US011258707B1

(12) United States Patent
Pudiyapura et al.

(10) Patent No.: US 11,258,707 B1
(45) Date of Patent: Feb. 22, 2022

(54) SYSTEMS FOR BUILDING DATA STRUCTURES WITH HIGHLY SCALABLE ALGORITHMS FOR A DISTRIBUTED LPM IMPLEMENTATION

(71) Applicant: Pensando Systems Inc., Milpitas, CA (US)

(72) Inventors: Ajeer Salil Pudiyapura, Sunnyvale, CA (US); Sarat Babu Kamisetty, Fremont, CA (US); Krishna Doddapaneni, Cupertino, CA (US)

(73) Assignee: PENSANDO SYSTEMS INC., Milpitas, CA (US)

( * ) Notice: Subject to any disclaimer, the term of this patent is extended or adjusted under 35 U.S.C. 154(b) by 0 days.

(21) Appl. No.: 17/000,172

(22) Filed: Aug. 21, 2020

(51) Int. Cl.
*H04L 12/66* (2006.01)
*H04L 45/745* (2022.01)
(Continued)

(52) U.S. Cl.
CPC .......... *H04L 45/7457* (2013.01); *H04L 45/48* (2013.01); *H04L 45/742* (2013.01);
(Continued)

(58) Field of Classification Search
CPC ... H04L 45/7457; H04L 45/48; H04L 45/742; H04L 45/748; H04L 49/901; H04L 49/9068
See application file for complete search history.

(56) References Cited

U.S. PATENT DOCUMENTS 6,731,643 B1 * 5/2004 Cucchi .................... H04L 45/04 370/401
7,043,494 B1 5/2006 Joshi et al.
(Continued)

FOREIGN PATENT DOCUMENTS

WO WO-2019046603 A1 3/2019
WO WO-2019164827 A1 8/2019
WO WO-2021222224 A1 11/2021

OTHER PUBLICATIONS

PCT/US2021/029368 International Search Report and Written Opinion dated Jul. 28, 2021.
(Continued)

*Primary Examiner* — Abdelnabi O Musa
(74) *Attorney, Agent, or Firm* — Wilson Sonsini Goodrich & Rosati

(57) ABSTRACT

Described are programmable IO devices configured to perform operations. These operations comprise: determining a set of range-based elements for a network; sorting the set of range-based elements according to a global order among the range-based elements; generating an interval table from the sorted range-based elements; generating an interval binary search tree from the interval table; propagating data stored in subtrees of interior stages of the interval binary search tree to subtrees of a last stage of the interval binary search tree such that the interior stages do not comprise data; converting the interval binary search tree to a Pensando Tree; compressing multiple levels of the Pensando Tree into cache-lines; and assembling the cache-lines in the memory unit such that each stage can compute an address of a next-cache line to be fetched by a next stage.

30 Claims, 140 Drawing Sheets

(51) Int. Cl.

| | |
|---|---|
| ***H04L 45/748*** | (2022.01) |
| ***H04L 45/48*** | (2022.01) |
| ***H04L 49/90*** | (2022.01) |
| ***H04L 45/74*** | (2022.01) |
| ***H04L 49/901*** | (2022.01) |
| ***H04L 47/2441*** | (2022.01) |

(52) U.S. Cl.

CPC ........ *H04L 45/748* (2013.01); *H04L 47/2441* (2013.01); *H04L 49/901* (2013.01); *H04L 49/9068* (2013.01)

(56) References Cited

U.S. PATENT DOCUMENTS

| | | | | |
|---|---|---|---|---|
| 8,996,535 | B1 | 3/2015 | Kimmel et al. | |
| 9,384,145 | B2 | 7/2016 | Gura et al. | |
| 2003/0009474 | A1 | 1/2003 | Hyland et al. | |
| 2004/0267732 | A1* | 12/2004 | Luk | H04L 45/7457 |
| 2005/0083937 | A1* | 4/2005 | Lim | H04L 45/7453 370/392 |
| 2005/0174272 | A1* | 8/2005 | Cadambi | G06F 16/9014 341/106 |
| 2006/0050640 | A1 | 3/2006 | Jin et al. | |
| 2006/0153179 | A1 | 7/2006 | Ho et al. | |
| 2008/0037420 | A1 | 2/2008 | Tang | |
| 2008/0148341 | A1* | 6/2008 | Ferguson | H04L 63/20 726/1 |
| 2008/0181112 | A1 | 7/2008 | Beck et al. | |
| 2010/0199344 | A1 | 8/2010 | Ling et al. | |
| 2011/0145260 | A1* | 6/2011 | Ichino | G06F 16/9014 707/747 |
| 2013/0322247 | A1 | 12/2013 | Li et al. | |
| 2014/0079297 | A1 | 3/2014 | Tadayon et al. | |
| 2014/0164641 | A1 | 6/2014 | Ye et al. | |
| 2014/0177455 | A1 | 6/2014 | Astigarraga et al. | |
| 2014/0201113 | A1* | 7/2014 | Harz | G06N 20/00 706/12 |
| 2014/0337472 | A1 | 11/2014 | Newton et al. | |
| 2015/0287192 | A1 | 10/2015 | Sasaki | |
| 2015/0341273 | A1 | 11/2015 | Naouri et al. | |
| 2017/0019803 | A1 | 1/2017 | Nguyen et al. | |
| 2017/0078205 | A1 | 3/2017 | Stalling et al. | |
| 2018/0213067 | A1 | 7/2018 | Yeh et al. | |
| 2019/0236752 | A1 | 8/2019 | Das | |

OTHER PUBLICATIONS

Co-pending U.S. Appl. No. 17/091,977, inventors Chu; Kit Chiu et al., filed Nov. 6, 2020.
Co-pending U.S. Appl. No. 16/415,609, filed May 17, 2019.
Co-pending U.S. Appl. No. 16/553,947, filed Aug. 28, 2019.
Co-pending U.S. Appl. No. 16/779,096, filed Jan. 31, 2020.
Co-pending U.S. Appl. No. 16/842,537, filed Apr. 7, 2020.
Co-pending U.S. Appl. No. 16/860,650, filed Apr. 28, 2020.
PCT/US2018/048893 International Search Report and Written Opinion dated Jan. 3, 2019.
PCT/US2020/033154 International Search Report and Written Opinion dated Aug. 26, 2020.
U.S. Appl. No. 16/860,650 Office Action dated Sep. 15, 2021.
Gupta: Algorithms for Routing Lookups and Packet Classification. Stanford University, Department of Computer Science, Doctoral Dissertation. Retrieved from the Internet: http://yuba.stanford.edu/~nickm/papers/pankaj-thesis.pdf [1-223] (2000).
Lim et al.: An Efficient IP Address Lookup Algorithm Using a Priority Trie. In IEEE Globecom [retrieved on Oct. 20, 2021], Retrieved from the Internet: https://www.researchgate.net/profile/Hyesook-Lim/publication/224695840_NXG06-1_An_Efficient_IP_Address_Lookup_Algorithrri_Using_a_Priority_Trie/links/02e7e5317d5bbale ce000000/NXG06-1-An-Efficient-IP-Address-Lookup-Algorithm-Using-a-Priority-Trie.pdf [1-5] (2006).
PCT/US2021/046970 International Search Report and Written Opinion dated Nov. 30, 2021.
Waldvogel et al.: Scalable High-Speed Prefix Matching. ACM Transactions on Computer Systems 19(4):440-482 Retrieved from the Internet: https://kops.uni-konstanz.de/bitstream/handle/123456789/6031/waldvogel01scalable.pdf?isAllowed=y&sequence=1 (2001).

* cited by examiner

500

| Prefix | → | Data |
|---|---|---|
| 1) 0.0.0.0/0 | → | NH1 |
| 2) 10.0.0.0/8 | → | NH2 |
| 3) 10.10.0.0/16 | → | HN3 |
| 4) 10.10.10.0/24 | → | NH4 |
| 5) 10.10.10.10/32 | → | NH5 |

| Source IP | Destination IP | Source Port | Destination Port | Protocol |
|---|---|---|---|---|
| 1) 0.0.0.0 /0 | 1) 0.0.0.0 /0 | 1) 0 - 65536 | 1) 0 - 65536 | 1) Any |
| 2) 10.0.0.0 /8 | 2) 10.0.0.0 /8 | 2) 2000 - 3000 | 2) 2000 - 3000 | 2) TCP |
| 3) 10.10.0.0 /16 | 3) 10.10.0.0 /16 | 3) 3000 - 3500 | 3) 3000 - 3500 | 3) UDP |
| 4) 10.10.10.0 /24 | 4) 10.10.10.0 /24 | 4) 5000 - 7000 | 4) 5000 - 7000 | 4) ICMP |
| 5) 10.10.10.10 /32 | 5) 10.10.10.10 /32 | 5) 8000 - 9999 | 5) 8000 - 9999 | 5) IGMP |

| Prefix | : | Mask | → | Data |
|---|---|---|---|---|
| 1) 0.0.0.0 | : | 0.0.0.0 | → | NH1 |
| 2) 10.0.0.0 | : | 255.0.0.0 | → | NH2 |
| 3) 10.10.0.0 | : | 255.255.0.0 | → | HN3 |
| 4) 10.10.10.0 | : | 255.255.255.0 | → | NH4 |
| 5) 10.10.10.10 | : | 255.255.255.255 | → | NH5 |

| Key | : | Mask |
|---|---|---|
| 1) 10.10.10.10 | : | 255.255.255.255 |
| 2) 10.10.10.0 | : | 255.255.255.0 |
| 3) 10.10.0.0 | : | 255.255.0.0 |
| 4) 10.0.0.0 | : | 255.0.0.0 |
| 5) 0.0.0.0 | : | 0.0.0.0 |

TCAM

| Data |
|---|
| 1) NH5 |
| 2) NH4 |
| 3) NH3 |
| 4) NH2 |
| 5) NH1 |

SRAM

| Interval Table |
|---|
| 1) 10.0.0.0 : A |
| 2) 10.10.0.0 : B |
| 3) 10.11.0.0 : A |
| 4) 10.15.0.0 : C |
| 5) 10.16.0.0 : A |
| 6) 11.0.0.0 : (-1) |
| 7) 11.10.0.0 : D |
| 8) 11.11.0.0 : E |
| 9) 11.12.0.0 : (-1) |
| 10) 192.168.0.0 : F |
| 11) 192.169.0.0 : (-1) |

873

Push Data to Exterior Nodes of Interval Binary Search Tree

Pushing the Next Hop to Leaf Nodes

Modified Binary Search

Data is not stored in the interior nodes

Building the Pensando Tree

Compress Multiple Levels into Each Cache-line

Port Range (16b) LPM Implementation for 8K scale

IPv4 Route LPM Implementation for 1K scale

IPv6 (64b) Route LPM Implementation for 1K scale

64b LPM cache line formats

1910

1912

IPv6 (128b) Route LPM Implementation for 1K scale

128b LPM cache line formats

128b LPM cache line formats

Generate the Final Memory Content from an Interval Table

Generate Memory Content from an Interval Table

Generate Memory Content from an Interval Table

SYSTEMS FOR BUILDING DATA STRUCTURES WITH HIGHLY SCALABLE ALGORITHMS FOR A DISTRIBUTED LPM IMPLEMENTATION

BACKGROUND

Network traffic refers to the amount of data moving across a network at a given point of time. Network data is mostly encapsulated in network packets, which provide the load in the network. Network traffic is the main component for network traffic measurement, network traffic control, and simulation. The proper organization of network traffic helps in ensuring the quality of service in a given network.

SUMMARY

Computing environments may include hosts such as servers, computers running one or more processes, such as virtual machines or containers. The hosts and/or processes may be configured to communicate with other processes or devices over a computing network. The host systems interface with the computing network via input/output (IO) devices (e.g., network interface cards (NICs)).

Computer systems interface to IO devices through a specified set of device registers and memory-based data structures. These registers and data structures are usually fixed for a given IO device, allowing a specific device driver program to run on the computer system and control the IO device. In a data communication network, network interfaces are normally fixedly defined control structures, descriptors, registers and the like. Networking data and control structures are memory based and access memory using direct memory access (DMA) semantics. Network systems such as switches, routing devices, receive messages or packets at one of a set of input interfaces and forward them on to one or more of a set of output interfaces. Users typically require that such routing devices operate as quickly as possible in order to keep pace with a high rate of incoming messages. One challenge associated with network systems relates to providing flexible network interfaces so as to adapt to changes in the network device structure and feature set, various protocols, operating systems, applications, and the rapid development of device models.

Communications service providers are investing heavily in large and hyper-scale data centers to deliver content, data processing, and communications services. The applications delivering these services must have access to high-speed storage and networking, be secure, and run in a virtualized environment based on software-defined networking (SDN). Virtualization software, load balancing, encryption, deep packet inspection (DPI), and packet processing all require many central processing unit (CPU) cycles and can tie up multiple processor cores, reducing the number of cores available for applications.

A NIC is a Peripheral Component Interconnect Express (PCIe) expansion card that plugs into a server or storage box to enable connectivity to an Ethernet network. Traditional NICs support offload of CPU functions, such as checksum and segmentation. However, with the recent tectonic shift in cloud data center networking driven by SDN and network functions virtualization (NFV), a new class of offload NIC is needed. More specifically, the complexity of the server-based networking data plane has increased dramatically with the introduction of overlay tunneling protocols, such as virtual extensible local-area network (VXLAN), and virtual switching with complex actions. Additionally, increasing network interface bandwidths mean that performing these functions in software creates an untenable load on the CPU resources, leaving little or no CPU left over to run applications. Moreover, a key requirement of SDN is that the networking data plane must remain fungible, so fixed-function offload technologies cannot be applied.

A smartNIC (also known as an intelligent server adapter (ISA)) goes beyond simple connectivity and implements network traffic processing on the NIC that would necessarily be performed by the CPU in the case of a foundational NIC. SmartNICs can be employed in cloud data center servers to boost performance by offloading operations of the CPUs of the servers by performing network datapath processing through an IO subsystem. For example, the IO subsystem provided through a SmartNIC offloads low-level operations from server CPUs to dramatically increasing network and application performance. By installing smartNICs, communications service providers can deliver significantly better revenue-earning services with a small increase in investment.

With the increase in the complexity of networks and the protocols which run on them, the amount of processing that hosts must perform for networking operations has increased exponentially. This problem is amplified because of as requirement for more network bandwidth grows so does the need for precious host CPU time. As such, ISAs are increasingly deployed in datacenters to offload these complex networking tasks away from the host CPU. This allows more CPU available to the applications on the host. ISAs include a capacity to a large amount of state data that can be used to provide advanced services. ISAs are usually presented to the host as a PCIe device but can also be involved in offloading host CPU tasks as a bump-in-the-wire ethernet device. The advanced functions can be host agnostic as a host usually uses off the rack drivers to communicate with these devices. ISA devices can be managed separately from the hosts by administrators who are not necessarily the same as the host administrators.

Moreover, cloud customers want enormous scale. For example, 1 Million Internet Protocol version 4 (IPv4) routes and 1 Million Internet Protocol version 6 (IPv6) routes. To put this in perspective, the total number of v4 and v6 routes on the internet is 795,000 and 75,000 respectively (5 Sep. 2019). These customers also want 1 Million v4 policy rules AND 1 Million v6 policy rules. In some embodiments, the above described IO subsystem includes a total of 192 KB of ternary content accessible memory (TCAM) in its data plane, which is insufficient for this scale. Moreover, the power requirement for cloud solutions is less than 50 W, which cannot support additional TCAM.

Some industry solutions target the Application Specific Integrated Circuit (ASIC) data path. These solutions primarily focus on traditional data path design, and thus are constrained by their limitations. These solutions may employ parallel or cascaded lookups and minimal or no processing between the lookups and attempt to slice and dice the IP address space, which makes IPv6 especially hard to implement and wastes enormous amounts of memory and are not highly scalable. Other solutions can be implemented in network processor cores and employ complex data structure schemes that require significant amounts of computing to process, are difficult to estimate the upper bound on processing latency and cannot meet high line rate. None of these solutions are optimal for a P4 programmable data path such as employed is the described IO subsystem where small amounts of processing can be performed in each stage (e.g., a tiny search). As such, the described system employs a solution that divides the problem into small amount of processing using a small amount of data that can be distributed among various stages.

Additional, longest prefix match (LPM) lookup that can be employed within, for example data plane routing, are labor intensive for various reasons including the following: an LPM lookup is a many-to-one mapping; valid keys that may be looked up do not have a unique entry in a look up table; index lookups cannot be used without expanding prefixes into their individual values; storage and processing of look up tables consumes a lot of memory; tries cannot be employed because may have up to 128 levels (IPv6) of nesting; too many decision stages; stride-based algorithms waste a lot of memory; prefixes are ranges with a lower value (floor) and an upper value (ceiling) and a lookup should find the range within which the lookup key belongs; various prefixes can have different prefix lengths (or range sizes); hash lookups cannot be employed because which prefix length to use is unknown; a separate hash lookup for each possible prefix length, 128 in total, is too many lookups; multiple, overlapping prefixes can exist in a table; a lookup key may match multiple overlapping prefixes; a lookup needs to find the narrowest range (longest prefix) in which the lookup key fits into; all entries in the table are examined during a lookup for the correct match; binary searches on prefixes cannot be used because the search cannot be stopped when the key matches a range as there could be more specific (longer) matches; and ternary trees and ternary searches wastes memory.

Described herein, in certain embodiments, are systems employing an IO device to provide a control plane to program data forwarding hardware. In some embodiments, the described system employs multiple cascading stages where each stage can perform arithmetical operations through an arithmetic logic units (ALU) and a match processing unit (MPU). In some embodiments, the described system employs a Pensando Tree without storing pointers in the nodes to optimize cache and memory access performance as well as significantly reducing the total memory requirement. In some embodiments, the described system employs the Pensando Tree without storing data in the interior nodes to achieve a higher exponential explosion. In some embodiments, the described system compresses multiple levels of the Pensando Tree efficiently to optimize performance in pipelined processing and achieve a higher exponential explosion per stage.

Accordingly, in one aspect, disclosed herein is a programmable IO device. The programmable IO device comprising a memory unit. The memory unit having instructions stored thereon which, when executed by the programmable IO device, cause the programmable IO device to perform operations comprising: determining a set of range-based elements for a network; sorting the set of range-based elements according to a global order among the range-based elements; generating an interval table from the sorted range-based elements; generating an interval binary search tree from the interval table; propagating data stored in subtrees of interior stages of the interval binary search tree to subtrees of a last stage of the interval binary search tree such that the interior stages do not comprise data; converting the interval binary search tree to a Pensando Tree; compressing multiple levels of the Pensando Tree into cache-lines based on a stage from which each of the levels is accessed; and assembling the cache-lines in the memory unit such that each stage can compute an address of a next-cache line of the cache-lines to be fetched by a next stage using an address of a current cache-line of the cache-lines and an outgoing branch number of the subtree at a current stage. In some embodiments, packets received in a data plane are classified based on the Pensando Tree without storing memory addresses in the cache-lines. In some embodiments, the programmable IO device comprises at least one ARM processor. In some embodiments, the instructions stored on the memory unit are executed by the at least one ARM processor. In some embodiments, the control plane is executed via the at least one ARM processor. In some embodiments, the programmable IO device comprises an MPU. In some embodiments, the packets received in the data plane are classified by the MPU based on a modified binary search of the Pensando Tree to determine an LPM. In some embodiments, the MPU executes multiple cascading stages to perform the modified binary search. In some embodiments, the MPU comprises at least one ALU. In some embodiments, each of the multiple cascading stages performs an arithmetical operation through the ALU. In some embodiments, a lookup result of the modified binary search is not determined until the Pensando Tree is fully traversed. In some embodiments, individual nodes of the Pensando Tree stored in one of the cache-lines are accessed directly as structure members. In some embodiments, the address of a next cache line is computed based on an address of a current cache-line and an index of an outgoing branch of the Pensando Tree stored in the current cache-line. In some embodiments, the index of the outgoing branch is determined according to the modified binary search. In some embodiments, the modified binary search is performed by fetching data stored in a selected one of the cache-lines. In some embodiments, the selected cache-line is determined based on address computation. In some embodiments, the interval table is generated from the sorted set of range-based elements via a stack. In some embodiments, the set of range-based elements is sorted according to a sorting algorithm that receives the set of range-based elements and determines an ordered version of the set of range-based elements according to the global order. In some embodiments, the cache-lines are assembled in the memory unit according to a linear algorithm. In some embodiments, the assembling of the cache-lines in the memory unit does not require memory pointers. In some embodiments, the linear algorithm comprises: selecting, for each of the stages of the Pensando Tree, a first cache-line of the cache-lines as a current cache-line for that stage; initializing the current cache-lines of all of the stages to a respective max value; initializing a default result data of the current cache-line for the last stage with a default result data; and traversing the interval table in ascending order, wherein each entry in the interval table comprises an interval value and a result data, for each traversed entry: when a current-cache line of the last stage is not full, adding the interval value and the result data to the current-cache line for the last stage; and when the current-cache line of the last stage is full: recursively promoting the interval value to a previous stage or stages; updating the current-cache line to represent the cache-line where the next numerically higher interval values will be stored for the previous stage or stages; reinitializing the updated current-cache lines with max values representing the next numerically higher cache-line for that stage; and setting the default result data for the reinitialized current cache-line for the last stage to the result data of the just promoted node. In some embodiments, the first cache-line stores a numerically lowest interval value. In some embodiments, the range-based elements comprise a set of available prefixes. In some embodiments, the global order is determined according to the lengths of the available prefixes. In some embodiments, the set of available prefixes comprise overlapping prefixes. In some embodiments, configured values for the range-based elements and associated data elements are converted into the interval binary search tree by: generating, as a range-based element number line, a number line representation of range-based values for the range-based elements and respective data element values associated with each of the range-based values over another number line, as a key space number line, which represents an entire number space of a search key; projecting each of the range-based element number lines onto the key space number line to mark a beginning point and an ending point of each of the range-based element number lines such that the key space number line is divided into distinct intervals, wherein each of the distinct interval comprises a unique data element value, and wherein each of the unique data element value represents a data element value of a deepest nested range-based element number line above the respective interval; and deriving the Pensando Tree from the distinct intervals on the key space number line and the respective data element values associated with each of the distinct intervals. In some embodiments, each of the data elements mapped in the Pensando Tree comprise a routing policy, a metered identifier, a policer identifier, or a routing element. In some embodiments, each of the range-based elements comprises an Internet Protocol (IP) address, wherein the associated data element comprises a next hop, and wherein classifying the packets comprises providing the packets to an outbound interface, the outbound interface determined according to a lookup result of a modified binary search of the Pensando Tree. In some embodiments, for the right-subtrees of all the nodes of the Pensando Tree starting at the root node of the interval binary search tree, the result data value from the node is stored as the result data value of a left most egress branch for the subtree in a left most leaf node of the subtree. In some embodiments, the programmable IO device is an ISA. In some embodiments, the programmable IO device is a router or a switch. In some embodiments, the Pensando Tree comprises a completely filled binary tree comprising nodes that are initialized with a max value and valid nodes that are populated in an order and exhibit the Binary Search Tree (BST) property. In some embodiments, the order is left to right.

In a related yet separate aspect, disclosed herein is a method for providing a control plane to program data forwarding hardware. The method being executed by a programmable IO device. The method comprising: determining a set of range-based elements for a network; sorting the set of range-based elements according to a global order among the range-based elements; generating an interval table from the sorted range-based elements; generating an interval binary search tree from the interval table; propagating data stored in subtrees of interior stages of the interval binary search tree to subtrees of a last stage of the interval binary search tree such that the interior stages do not comprise data; converting the interval binary search tree to a Pensando Tree; compressing multiple levels of the Pensando Tree into cache-lines based on a stage from which each of the levels is accessed; and assembling the cache-lines in a memory unit such that each stage can compute an address of a next-cache line of the cache-lines to be fetched by a next stage using an address of a current cache-line of the cache-lines and an outgoing branch number of the subtree at a current stage. In some embodiments, packets received in a data plane are classified based on the Pensando Tree without storing memory addresses in the cache-lines. In some embodiments, the programmable IO device comprises at least one ARM processor. In some embodiments, the instructions stored on the memory unit are executed by the at least one ARM processor. In some embodiments, the control plane is executed via the at least one ARM processor. In some embodiments, the programmable IO device comprises an MPU. In some embodiments, the packets received in the data plane are classified by the MPU based on a modified binary search of the Pensando Tree to determine an LPM. In some embodiments, the MPU executes multiple cascading stages to perform the modified binary search. In some embodiments, the MPU comprises at least one ALU. In some embodiments, each of the multiple cascading stages performs an arithmetical operation through the ALU. In some embodiments, a lookup result of the modified binary search is not determined until the Pensando Tree is fully traversed. In some embodiments, individual nodes of the Pensando Tree stored in one of the cache-lines are accessed directly as structure members. In some embodiments, the address of a next cache line is computed based on an address of a current cache-line and an index of an outgoing branch of the Pensando Tree stored in the current cache-line. In some embodiments, the index of the outgoing branch is determined according to the modified binary search. In some embodiments, the modified binary search is performed by fetching data stored in a selected one of the cache-lines. In some embodiments, the selected cache-line is determined based on address computation. In some embodiments, the interval table is generated from the sorted set of range-based elements via a stack. In some embodiments, the set of range-based elements is sorted according to a sorting algorithm that receives the set of range-based elements and determines an ordered version of the set of range-based elements according to the global order. In some embodiments, the cache-lines are assembled in the memory unit according to a linear algorithm. In some embodiments, the assembling of the cache-lines in the memory unit does not require memory pointers. In some embodiments, the linear algorithm comprises: selecting, for each of the stages of the Pensando Tree, a first cache-line of the cache-lines as a current cache-line for that stage; initializing the current cache-lines of all of the stages to a respective max value; initializing a default result data of the current cache-line for the last stage with a default result data; and traversing the interval table in ascending order, wherein each entry in the interval table comprises an interval value and a result data, for each traversed entry: when a current-cache line of the last stage is not full, adding the interval value and the result data to the current-cache line for the last stage; and when the current-cache line of the last stage is full: recursively promoting the interval value to a previous stage or stages; updating the current-cache line to represent the cache-line where the next numerically higher interval values will be stored for the previous stage or stages; reinitializing the updated current-cache lines with max values representing the next numerically higher cache-line for that stage; and setting the default result data for the reinitialized current cache-line for the last stage to the result data of the just promoted node. In some embodiments, the first cache-line stores a numerically lowest interval value. In some embodiments, the range-based elements comprise a set of available prefixes. In some embodiments, the global order is determined according to the lengths of the available prefixes. In some embodiments, the set of available prefixes comprise overlapping prefixes. In some embodiments, configured values for the range-based elements and associated data elements are converted into the interval binary search tree by: generating, as a range-based element number line, a number line representation of range-based values for the range-based elements and respective data element values associated with each of the range-based values over another number line, as a key space number line, which represents an entire number space of a search key; projecting each of the range-based element number lines onto the key space number line to mark a beginning point and an ending point of each of the range-based element number lines such that the key space number line is divided into distinct intervals, wherein each of the distinct interval comprises a unique data element value, and wherein each of the unique data element value represents a data element value of a deepest nested range-based element number line above the respective interval; and deriving the Pensando Tree from the distinct intervals on the key space number line and the respective data element values associated with each of the distinct intervals. In some embodiments, each of the data elements mapped in the Pensando Tree comprise a routing policy, a metered identifier, a policer identifier, or a routing element. In some embodiments, each of the range-based elements comprises an Internet Protocol (IP) address, wherein the associated data element comprises a next hop, and wherein classifying the packets comprises providing the packets to an outbound interface, the outbound interface determined according to a lookup result of a modified binary search of the Pensando Tree. In some embodiments, for the right-subtrees of all the nodes of the Pensando Tree starting at the root node of the interval binary search tree, the result data value from the node is stored as the result data value of a left most egress branch for the subtree in a left most leaf node of the subtree. In some embodiments, the programmable IO device is an ISA. In some embodiments, the programmable IO device is a router or a switch. In some embodiments, the Pensando Tree comprises a completely filled binary tree comprising nodes that are initialized with a max value and valid nodes that are populated in an order and exhibit the Binary Search Tree (BST) property. In some embodiments, the order is left to right. In a related yet separate aspect, disclosed herein is a method for providing a control plane to program data forwarding hardware. The method being executed by a programmable IO device. The method comprising: determining a set of range-based elements for a network; sorting the set of range-based elements according to a global order among the range-based elements; generating an interval table from the sorted range-based elements; generating an interval binary search tree from the interval table; propagating data stored in subtrees of interior stages of the interval binary search tree to subtrees of a last stage of the interval binary search tree such that the interior stages do not comprise data; converting the interval binary search tree to a Pensando Tree; compressing multiple levels of the Pensando Tree into cache-lines based on a stage from which each of the levels is accessed; and assembling the cache-lines in a memory unit such that each stage can compute an address of a next-cache line of the cache-lines to be fetched by a next stage using an address of a current cache-line of the cache-lines and an outgoing branch number of the subtree at a current stage. In some embodiments, packets received in a data plane are classified based on the Pensando Tree without storing memory addresses in the cache-lines In a related yet separate aspect, disclosed herein is a system comprising: a programmable IO device configured to execute instructions that cause the programmable IO device to perform operations comprising: determining a set of range-based elements for a network; sorting the set of range-based elements according to a global order among the range-based elements; generating an interval table from the sorted range-based elements; generating an interval binary search tree from the interval table; propagating data stored in subtrees of interior stages of the interval binary search tree to subtrees of a last stage of the interval binary search tree such that the interior stages do not comprise data; converting the interval binary search tree to a Pensando Tree; compressing multiple levels of the Pensando Tree into cache-lines based on a stage from which each of the levels is accessed; and assembling the cache-lines in a memory unit such that each stage can compute an address of a next-cache line of the cache-lines to be fetched by a next stage using an address of a current cache-line of the cache-lines and an outgoing branch number of the subtree at a current stage. In some embodiments, packets received in a data plane are classified based on the Pensando Tree without storing memory addresses in the cache-lines. In some embodiments, the programmable IO device comprises at least one ARM processor. In some embodiments, the instructions stored on the memory unit are executed by the at least one ARM processor. In some embodiments, the control plane is executed via the at least one ARM processor. In some embodiments, the programmable IO device comprises an MPU. In some embodiments, the packets received in the data plane are classified by the MPU based on a modified binary search of the Pensando Tree to determine an LPM. In some embodiments, the MPU executes multiple cascading stages to perform the modified binary search. In some embodiments, the MPU comprises at least one ALU. In some embodiments, each of the multiple cascading stages performs an arithmetical operation through the ALU. In some embodiments, a lookup result of the modified binary search is not determined until the Pensando Tree is fully traversed. In some embodiments, individual nodes of the Pensando Tree stored in one of the cache-lines are accessed directly as structure members. In some embodiments, the address of a next cache line is computed based on an address of a current cache-line and an index of an outgoing branch of the Pensando Tree stored in the current cache-line. In some embodiments, the index of the outgoing branch is determined according to the modified binary search. In some embodiments, the modified binary search is performed by fetching data stored in a selected one of the cache-lines. In some embodiments, the selected cache-line is determined based on address computation. In some embodiments, the interval table is generated from the sorted set of range-based elements via a stack. In some embodiments, the set of range-based elements is sorted according to a sorting algorithm that receives the set of range-based elements and determines an ordered version of the set of range-based elements according to the global order. In some embodiments, the cache-lines are assembled in the memory unit according to a linear algorithm. In some embodiments, the assembling of the cache-lines in the memory unit does not require memory pointers. In some embodiments, the linear algorithm comprises: selecting, for each of the stages of the Pensando Tree, a first cache-line of the cache-lines as a current cache-line for that stage; initializing the current cache-lines of all of the stages to a respective max value; initializing a default result data of the current cache-line for the last stage with a default result data; and traversing the interval table in ascending order, wherein each entry in the interval table comprises an interval value and a result data, for each traversed entry: when a current-cache line of the last stage is not full, adding the interval value and the result data to the current-cache line for the last stage; and when the current-cache line of the last stage is full: recursively promoting the interval value to a previous stage or stages; updating the current-cache line to represent the cache-line where the next numerically higher interval values will be stored for the previous stage or stages; reinitializing the updated current-cache lines with max values representing the next numerically higher cache-line for that stage; and setting the default result data for the reinitialized current cache-line for the last stage to the result data of the just promoted node. In some embodiments, the first cache-line stores a numerically lowest interval value. In some embodiments, the range-based elements comprise a set of available prefixes. In some embodiments, the global order is determined according to the lengths of the available prefixes. In some embodiments, the set of available prefixes comprise overlapping prefixes. In some embodiments, configured values for the range-based elements and associated data elements are converted into the interval binary search tree by: generating, as a range-based element number line, a number line representation of range-based values for the range-based elements and respective data element values associated with each of the range-based values over another number line, as a key space number line, which represents an entire number space of a search key; projecting each of the range-based element number lines onto the key space number line to mark a beginning point and an ending point of each of the range-based element number lines such that the key space number line is divided into distinct intervals, wherein each of the distinct interval comprises a unique data element value, and wherein each of the unique data element value represents a data element value of a deepest nested range-based element number line above the respective interval; and deriving the Pensando Tree from the distinct intervals on the key space number line and the respective data element values associated with each of the distinct intervals. In some embodiments, each of the data elements mapped in the Pensando Tree comprise a routing policy, a metered identifier, a policer identifier, or a routing element. In some embodiments, each of the range-based elements comprises an Internet Protocol (IP) address, wherein the associated data element comprises a next hop, and wherein classifying the packets comprises providing the packets to an outbound interface, the outbound interface determined according to a lookup result of a modified binary search of the Pensando Tree. In some embodiments, for the right-subtrees of all the nodes of the Pensando Tree starting at the root node of the interval binary search tree, the result data value from the node is stored as the result data value of a left most egress branch for the subtree in a left most leaf node of the subtree. In some embodiments, the programmable IO device is an ISA. In some embodiments, the programmable IO device is a router or a switch. In some embodiments, the Pensando Tree comprises a completely filled binary tree comprising nodes that are initialized with a max value and valid nodes that are populated in an order and exhibit the Binary Search Tree (BST) property. In some embodiments, the order is left to right. In a related yet separate aspect, disclosed herein is a method for providing a control plane to program data forwarding hardware. The method being executed by a programmable IO device. The method comprising: determining a set of range-based elements for a network; sorting the set of range-based elements according to a global order among the range-based elements; generating an interval table from the sorted range-based elements; generating an interval binary search tree from the interval table; propagating data stored in subtrees of interior stages of the interval binary search tree to subtrees of a last stage of the interval binary search tree such that the interior stages do not comprise data; converting the interval binary search tree to a Pensando Tree; compressing multiple levels of the Pensando Tree into cache-lines based on a stage from which each of the levels is accessed; and assembling the cache-lines in a memory unit such that each stage can compute an address of a next-cache line of the cache-lines to be fetched by a next stage using an address of a current cache-line of the cache-lines and an outgoing branch number of the subtree at a current stage. In some embodiments, packets received in a data plane are classified based on the Pensando Tree without storing memory addresses in the cache-lines.

Particular embodiments of the subject matter described in this disclosure can be implemented so as to realize one or more of the following advantages. In some embodiments, the described system provides for control plane algorithms used to efficiently build the data structures that are used in the data plane implementation explained there. In some embodiments, the described system organizes memory into cache-lines that can be accessed by each of a series of cascading stages. In some embodiments, the described system employs algorithms that can be leveraged for LPMs of varying widths and expansion at each stage. In some embodiments, the described system is design for scale to avoid control plane bottlenecks by using highly efficient algorithms (e.g., linear).

It shall be understood that different aspects of the described system can be appreciated individually, collectively, or in combination with each other. Various aspects of the systems described herein may be applied to any of the particular applications set forth below or for any other types of the data processing system disclosed herein. Any description herein concerning the data processing may apply to and be used for any other data processing situations. Additionally, any embodiments disclosed in the context of the data processing system or apparatuses are also applicable to the methods disclosed herein.

BRIEF DESCRIPTION OF THE DRAWINGS

A better understanding of the features and advantages of the present subject matter will be obtained by reference to the following detailed description that sets forth illustrative embodiments and the accompanying drawings of which:

FIG. 5A depicts a non-limiting exemplary route table;

FIG. 5B depicts non-limiting exemplary policy match tables;

FIG. 5C depicts a non-limiting exemplary table that includes a mask in addition to the key to match and the data to retrieve;

FIG. 5D depicts non-limiting exemplary tables that show how LPMs can be implemented in traditional switches;

DETAILED DESCRIPTION

Figure 1:
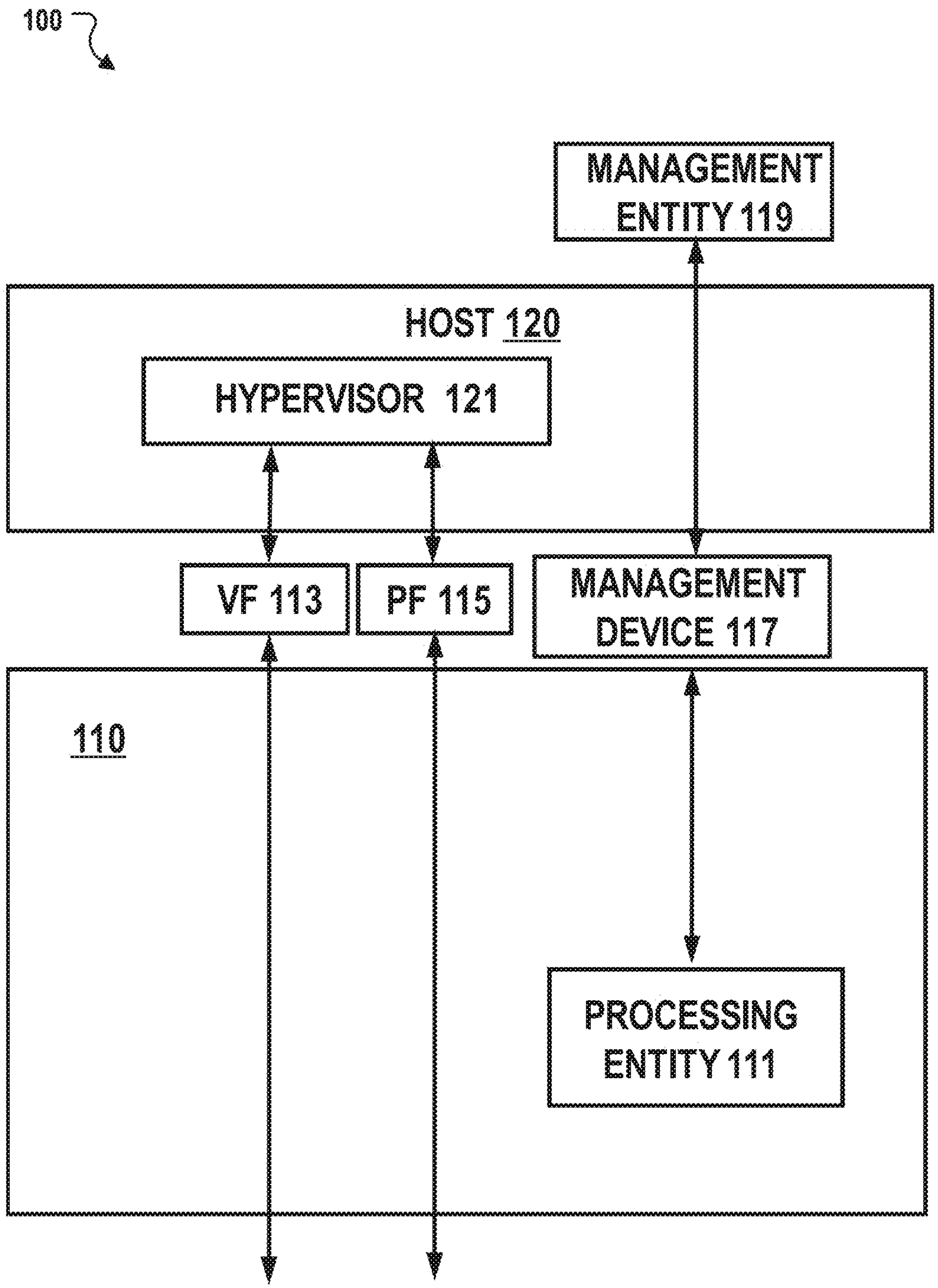
FIG. 1 depicts a non-limiting exemplary computing system architecture that may be employed by embodiments of the present disclosure.

Described herein, in certain embodiments, are programmable IO devices. Each programmable IO device comprising: a memory unit. The memory unit having instructions stored thereon which, when executed by the programmable IO device, cause the programmable IO device to perform operations. These operation comprise: determining a set of range-based elements for a network; sorting the set of range-based elements according to a global order among the range-based elements; generating an interval table from the sorted range-based elements; generating an interval binary search tree from the interval table; propagating data stored in subtrees of interior stages of the interval binary search tree to subtrees of a last stage of the interval binary search tree such that the interior stages do not comprise data; converting the interval binary search tree to a Pensando Tree; compressing multiple levels of the Pensando Tree into cache-lines based on a stage from which each of the levels is accessed; and assembling the cache-lines in the memory unit such that each stage can compute an address of a next-cache line of the cache-lines to be fetched by a next stage using an address of a current cache-line of the cache-lines and an outgoing branch number of the subtree at a current stage, wherein packets received in a data plane are classified based on the Pensando Tree without storing memory addresses in the cache-lines.

Also described herein, in certain embodiments, are methods for providing a control plane to program data forwarding hardware. The method being executed by a programmable IO device and comprising: determining a set of range-based elements for a network; sorting the set of range-based elements according to a global order among the range-based elements; generating an interval table from the sorted range-based elements; generating an interval binary search tree from the interval table; propagating data stored in subtrees of interior stages of the interval binary search tree to subtrees of a last stage of the interval binary search tree such that the interior stages do not comprise data; converting the interval binary search tree to a Pensando Tree; compressing multiple levels of the Pensando Tree into cache-lines based on a stage from which each of the levels is accessed; and assembling the cache-lines in a memory unit such that each stage can compute an address of a next-cache line of the cache-lines to be fetched by a next stage using an address of a current cache-line of the cache-lines and an outgoing branch number of the subtree at a current stage, wherein packets received in a data plane are classified based on the Pensando Tree without storing memory addresses in the cache-lines.

Also described herein, in certain embodiments, are systems comprising a programmable IO device configured to execute instructions that cause the programmable IO device to perform operations comprising: determining a set of range-based elements for a network; sorting the set of range-based elements according to a global order among the range-based elements; generating an interval table from the sorted range-based elements; generating an interval binary search tree from the interval table; propagating data stored in subtrees of interior stages of the interval binary search tree to subtrees of a last stage of the interval binary search tree such that the interior stages do not comprise data; converting the interval binary search tree to a Pensando Tree; compressing multiple levels of the Pensando Tree into cache-lines based on a stage from which each of the levels is accessed; and assembling the cache-lines in a memory unit such that each stage can compute an address of a next-cache line of the cache-lines to be fetched by a next stage using an address of a current cache-line of the cache-lines and an outgoing branch number of the subtree at a current stage, wherein packets received in a data plane are classified based on the Pensando Tree without storing memory addresses in the cache-lines.

Certain Definitions

Unless otherwise defined, all technical terms used herein have the same meaning as commonly understood by one of ordinary skill in the art to which this described system belongs.

As used herein, the singular forms "a," "an," and "the" include plural references unless the context clearly dictates otherwise. Any reference to "or" herein is intended to encompass "and/or" unless otherwise stated.

Reference throughout this specification to "some embodiments," or "an embodiment," means that a particular feature, structure, or characteristic described in connection with the embodiment is included in at least one embodiment. Thus, the appearances of the phrase "in some embodiments," or "in an embodiment," in various places throughout this specification are not necessarily all referring to the same embodiment. Furthermore, the particular features, structures, or characteristics may be combined in any suitable manner in one or more embodiments.

As referenced herein, terms "component," "system," "interface," "unit," "block," "device" and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Further, these components can execute from various computer readable media having various data structures stored thereon. The components can communicate via local and/or remote processes such as in accordance with a signal having one or more data packets (e.g., data from one component interacting with another component in a local system, distributed system, and/or across a network, e.g., the Internet, a local area network, a wide area network, etc. with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components.

Moreover, the word "exemplary" where used herein to means serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

As used herein, the term "real-time" refers to transmitting or processing data without intentional delay given the processing limitations of a system, the time required to accurately obtain data and images, and the rate of change of the data and images. In some examples, "real-time" is used to describe the presentation of information obtained from components of embodiments of the present disclosure.

As used herein, PCIe includes a high-speed serial computer expansion bus standard. In some examples, PCIe is a motherboard interface for hardware components, such as, graphics cards, hard drives, solid-state drives (SSDs), Wi-Fi and Ethernet hardware connections. PCIe is based on point-to-point topology, with separate serial links connecting every device to the root complex (host). PCIe has improvements over the older standards (e.g., Peripheral Component Interconnect (PCI), PCI eXtended (PCI-X) and Accelerated Graphics Port (AGP) bus standards), including higher maximum system bus throughput, lower input output (I/O) pin count and smaller physical footprint, better performance scaling for bus devices, a more detailed error detection and reporting mechanism (e.g., Advanced Error Reporting, (AER)), and native hot-swap functionality. More recent revisions of the PCIe standard provide hardware support for I/O virtualization.

As used herein, an expansion card includes a printed circuit board that can be inserted into an electrical connector, or expansion slot, on a computer motherboard, backplane or riser card to add functionality to a computer system via an expansion bus. In some embodiments, an expansion bus is a computer bus that moves information between the internal hardware of a computer system, such as the CPU and random access memory (RAM), and peripheral devices such as cache, other memory, data storage or electronic display adapters.

As used herein, operations include compression, decompression, encryption, decryption, hash digest computation (dedupe), checksum, and so forth. In some embodiments, these operations also perform "generic" work, such as fetch, decode and execute.

As used herein, a chain of operations includes a combination or a sequence of operations. For example, compress plus encrypt, decrypt plus decompress, checksum plus encrypt plus checksum, and hash plus compress plus pad plus hash.

As used herein, a datapath includes a collection of functional units, such as arithmetic logic units or multipliers, which perform data processing operations, registers, and buses. A larger datapath can be made by joining more than one number of datapaths using multiplexer. In some embodiments, offload chaining within a datapath provides for increased processing throughput. For example, a smartNIC may have a 100 Gigabits per second (Gbps) PCIe data path which, if not properly employed by, for example, a host operating system, would not achieve the full 100 Gbps throughput. The counterpart of a datapath is the control path, which may execute on a host CPU and, as such, would not be able to reach the 100 Gbps throughput.

As used herein, a Pensando tree is a completely filled binary tree whose nodes are initialized with some MAX value, and whose valid (non MAX value) nodes are populated in-order (e.g., left to right) and exhibit the BST property.

Embodiments of the described system may be used in a variety of applications. Some embodiments of the described system may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, a wireless communication station, a wireless communication device, a wireless access point (AP), a modem, a network, a wireless network, a local area network (LAN), a wireless LAN (WLAN), a metropolitan area network (MAN), a wireless MAN (WMAN), a wide area network (WAN), a wireless WAN (WWAN), a personal area network (PAN), a wireless PAN (WPAN), devices and/or networks operating in accordance with existing IEEE 802.11, 802.11a, 802.11b, 802.11e, 802.11g, 802.11h, 802.11i, 802.11n, 802.16, 802.16d, 802.16e standards and/or future versions and/or derivatives and/or long term evolution (LTE) of the above standards, units and/or devices which are part of the above networks, one way and/or two-way radio communication systems, cellular radio-telephone communication systems, a cellular telephone, a wireless telephone, a personal communication systems (PCS) device, a PDA device which incorporates a wireless communication device, a multiple input multiple output (MIMO) transceiver or device, a single input multiple output (SIMO) transceiver or device, a multiple input single output (MISO) transceiver or device, or the like.

The term "table" refers to a variety types of tables involved in data or packet processing. For example, the table may be match tables used in the match+action stages, such as forwarding tables (e.g., hash tables for Ethernet address lookup, the longest-prefix match tables for IPv4 or IPv6, wildcard lookups for ACLs). These tables may be stored in various memory locations such as in internal SRAM, NIC DRAM, or host memory.

The term "match+action" refers to the paradigm for network packet switching (such as those performed by an OpenFlow switch or P4 pipeline, which uses match tables, action tables, statistics memories, meters memories, stateful memories, and ternary indirection memories). The term "P4" refers to a high-level language for programming protocol-independent packet processors. P4 is a declarative language for expressing how packets are processed by the pipeline of a network forwarding element such as a switch, NIC, router or network function appliance. It is based upon an abstract forwarding model consisting of a parser and a set of match+action table resources, divided between ingress and egress. The parser identifies the headers present in each incoming packet. Each match+action table performs a lookup on a subset of header fields and applies the actions corresponding to the first match within each table.

The term "stateful configuration state" refers to the entries in the memory that correspond to the two-legs of the bi-directional flow and entries that are not updated on a per-packet basis and are instead created with the first flow-miss packet.

While portions of this disclosure, for demonstrative purposes, refer to wired and/or wired communication systems or methods, embodiments of the described system are not limited in this regard. As an example, one or more wired communication systems, can utilize one or more wireless communication components, one or more wireless communication methods or protocols, or the like.

Although some portions of the discussion herein may relate, for demonstrative purposes, to a fast or high-speed interconnect infrastructure, to a fast or high-speed interconnect component or adapter with OS bypass capabilities, to a fast or high-speed interconnect card or NIC with OS bypass capabilities, or to a to a fast or high-speed interconnect infrastructure or fabric, embodiments of the described system are not limited in this regard, and may be used in conjunction with other infrastructures, fabrics, components, adapters, host channel adapters, cards or NICs, which may or may not necessarily be fast or high-speed or with OS bypass capabilities. For example, some embodiments of the described system may be utilized in conjunction with InfiniBand (TB) infrastructures, fabrics, components, adapters, host channel adapters, cards or NICs; with Ethernet infrastructures, fabrics, components, adapters, host channel adapters, cards or NICs; with gigabit Ethernet (GEth) infrastructures, fabrics, components, adapters, host channel adapters, cards or NICs; with infrastructures, fabrics, components, adapters, host channel adapters, cards or NICs that have OS with infrastructures, fabrics, components, adapters, host channel adapters, cards or NICs that allow a user mode application to directly access such hardware and bypassing a call to the operating system (namely, with OS bypass capabilities); with infrastructures, fabrics, components, adapters, host channel adapters, cards or NICs; with infrastructures, fabrics, components, adapters, host channel adapters, cards or NICs that are connectionless and/or stateless; and/or other suitable hardware.

Computer systems employ a wide variety of peripheral components or IO devices. An example of a host processor of a computer system connected to IO devices through a component bus defined by PCIe, a high-speed serial computer expansion bus standard. Device drivers (also referred to drivers) are hardware-specific software which controls the operation of hardware devices connected to computing systems.

In computing, virtualization techniques are used to allow multiple operating systems to simultaneously share processor resources. One such virtualization technique is Single Root I/O Virtualization (SR-IOV), which is described in the PCI-SIG Single Root I/O Virtualization and Sharing Specifications. A physical IO device may allow multiple virtual machines to use the device concurrently through SR-IOV. In SR-IOV, a physical device may have physical functions (PFs) that allow for input/output operations and device configuration, as well as one or more virtual functions (VFs) that allow for data input/output. According to SR-IOV, a PCIe device can appear to be multiple separate physical PCIe devices. For example, a SR-IOV NIC having a single port can have up to 256 virtual functions, with each virtual function representing a respective NIC port.

In one aspect, a programmable device interface is provided. The device interface may be a highly optimized ring based I/O queue interface with an efficient software programming model to deliver high performance with CPU and PCIe bus efficiency. FIG. 1 shows a block diagram of an exemplary computing system architecture 100, in accordance with embodiments of the described system. A hypervisor 121 on the host computing system 120 may interact with the physical IO device 110 using the PFs 115 and one or more VFs 113. As illustrated, the computing system 120 may comprise a management device 117 configured for management of the interface devices. The management device 117 may be in communication with a processing entity 111 (e.g., an Advanced Reduced Instruction Set Computer (RISC) Machine (ARM) processor) and a management entity 119 (e.g., management virtual machine system). It should be noted that the illustrated computing system is only an example mechanism, without suggesting any limitation as to the scope of the described system. The provided programmable IO interface and methods can be applied to any operating-system-level virtualization (e.g., container and docker system) or machine level virtualization or computing system without virtualization features.

The hypervisor 121 generally provides operating system functionality (e.g., process creation and control, file system process threads, etc.) as well as CPU scheduling and memory management for the host. In some cases, the host computing system 120 may include programs that implement a machine emulator and virtualizer. The machine emulator and virtualizer may assist in virtualizing respective computer IO devices in virtual machines, such as virtualized hard disks, compact disk drives, and NICs. Virtio is a virtualization standard for implementing virtual IO devices in a virtual machine and may be considered as an abstraction for a set of common emulated devices in a hypervisor.

The provided programmable IO device interface mechanism allows for native hardware speeds when using the device emulator. The programmable IO device interface allows the host system to interface with the IO device with existing device drivers without reconfiguration or modification. In some cases, the VF device, PF device and management device may have similar driver interface such that such devices can be supported by a single driver. Such devices may, in some cases, be referred to as Ethernet devices.

The IO device 110 may provide a variety of services and/or functionality to an operating system operating as a host on computing system 120. For example, the IO device may provide network connectivity functions to the computing system, coprocessor functionality (e.g., graphics processing, encryption/decryption, database processing, etc.) and the like. The IO device 110 may interface with other components in the computing system 100 via, for example, a PCIe bus.

As mentioned above, SR-IOV specification enables a single root function (for example, a single Ethernet port) to appear to virtual machines as multiple physical devices. A physical IO device with SR-IOV capabilities may be configured to appear in the PCI configuration space as multiple functions. The SR-IOV specification supports physical functions and virtual functions.

Physical functions are full PCIe devices that may be discovered, managed, and configured as normal PCI devices. Physical functions configured and manage the SR-IOV functionality by assigning virtual functions. The IO device may expose one or more physical functions (PFs) 115 to a host computing system 120 or hypervisor 121. The PFs 115 may be full-featured PCIe devices that include all configuration resources and capabilities for the IO device. In some cases, the PFs may be PCIe functions that include SR-IOV extended capability, which facilitates the configuration or management of the IO device. The PF device is essentially a base controller of the Ethernet device. The PF device may be configured with up to 256 VFs. In some cases, the PFs may include extended operations such as allocating, configuring and freeing a VF, discovering hardware capabilities of the VF, such as Receive Side Scaling (RSS), discovering hardware resources of the VF, such as number of queues and interrupts resources, configuring the hardware resources and features of a VF, saving and restoring hardware state and the like. In some instances, the PF device may be configured as a boot device which may present an Option ROM base address registers (BAR).

The IO device may also provide one or more virtual functions (VFs) 113. The VFs may be lightweight PCIe functions that contain the resources necessary for data movement but may have a minimized set of configuration resources. In some cases, the VFs may include lightweight PCIe functions that support SR-IOV. To use SR-IOV devices in a virtualized system, the hardware may be configured to create multiple VFs. These VFs may be made available to the hypervisor for allocations to virtual machines. The VFs may be manipulated (e.g., created, configured, monitored, or destroyed) for example, by the SR-IOV physical function device. In some cases, each of the multiple VFs is configured with one or more base address registers (BARs) to map NIC resources to the host system. A VF may map one or more LIFs or port, which are used in the IO device for forwarding and transaction identification. A LIF may belong to only one VF. Within a physical device, all virtual functions may have an identical BAR resource layout, stacked sequentially in host PCIe address space. The IO device PCIe interface logic may be programmed to map control registers and NIC memory regions with programmable access permissions (e.g., read, write, execute) to the VF BARs.

The IO device 110 may comprise a management device 117 for management of the IO device. The management device 117 may not have direct access to the network uplink ports. The management device may be in communication with the processing entity 111. For example, the traffic on the management device may be steered to internal receive queues for processing by the management software on the processing entity 111. In some cases, the management device may be made available to pass through the hypervisor to a management entity 119 such as a management virtual machine. For example, the management device 117 may be assigned a device ID different from the PF device 115, such that a device driver in the hypervisor may be released for the PF device when the PF device does not claim the management device.

Figure 2:
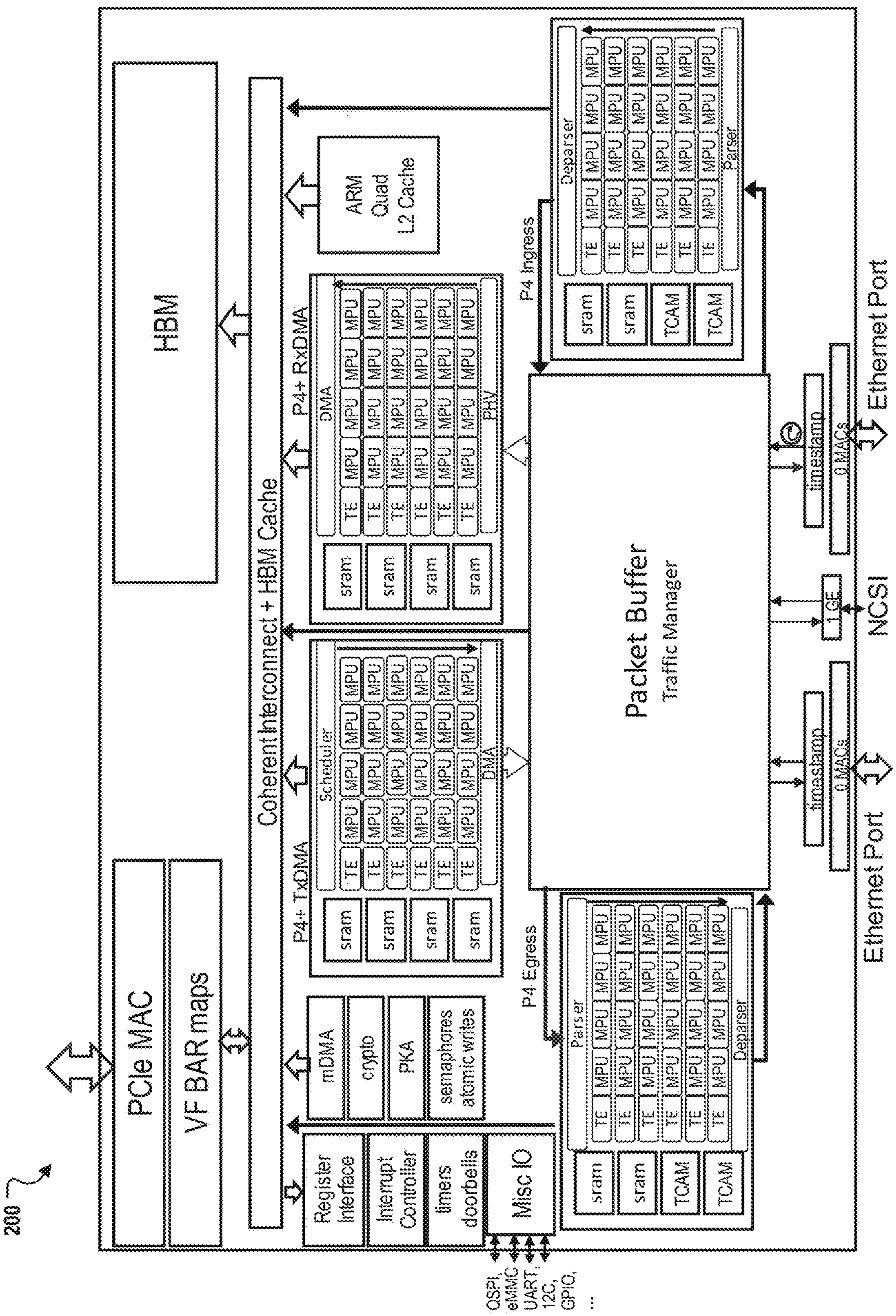
FIG. 2 depicts a non-limiting exemplary configuration of multiples MPUs for executing a program that may be employed by embodiments of the present disclosure.

FIG. 2 shows another exemplary IO device system 200 with described programmable device interface, in accordance with some embodiments of the described system. The system 200 serves as an example of implementing the P4 and extended P4 pipelines and various other functions to provide an improved network performance. In some cases, the device interface may have improved network performance by: not requiring PCIe bus register reads in the packet transmit or receive path; providing a single posted (non-blocking) PCIe bus register write for packet transmit; supporting for message signaled interrupts (MSI) and message signaled interrupts-extended (MSI-X) modes with driver-configurable interrupt moderation for high-performance interrupt processing; supporting I/O queues with outstanding requests (e.g., up to 64 k) per queue; transmitting TCP segmentation Offload (TSO) with improved send size; providing Transmission Control Protocol (TCP)/User Datagram Protocol (UDP) checksum offload; supporting for a variable number of Receive Queues to support industry standard Receive Side Scaling (RSS); supporting SR-IOV with up to 255 virtual functions.

The IO device system 200 may be the same IO device as described in FIG. 1 and implemented as a rack mounted device and comprise one or more ASICs and/or boards with components mounted thereon. As shown in FIG. 2, the system 200 may comprise four ARM processors with coherent L1 and L2 caches, a shared local memory system, flash non-volatile memory, DMA engines, and miscellaneous IO devices for operation and debug. The ARM processors may observe and control all NIC resources via an address map. The ARM processor may implement the P4 pipeline and the extended P4 pipeline as described later herein.

The system may comprise a host interface and a network interface. The host interface may be configured to provide communication link(s) with one or more hosts (e.g., host servers). The host interface block may also observe regions of the address space via PCIe BAR maps to expose NIC functions to a host system. In an example, the address map may be initially created according to the principles of ARM memory maps, ARM limited, which provides SOC addressing guidelines for a 34-bit memory map.

The network interface may support network connections or uplinks with a computing network that may be, for example, a local area network, wide area network and various others as described elsewhere herein. The physical link may be controlled by a management agent (e.g., management entity 119) through the device driver. For example, the physical link may be configured via a “virtual link” associated with a device LIF.

Memory transactions in the system 200, including host memory, HBM, and registers may be connected via a coherent network on a chip (NOC) based on IP from an external Systems. The NOC may provide cache coherent interconnect between the NOC masters, including P4 pipeline, extended P4 pipeline, DMA, PCIe, and ARM. The interconnect may distribute HBM memory transactions across a plurality (e.g., 16) of HBM interfaces using a programmable hash algorithm. All traffic targeting HBM may be stored in the NOC cache (e.g., 1 MB cache). The NOC cache may be kept coherent with the ARM caches. The NOC cache may be used to aggregate HBM write transactions which may be smaller than the cache line (e.g., size of 64 bytes), as the HBM is not efficient when processing small writes. The NOC cache may have high bandwidth, supporting up to 3.2 Tb/s operation as it fronts the 1.6 Tb/s HBM.

The system may comprise an internal HBM memory system for running Linux, storing large data structures such as flow tables and other analytics, and providing buffering resources for advanced features including TCP termination and proxy, deep packet inspection, storage offloads, and connected FPGA functions. The memory system may comprise an HBM module which may support 4 GB capacity or 8 GB capacity, depending on package and HBM.

As mentioned above, the system may comprise a PCIe host interface. The PCIe host interface may support a bandwidth of, for example, 100 Gb/s per PCIe connection (e.g., dual PCIe Gen4×8 or single PCIe Gen3×16). A mechanism or a scheme to map resources available at the IO device to memory-mapped control regions associated with the virtual IO devices may be implemented by using a pool of configurable PCIe Base Address Registers (BARs) coupled with a resource mapping table to store mapping information for each virtual IO device. The IO resources provided by the IO device may be mapped to host addresses in the framework of the PCIe standard such that the same device drivers that are utilized to communicate with physical PCIe devices may be utilized to communicate with corresponding virtual PCIe devices.

The IO device interface may comprise programmable registers. These registers may comprise, for example, PCIe base address registers (BARs) that may include a first memory BAR containing device resources (e.g., device command registers, doorbell registers, interrupt control registers, interrupt status registers, MSI-X interrupt table, MSI-X interrupt pending bit array, etc.) a second BAR containing device doorbells pages, and a third BAR for mapping a controller memory buffer.

The device command registers are a set of registers used for submitting administrative commands to the hardware or firmware. For example, the device command registers may specify a single 64-byte command and a single 16-byte completion response. This register interface may allow for a single command outstanding at a time. The device command doorbell is a special purpose doorbell used to signal a command is ready in the device command registers.

The second BAR may contain doorbells pages. The general form of the second BAR may contain multiple LIFs with multiple doorbell pages per LIF. A network device (i.e., IO device) may have at least one LIF with at least one doorbell page. Any combination of single/many LIFs with single/many Doorbell Pages is possible and the driver may be prepared to identify and operate the different combinations. In an example, doorbell pages may be presented on a 4 k stride by default to match a common system page size. The stride between doorbell pages may be adjusted in the virtual function device 113 to match the system page size configuration setting in the SR-IOV capability header in the parent physical function device 115. This page size separation allows protected independent direct access to a set of doorbell registers by processes by allowing each process to map and access a doorbell page dedicated for its use. Each page may provide the doorbell resources needed to operate the data path queue resources for a LIF, while protecting access to those resources from another process.

The doorbell register may be written by software to adjust a queue’s producer index. Adjusting the producer index is the mechanism to transfer ownership of queue entries in the queue descriptor ring to the hardware. Some doorbell types, such as the Admin Queue, Ethernet Transmit Queue, and RDMA Send Queue, may cause the hardware queue to schedule further processing of the descriptors available in the queue. Other queue types, such as Completion Queues and Receive Queues, may require no further action from the hardware queue after updating the producer index.

The interrupt status register may contain a bit for each interrupt resource of the device. The register may have a bit set indicating the corresponding interrupt resource has asserted its interrupt. For example, bit 0 in Interrupt Status indicates interrupt resource 0 is asserted, bit 1 indicates interrupt resource 1 is asserted.

The controller memory buffer may be a region of general-purpose memory resident on the IO device. The user or kernel driver may map in this controller memory BAR, and build descriptor rings, descriptors, and/or payload data in the region. A bit may be added in the descriptor to select whether the descriptor address field is interpreted as a host memory address, or as an offset relative to the beginning of the device controller memory window. The extended P4 program may set a designated bit (e.g., bit 63) of the address if it is a host address or clear the bit and add the device controller memory base address to the offset when building the TxDMA operations for the DMA stage.

The MSI-X resources may be mapped through the first BAR and the format may be described by the PCIe Base Specification. The MSI-X interrupt table is a region of control registers that allows an OS to program MSI-X interrupt vectors on behalf of the driver.

The MSI-X Interrupt Pending Bit Array (PBA) is an array of bits, one for each MSI-X interrupt supported by the device.

The IO device interface may support programmable DMA register tables, descriptor formats, and control register formats, allowing specialized VF interfaces and user defined behaviors. The IO device PCIe interface logic may be programmed to map control registers and NIC memory regions with programmable access permissions (e.g., read, write, execute) to the VF BARs.

Match Processing Unit

In an aspect of the described system, an MPU is provided to process a data structure. The data structure may comprise various types such as data packet, a management token, administrative command from a host, a processing token, a descriptor ring and various others. The MPU may be configured to perform various operations according to the type of data being processed or different purposes. For example, the operations may include table-based actions for processing packets, table maintenance operations such as writing a timestamp to a table or harvesting table data for export, administrative operations such as creating new queues or memory maps, gathering statistics, and various other operations such as initiating a bulk data processing that may result in writing any type of modified data to the host memory.

In some embodiments, the MPU may process a data structure in order to update the memory-based data structure or initiate an event. The event may or may not relate to modifying or updating a packet. For instance, the event may be administrative operations such as creating new queues or memory maps, gathering statistics, initiating a bulk data processing that may result in writing any type of modified data to the host memory, or performing calculations on descriptor rings, scatter gather lists (SGLs).

Figure 3:
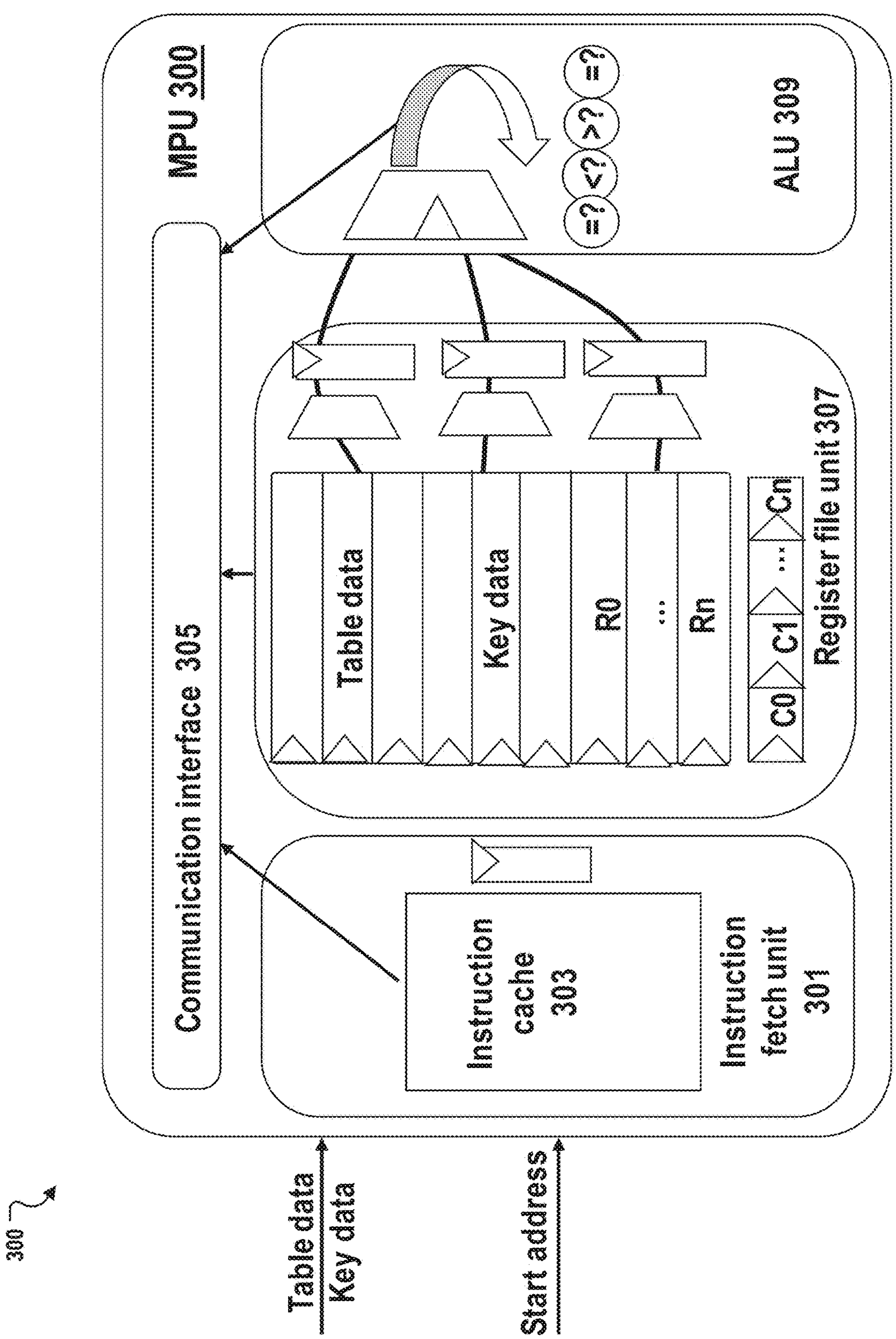
FIG. 3 depicts a non-limiting exemplary MPU that may be employed by embodiments of the present disclosure.

FIG. 3 shows a block diagram of an MPU 300, in accordance with embodiments of the described system. In some embodiments, the MPU unit 300 may comprise multiple functional units, memories and at least a register file. For example, the MPU unit may comprise an instruction fetch unit 301, a register file unit 307, a communication interface 305, ALUs 309 and various other functional units.

In the illustrated example, the MPU unit 300 may comprise a write port or communication interface 305 allowing for memory read/write operations. For instance, the communication interface may support packets written to or read from an external memory (e.g., HBM of a host device) or an internal SRAM. The communication interface 305 may employ any suitable protocol such as Advanced Microcontroller Bus Architecture (AMBA) Advanced extensible Interface (AXI) protocol. AXI is a bus protocol for a high-speed/high-end on-chip bus protocol and has channels associated with read, write, address, and write response, which are respectively separated, individually operated, and have transaction properties such as multiple-outstanding address or write data interleaving. The AXI interface 305 may include features that support for unaligned data transfers using byte strobes, burst based transactions with only start address issued, separate address/control and data phases, issuing of multiple outstanding addresses with out of order responses, and easy addition of register stages to provide timing closure. For example, when the MPU executes a table write instruction, the MPU may track which bytes have been written to (a.k.a. dirty bytes) and which remain unchanged. When the table entry is flushed back to the memory, the dirty byte vector may be provided to AXI as a write strobe, allowing multiple writes to safely update a single table data structure as long they do not write to the same byte. In some cases, dirty bytes in the table need not be contiguous and the MPU may only write back a table if at least one bit in the dirty vector is set. Though packet data is transferred according the AXI protocol in the packet data communication on-chip interconnect system according to the present exemplary embodiment in the present specification, it can also be applied to a packet data communication on-chip interconnect system operating by other protocols supporting a lock operation, such as Advanced High-performance Bus (AHB) protocol or Advanced Peripheral Bus (APB) protocol in addition to the AXI protocol.

The MPU 300 may comprise an instruction fetch unit 301 configured to fetch instruction set from a memory external to the MPU based on the input table result or at least a portion of the table result. The instruction fetch unit may support branches and/or linear code paths based on table results or a portion of a table result provided by a table engine. In some cases, the table result may comprise table data, key data and/or a start address of a set of instructions/program. Details about the table engine are described later herein. In some embodiments, the instruction fetch unit 301 may comprise an instruction cache 303 for storing one or more programs. In some cases, the one or more programs may be loaded into the instruction cache 303 upon receiving the start address of the program provided by the table engine. In some cases, a set of instructions or a program may be stored in a contiguous region of a memory unit, and the contiguous region can be identified by the address. In some cases, the one or more programs may be fetched and loaded from an external memory via the communication interface 305. This provides flexibility to allow for executing different programs associated with different types of data using the same processing unit. In an example, when a management packet header vector (PHV) injected into the pipeline, for example to perform administrative table direct memory access (DMA) operations or entry aging functions (i.e., adding timestamps), one of the management MPU programs may be loaded to the instruction cache to execute the management function. The instruction cache 303 can be implemented using various types of memories such as one or more SRAMs.

The one or more programs can be any programs such as P4 programs related to reading table, building headers, DMA to/from memory regions in HBM or in the host device and various other actions. The one or more programs can be executed in any stage of a pipeline as described elsewhere herein.

The MPU 300 may comprise a register file unit 307 to stage data between the memory and the functional units of the MPU, or between the memory external to the MPU and the functional units of the MPU. The functional units may include, for example, ALUs, meters, counters, adders, shifters, edge detectors, zero detectors, condition code registers, status registers, and the like. In some cases, the register file unit 307 may comprise a plurality of general-purpose registers (e.g., R0, R1, . . . Rn) which may be initially loaded with metadata values then later used to store temporary variables within execution of a program until completion of the program. For example, the register file unit 307 may be used to store SRAM addresses, TCAM search values, ALU operands, comparison sources, or action results. The register file unit of a stage may also provide data/program context to the register file of the subsequent stage, as well as making data/program context available to the next stage's execution data path (i.e., the source registers of the next stage's adder, shifter, and the like). In one embodiment, each register of the register file is 64 bits and may be initially loaded with special metadata values such as hash value from table, lookup, packet size, PHV timestamp, programmable table constant and the like, respectively.

In some embodiments, the register file unit 307 may also comprise comparator flags unit (e.g., C0, C1, . . . Cn) configured to store comparator flags. The comparator flags can be set by calculation results generated by the ALU which in return is compared with constant values in an encoded instruction to determine a conditional branch instruction. In an embodiment, the MPU may comprise eight one-bit comparator flags. However, it should be noted that MPU may comprise any number of comparator flag units each of which may have any suitable length.

The MPU 300 may comprise one or more functional units such as the ALU 309. The ALU may support arithmetic and logical operations on the values stored in the register file unit 307. The results of the ALU operations (e.g., add, subtract, AND, OR, XOR, NOT, AND NOT, shift, and compare) may then be written back to the register file. The functional units of the MPU may, for example, update or modify fields anywhere in a PHV, write to memory (e.g., table flush), or perform operations that are not related to PHV update. For example, the ALU may be configured to perform calculations on descriptor rings, scatter gather lists (SGLs), and control data structures loaded into the general-purpose registers from the host memory.

The MPU 300 may comprise various other functional units such as meters, counters, action insert unit and the like. For example, the ALU may be configured to support P4 compliant meters. A meter is a type of action executable on a table match used to measure data flow rates. A meter may include a number of bands, typically two or three, each of which has a defined maximum data rate and optional burst size. Using a leaky bucket analogy, a meter band is a bucket filled by the packet data rate and drained at a constant allowed data rate. Overflow occurs if the integration of data rate exceeding quota is larger than the burst size. Overflowing one band triggers activity into the next band, which presumably allows a higher data rate. In some cases, a field of the packet may be remarked as a result of overflowing the base band. This information might be used later to direct the packet to a different queue, where it may be more subject to delay or dropping in case of congestion. The counter may be implemented by the MPU instructions. The MPU may comprise one or more types of counters for different purposes. For example, the MPU may comprise performance counters to count MPU stalls. The action insert unit may be configured to push the register file result back to the PHV for header field modifications.

The MPU may be capable of locking a table. In some case, a table being processed by an MPU may be locked or marked as "locked" in the table engine. For example, while an MPU has a table loaded into its register file, the table address may be reported back to the table engine, causing future reads to the same table address to stall until the MPU has released the table lock. For instance, the MPU may release the lock when an explicit table flush instruction is executed, the MPU program ends, or the MPU address is changed. In some cases, an MPU may lock more than one table addresses, for example, one for the previous table write-back and another address lock for the current MPU program.

MPU Pipelining

A single MPU may be configured to execute instructions of a program until completion of the program. Alternatively, or additionally, multiple MPUs may be configured to execute a program. In some embodiments, a table result may be distributed to multiple MPUs. The table result may be distributed to multiple MPUs according to an MPU distribution mask configured for the tables. This provides advantages to prevent data stalls or mega packets per second (MPPS) decrease when a program is too long. For example, if a PHV requires four table reads in one stage, then each MPU program may be limited to only eight instructions in order to maintain a 100 MPPS if operating at a frequency of 800 MHz in which scenario multiple MPUs may be desirable.

Any number of MPUs may be used for executing a program in order to meet a desirable performance. For instance, at least two, three, four, five, six, seven, eight, nine, or ten MPUs may be used to execute a program. Each MPU may execute at least a portion of the program or a subset of the instruction set. The multiple MPUs may perform the execution simultaneously or sequentially. Each MPU may or may not perform the same number of instructions. The configurations may be determined according to the length of program (i.e., number of instructions, cycles) and/or number of available MPUs. In some case, the configuration may be determined by an application instruction received from a main memory of a host device operably coupled to the plurality of MPUs.

P4 Pipelines

Figure 4:
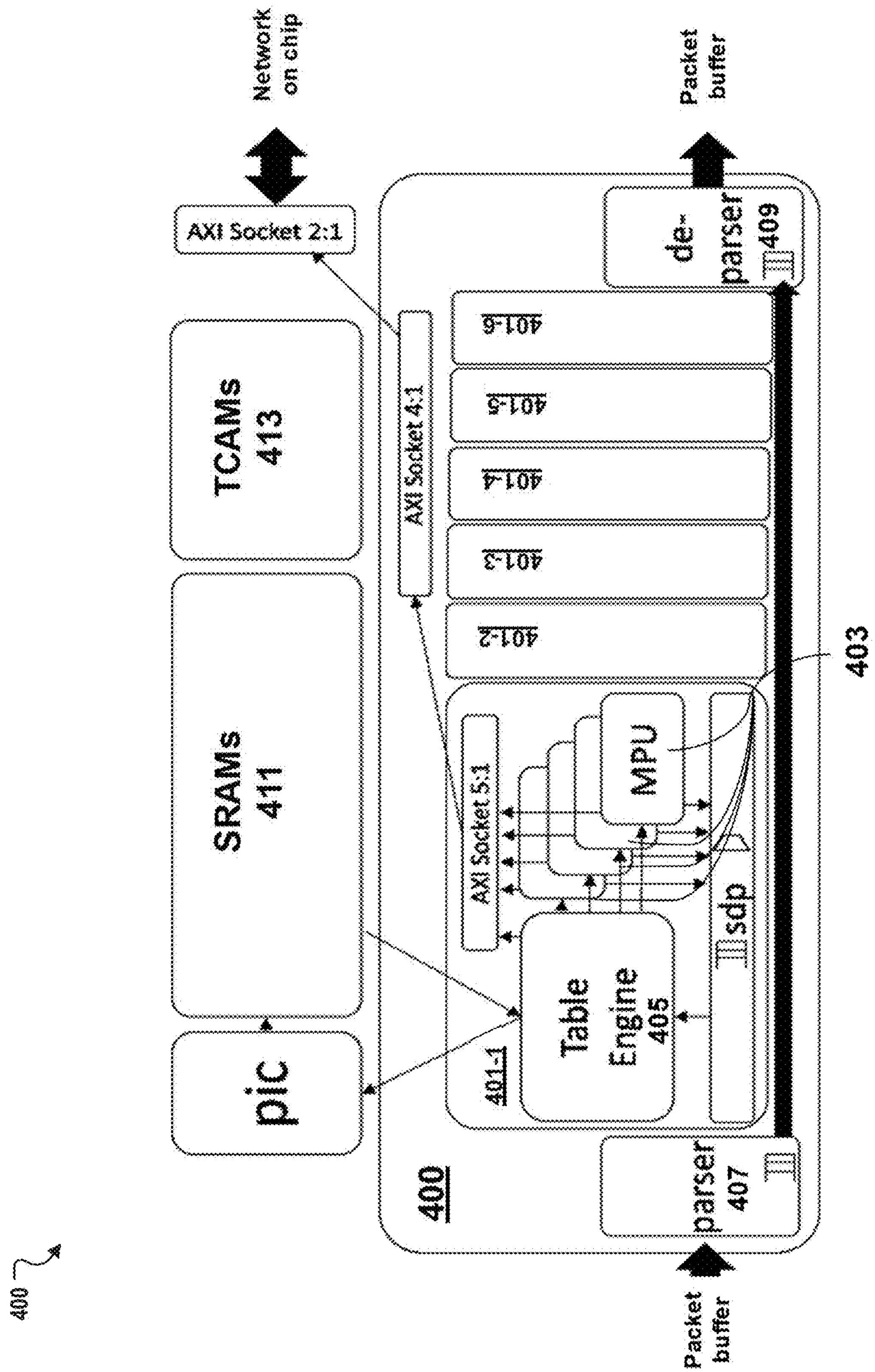
FIG. 4 depicts a non-limiting exemplary P4 ingress or egress pipeline (PIP pipeline) that may be employed by embodiments of the present disclosure.

In one aspect, a flexible, high performance match action pipeline which can execute a wide range of P4 programs is provided. The P4 pipeline can be programmed to provide various features, including, but not limited to, routing, bridging, tunneling, forwarding, network ACLs, L4 firewalls, flow based rate limiting, VLAN tag policies, membership, isolation, multicast and group control, label push/pop operations, L4 load balancing, L4 flow tables for analytics and flow specific processing, DDOS attack detection, mitigation, telemetry data gathering on any packet field or flow state and various others. FIG. 4 shows a block diagram of an exemplary P4 ingress or egress pipeline (PIP pipeline) 400 in accordance with embodiments of the described system.

In some embodiments, the described system may support a match+action pipeline. The programmer or compiler may decompose the packet processing program into a set of dependent or independent table lookup and action processing stages (i.e., match+action) which are mapped onto the table engine and MPU stages respectively. The match+action pipeline may comprise a plurality of stages. For example, a packet entering the pipeline may be first parsed by a parser (e.g., parser 507) according to the packet header stack specified by a P4 program. This parsed representation of the packet may be referred to as parsed header vector. The parsed header vector may then be passed through stages (e.g., stages 401-1, 401-2, 401-3, 401-4, 401-5, 401-6) of ingress match+action pipeline. In some embodiments, each stage is configured to match one or more parsed header vector fields to tables, then updates the packet header vector (PHV) and/or table entries according to the actions specified by the P4 program. In some instances, if the required number of stages exceeds the implemented number of stages, a packet may be recirculated for additional processing. In some cases, the packet payload may travel in a separate first-in-first-out (FIFO) queue until it is reassembled with its PHV in the de-parser (e.g., de-parser 409). The de-parser may rewrite the original packet according to the PHV fields which have been modified (e.g., added, removed, or updated). In some cases, the packet processed by the ingress pipeline may be placed in a packet buffer for scheduling and possible replication. In some cases, once the packet is scheduled and leaves the packet buffer, it may be parsed again to create an egress parsed header vector. The egress parsed header vector may be passed through a sequence of stages of match+action pipeline in a similar fashion of the ingress match+action pipeline, after which a final de-parser operation may be executed before the packet is sent to its destination interface or recirculated for additional processing.

In some embodiments, the ingress pipeline and egress pipeline may be implemented using the same physical block or processing unit pipeline. In some embodiments, the PIP pipeline 400 may comprise at least one parser 407 and at least one de-parser 409. The PIP pipeline 400 may comprise multiple parsers and/or multiple de-parsers. The parser and/or de-parser may be a P4 compliant programmable parser or de-parser. In some cases, the parser may be configured to extract packet header fields according to P4 header definitions and place them in the packet header vector (PHV). The parser may select from any fields within the packet and align the information from the selected fields to create a packet header vector. In some cases, after passing through a pipeline of match+action stages, the de-parser block may be configured to rewrite the original packet according to the updated PHV.

The packet header vector (PHV) produced by the parser may have any size or length. For example, the PHV may be a least 512 bits, 256 bits, 128 bits, 64 bits, 32 bits, 8 bits or 4 bits. In some cases, when a long PHV (e.g., 6 Kb) is desired to contain all relevant header fields and metadata, a single PHV may be time division multiplexed (TDM) across several cycles. This TDM capability provides benefit allowing the described system to support variable length PHVs, including very long PHVs to enable complex features. A PHV length may vary as the packet passes through the match+action stages.

The PIP pipeline may comprise a plurality of match+action stages. After the parser 407 produces the PHV, the PHV may be passed through the ingress match+action stages. In some embodiments, the PIP pipeline may be implemented using multiple stage units 401-1, 401-2, 401-3, 401-4, 401-5, 401-6, each of which may comprise a table engine 405 and multiple MPUs 403. The MPU 403 can be same as the MPU as described in FIG. 4. In the illustrated example, four MPUs are used in one stage unit. However, any other number of MPUs, such as at least one, two, three, four, five, six, seven, eight, nine, or ten can be utilized or grouped with a table engine.

A table engine 405 may be configured to support per-stage table match. For example, the table engine 405 may be configured to hash, lookup, and/or compare keys to table entries. The table engine 405 may be configured to control table match process by controlling the address and size of the table, PHV fields to use as a lookup key, and MPU instruction vector which defines the P4 program associated with the table. A table result produced by the table engine may be distributed to the multiple MPUs 403.

The table engine 405 may be configured to control a table selection. In some cases, upon entering a stage, the PHV may be examined to select which table(s) to enable for the arriving PHV. Table selection criteria may be determined based on the information contained in the PHV. In some cases, a match table may be selected based on packet type information related to a packet type associated with the PHV. For instance, the table selection criteria may be based on packet type or protocols (e.g., IPv4, IPv6 and Multiprotocol Label Switching (MPLS)) or the next table ID as determined by the preceding stage. In some cases, the incoming PHV may be analyzed by the table selection logic, which then generates a table selection key and compares the result using a TCAM to select the active tables. The table selection Key may be used to drive table hash generation, table data comparison, and associated data into the MPUs.

In some embodiments, the table engine 405 may comprise a hash generation unit. The hash generation unit may be configured to generate a hash result off a PHV input and the hash result may be used to conduct a DMA read from a DRAM or SRAM array. In an example, the input to the hash generation unit may be masked according to which bits in the table selection key contribute to the hash entropy. In some cases, the same mask may be used by the table engine for comparison with the returning SRAM read data. In some instances, the hash result may be scaled according to the table size, then the table base offset may be added to create the memory index. The memory index may be sent to the DRAM or SRAM array and to perform the read.

In some cases, the table engine 405 may comprise a TCAM control unit. The TCAM control unit may be configured to allocate memory to store multiple TCAM search tables. In an example, a PHV table selection key may be directed to a TCAM search stage before a SRAM lookup. TCAM search tables can be configured to be up to 1024 bits wide and as deep as TCAM resources permit. In some cases, multiple TCAM tables may be carved from the shared quadrant TCAM resources. The TCAM control unit may be configured to allocate TCAMs to individual stages so that to prevent TCAM resource conflicts or allocate TCAM into multiple search tables within a stage. The TCAM search index results may be forwarded to the table engine for SRAM lookups.

The PIP pipeline 400 may comprise multiple stage units 401-1, 401-2, 401-3, 401-4, 401-5, 401-6. The PIP pipeline may comprise any number of stage units such as at least two, three, four, five, six, seven, eight, nine, ten sage units that can be used within the PIP pipeline. In the illustrated example, six match+action stages units 401-1, 401-2, 401-3, 401-4, 401-5, 401-6 are grouped into a set. The set of stages units may share a common set of SRAMs 411 and TCAMs 413. The SRAMs 411 and TCAMs 413 may be component of the PIP pipeline. This arrangement may allow the six stage units to divide match table resources in any suitable proportion which provides convenience to the compiler and easing the complier's task of resource mapping. Any suitable number of SRAM resources and any suitable number of TCAM resources may be used by each PIP pipeline. For example, the illustrated PIP pipeline may be coupled to ten SRAM resources and four or eight TCAM resources. In some instances, TCAMs may be fused vertically or horizontally for a wider or deeper search.

Extended P4 Pipelines

In one aspect, the described system may support an extended P4 programmable pipeline to allow for direct interfacing with the host driver. The extended P4 programmable pipeline implements the IO device interface as described above. For example, the P4 programmed DMA interfaces may be directly coupled to the host virtual functions (VFs) as well as ARM, CPU, or offload engine interfaces. The extended P4 pipeline may handle required DMA operations and loops. The extended P4 pipeline may include features, including but not limited to, stateless NIC offloads such as TCP segmentation offload (TSO) and Receive Side Scaling (RSS); storage exchange table-style transaction servicing in the extended P4 pipeline; fine grained load balancing decisions that can be extended to individual data structures of performance critical applications, such as DPDK or key value matching; TCP flow termination and initiation for proxy services; RDMA over converged Ethernet (RoCE) and similar remote direct memory access (RDMA) protocol support; custom descriptor and SGL formats can be specified in P4 to match data structures of performance critical applications; new device and VF behaviors can be modelled using P4 programs coupled with host driver development, and various other features.

Data may be transmitted between the packetized domain in the P4 pipeline to/from the memory transaction domain in the host and NIC memory systems. This packet to memory transaction conversion may be performed by the extended P4 pipelines that include DMA write (TxDMA) and/or DMA read (RxDMA) operations. The extended P4 pipeline includes TxDMA may also be referred to as Tx P4 or TxDMA and the extended P4 pipeline includes RxDMA may also be referred to as Rx P4 throughout this specification. The extended P4 pipelines may comprise the same match+action stages in the P4 pipeline, and a payload DMA stage at the end of the pipeline. Packets may be segmented or reassembled into data buffers or memory regions (e.g., RDMA registered memory) according to the extended P4 programs. The payload DMA stage may be a P4 extension which enables the programmable P4 network pipeline extended to the host memory system and driver interface. This P4 extension allows custom data structures and applications interactions to be tailored to application or container needs.

The match table utilized in the extended P4 pipeline may be programmable tables. A stage of an extended P4 pipeline may include multiple programmable tables which may exist in SRAM, NIC DRAM, or host memory. For example, host memory structures may include descriptor rings, SGLs, and control data structures which can be read into the register file unit of the MPU for calculations. The MPU may add PHV commands to control DMA operations to and from host and NIC memory and insert DMA commands into the PHV for execution by the payload DMA stage. The extended P4 programs may include, for example, completion queue events, interrupts, timer set, and control register writes and various other programs.

Control Plane

Three planes are generally recognized in telecommunications: control, data and management. In this context, a "plane" is an area of operations. Generally, the data plane refers to the functions and processes that forward packets or frames from one interface to another; the control plane refers to the functions and processes (e.g., routing protocols, spanning tree, Label Distribution Protocol (LDP), and so forth) that determine which path to use; and the management plane is the functions employed to control and monitor devices. In some implementations, the management plane is considered a subset of the control plane.

In some implementations, the control plane defines the topology of a network and is responsible for establishing links between network nodes (e.g., routers) and for exchanging protocol information. In some implementations, a variety of routing protocols are used to define connections and manage their behavior. In conventional networks, each of these planes are implemented into the firmware of a router. In SDN, the control and data planes are decoupled, allowing for greater flexibility and dynamic control of the network architecture. Both control and data planes can then be managed through software controls.

Longest Prefix Matching

In general, an LPM lookup for the routing of traffic through a data plane may be provided through hardware, such as an IO subsystem. For example, when a packet with an IP address (e.g., a destination IP address or a source IP address) is received, the address is looked up in various stored route tables and matched to a set of available prefixes. The prefix entry with the longest match (e.g., the most numbers from the left to the IP address) is returned. However, complexity is added when multiple prefixes are matched up within each other. In such instances, the prefix that includes the deepest nesting of matches should be returned as the longest match.

FIG. 5A depicts an example route table 500 that includes prefixes to match, and the data to retrieve. The example table 500 can be employed within the described system to look up data with a lookup key that is a specific value (not a prefix). The example table shows that multiple entries could potentially match the same lookup key. In such scenarios, in some embodiments, the data of the longest matching prefix is returned. For example, the depicted table yields the following LPM results: 20.20.20.20→NH1 (only the default route matches); 10.20.20.20→NH2 (the 10.x.x.x matches); 10.10.20.20→NH3 (the 10.10.x.x matches); 10.10.10.20→NH4 (the 10.10.10.x matches); and 10.10.10.10→NH5 (the 10.10.10.10 matches). LPM results can employed for route lookup where, for example, a next hop that that matches the longest prefix of the IP address in the incoming packet is selected.

In general, LPMs are used two primary purposes: 1) route lookup and 2) policy matching. As an example, a policy may be in place that includes: when receiving a packet with a source IP prefix of X, a destination IP prefix of Y, a UDP protocol or TCP protocol, a source port range of between 100 and 200, and a destination range of 600 and 700, then a particular action is to be taken (e.g., the packet is dropped, the packet is accepted, the packet is inspected, etc.). In some embodiments, to perform the route lookup and policy matching, multiple match tables (see FIG. 5B) can be employed.

FIG. 5B depicts example policy match tables 510. These tables can be employed, for example, where multiple components of a policy need to match. As depicted, the source and destination IP tables specify LPM prefixes, the source and destination port tables specify ranges, and the protocol table specifies protocols. In some embodiments, software is employed to break down ranges into multiple LPM entries that are maskable. In some embodiment, all columns of a row must match in order for that row to be considered as a match.

FIG. 5C depicts an example table 520 that includes a mask in addition to the key to match and the data to retrieve. Uses such an example table 520, a lookup key is compared against each prefix entry in the table, and for each entry, the lookup key is first AND'ed with the mask, and then the result compared against the prefix. Also, out of the multiple entries that could potentially match, the data of the longest matching prefix is returned.

FIG. 5D depicts example tables 530 that show how LPMs can be implemented in traditional switches. For example, TCAMs can be used in the hardware where the TCAM may only store the key and the mask and each entry in the TCAM has a corresponding entry in the SRAM to store the data. In some embodiments, the entries are programmed in the descending order of length of prefixes. In some embodiments, the lookup key is ANDed with the mask stored in each entry and the result is matched with the stored key. In some embodiments, out of all the entries that matched, the index of the entry at the lowest (e.g., counted from top to bottom) index is returned. In some embodiments, a separate lookup is done in the SRAM table using that index to retrieve the data.

One issues with systems employing the tables depicted and described in FIGS. 5A-5D is that TCAMs require complex logic and take a lot of silicon real estate, which makes them expensive to build. Moreover, the logic and speed requirements make them power hungry and thus expensive to operate. The use of power also generates a lot of heat. Removing that heat is a challenge and adds to cost of operation. Moreover, data retrieval can require complex ordering (compiling) to find the correct result. All of these limits scale by placing high demand on the control plane processor.

Control Plane Implementation

Figure 6:
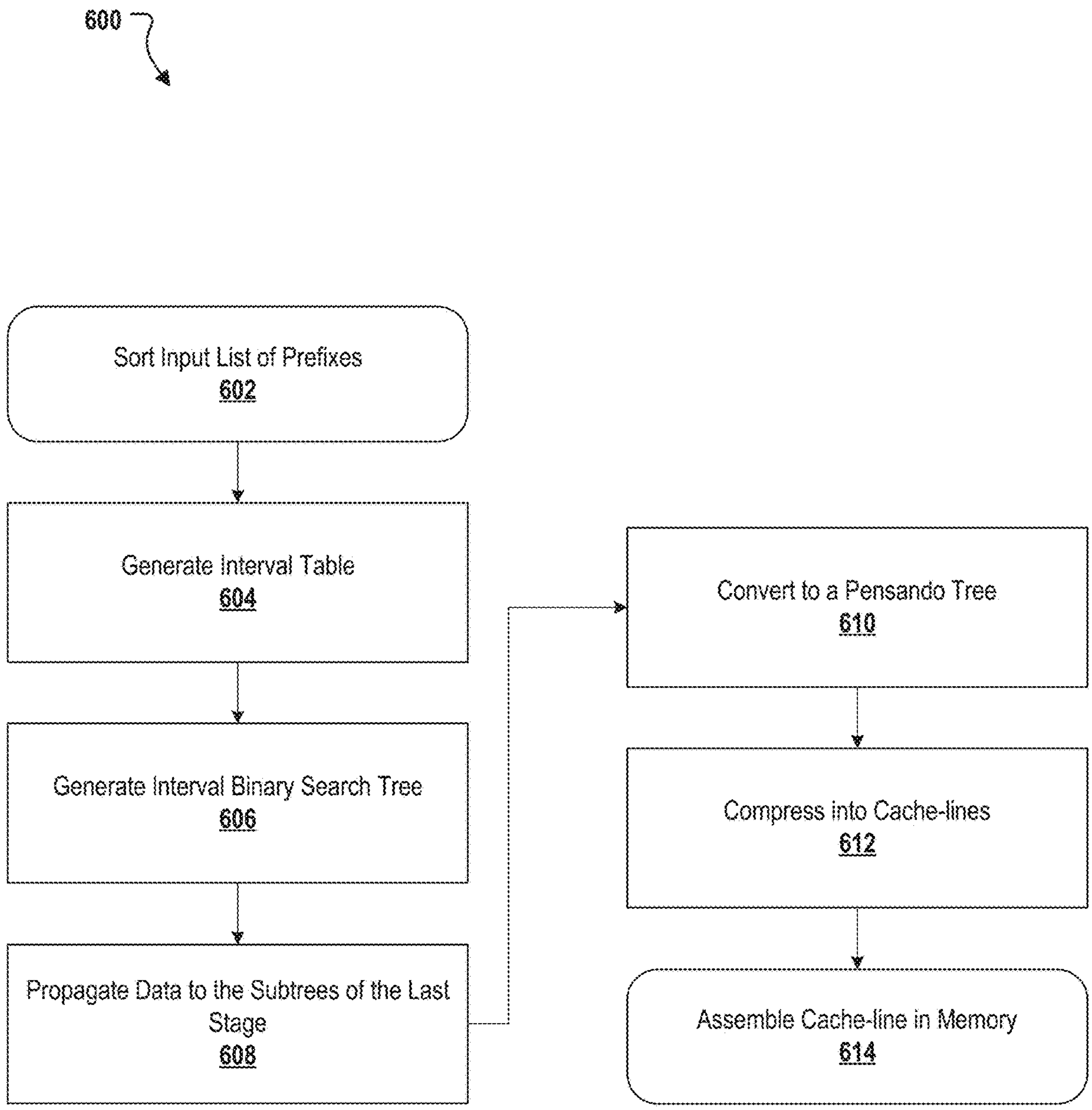
FIG. 6 depicts a flowchart of an example process executed within a control plane to program the data forwarding hardware.

FIG. 6 depicts a flowchart of an example process 600 executed within a control plane to program the data forwarding hardware. The example process 600 may be implemented by various elements of the described system such as via a programmable IO device. In some embodiments, the described system employs multiple cascading stages where each stage can perform arithmetical operations through an ALU and a match processing unit MPU. As depicted, the example process can be executed in a control plan to efficiently build data structures that may be employed in a data plane implementation. The example process 600 organizes memory into cache-lines that can be accessed by each cascading stage. The example process 600 may be leveraged for LPMs of varying widths and expansion at each stage and avoid control plane bottlenecks through high efficiency (e.g., linear execution).

For clarity of presentation, the description that follows generally describes the example process 600 in the context of FIGS. 1-5D and 6-27. However, it will be understood that the processes 600 may be performed, for example, by any other suitable system, environment, software, and hardware, or a combination of systems, environments, software, and hardware as appropriate. In some embodiments, various operations of the process 600 can be run in parallel, in combination, in loops, or in any order. In some embodiments, the process 600 is executed by a programmable IO device. In some embodiments, the programmable IO device is an ISA. In some embodiments, the programmable IO device is a router or a switch. In some embodiments, the programmable IO device includes a memory unit having instructions stored thereon which, when executed by the programmable IO device, cause the programmable IO device to perform the process 600. In some embodiments, the programmable IO device includes an MPU that includes at least one ALU. In some embodiments, the programmable IO device includes an ARM processor.

At 602, the input list of prefixes is sorted with a sorting algorithm. In general, a sorting algorithm receives sortable data (e.g., a list of elements) as input and determines an ordered version of the data according to some global order among its elements. For example, a sorting algorithm may repeatedly compare pairs of elements and make decisions based on the outcome of the comparison. Examples algorithms includes, but are not limited to, bubble sort, heap sort, insertion sort, or merge sort. At 604, an interval table is generated from the sorted table of (possibly overlapping) prefixes. At 606, an interval binary search tree is generated from the interval table. At 608, the data stored in the subtrees of the interior stages of the interval binary search tree is propagated ('pushed') to the subtrees of the last stage so that the interior stages do not include stored data. At 610, the interval binary search tree is converted to a Pensando Tree. At 612, multiple levels of the Pensando Tree are compressed into cache-lines based on a stage from which it will be accessed. At 614, the cache-lines are assembled in the memory such that each stage can compute the address of the next-cache line to be fetched by the next stage using the address of the current cache-line and the outgoing branch number of the subtree at this stage. By assembling the cache-lines is this manner, memory pointers do not have to be stored thus providing increased space for data. Steps 604-614 are described in greater detail below.

Prefix Space Representation

Figure 7A:
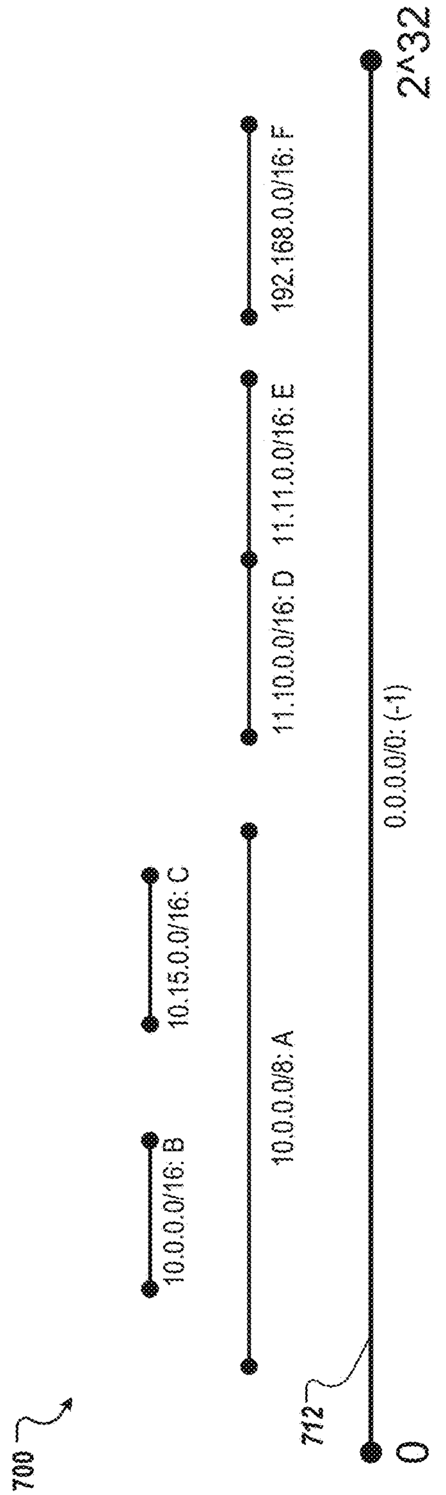
FIG. 7A depicts a non-limiting exemplary prefix space representation that can be employed to convert prefixes and respective next hops into something that can be binary searched.

FIG. 7A depicts an example prefix space representation 700 that can be employed to convert prefixes and respective next hops into a structure (e.g., an interval binary search tree) that can be binary searched within, for example, the control plane. The example prefix space representation 700 shows the following prefixes and next hops: 10.0.0.0/8:A, 10.10.0.0/16:B, 10.15.0.0/16:C, 11.10.0.0/16:D, 11.11.0.0/16:E, and 192.168.0.0/16:F. As depicted, "−1" represents the default Next Hop. The number line 712 represents the bit range for the addresses included in IPV4, which is a 32-bit range (e.g., zero to two to the power of 32).

Figure 7B:
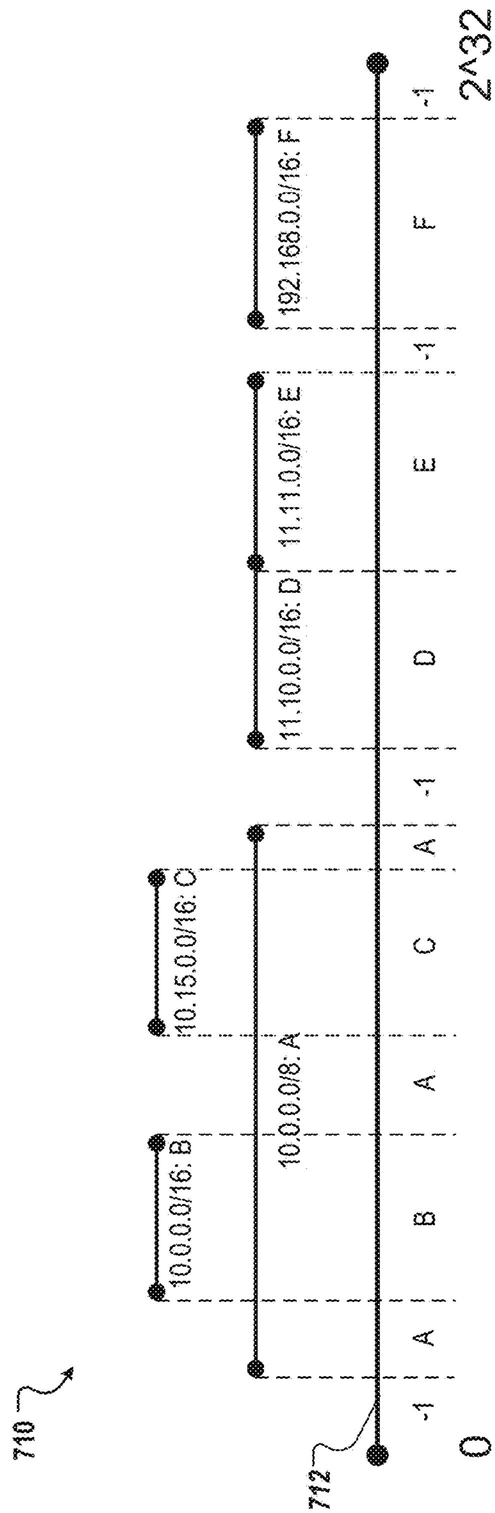
FIG. 7B depicts a non-limiting exemplary prefix space representation projected into distinct intervals on a number line.
Figures 7C, 7D:
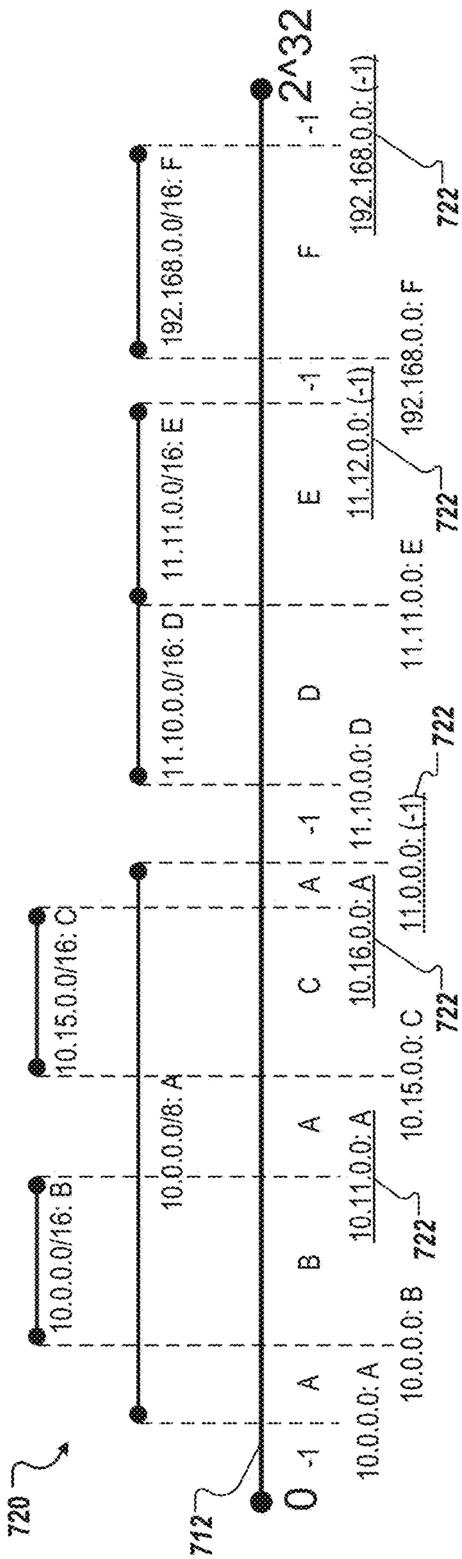
FIG. 7C depicts a non-limiting exemplary prefix space representation projected onto a number line with new points added where necessary.
FIG. 7D depicts a non-limiting exemplary interval table derived from a transform.

FIG. 7B depicts an example 710 of the prefix space representation 700 projected into distinct intervals on the number line 712, which can be employed to derive a next hop for each of those intervals (e.g., −1, A, B, C, D, E, F). FIG. 7C depicts an example 720 of the prefix space representation 700 projected onto the number line 712 with new points 722 added where necessary. For example, new points 722 can be added such that each prefix is converted into two points, a beginning point and an end point, on the number line 712. To lookup an address, the values corresponding to the points on the number line 712 can be searched from left to right sequentially with no masking or ANDing. When the point is less than or equal to the address key, the data is picked from that point, and the search is continued; when the point is greater than the address key, the search is stopped, and the most recent data is the correct result. Thus, the brute force search of every entry in the route table can be replaced with a search that can be stopped at a particular point when the correct interval is found.

FIG. 7D depicts an example interval table 730 derived from the example 720. In the worst case, such an interval table has 2n−1 entries (e.g., when the prefixes are non-overlapping) for n prefixes with a best case of n+1 (e.g., when the prefixes are adjacent). In some embodiments, masks are not included in a derived interval table employed by the described system. The exclusion of mask saves memory and processing. Even though the search can be stopped as soon as the correct interval is found, sequentially searching the interval table is computationally intensive and severely limits scale. For example, searching through just 4,096 intervals (corresponding to a worst case distributed 2K prefixes) would require a prohibitive 1024 stages assuming that each stage can compare and branch on 4 intervals while searching through 16 Million intervals (8 Million prefixes) would require an unrealistic 4,000,000 stages with the same assumption.

Generating an Interval Table

Figure 8A:
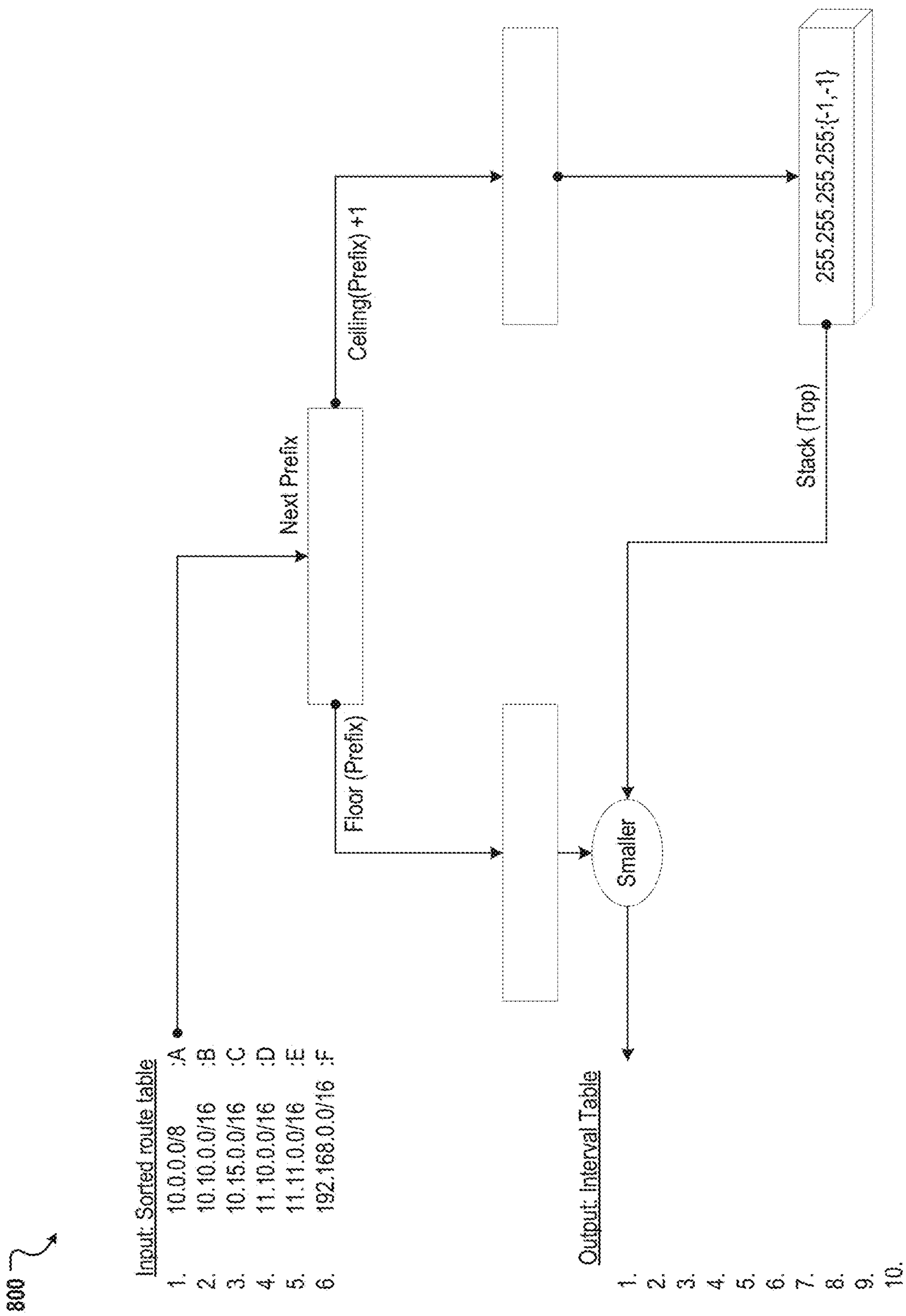
FIGS. 8A-8BL depict a non-limiting exemplary series of incremental steps for an example modified binary search that can be performed on an interval binary search tree.
Figure 8B:
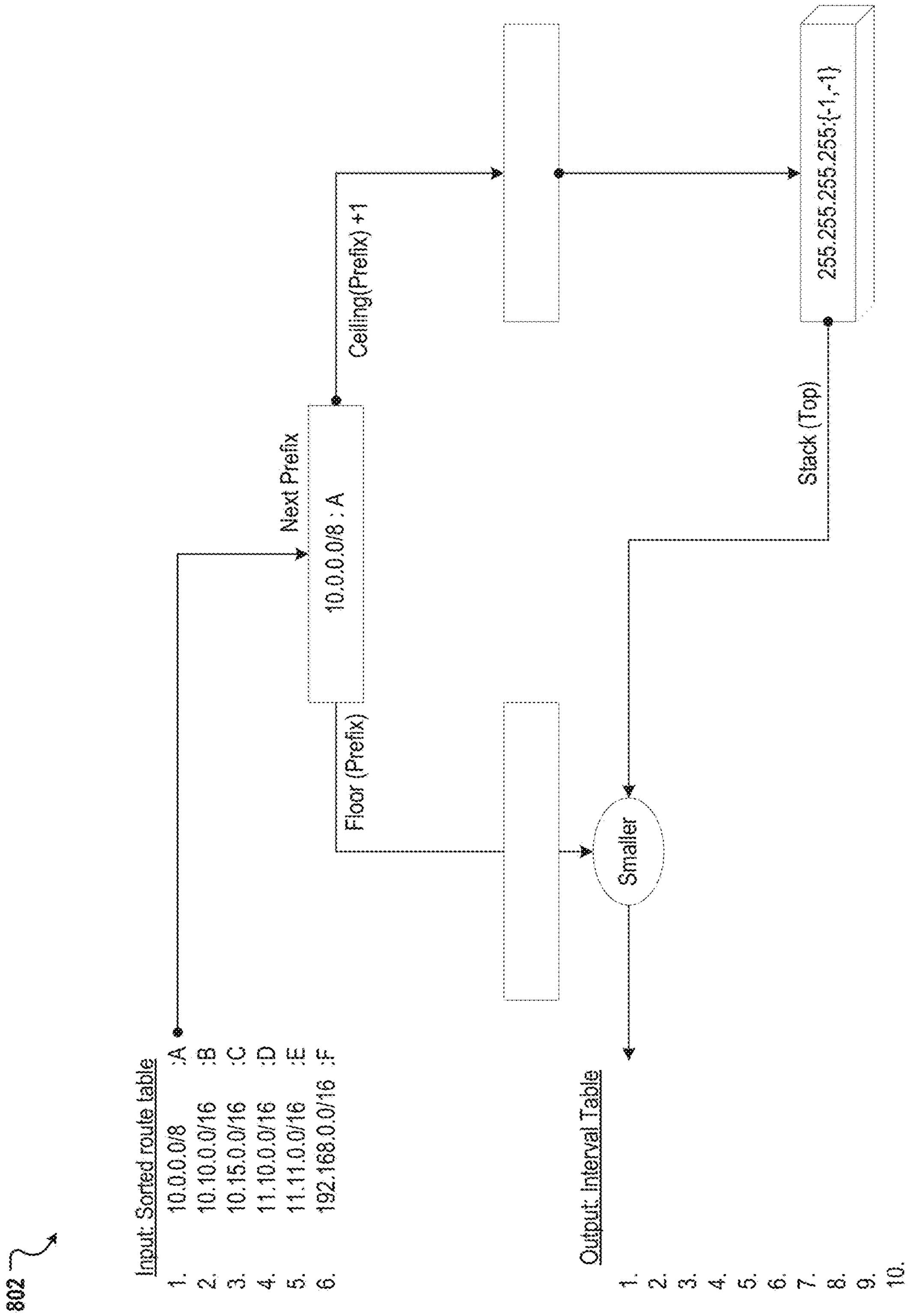
Figure 8C:
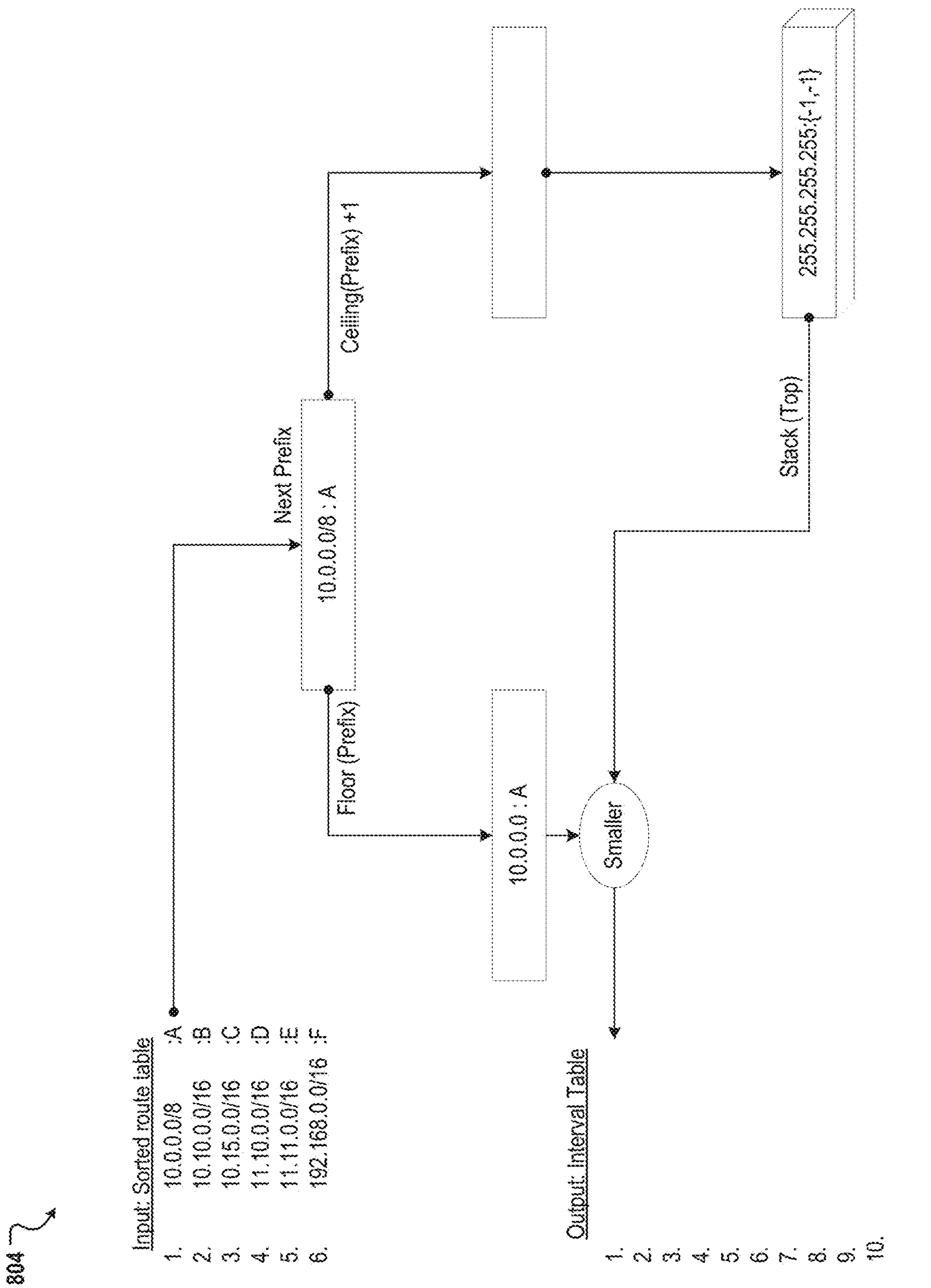
Figure 8D:
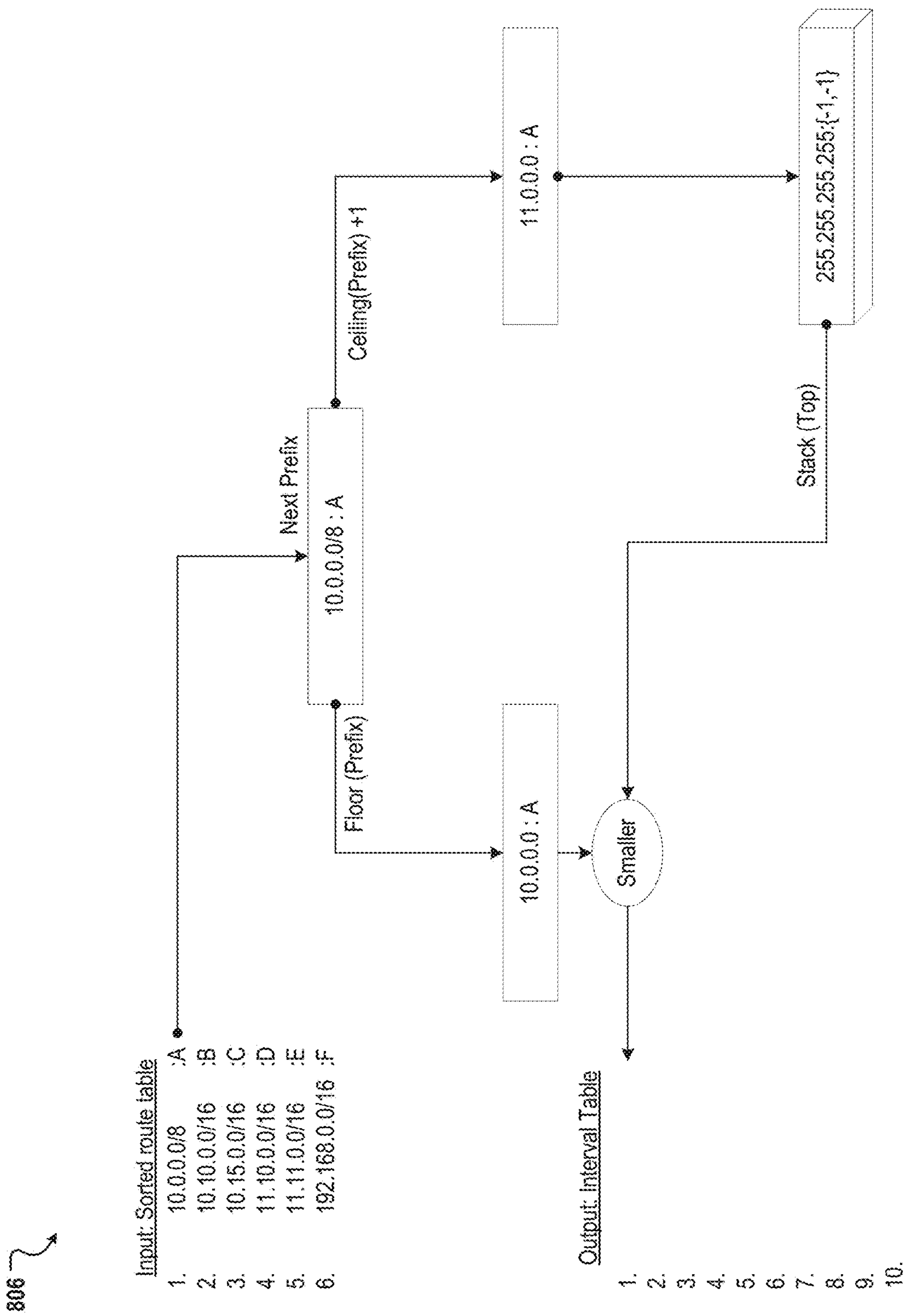
Figure 8E:
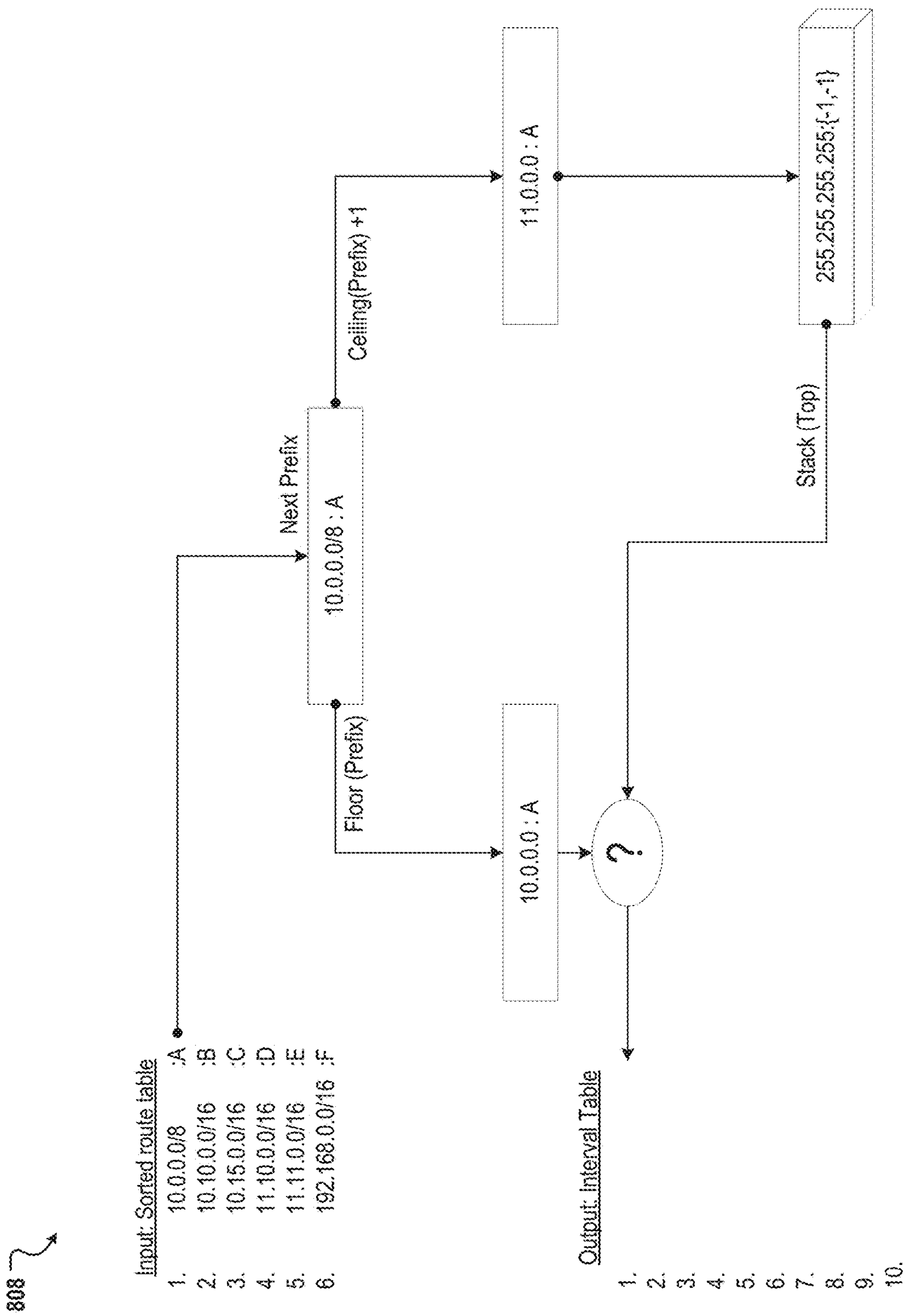
Figure 8F:
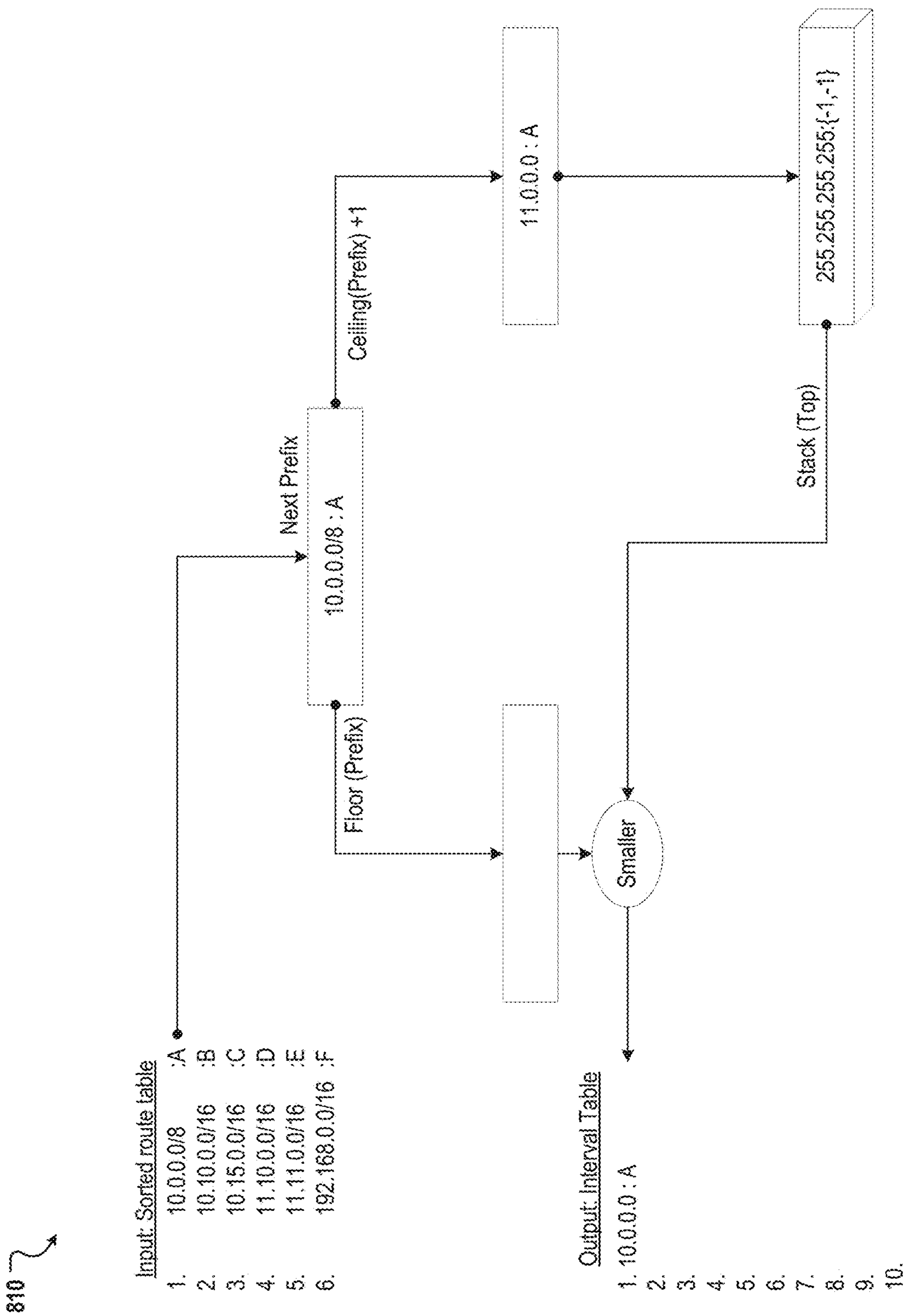
Figure 8G:
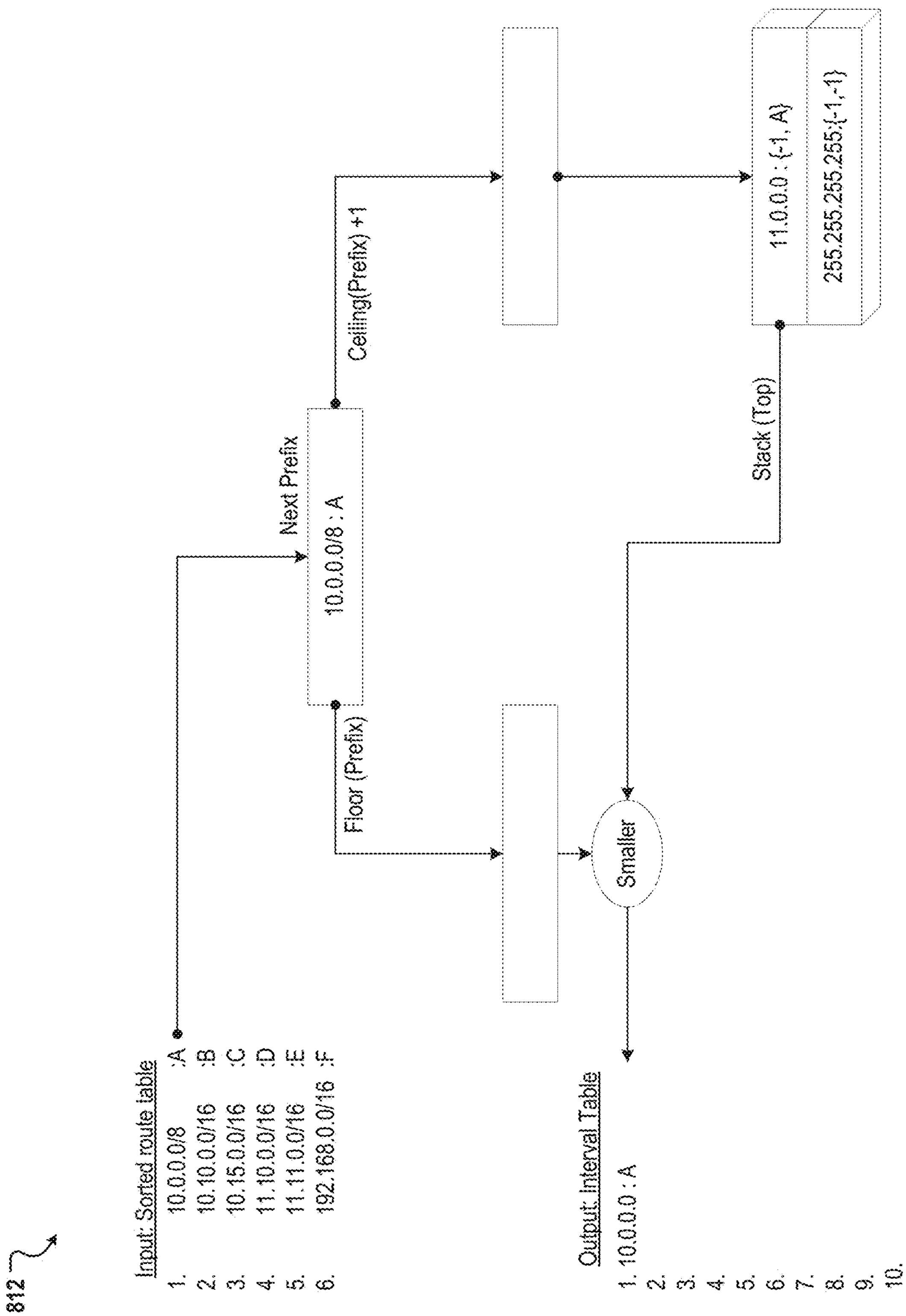
Figure 8H:
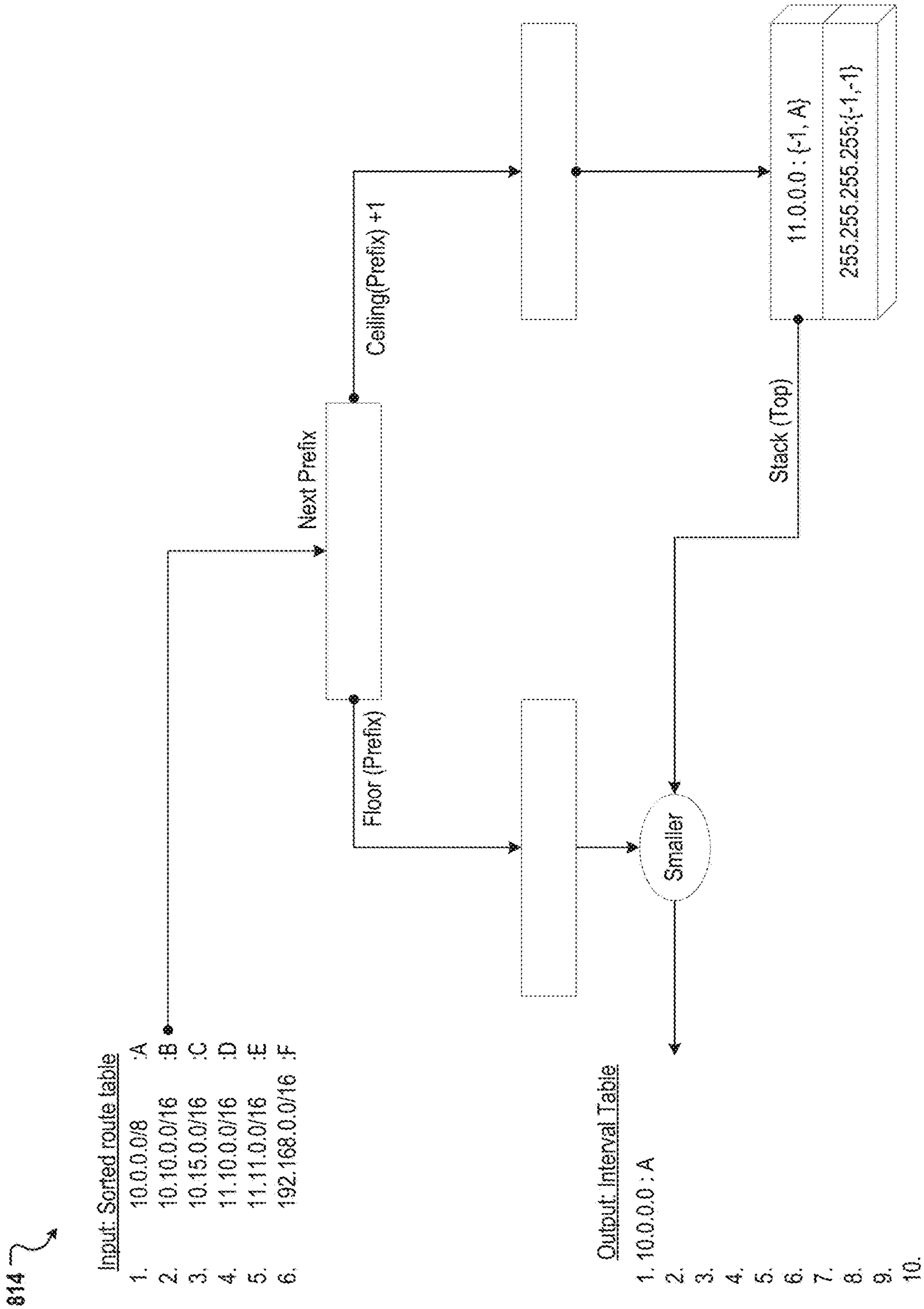
Figure 8I:
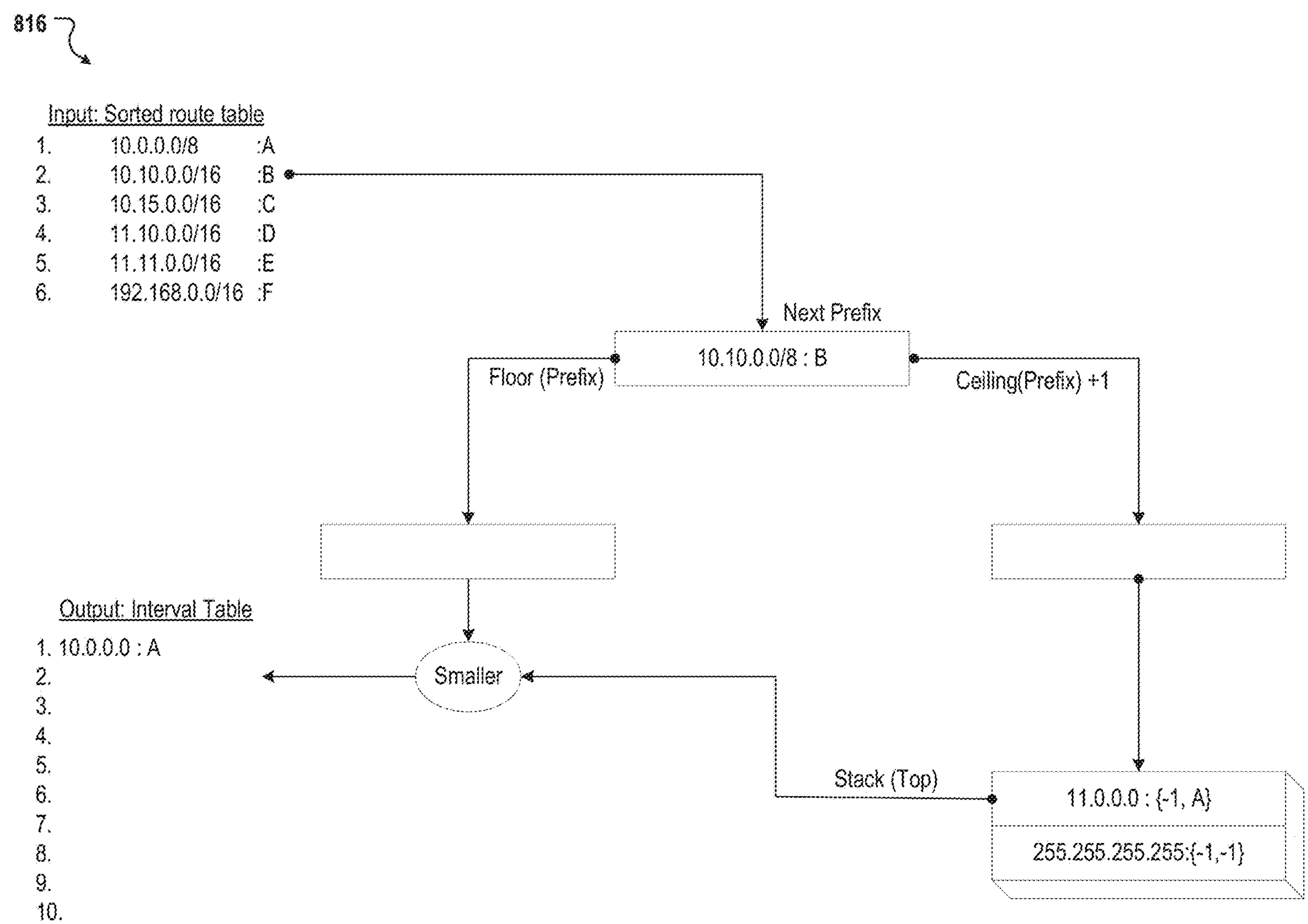
Figure 8J:
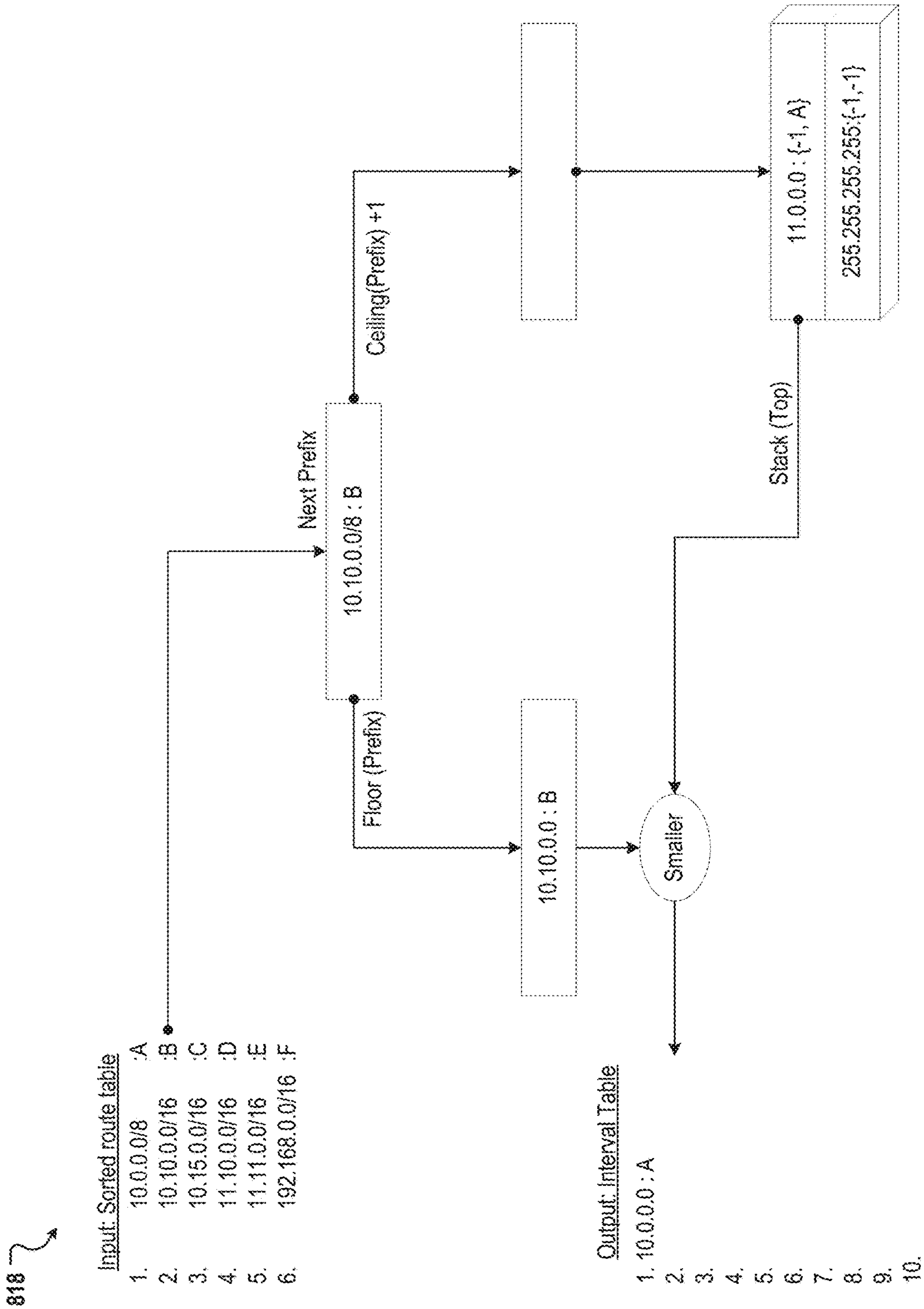
Figure 8K:
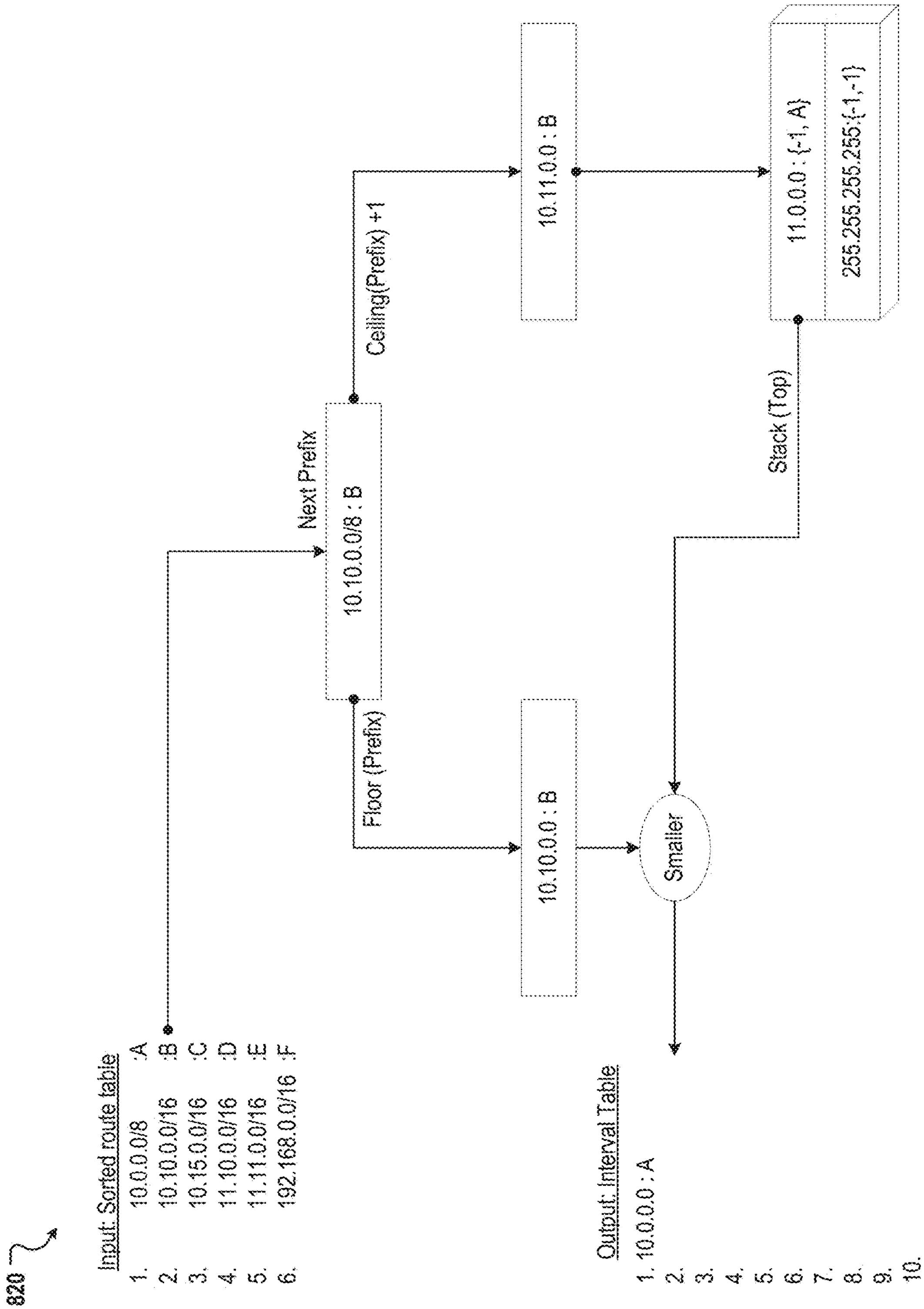
Figure 8L:
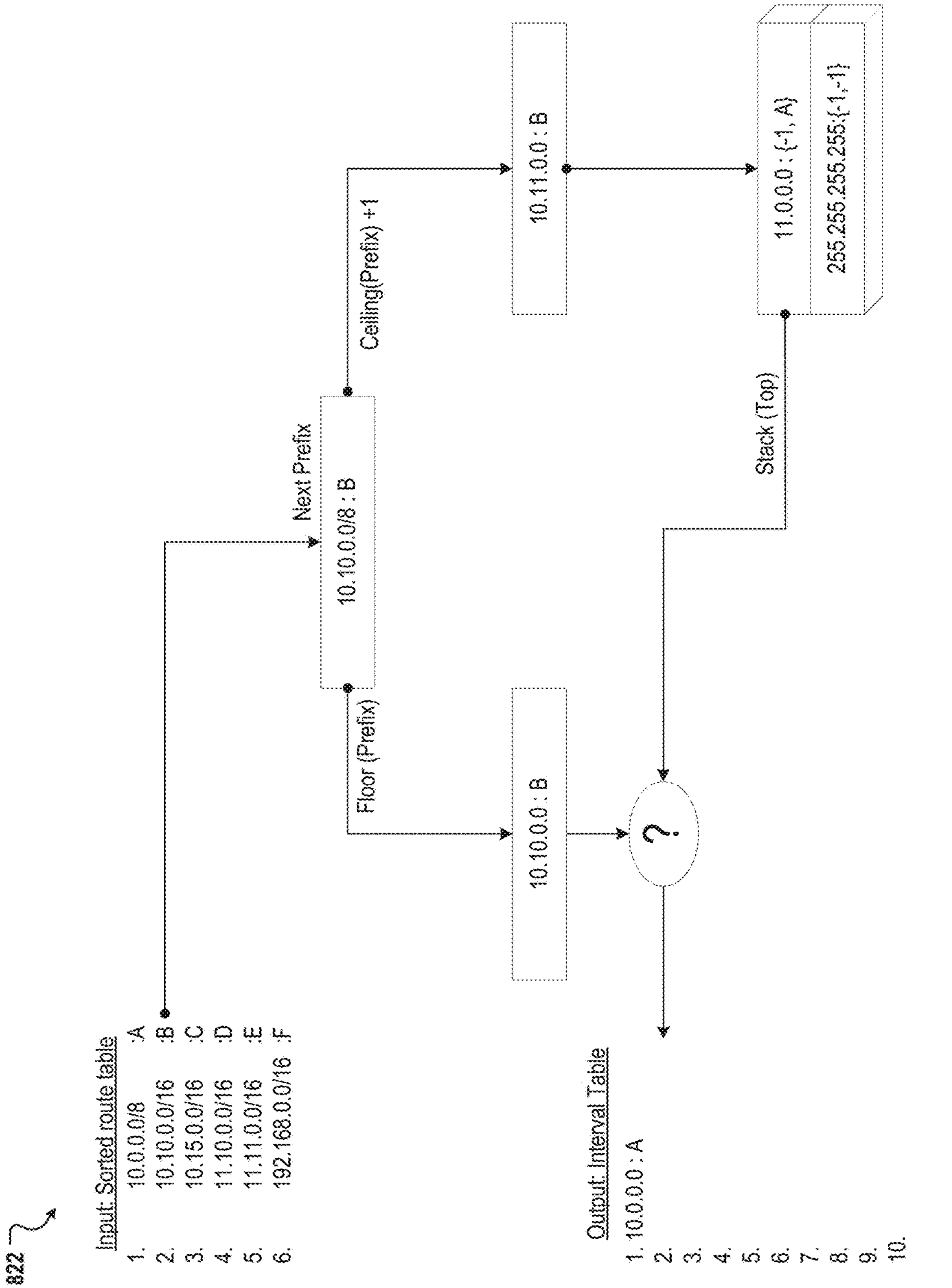
Figure 8M:
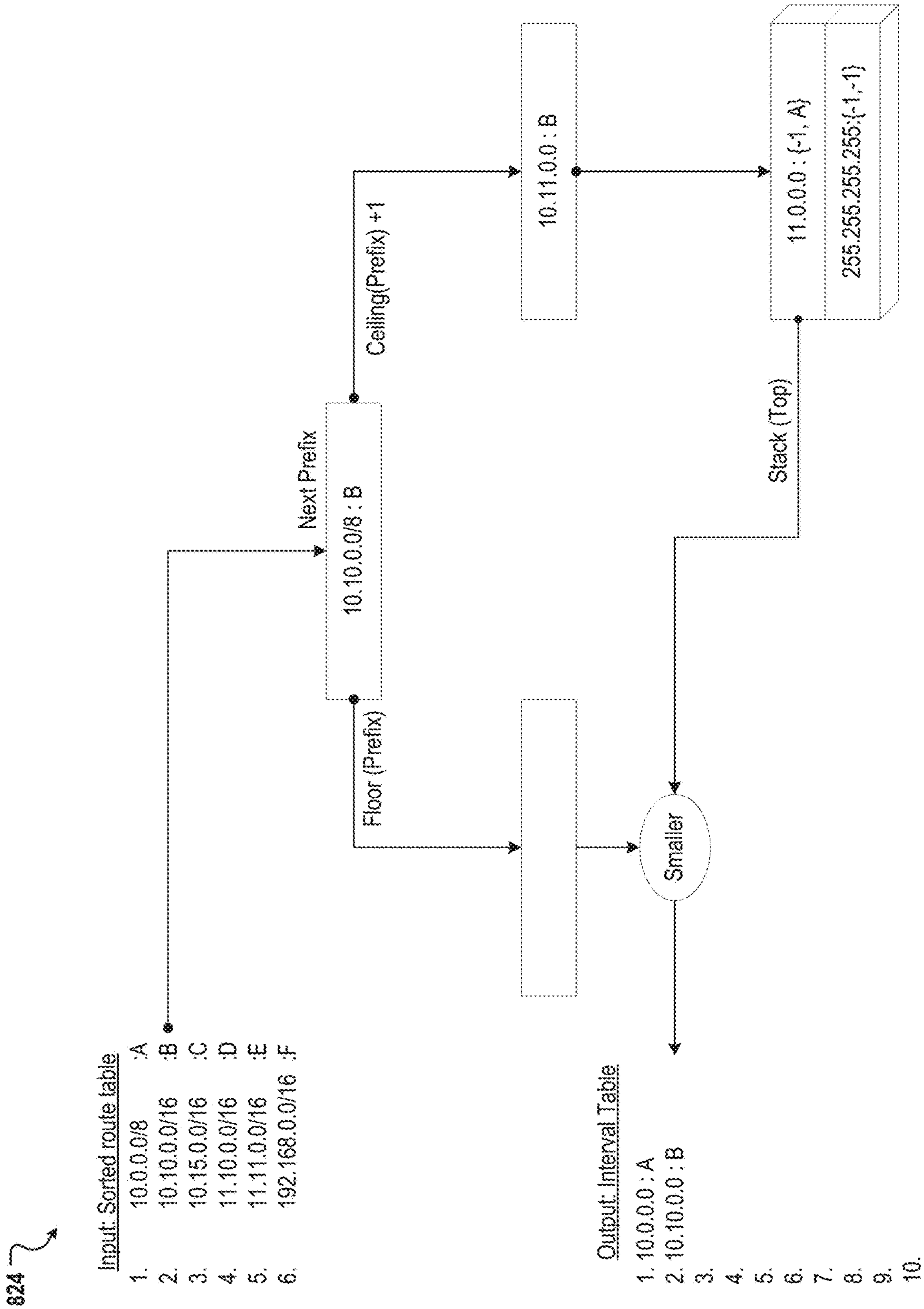
Figure 8N:
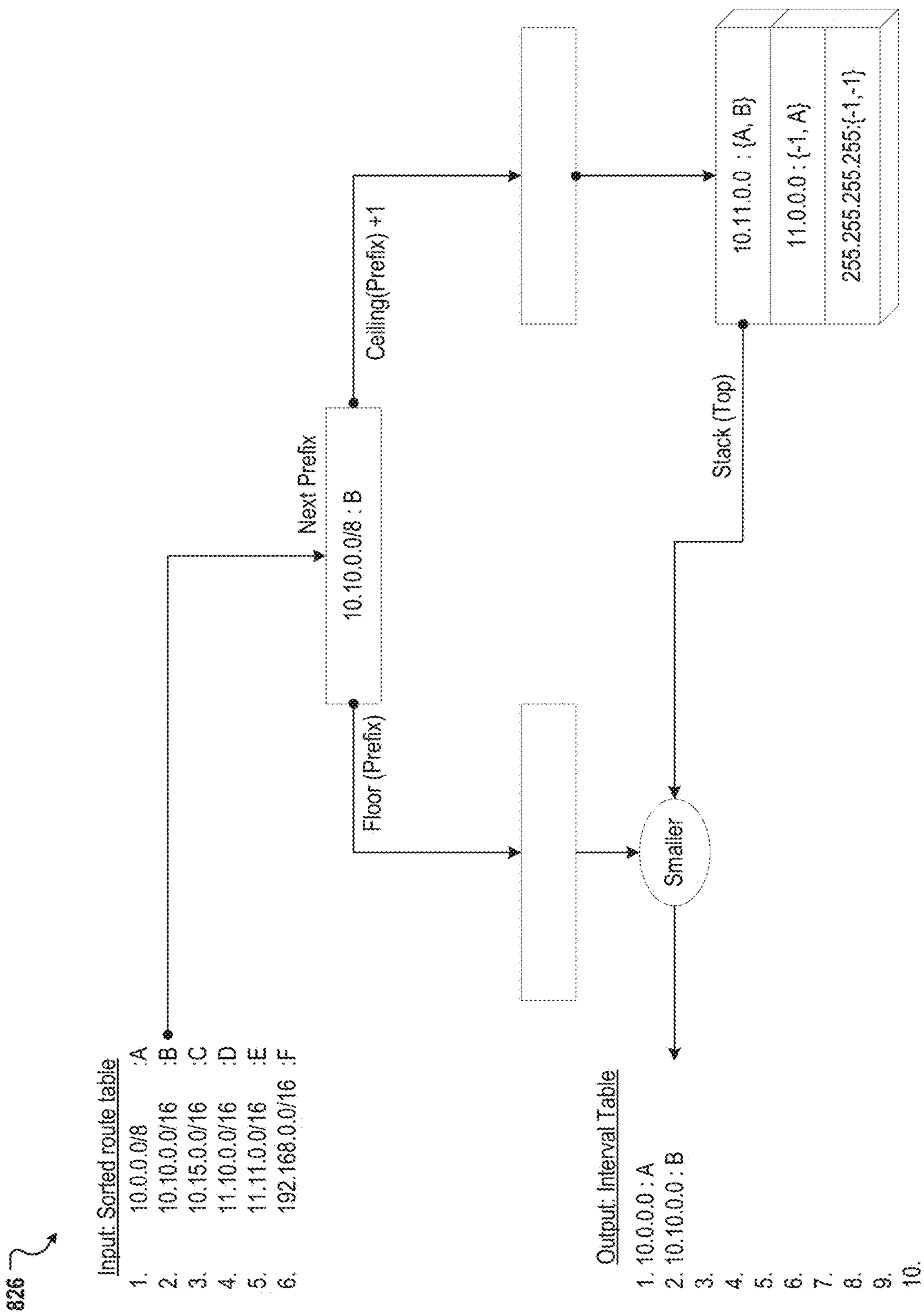
Figure 8O:
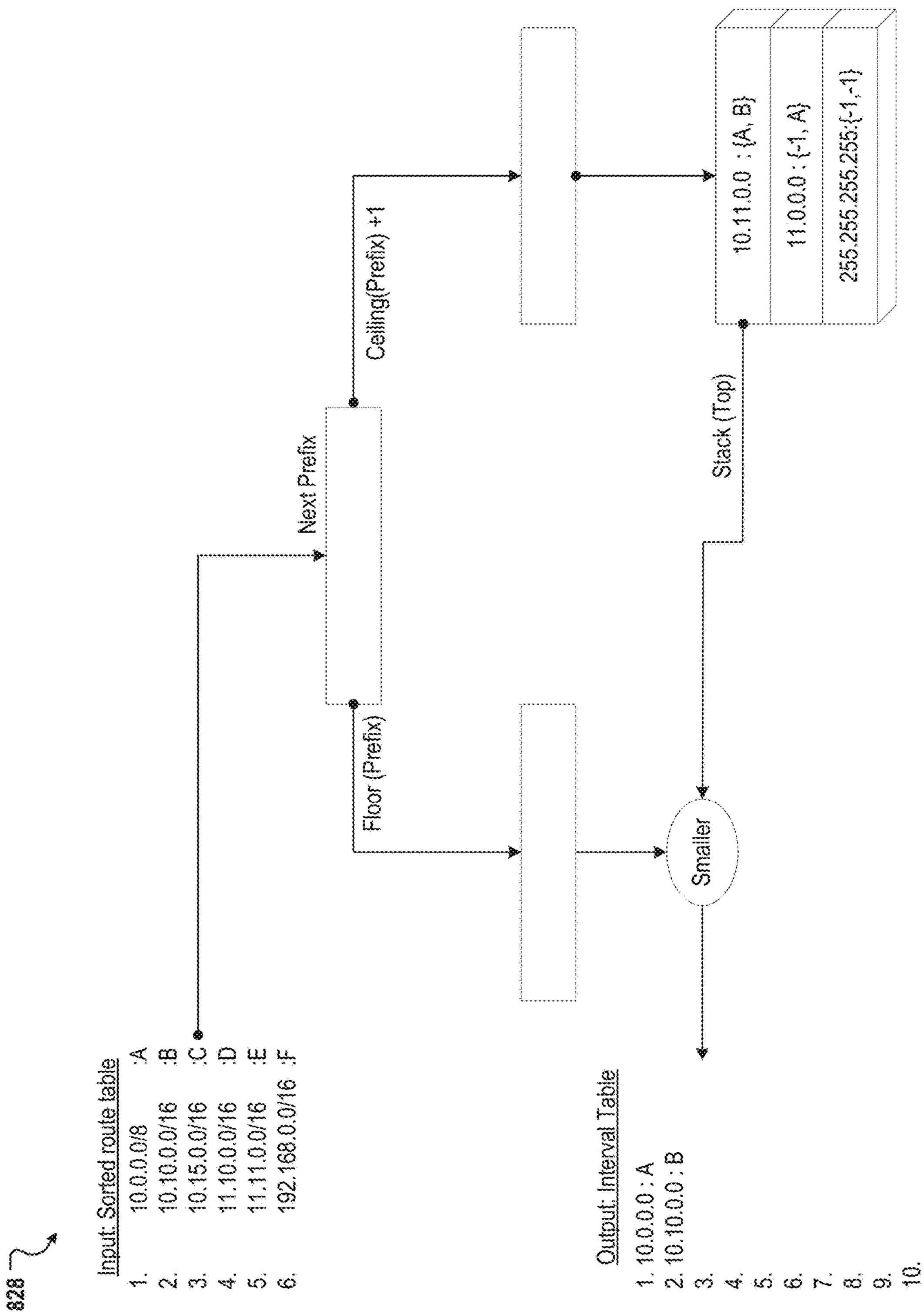
Figure 8P:
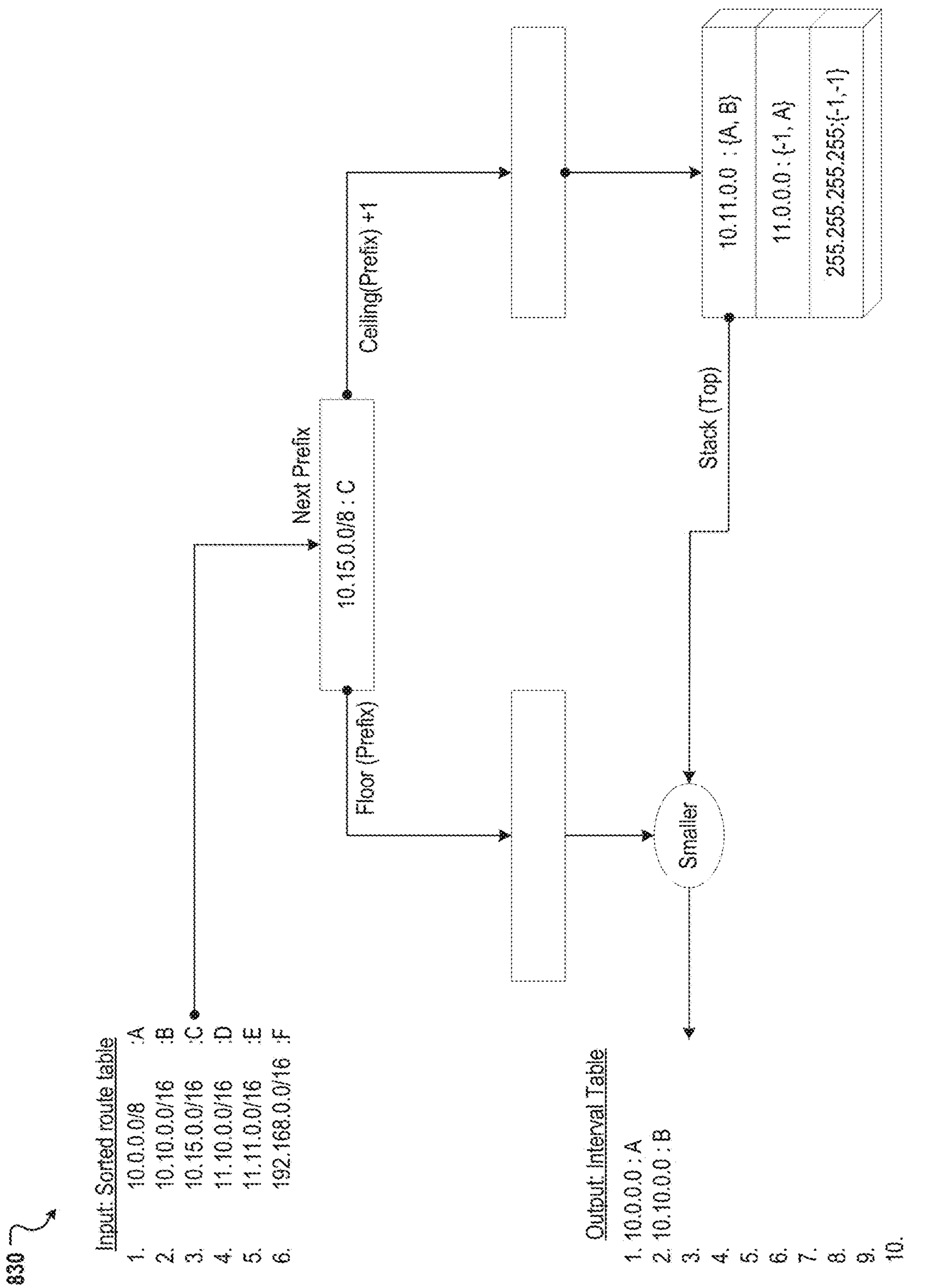
Figure 8Q:
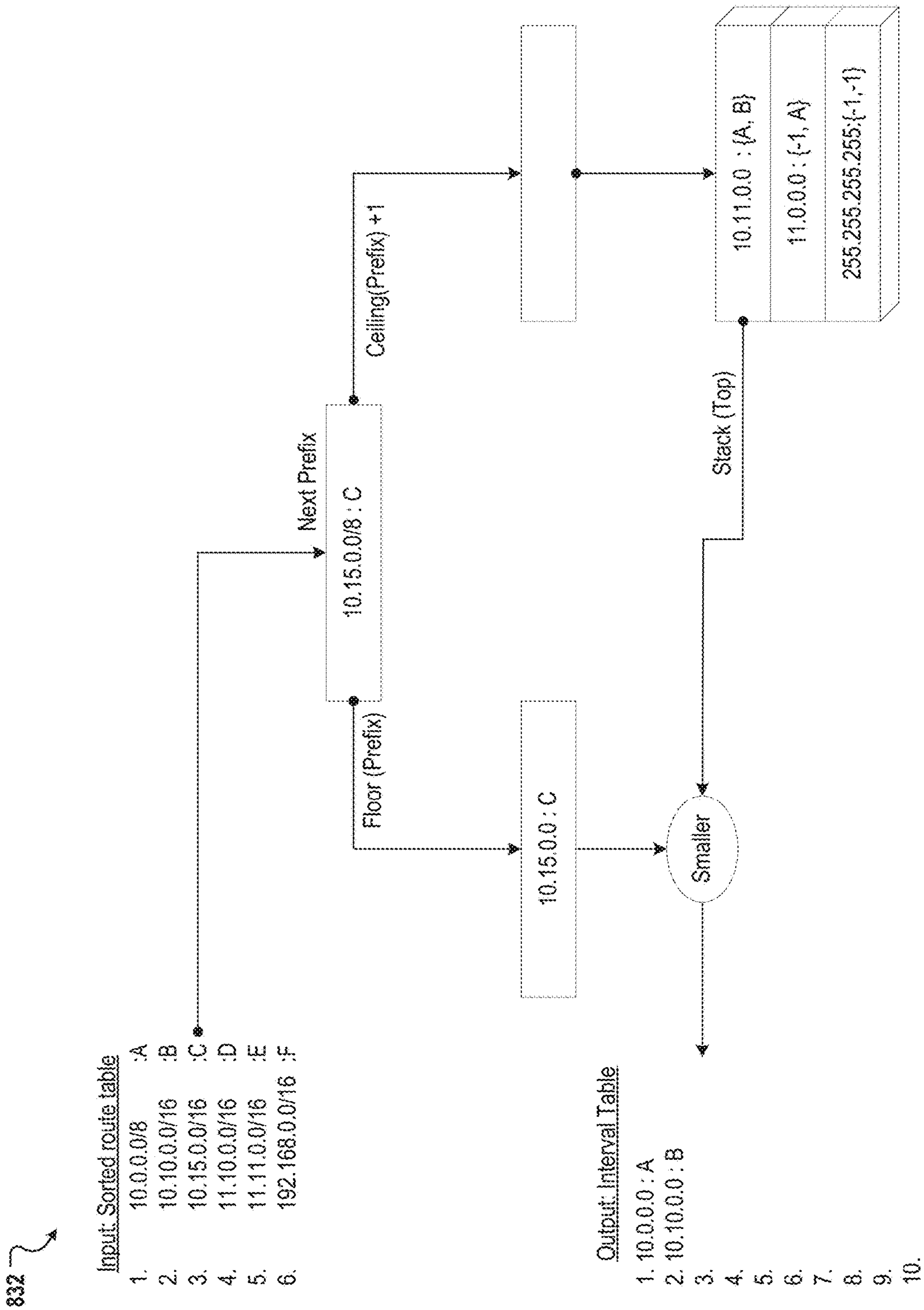
Figure 8R:
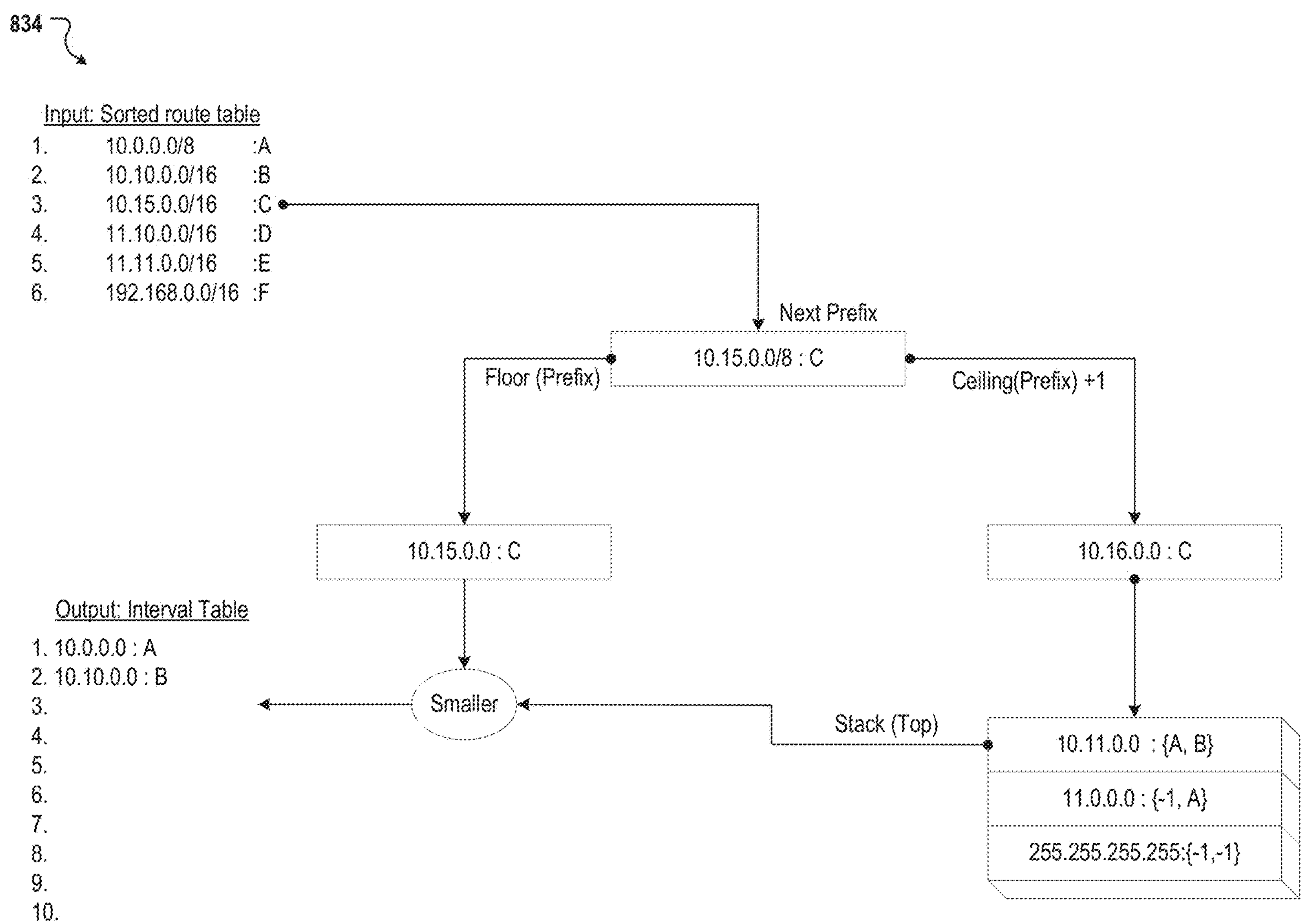
Figure 8S:
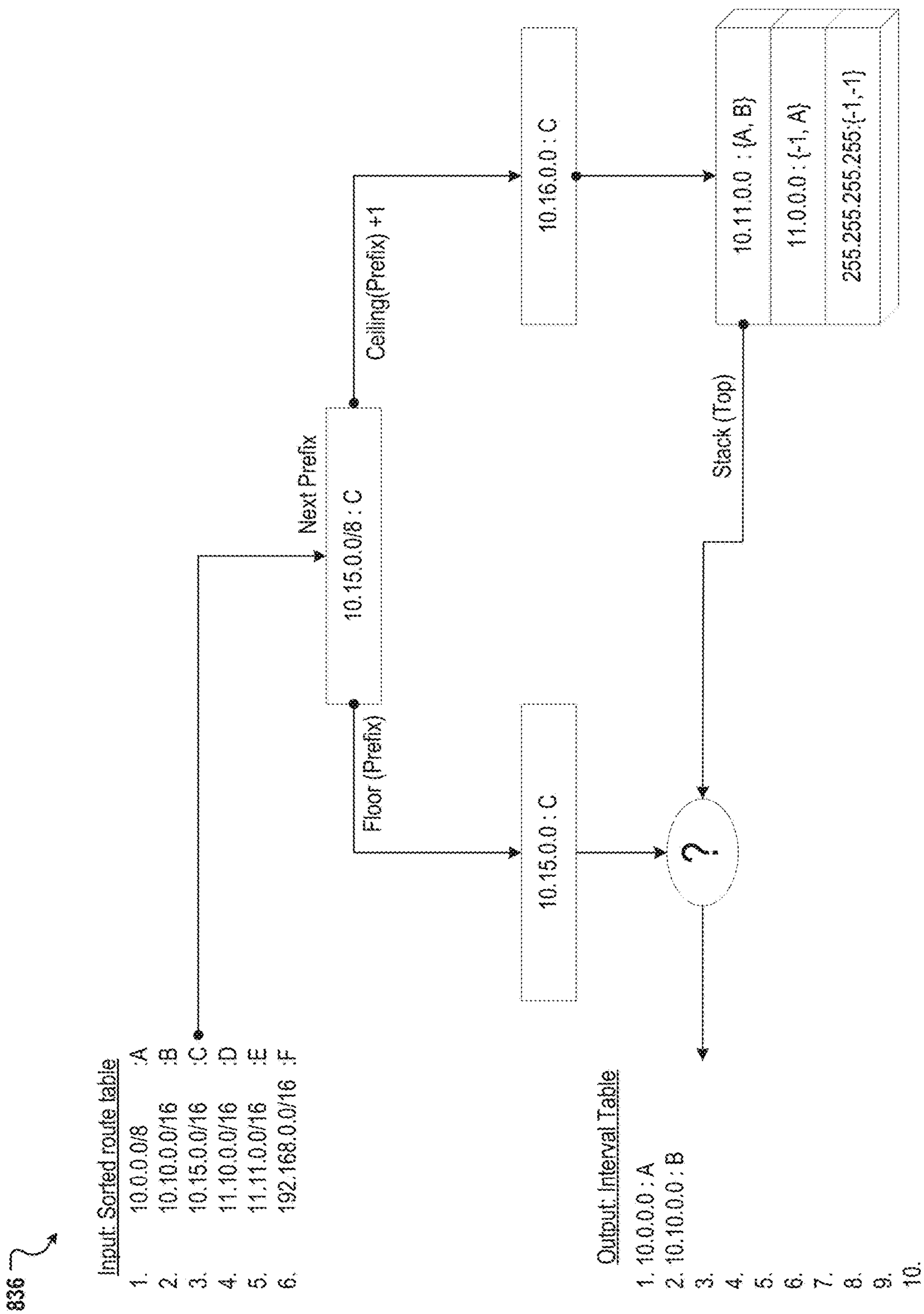
Figure 8T:
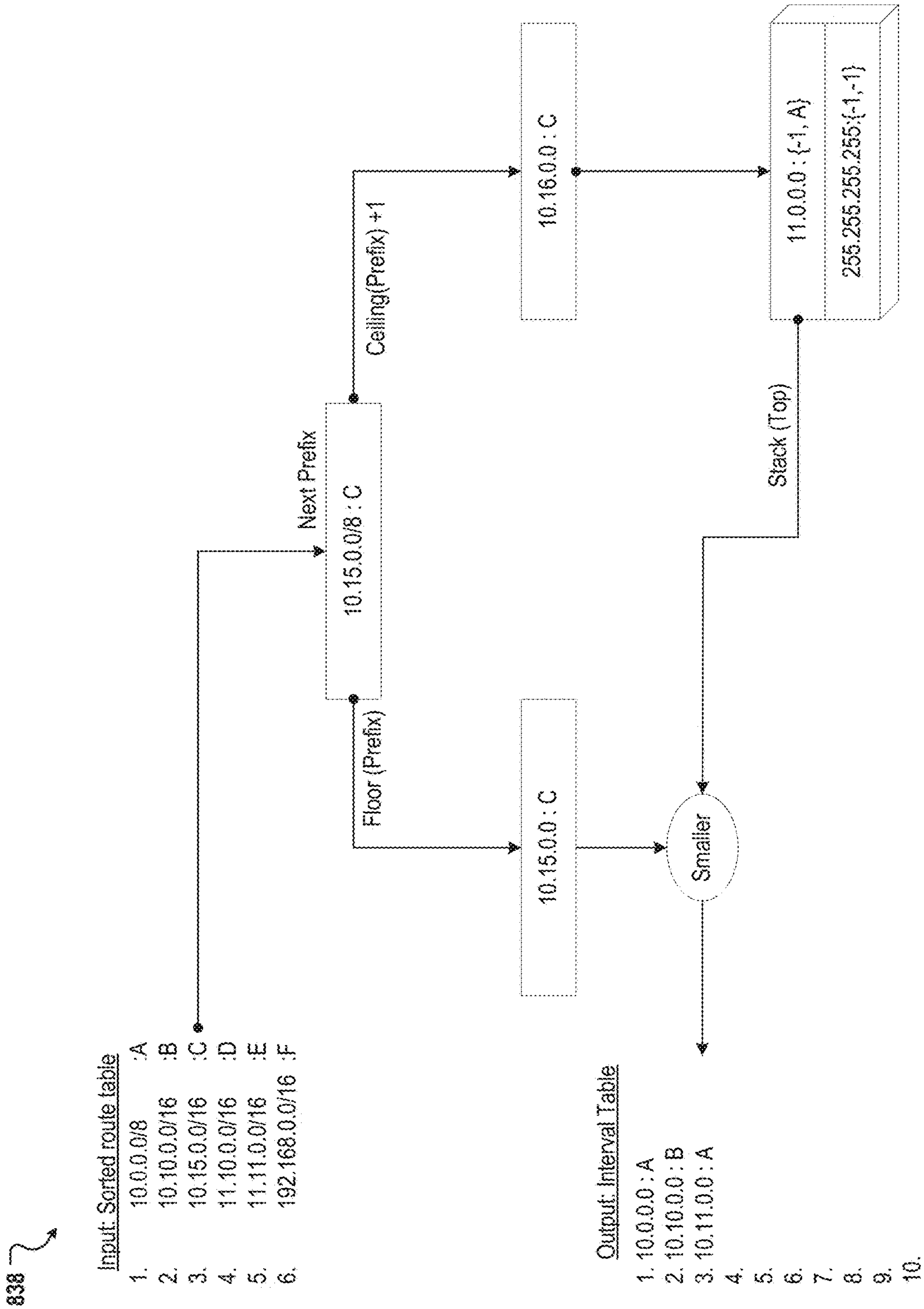
Figure 8U:
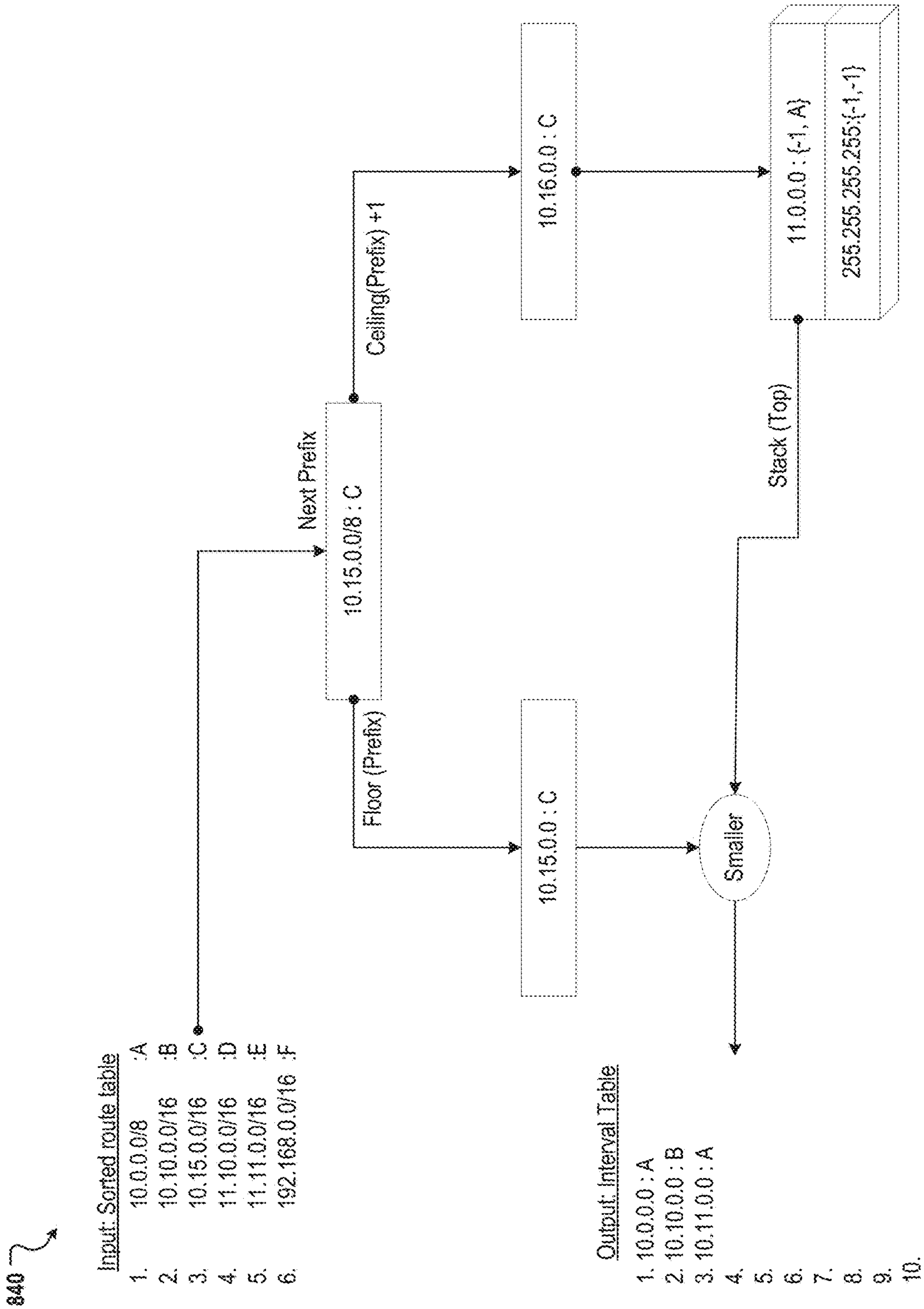
Figure 8V:
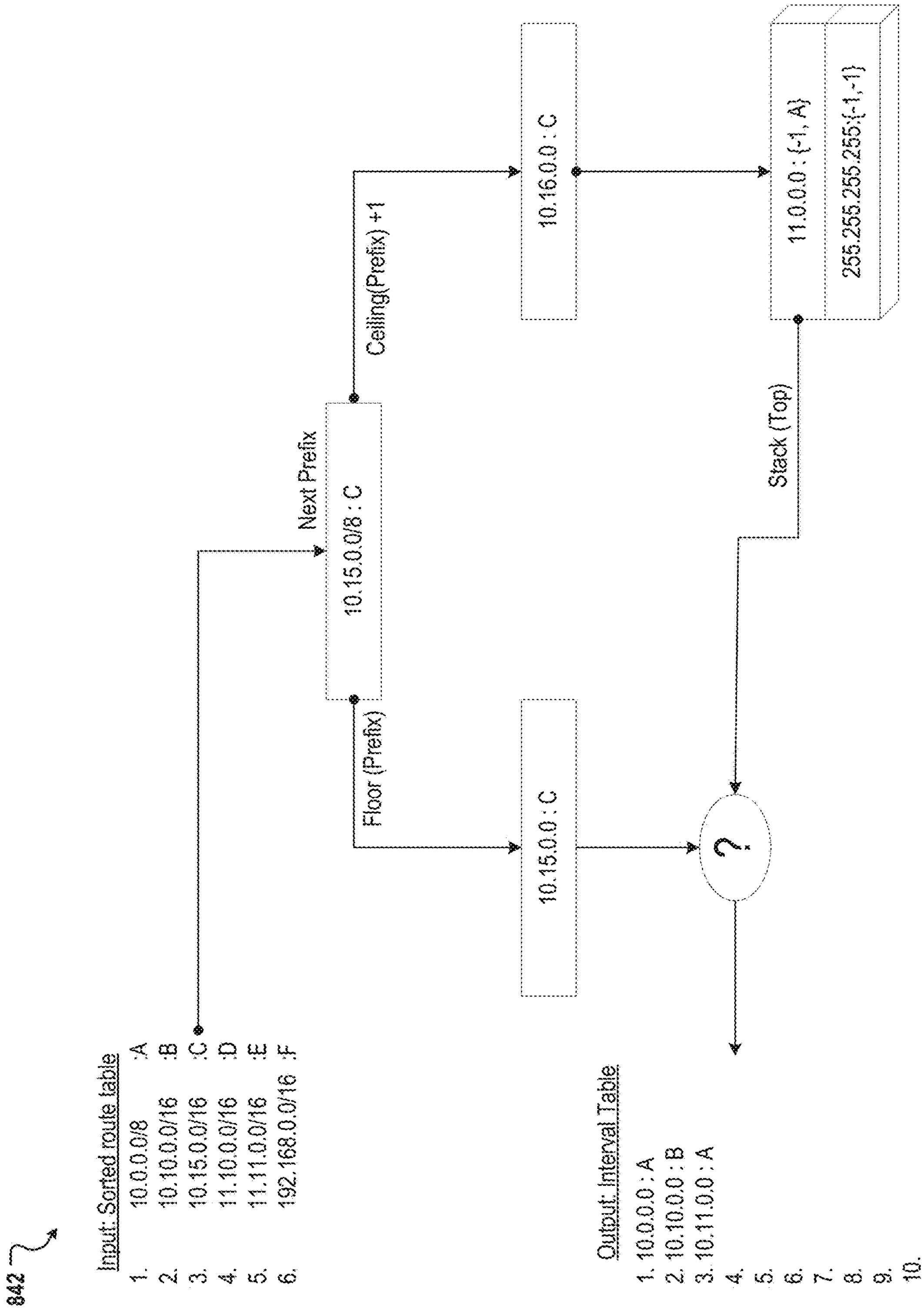
Figure 8W:
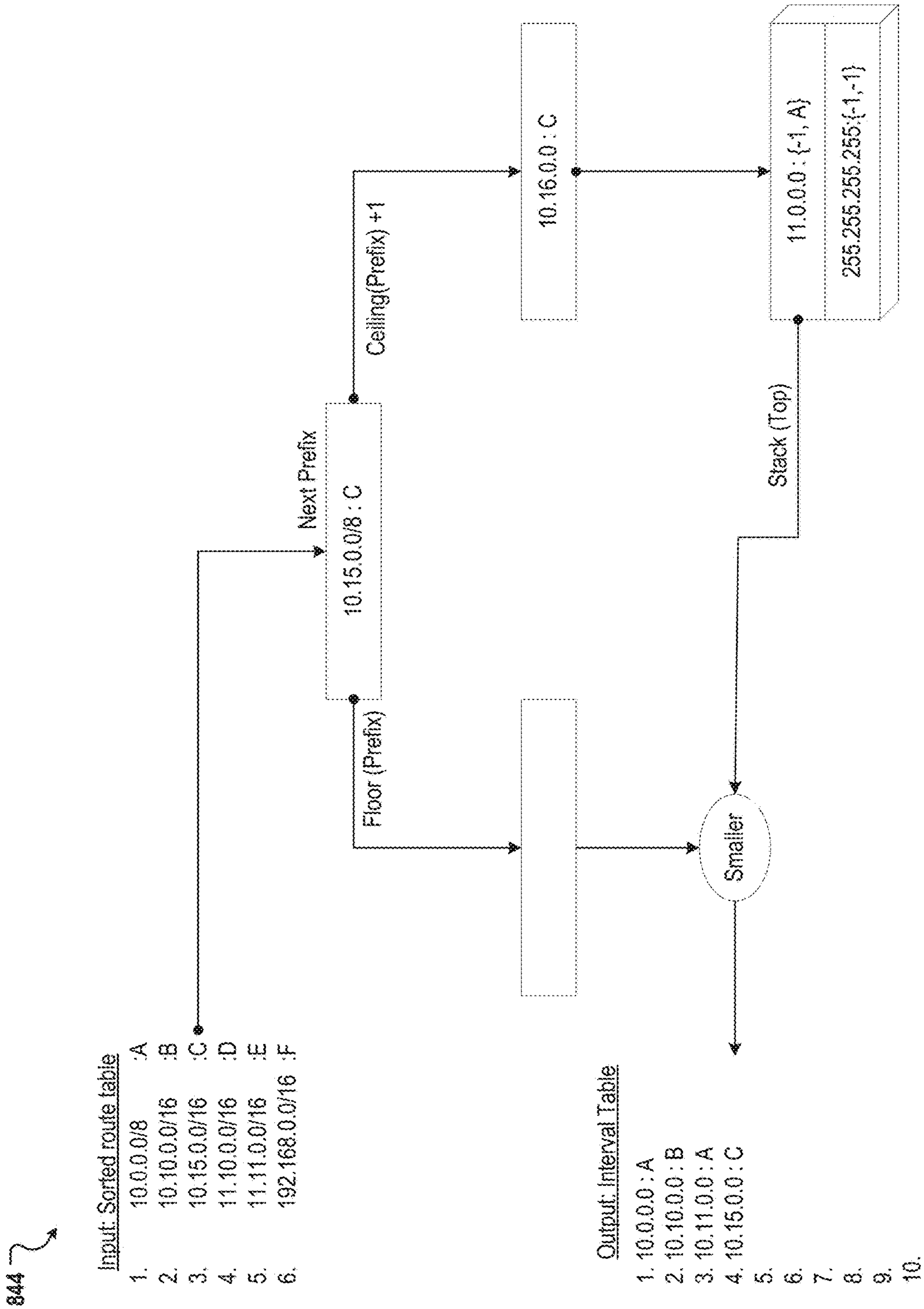
Figure 8X:
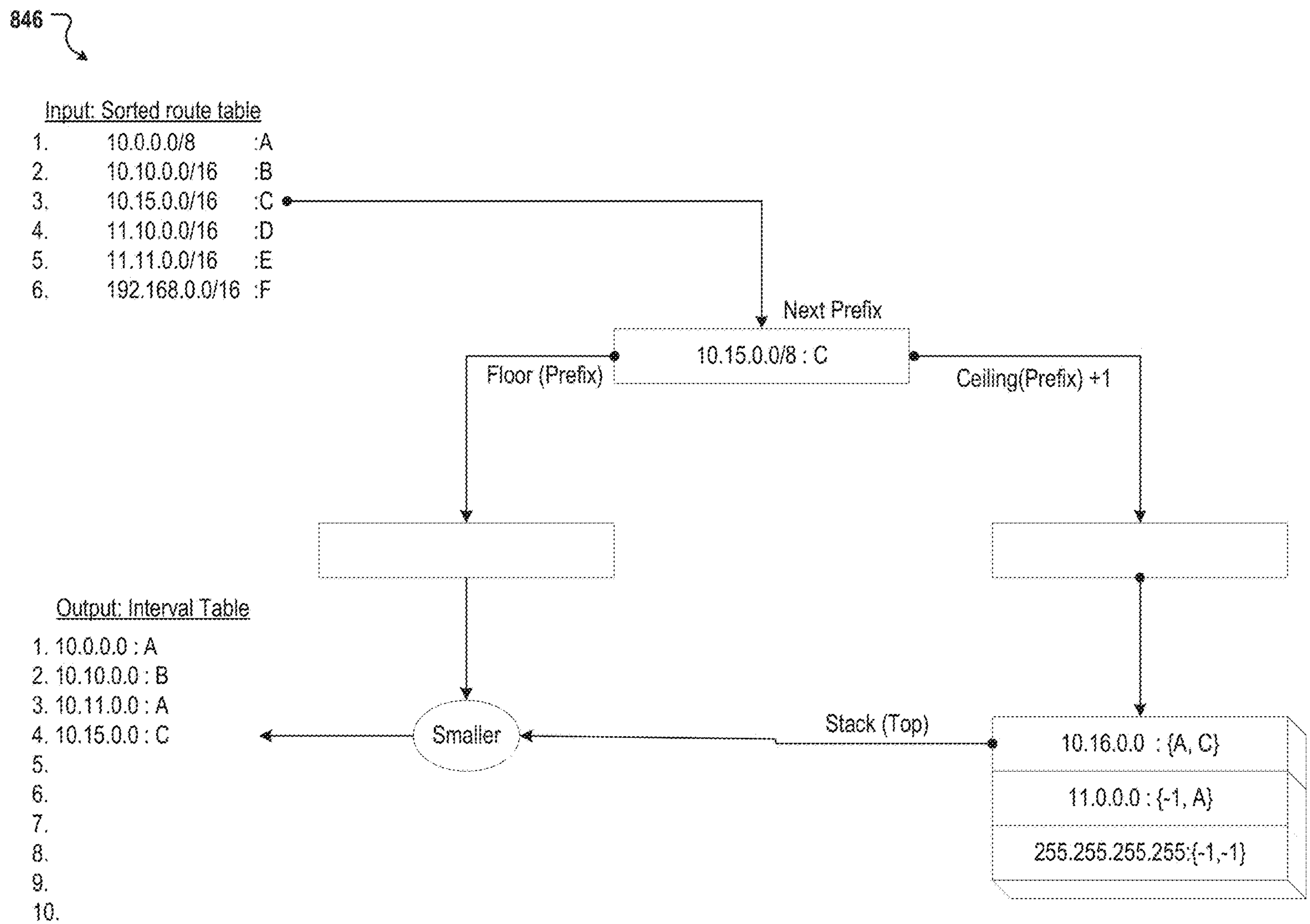
Figure 8Y:
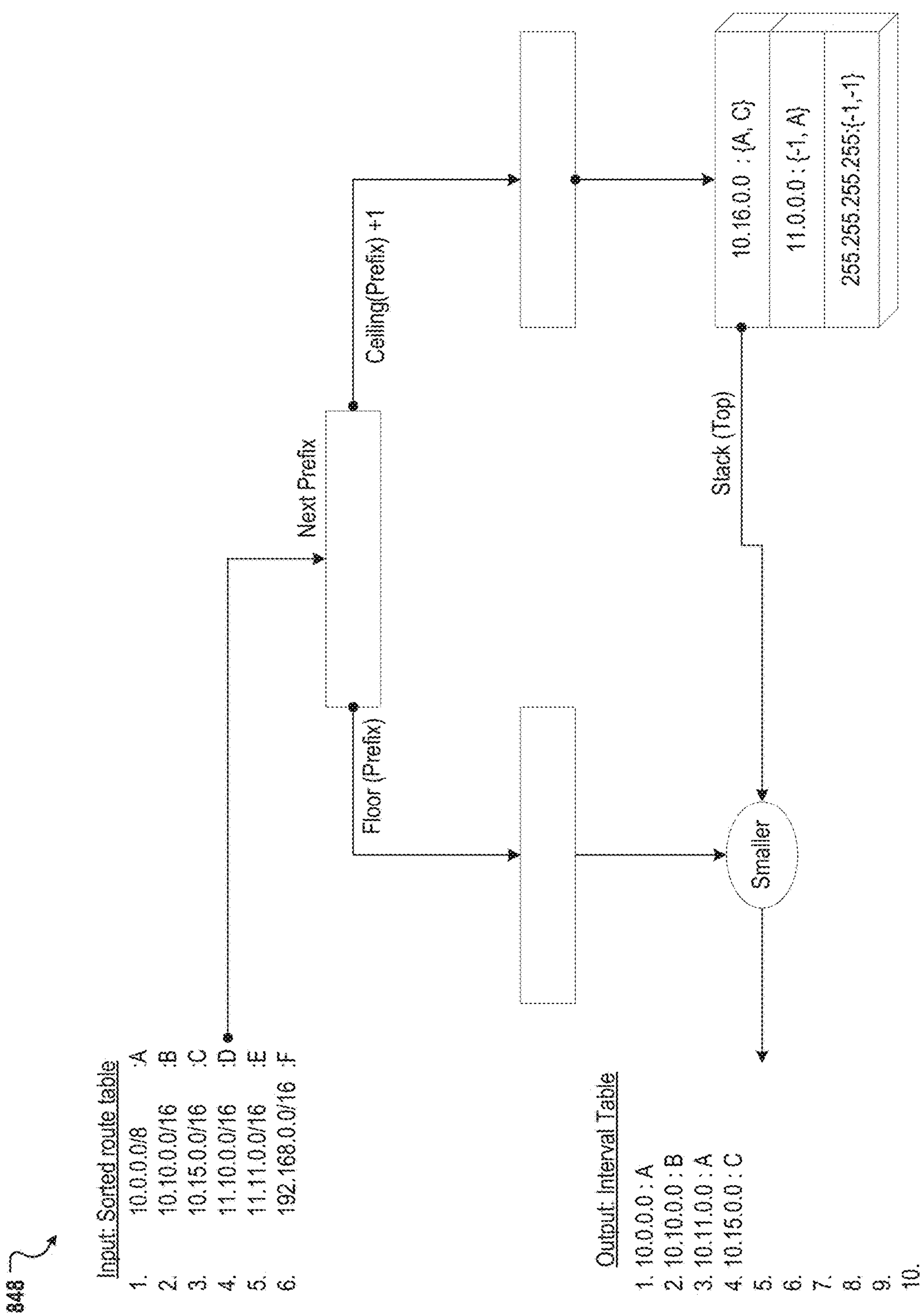
Figure 8Z:
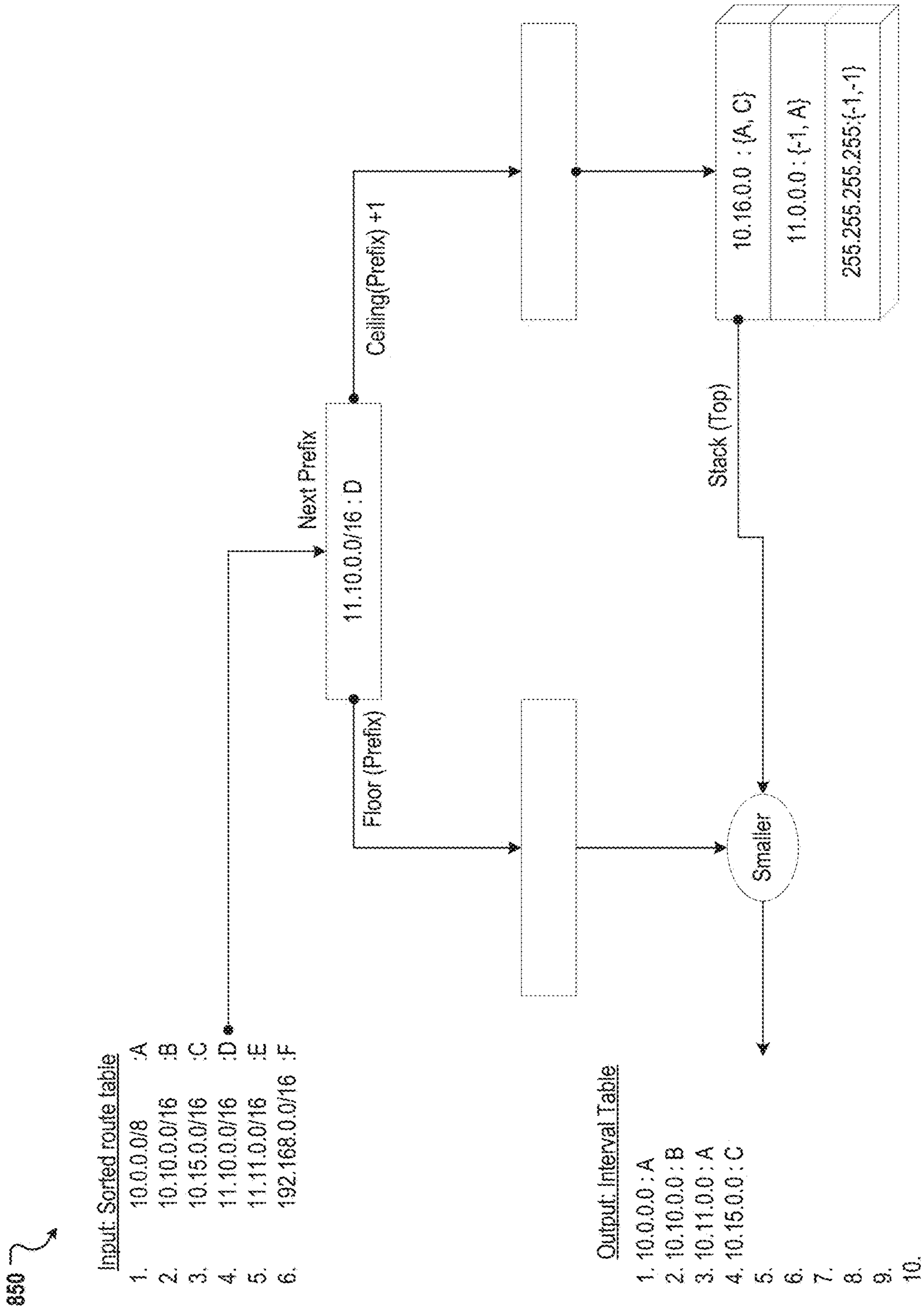
Figure 8A:
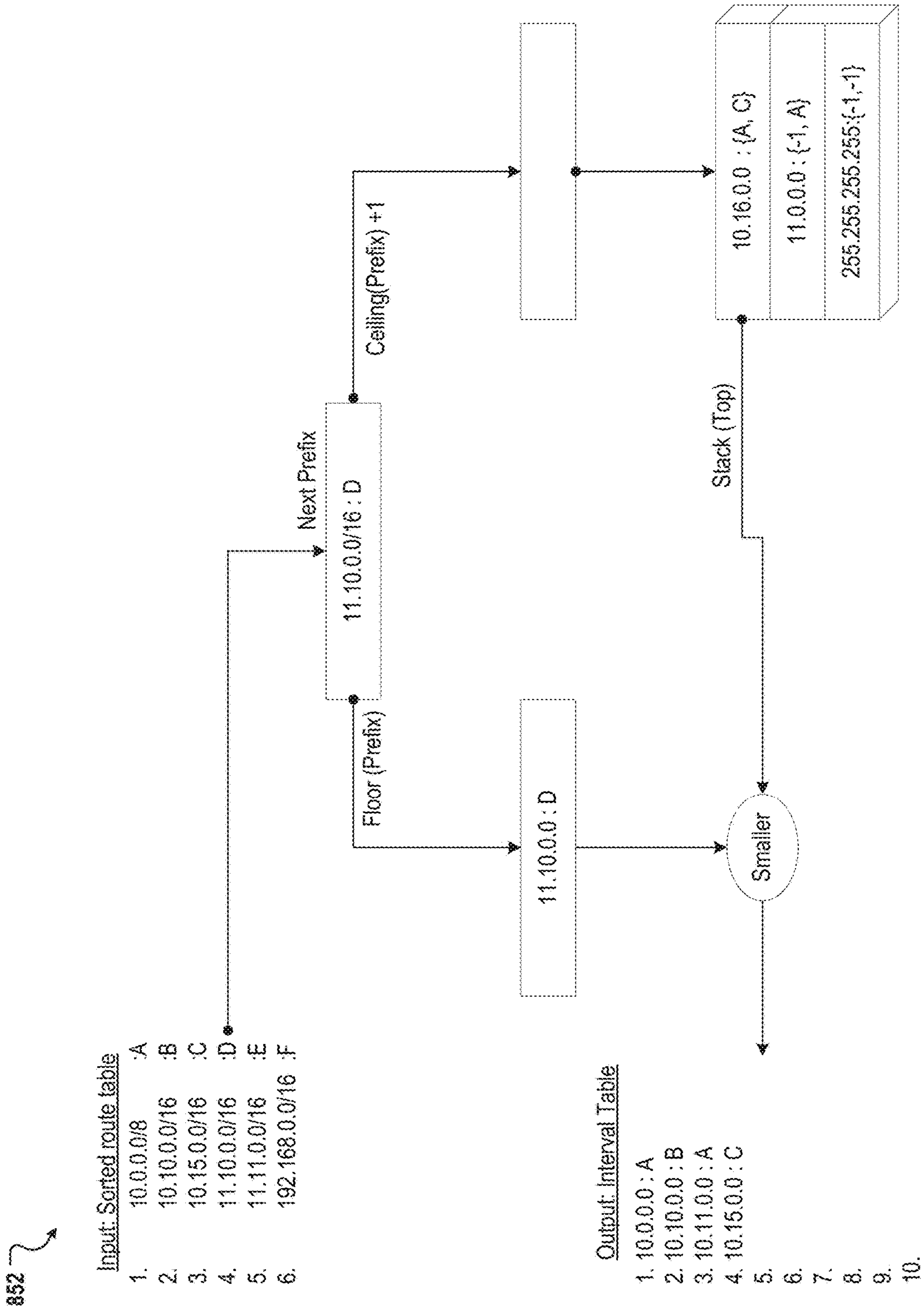
Figure 8A:
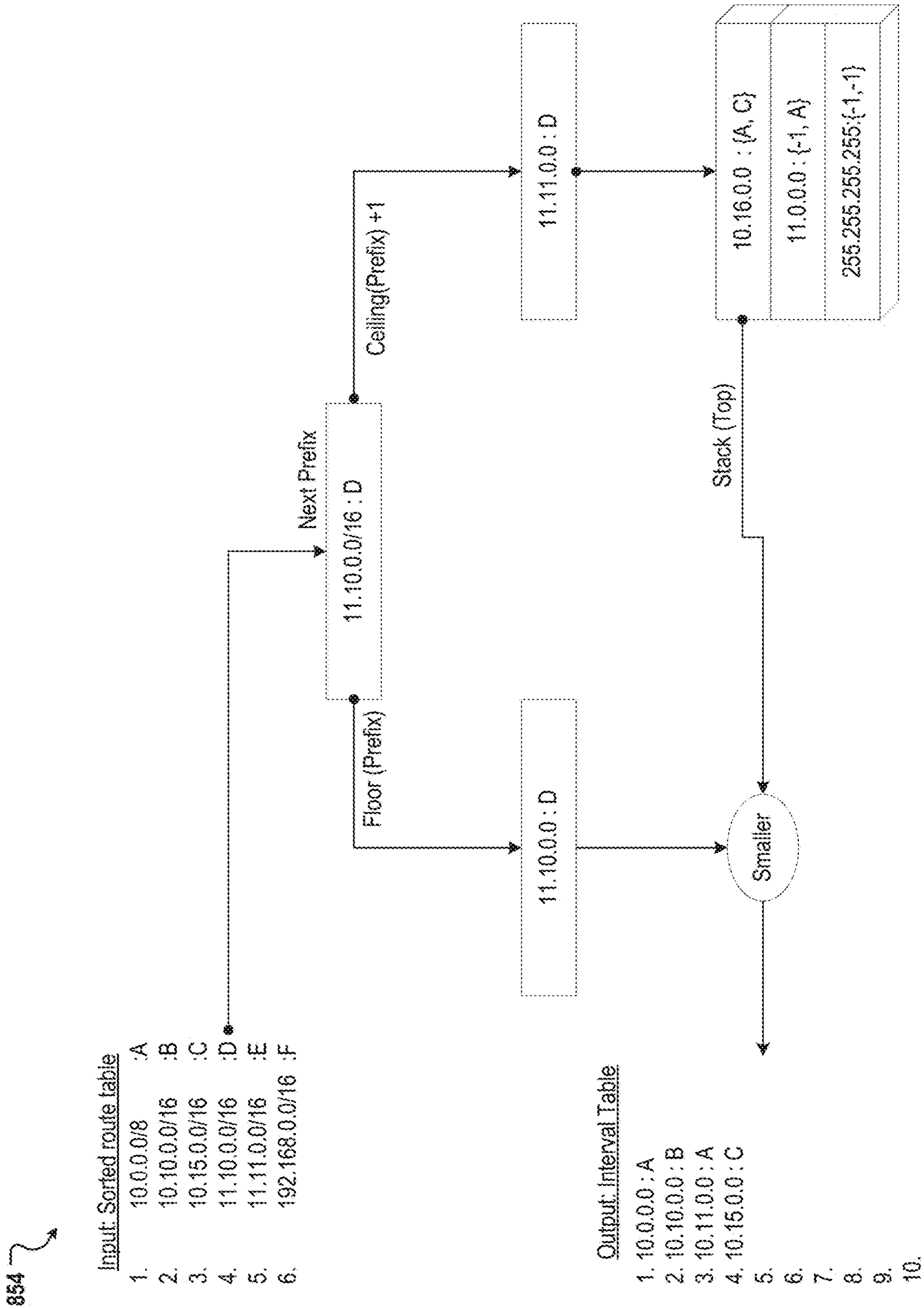
Figure 8A:
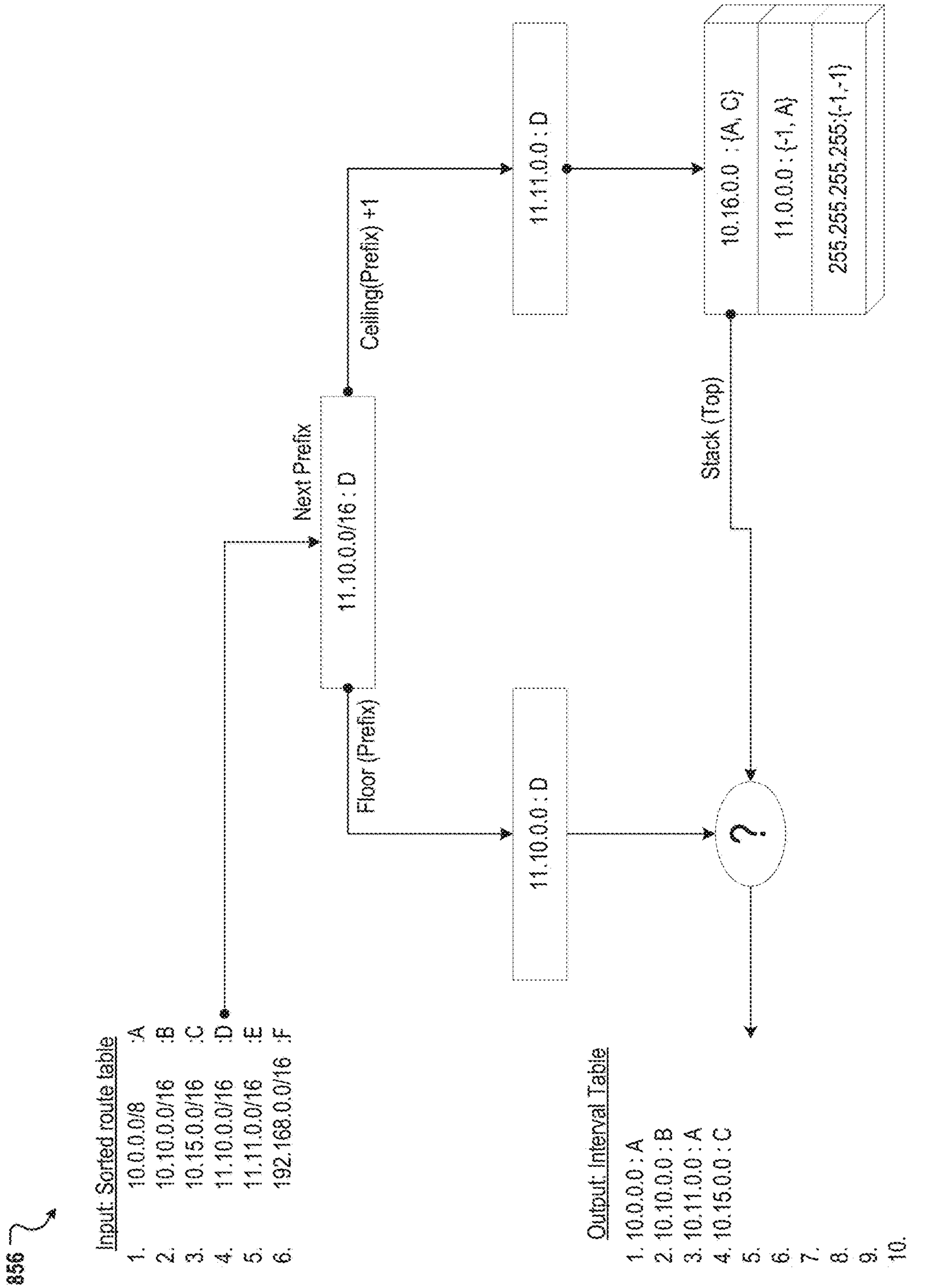
Figure 8A:
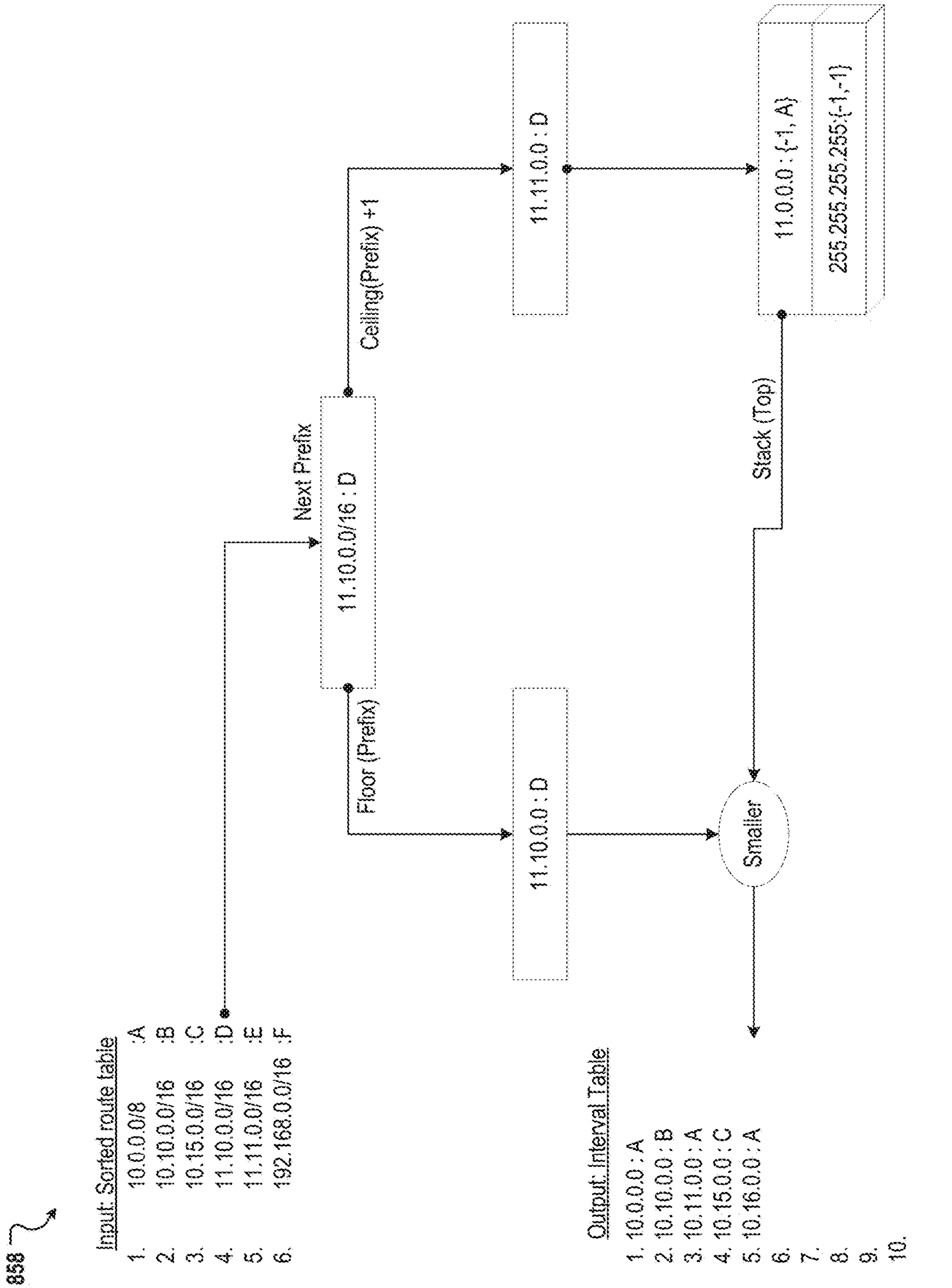
Figure 8A:
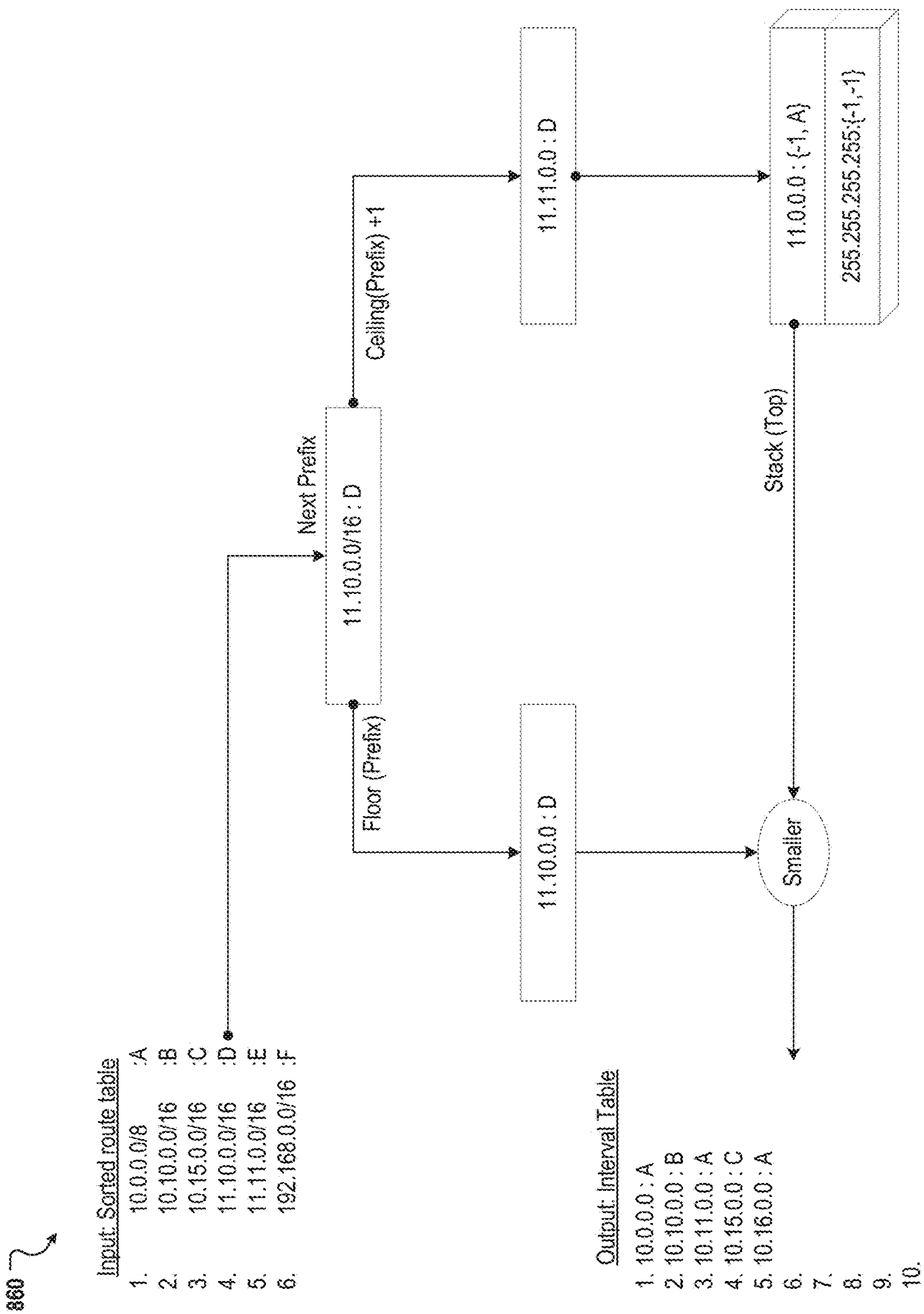
Figure 8A:
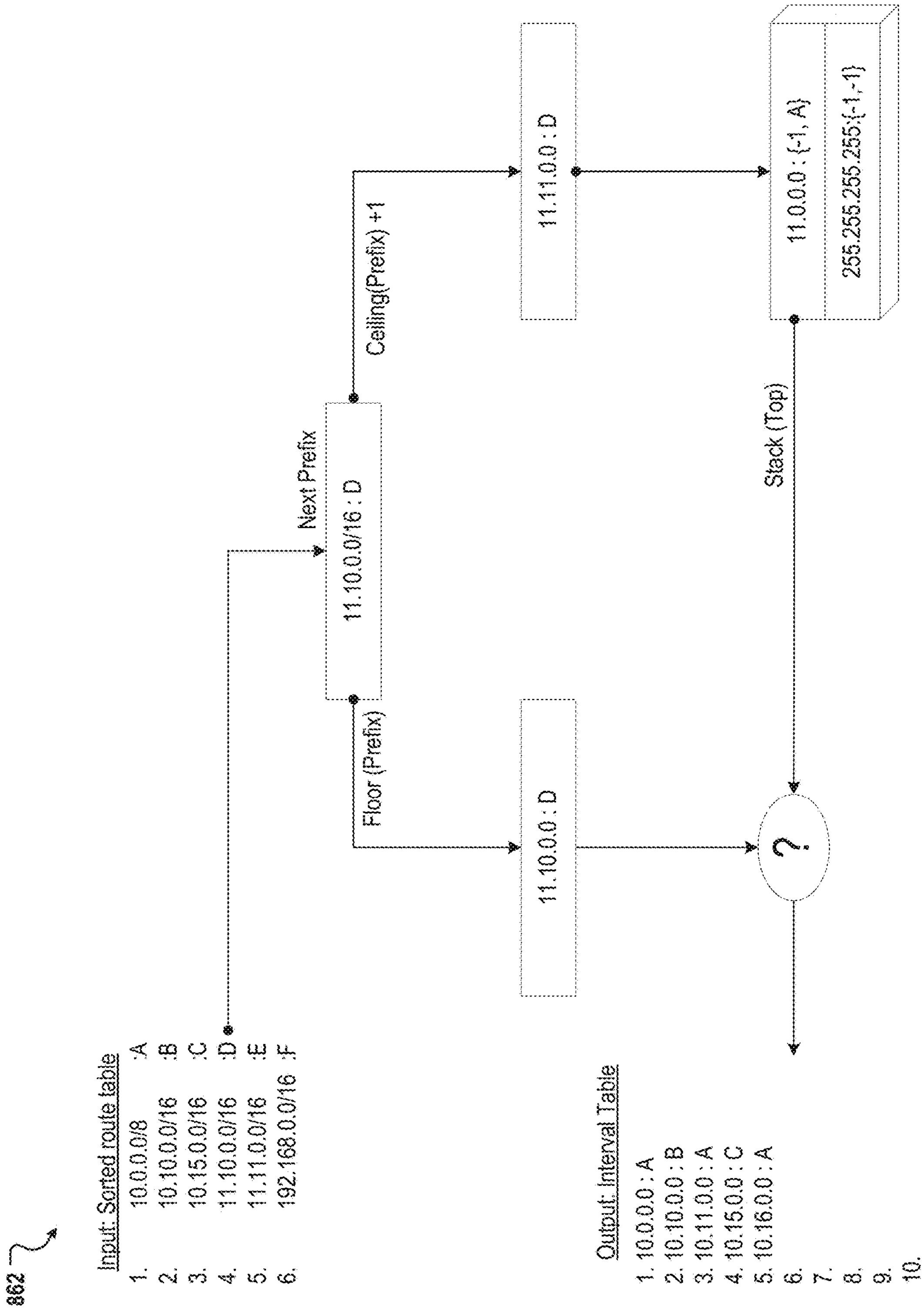
Figure 8A:
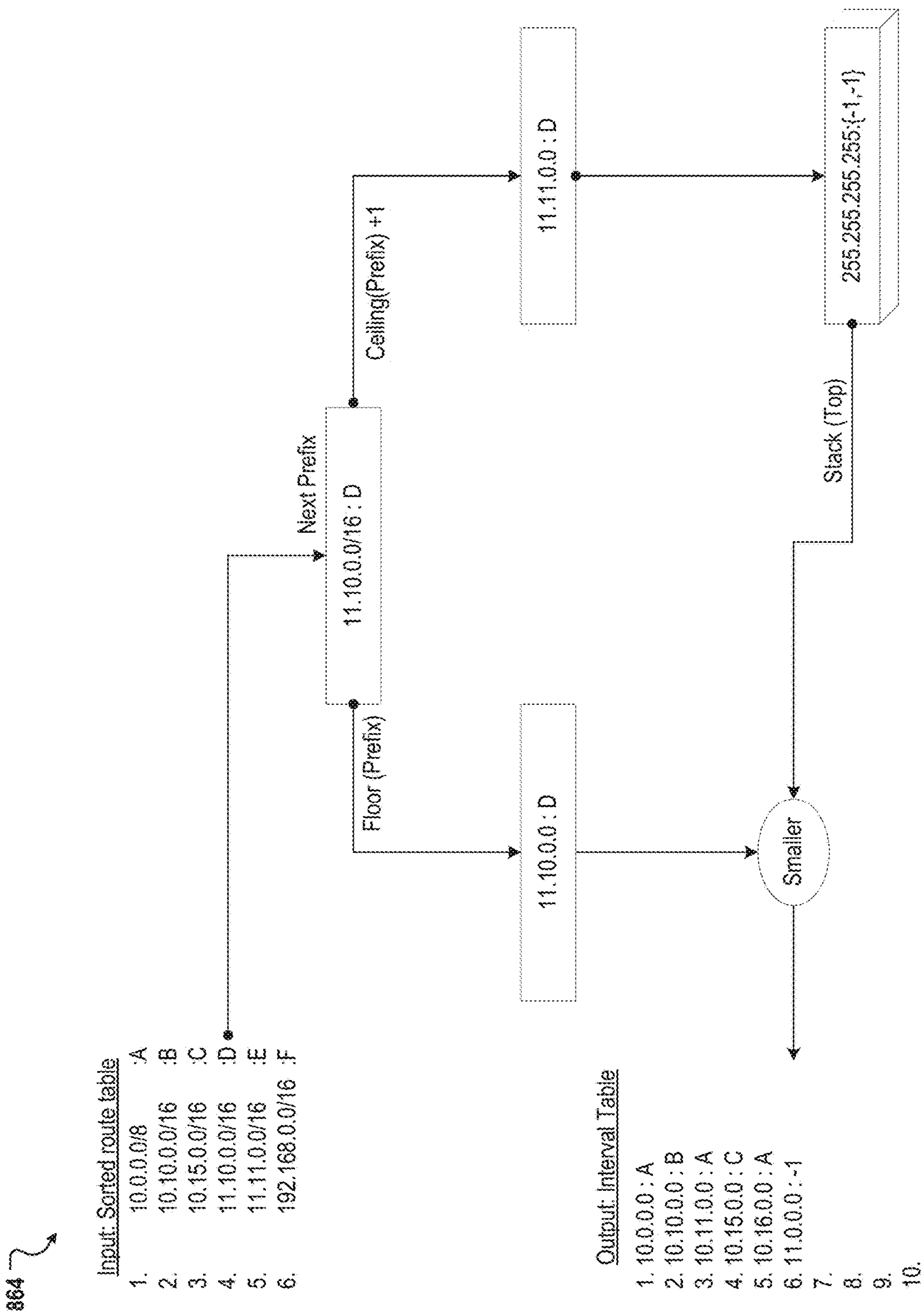
Figure 8A:
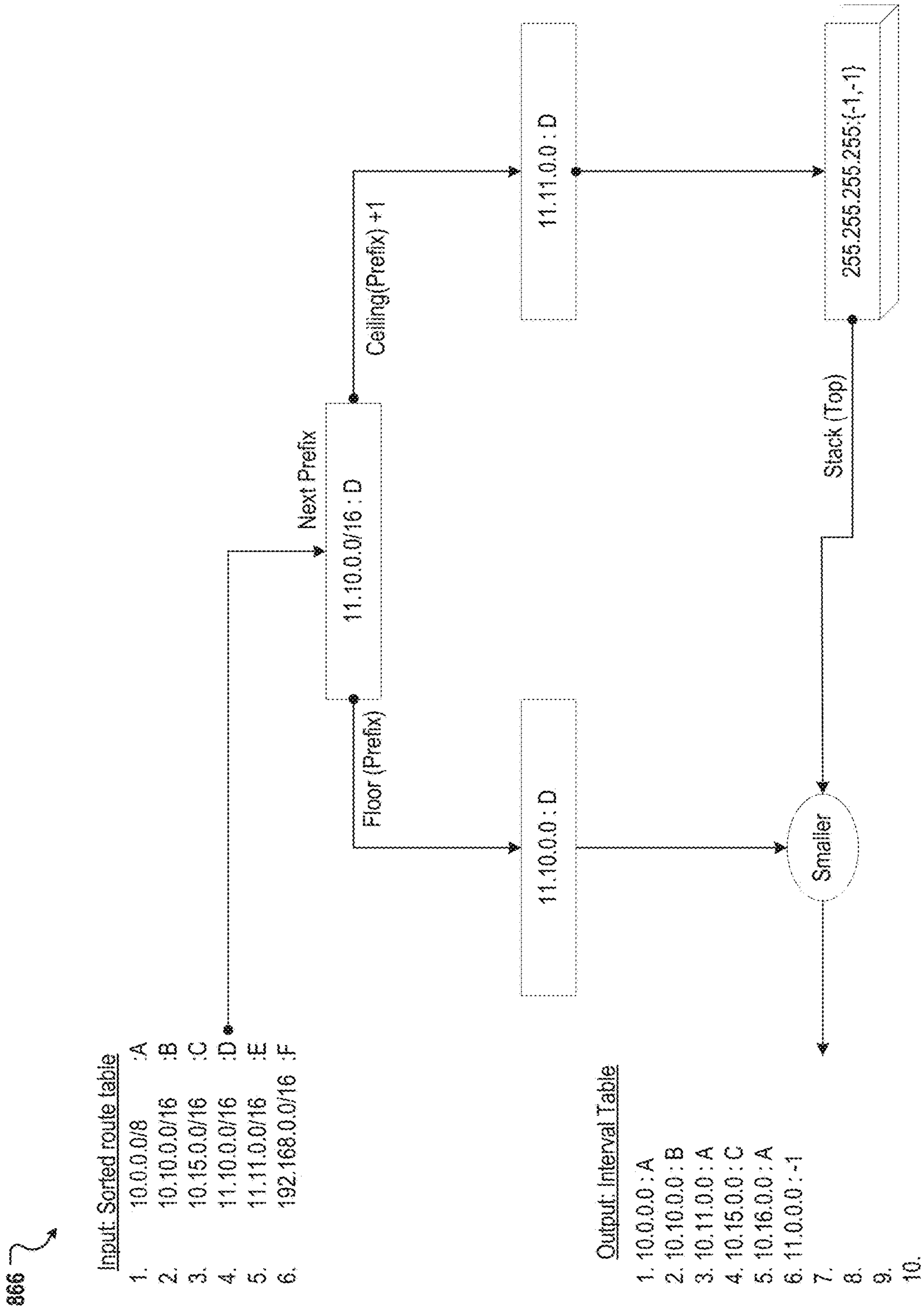
Figure 8A:
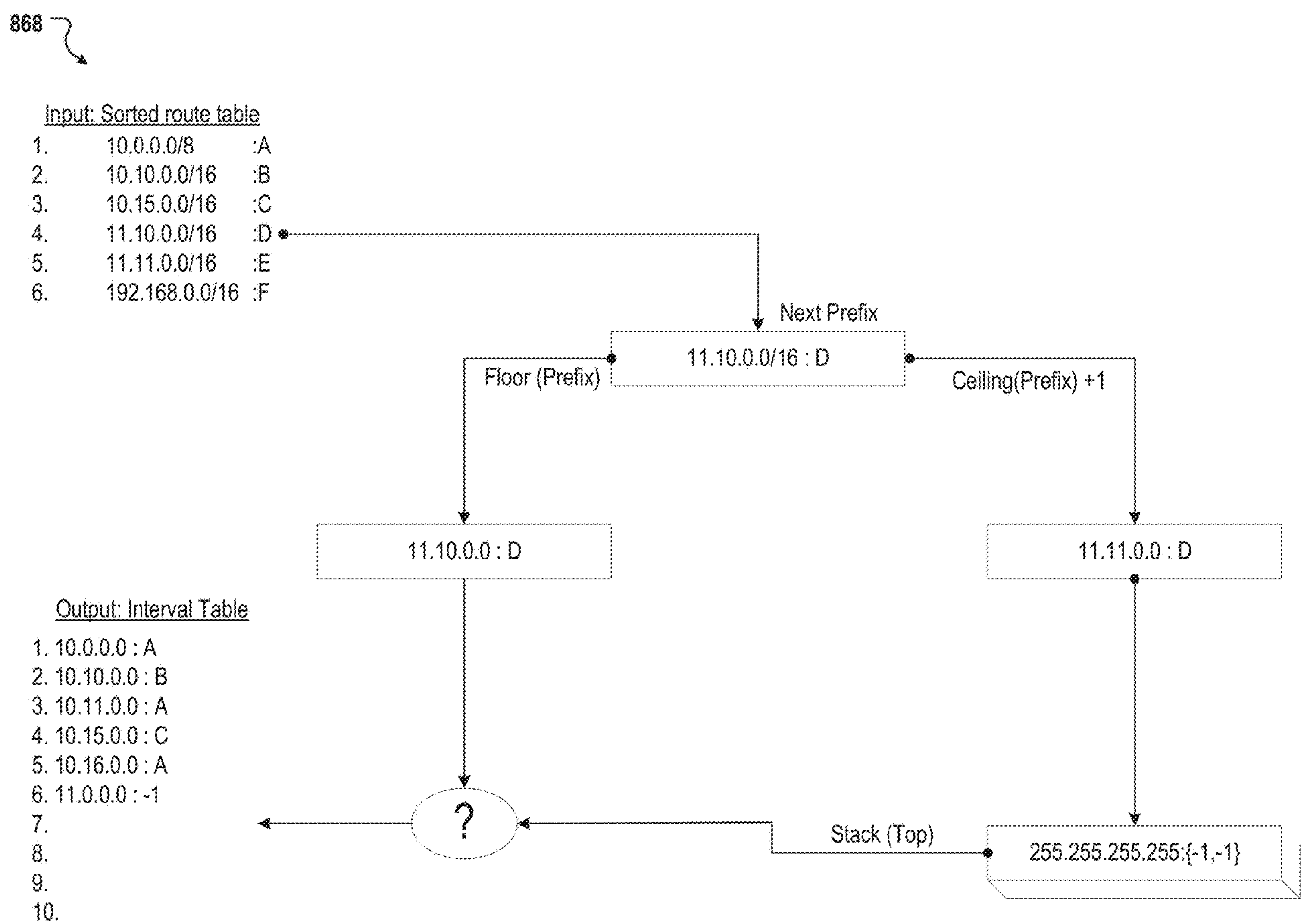
Figure 8A:
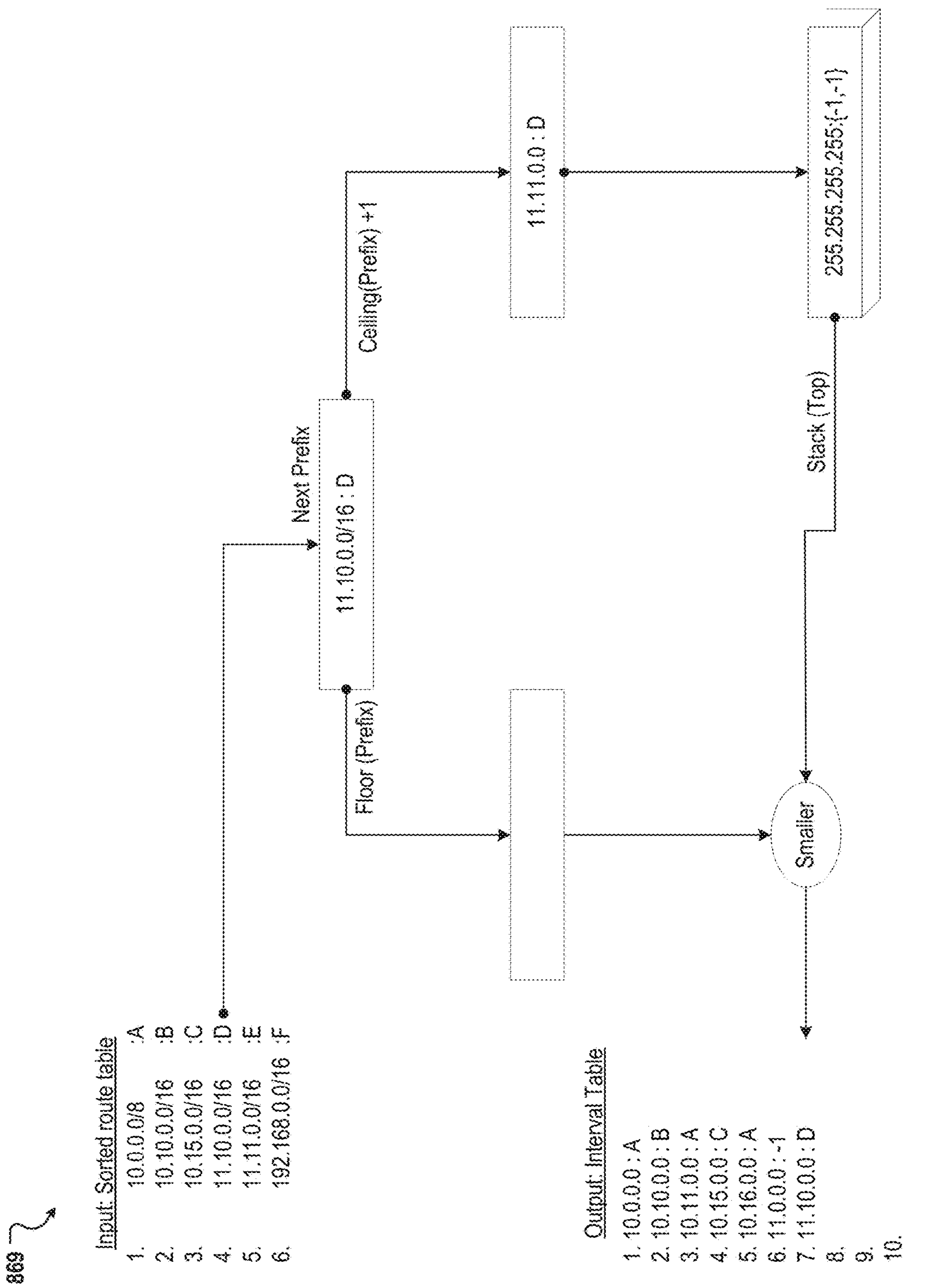
Figure 8A:
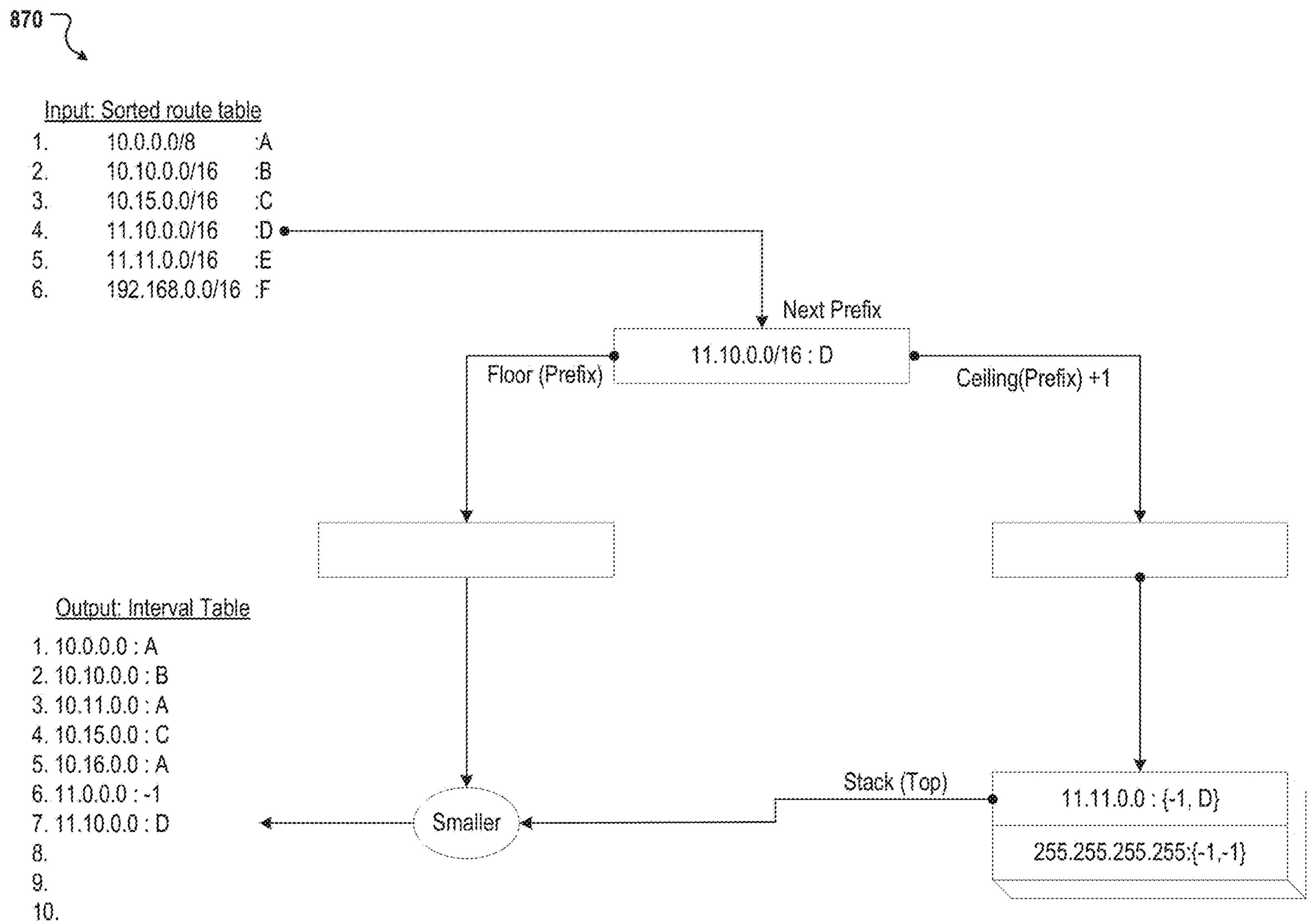
Figure 8A:
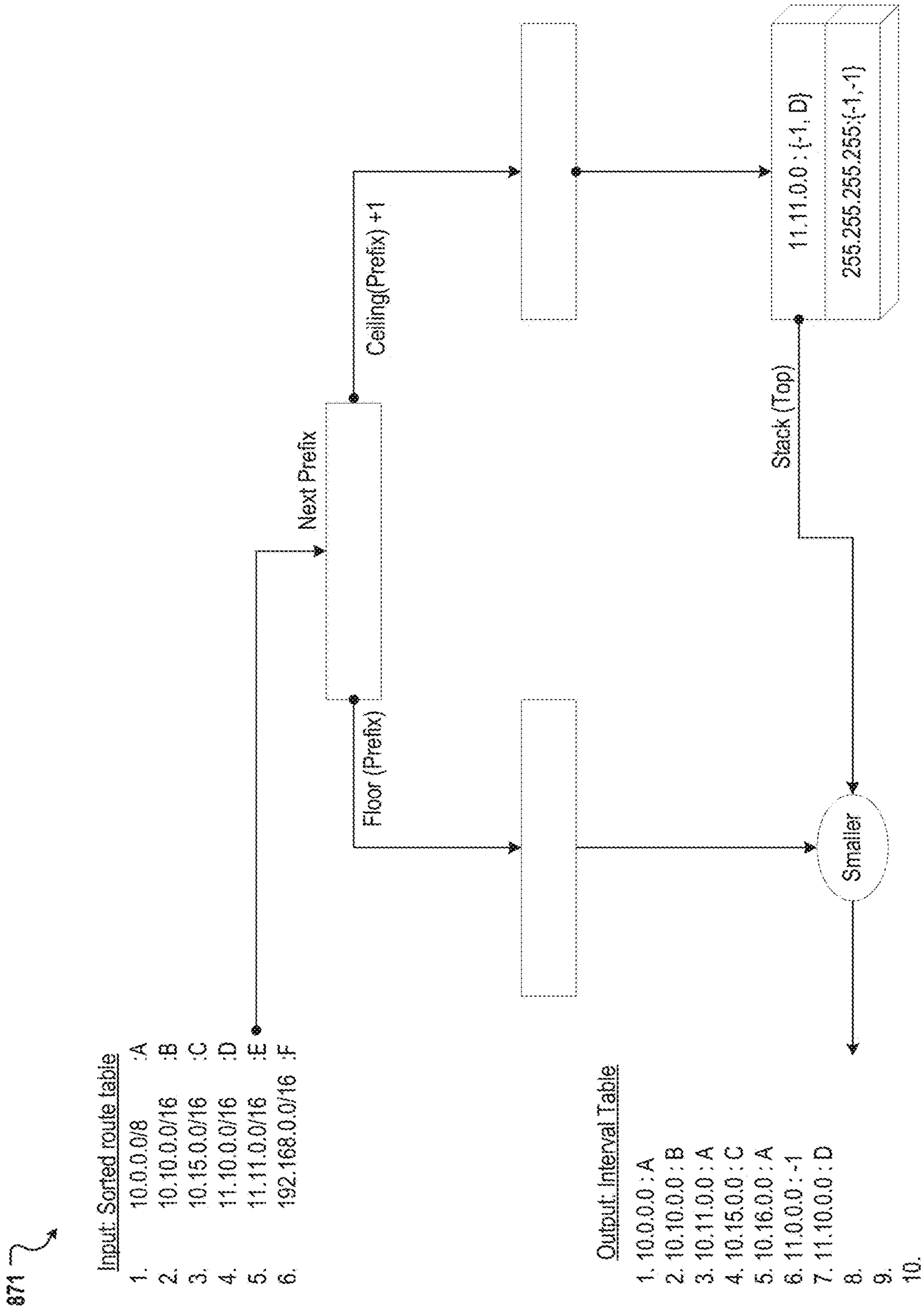
Figure 8A:
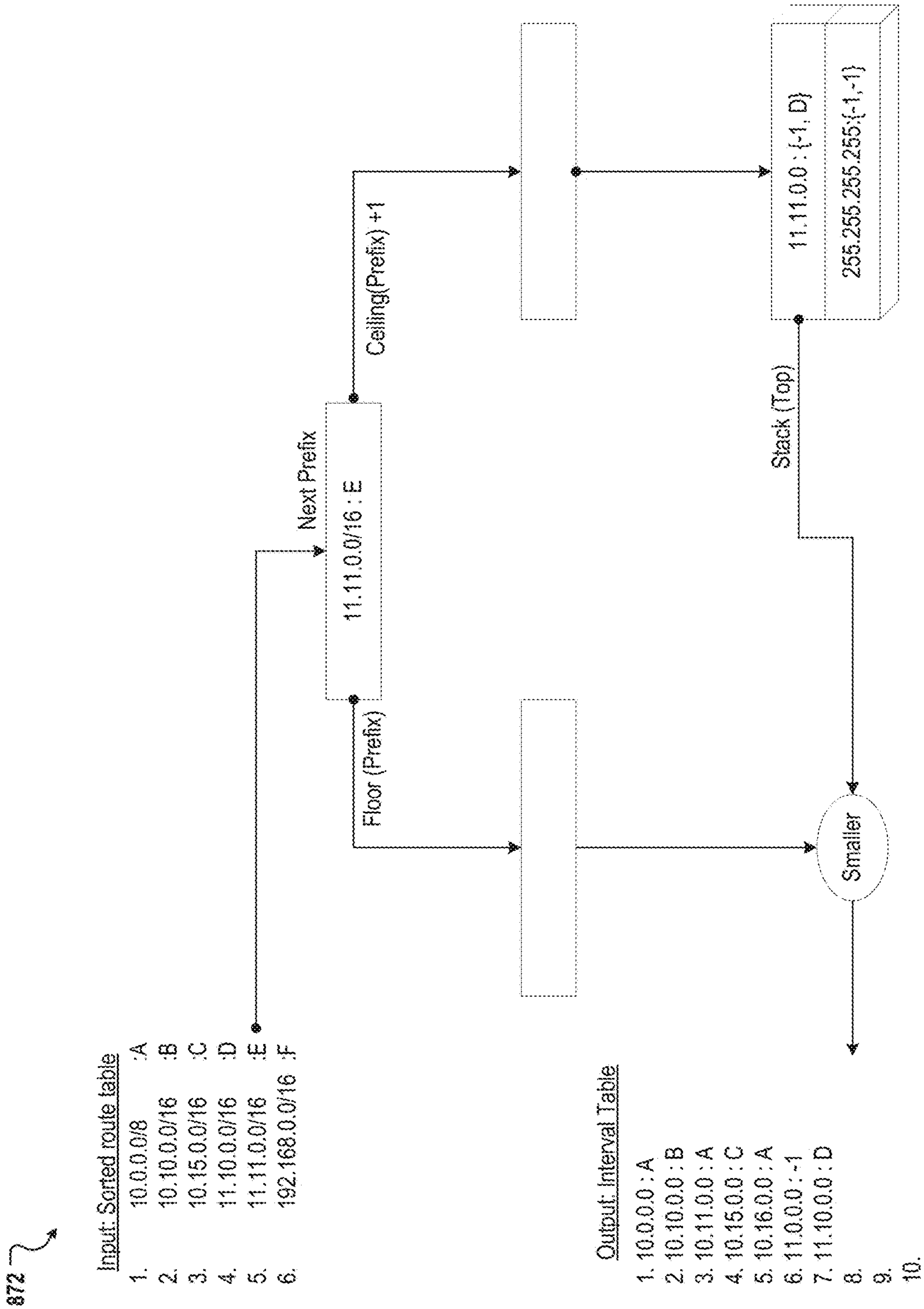
Figure 8A:
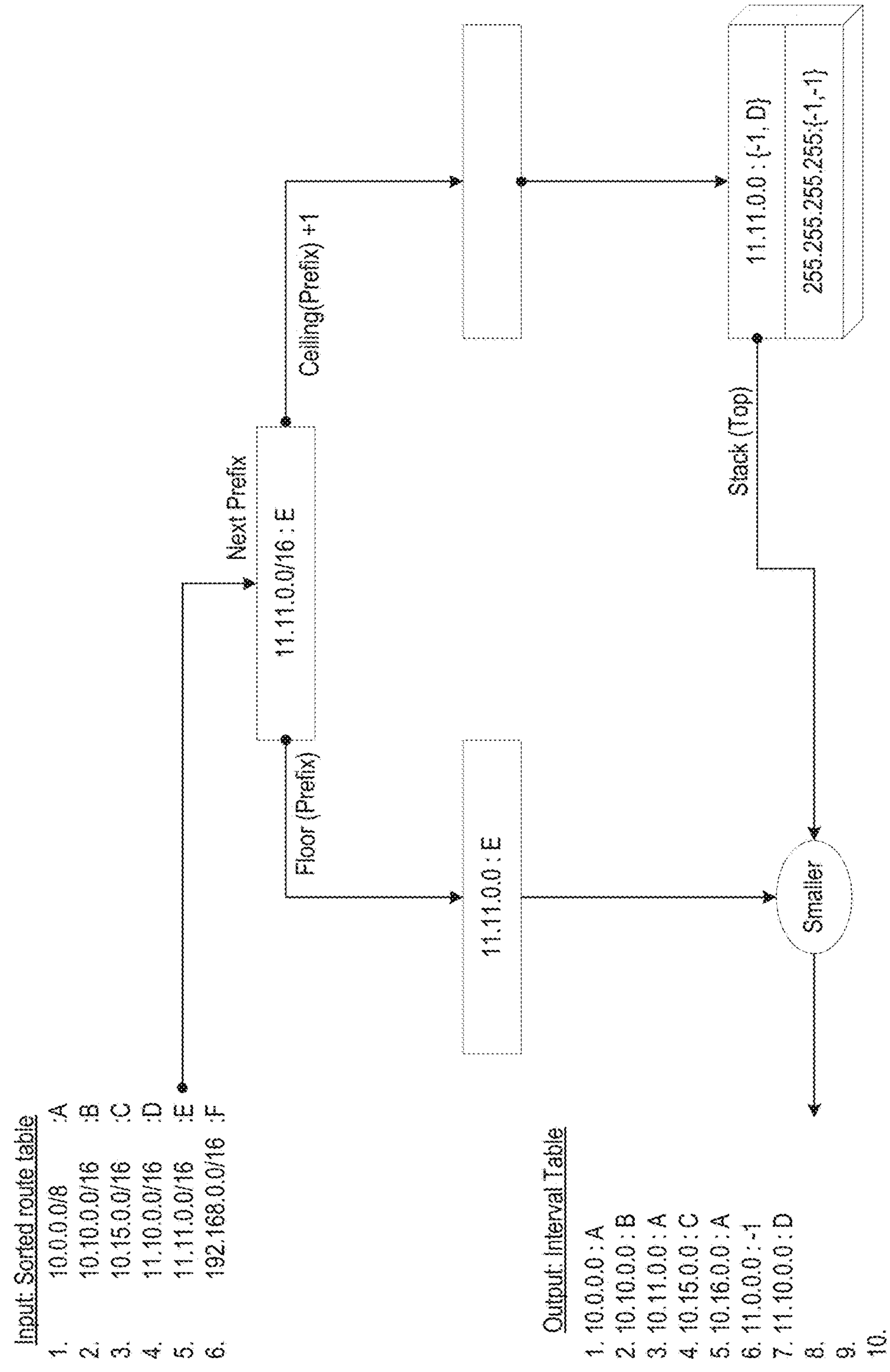
Figure 8A:
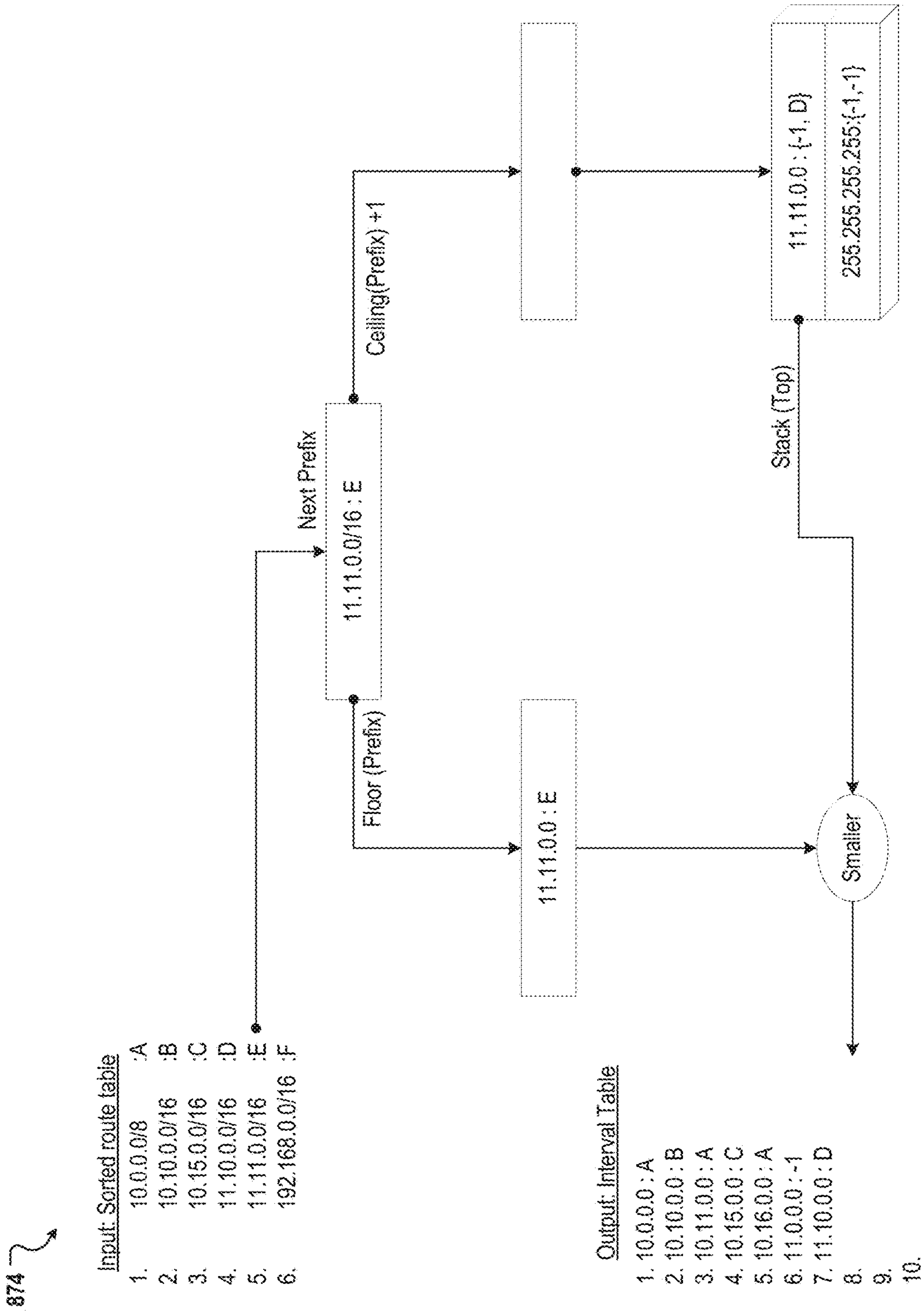
Figure 8A:
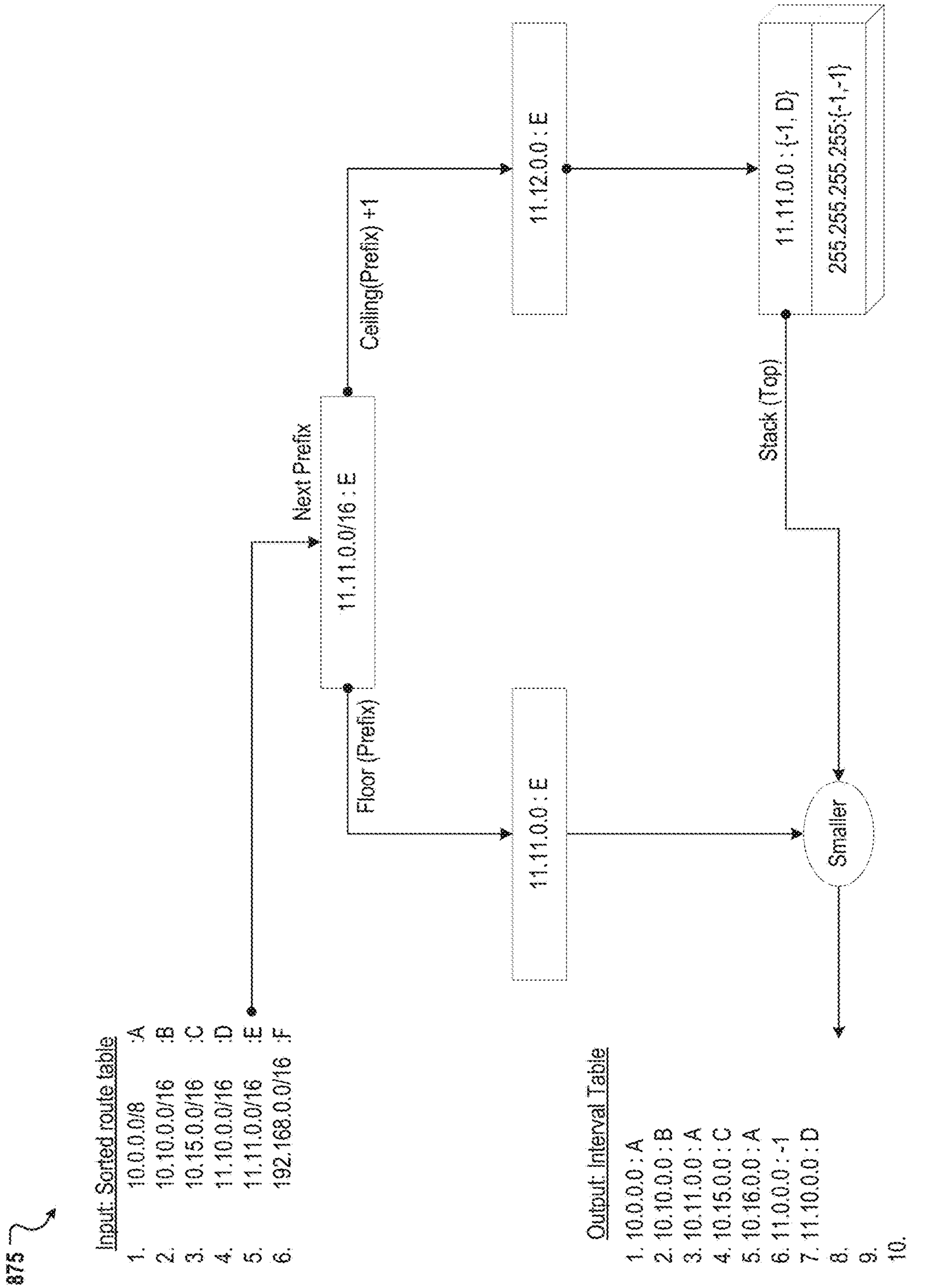
Figure 8A:
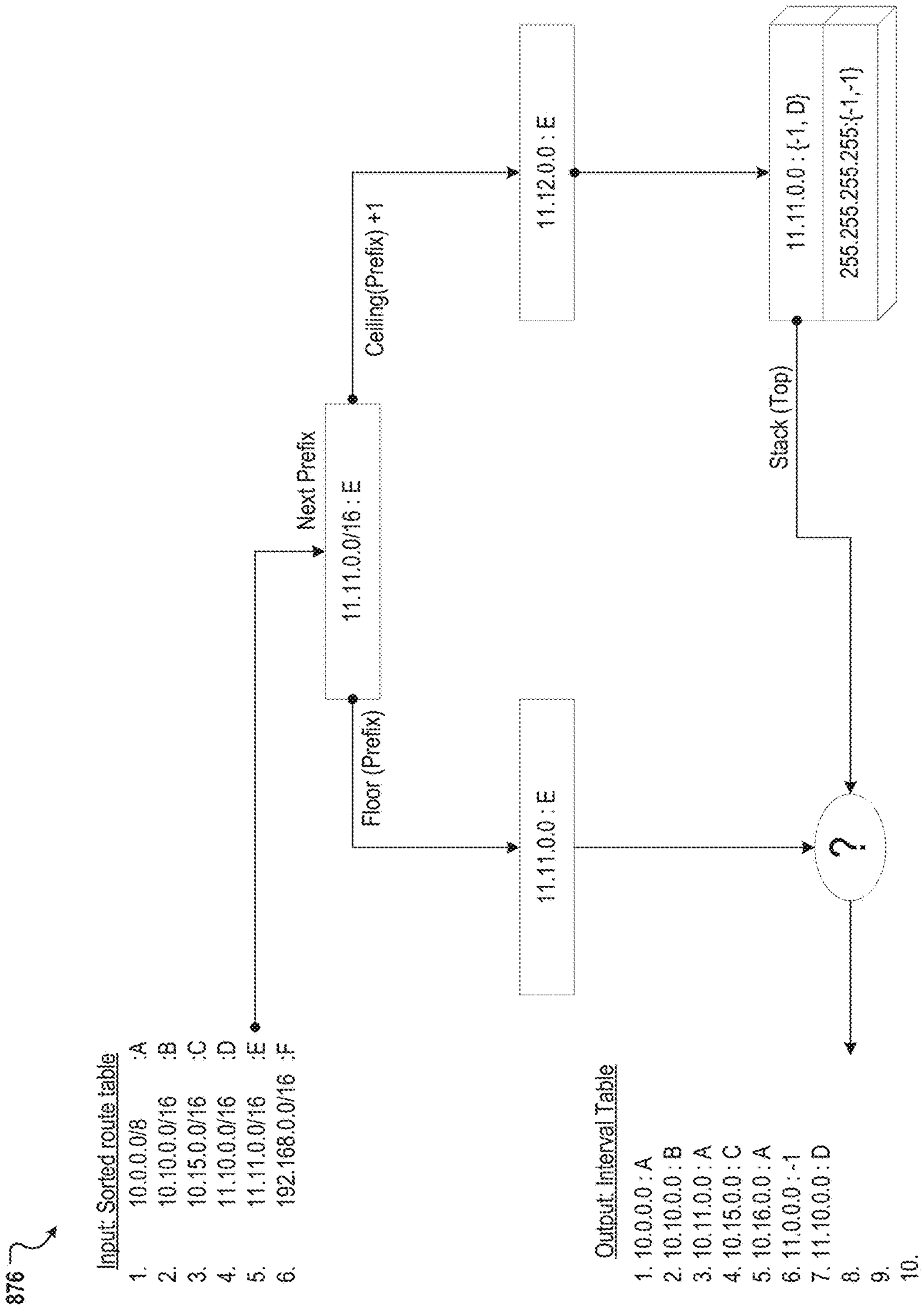
Figure 8A:
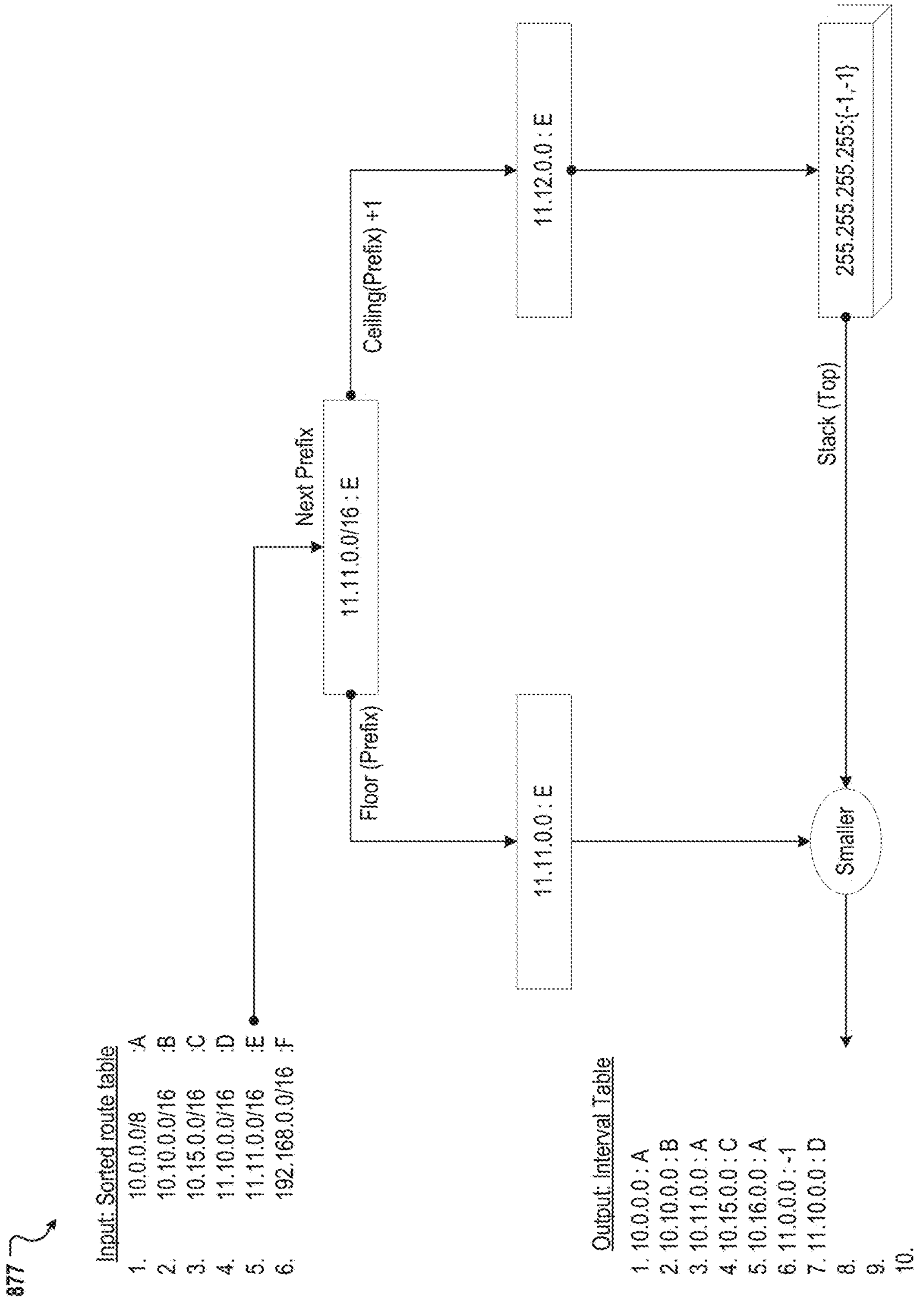
Figure 8A:
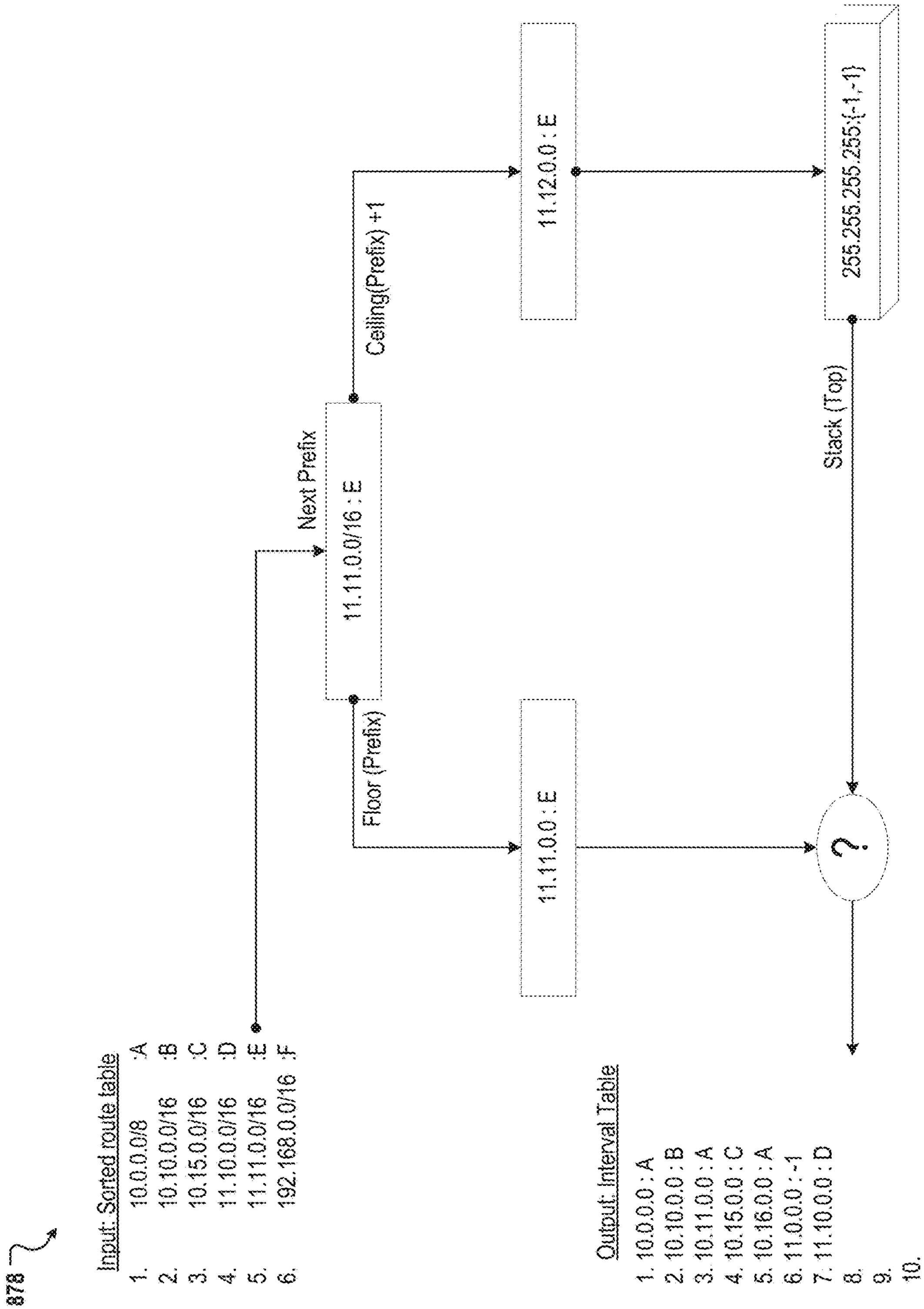
Figure 8A:
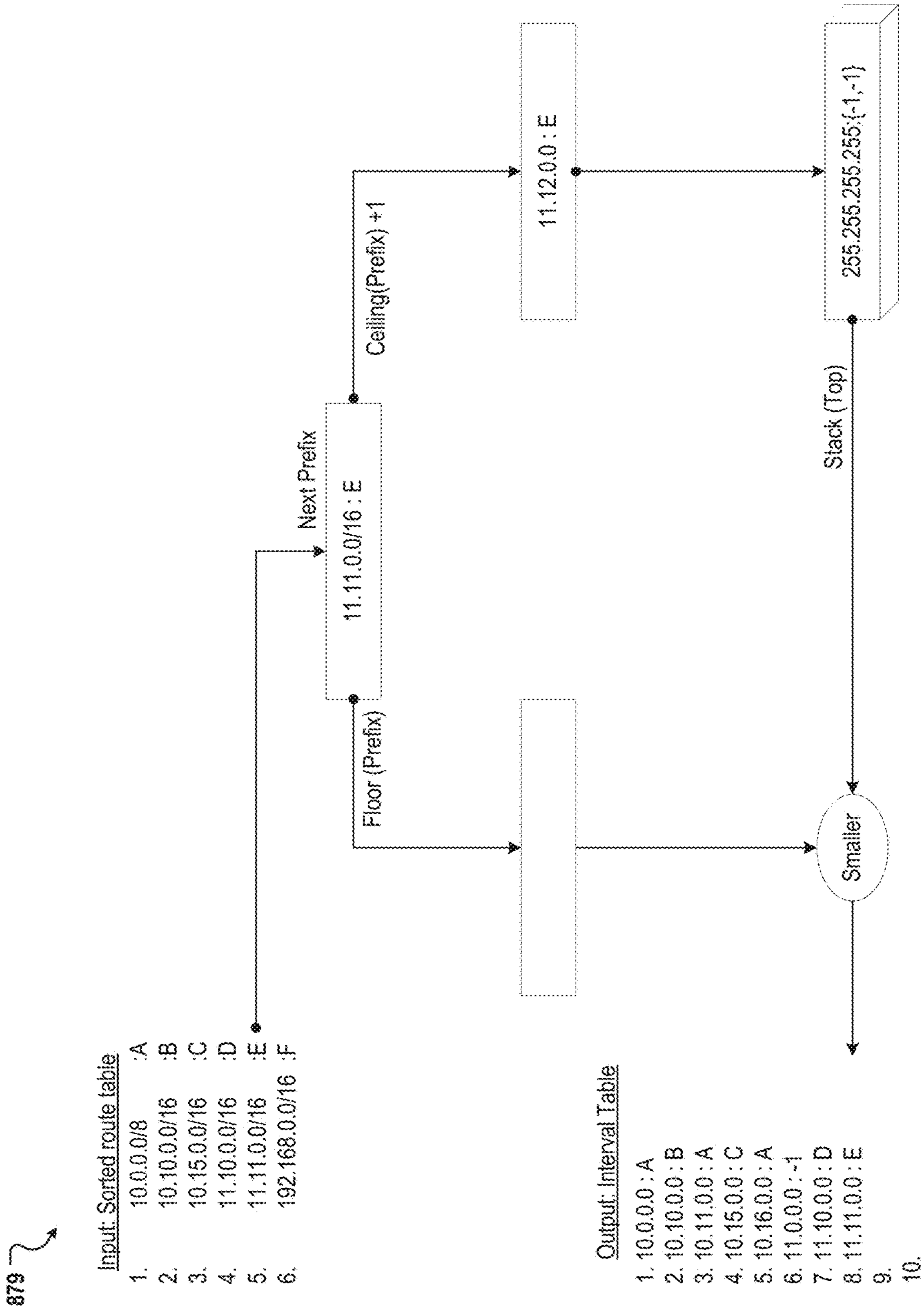
Figure 8A:
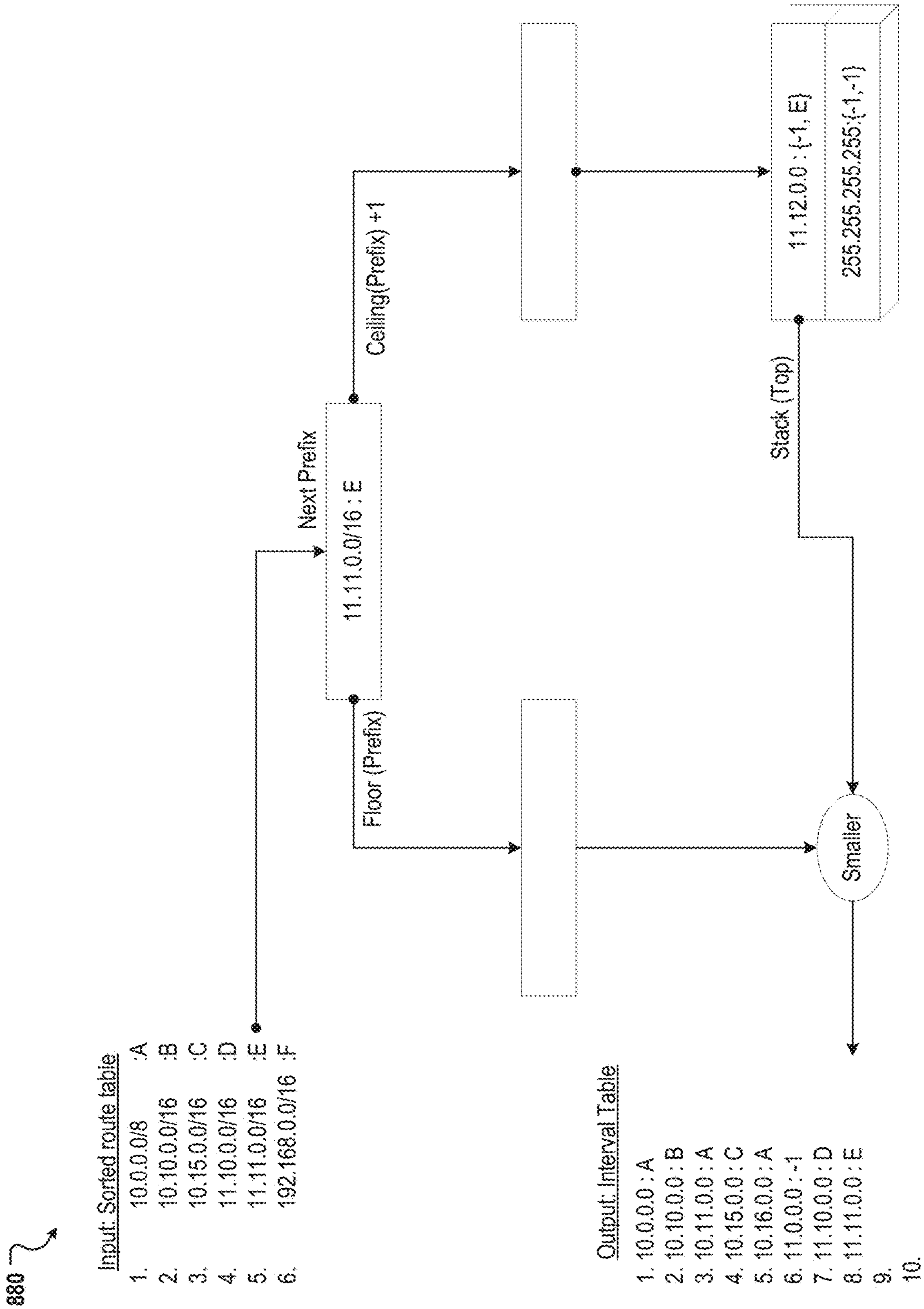
Figure 8A:
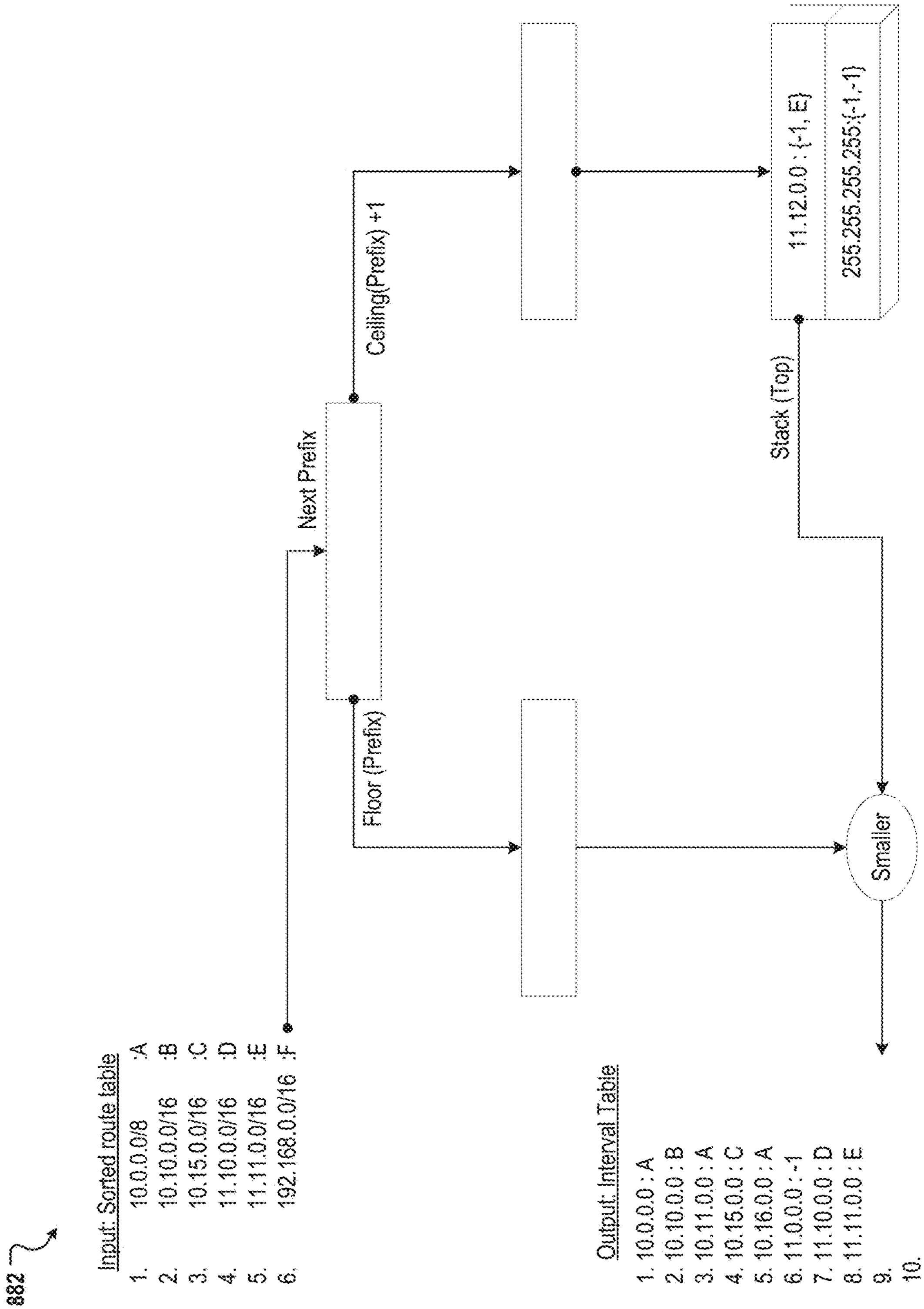
Figure 8A:
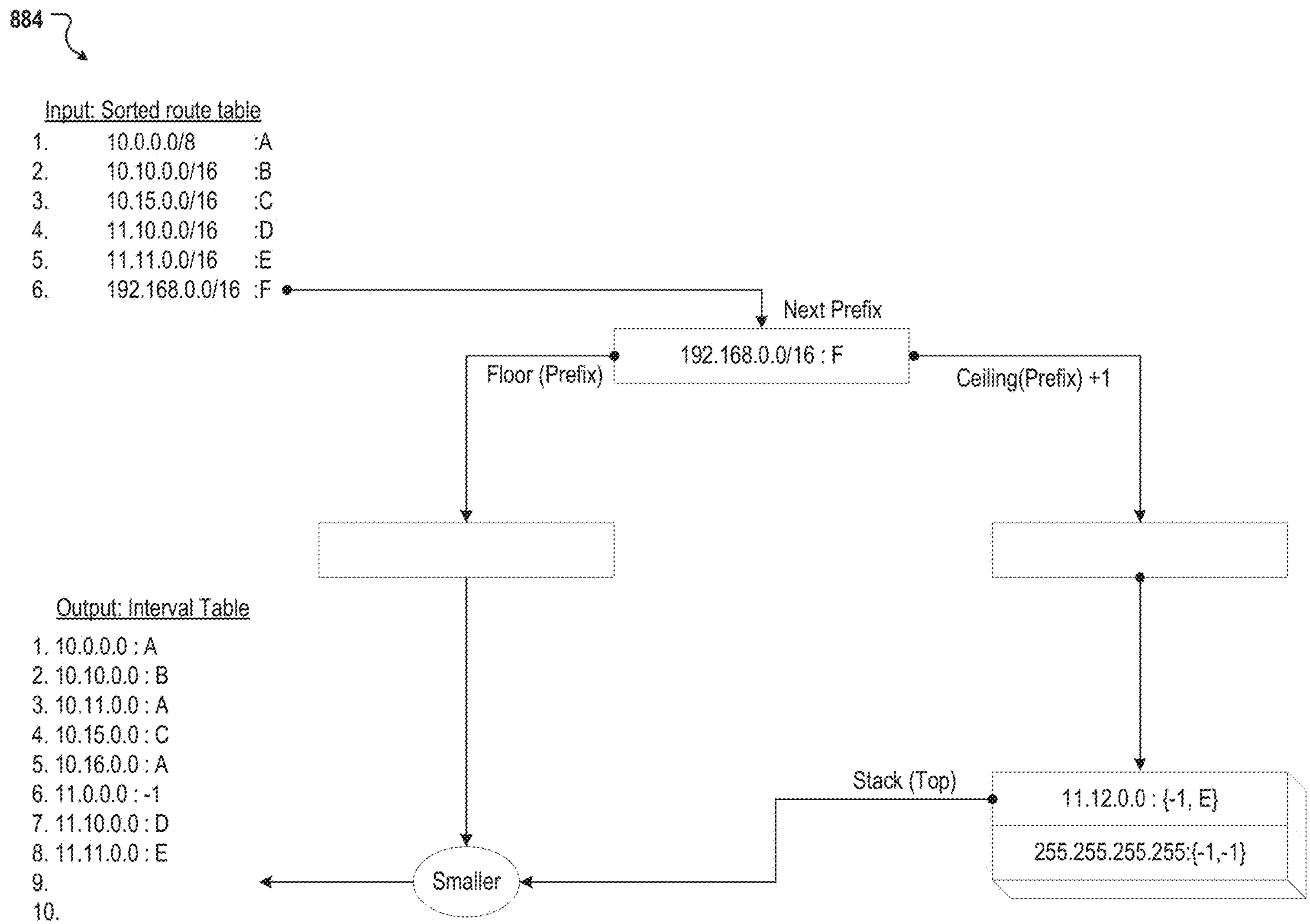
Figure 8A:
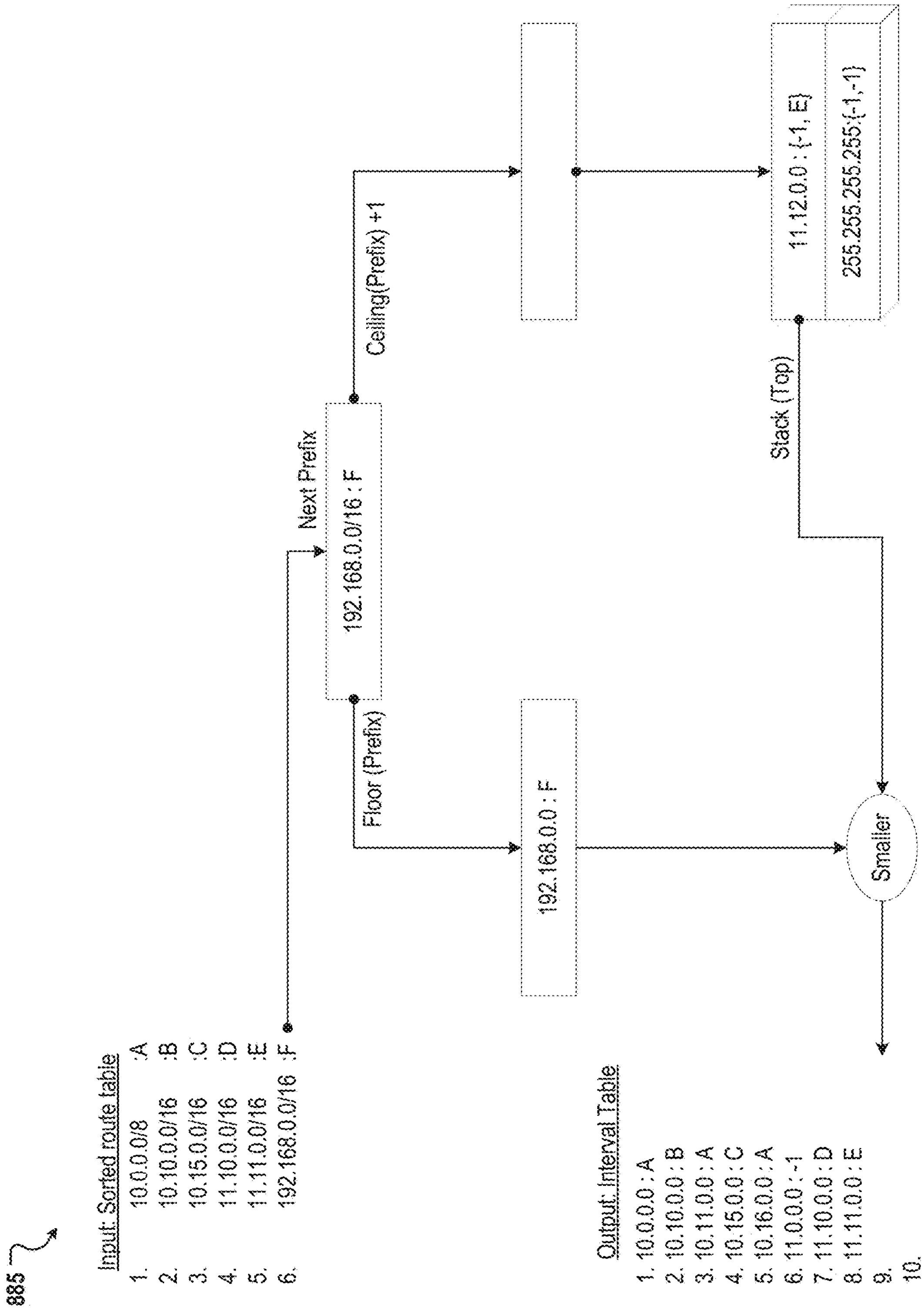
Figure 8A:
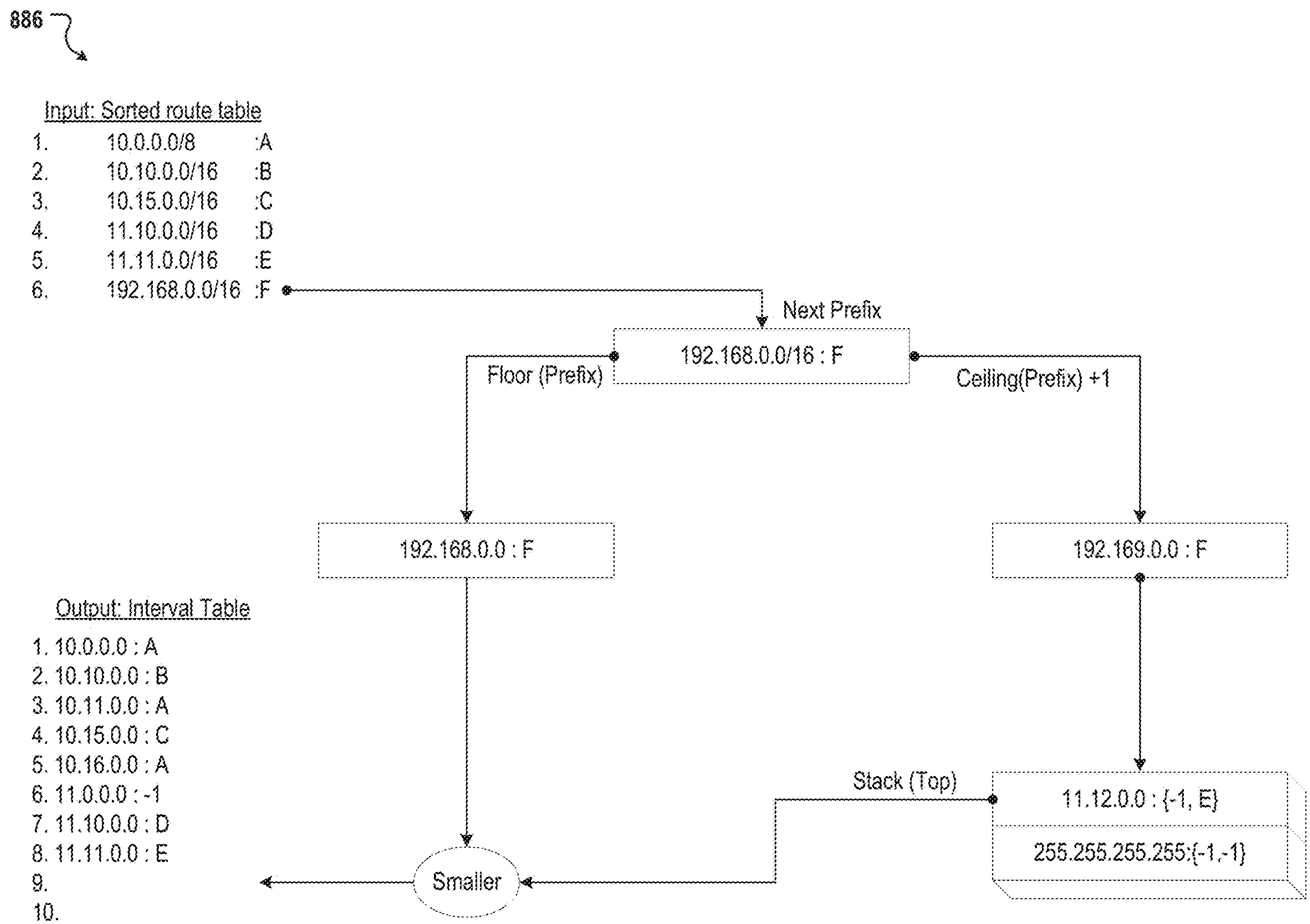
Figure 8A:
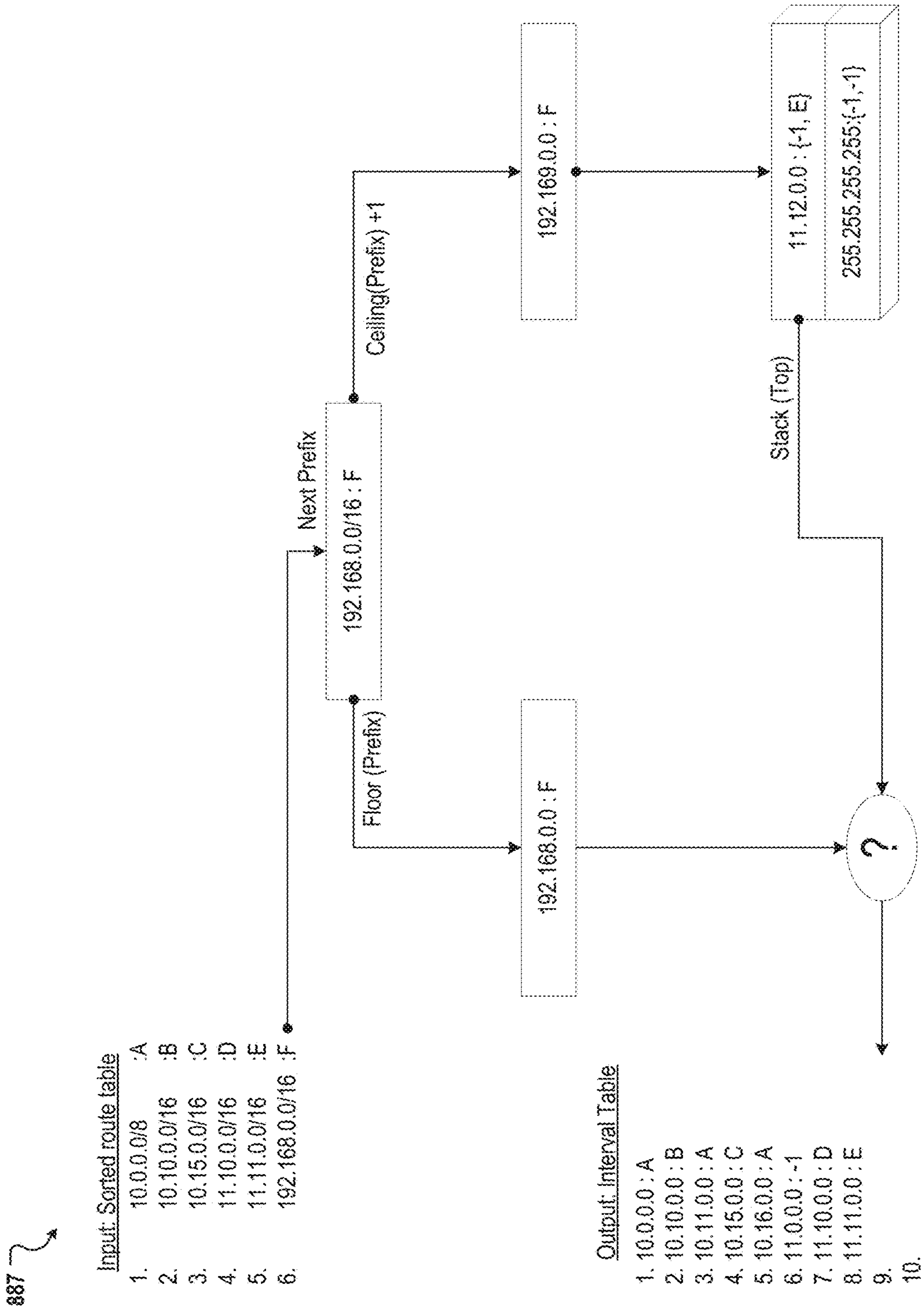
Figure 8B:
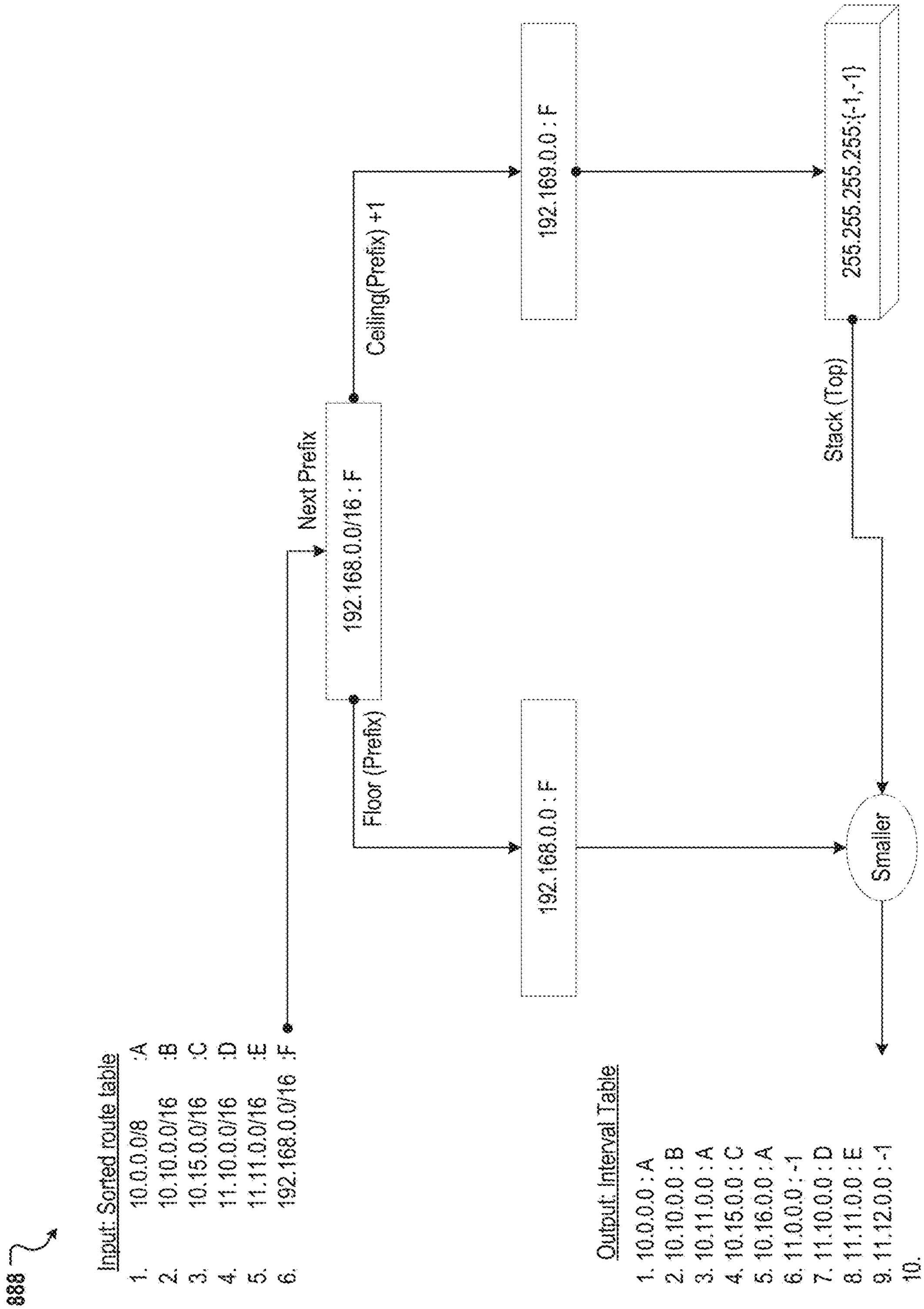
Figure 8B:
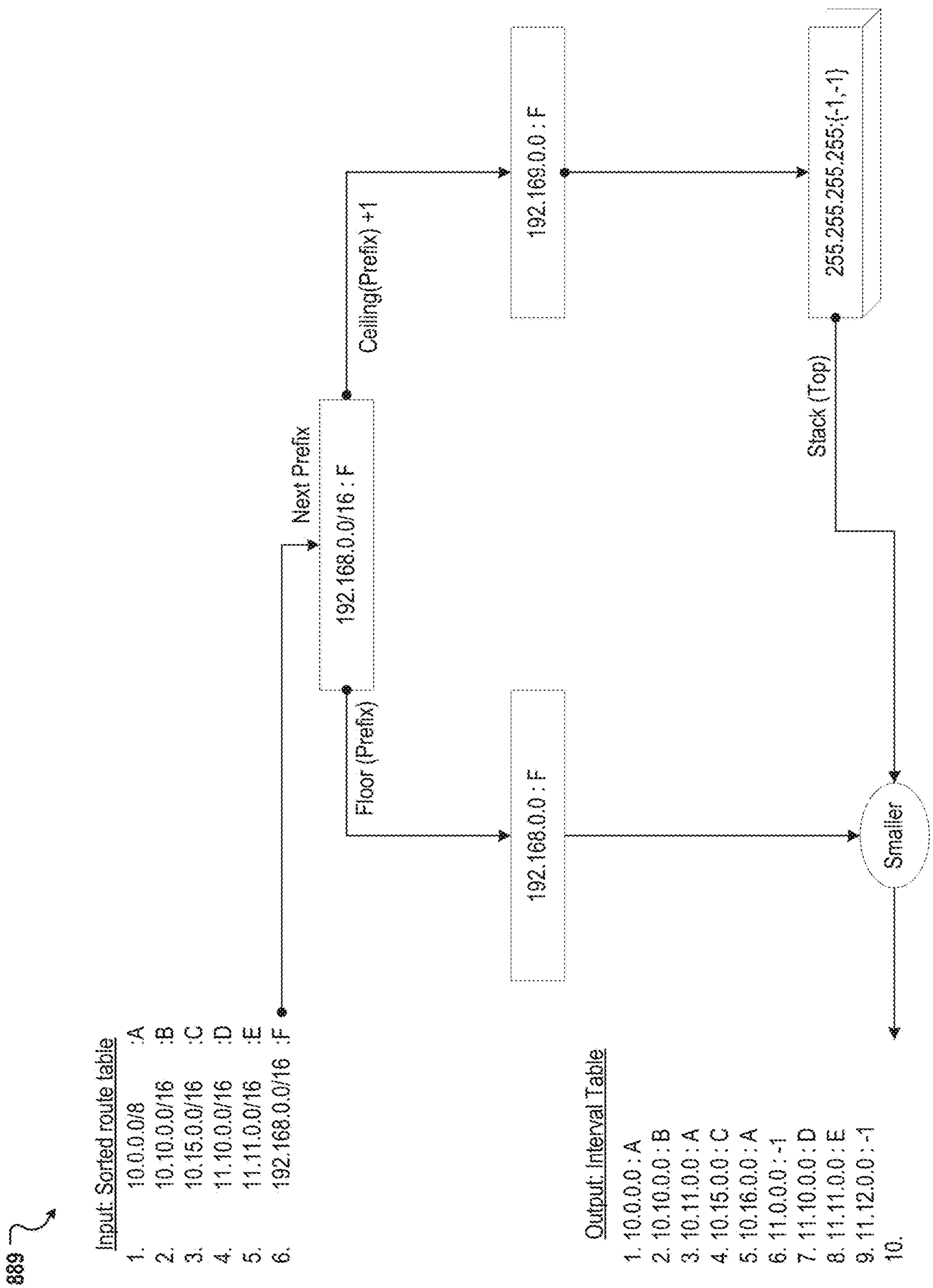
Figure 8B:
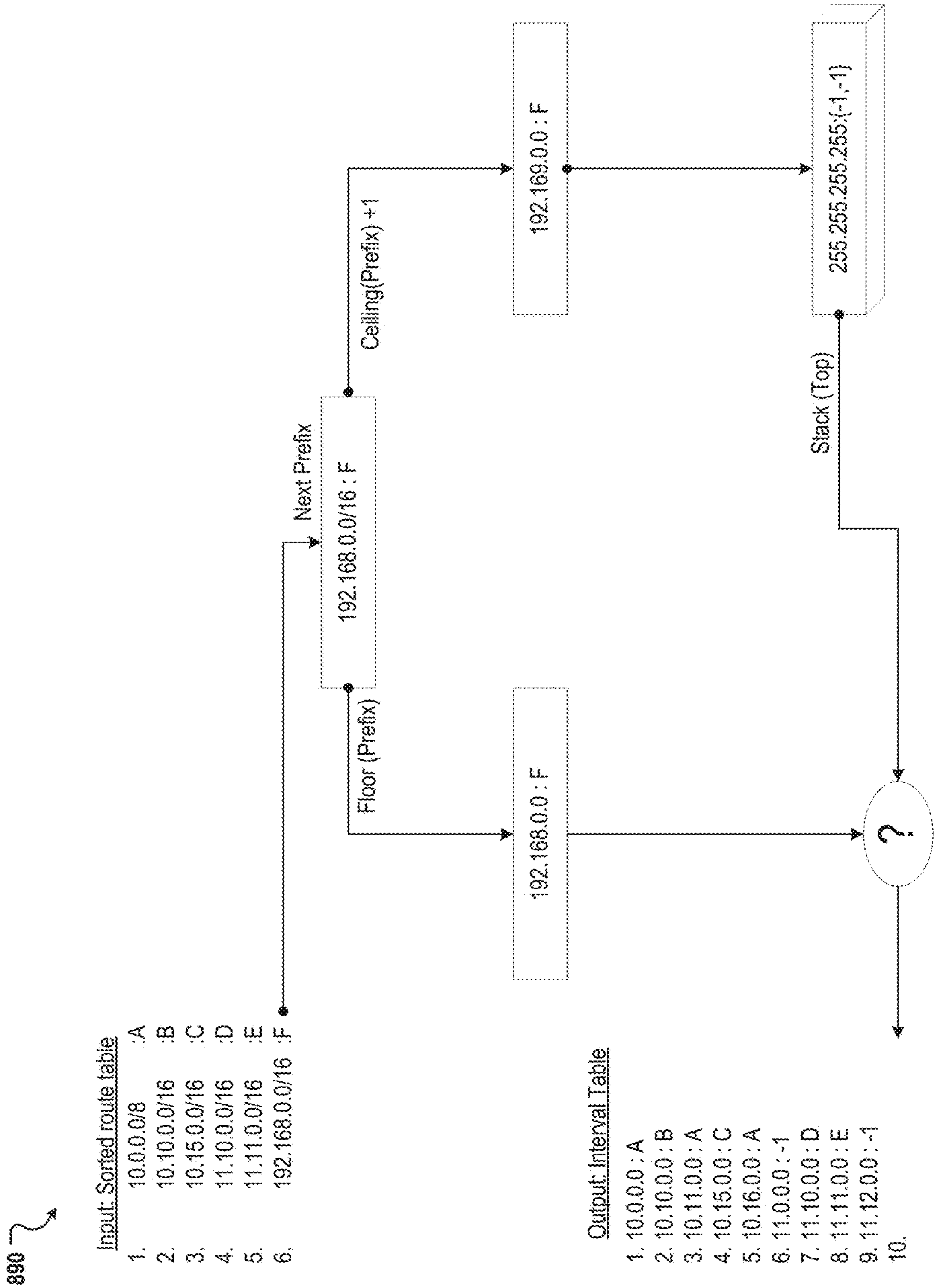
Figure 8B:
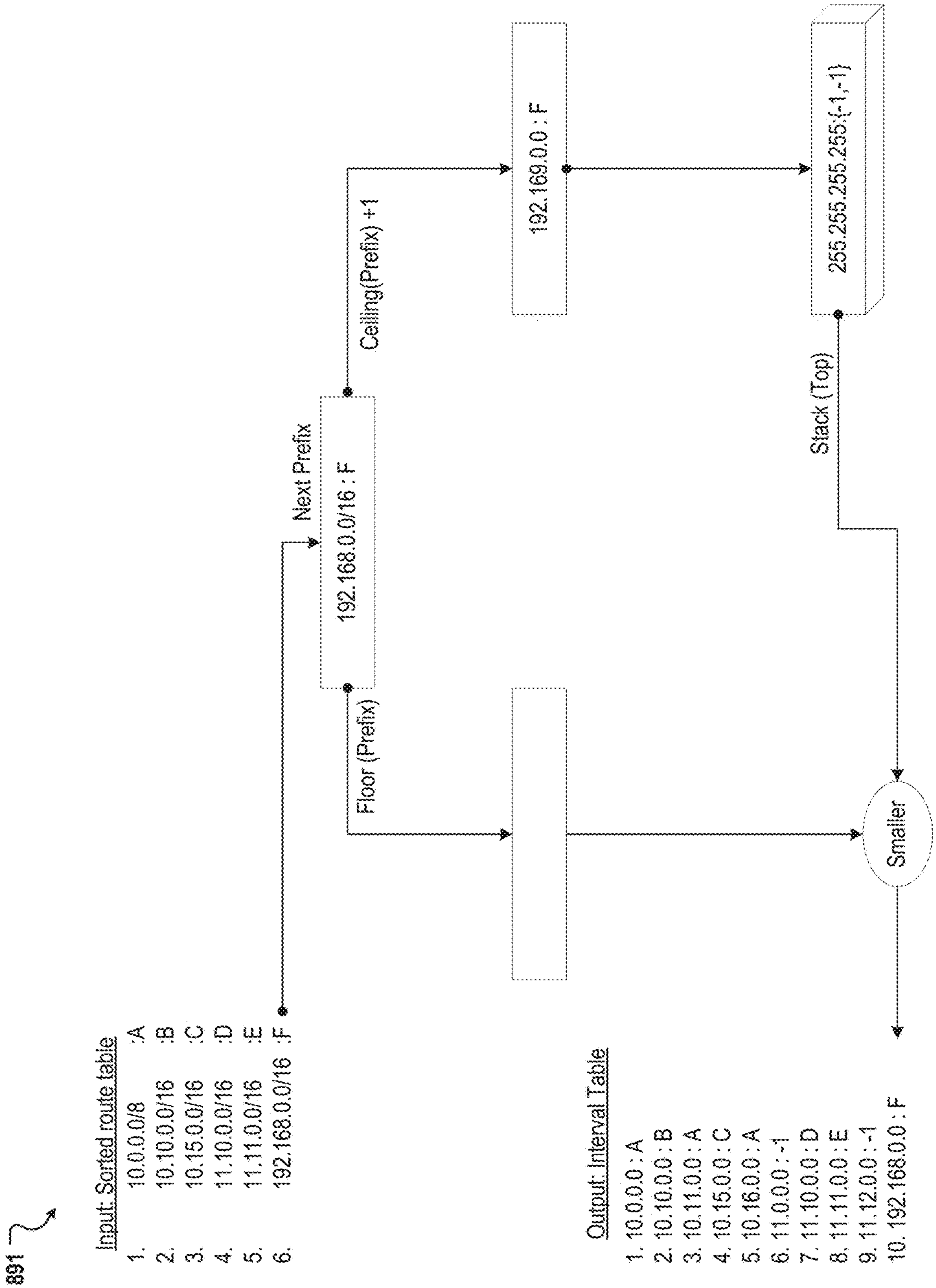
Figure 8B:
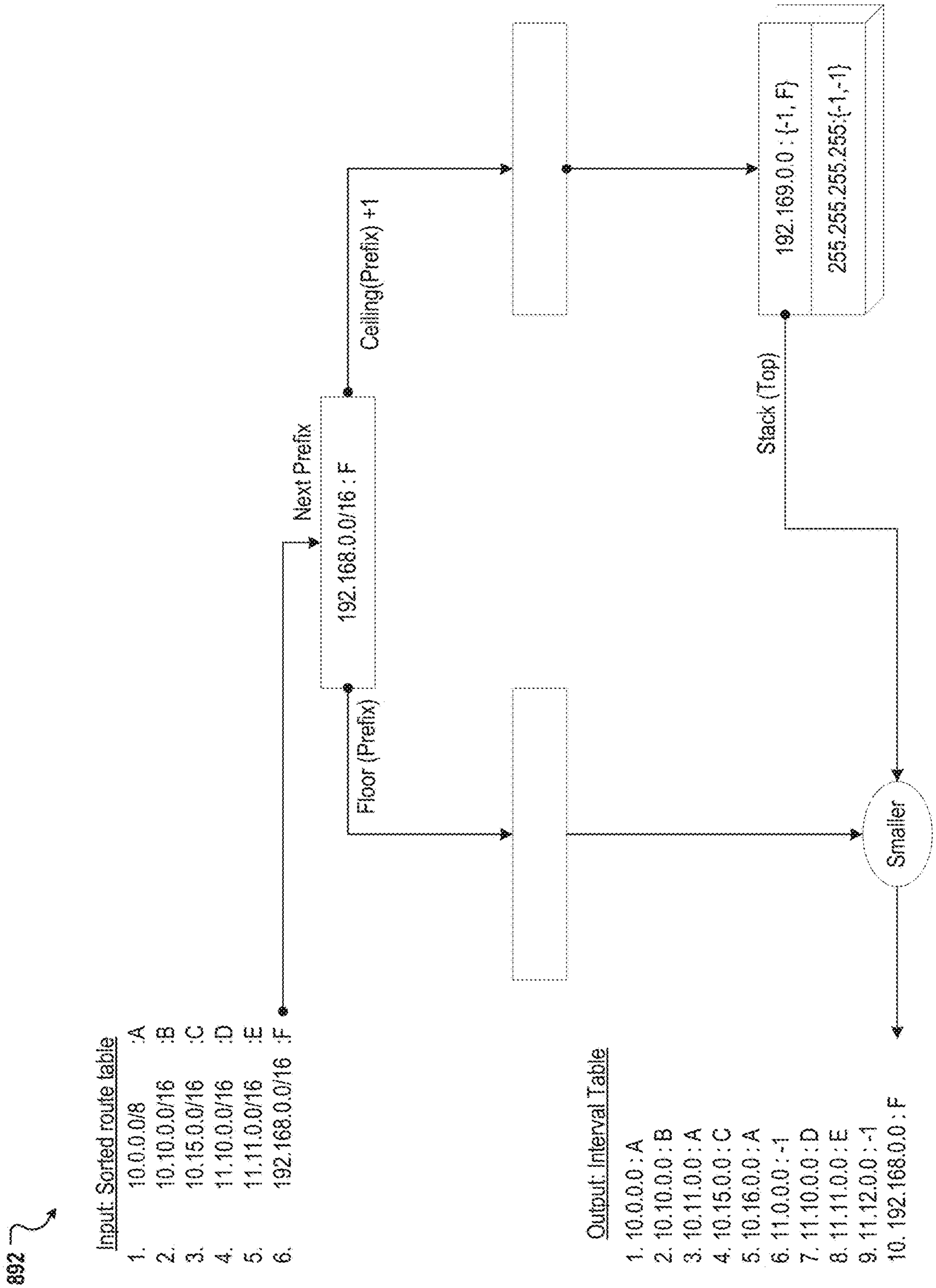
Figure 8B:
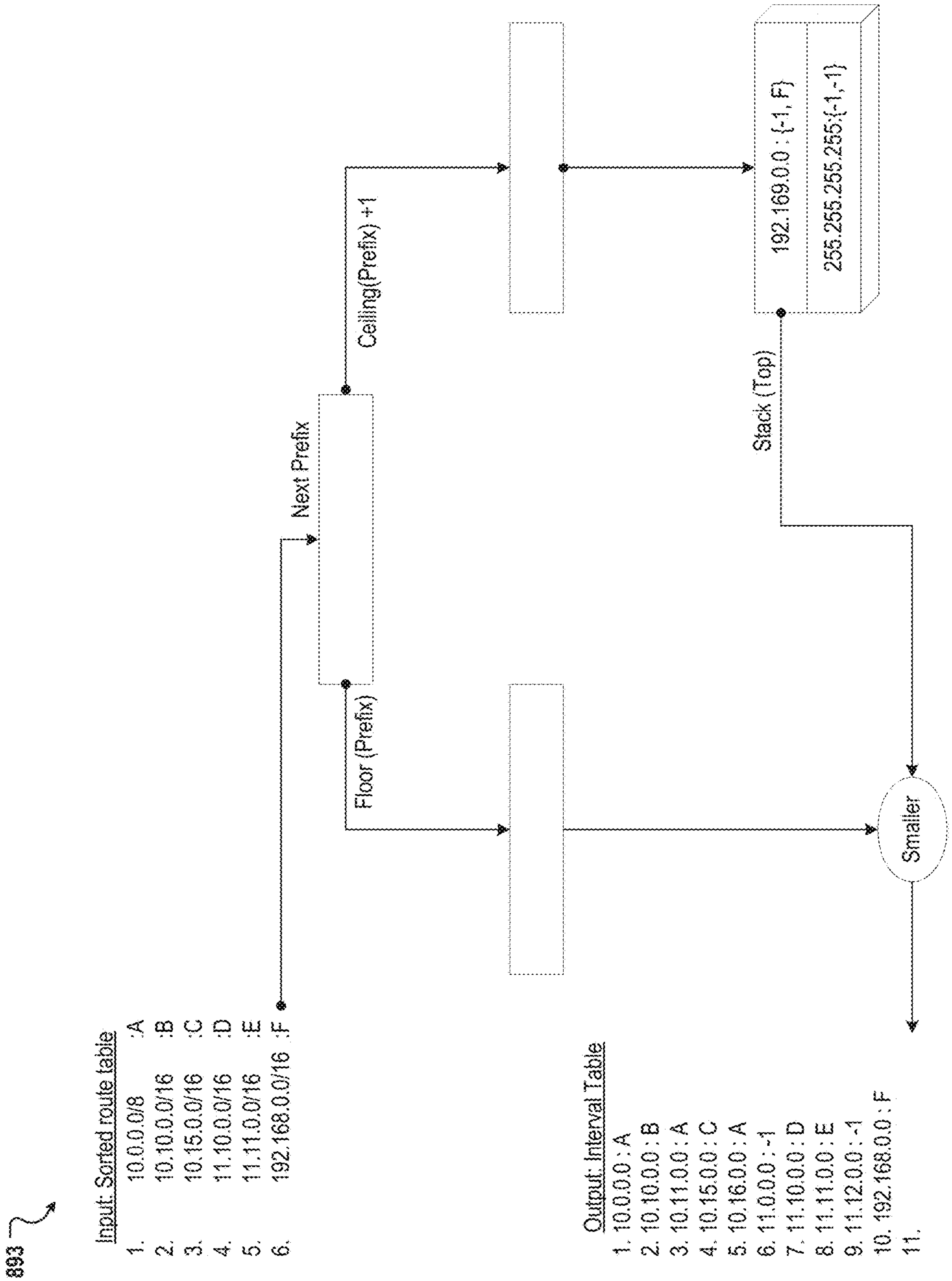
Figure 8B:
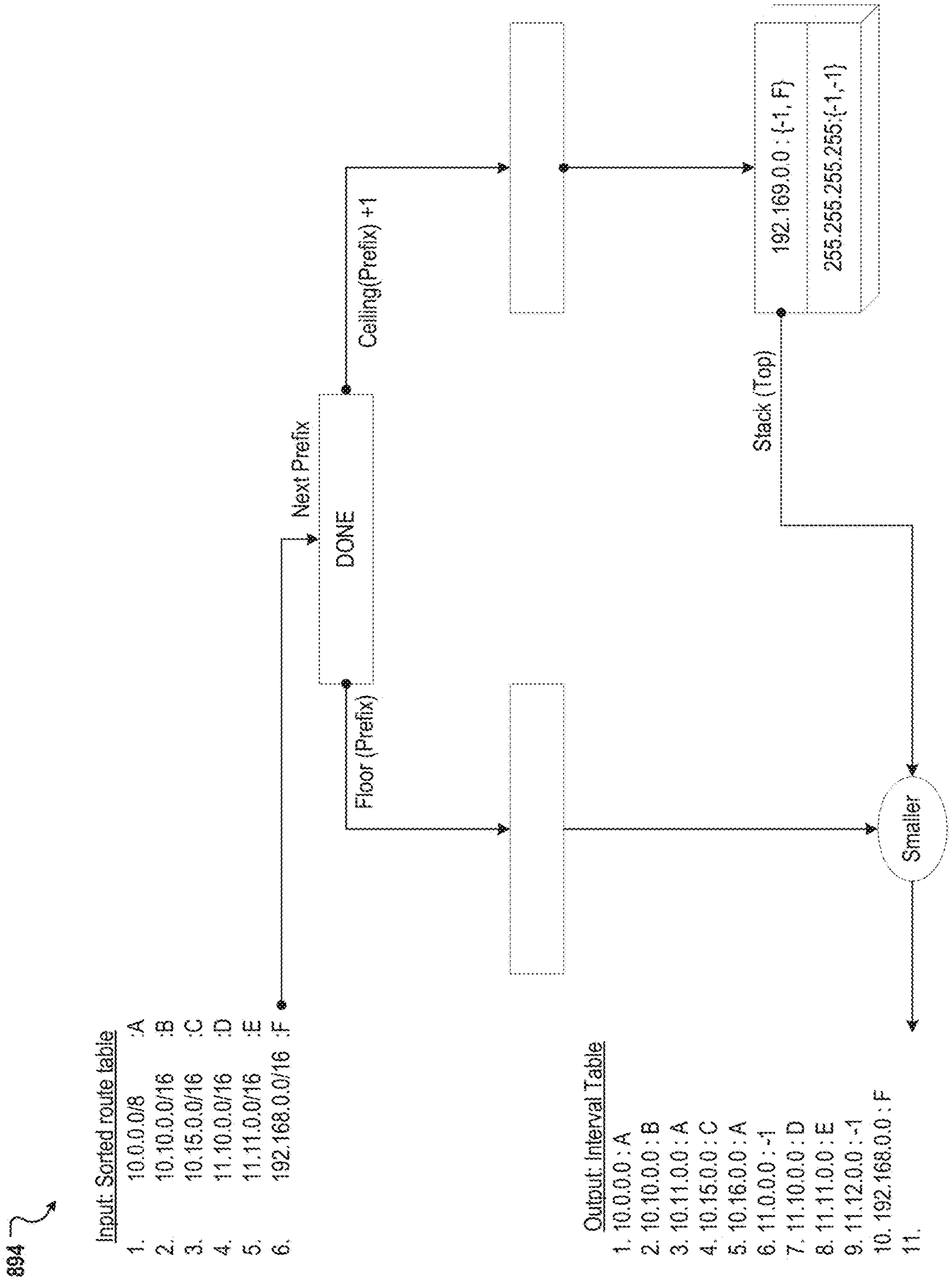
Figure 8B:
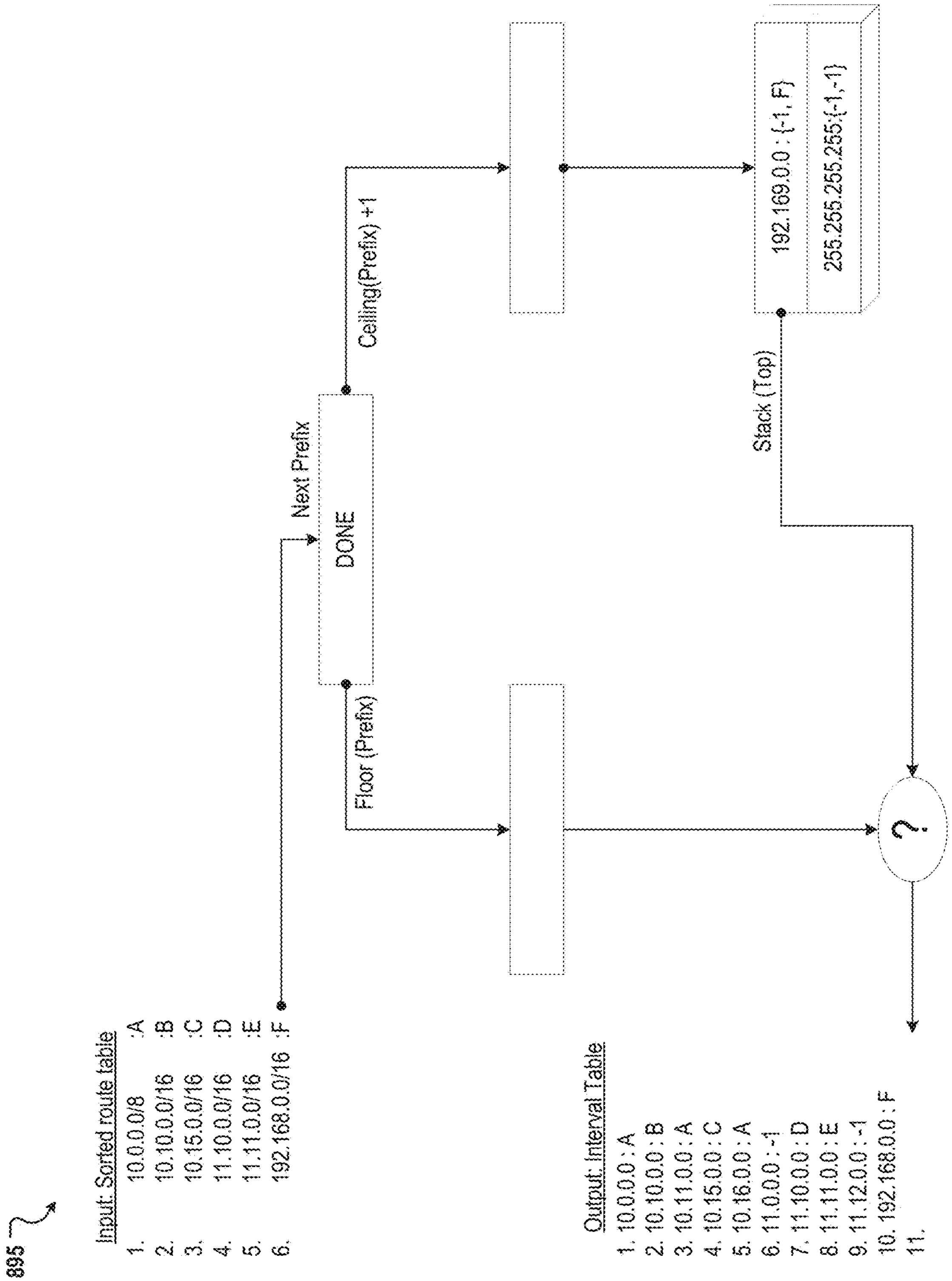
Figure 8B:
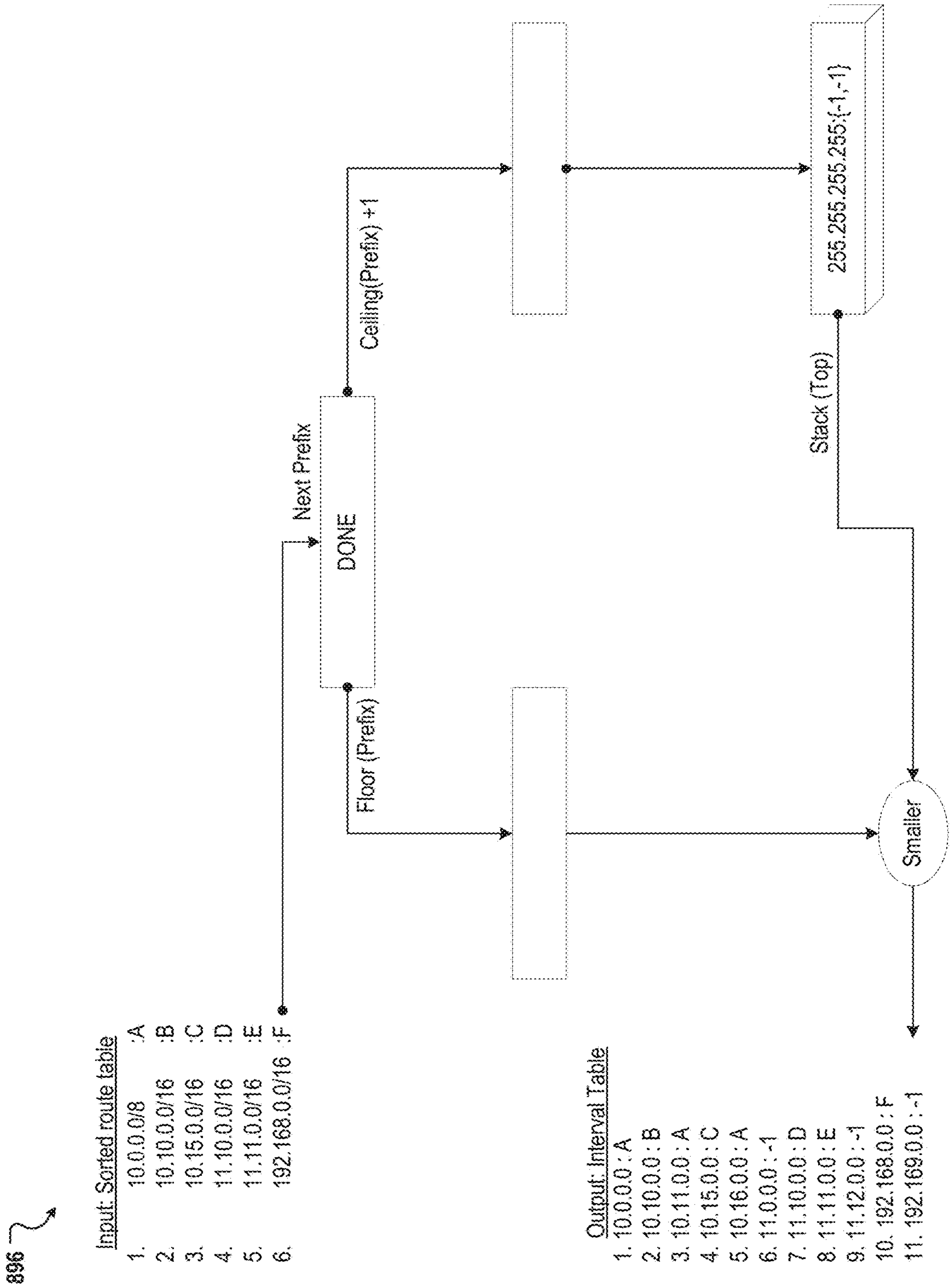
Figure 8B:
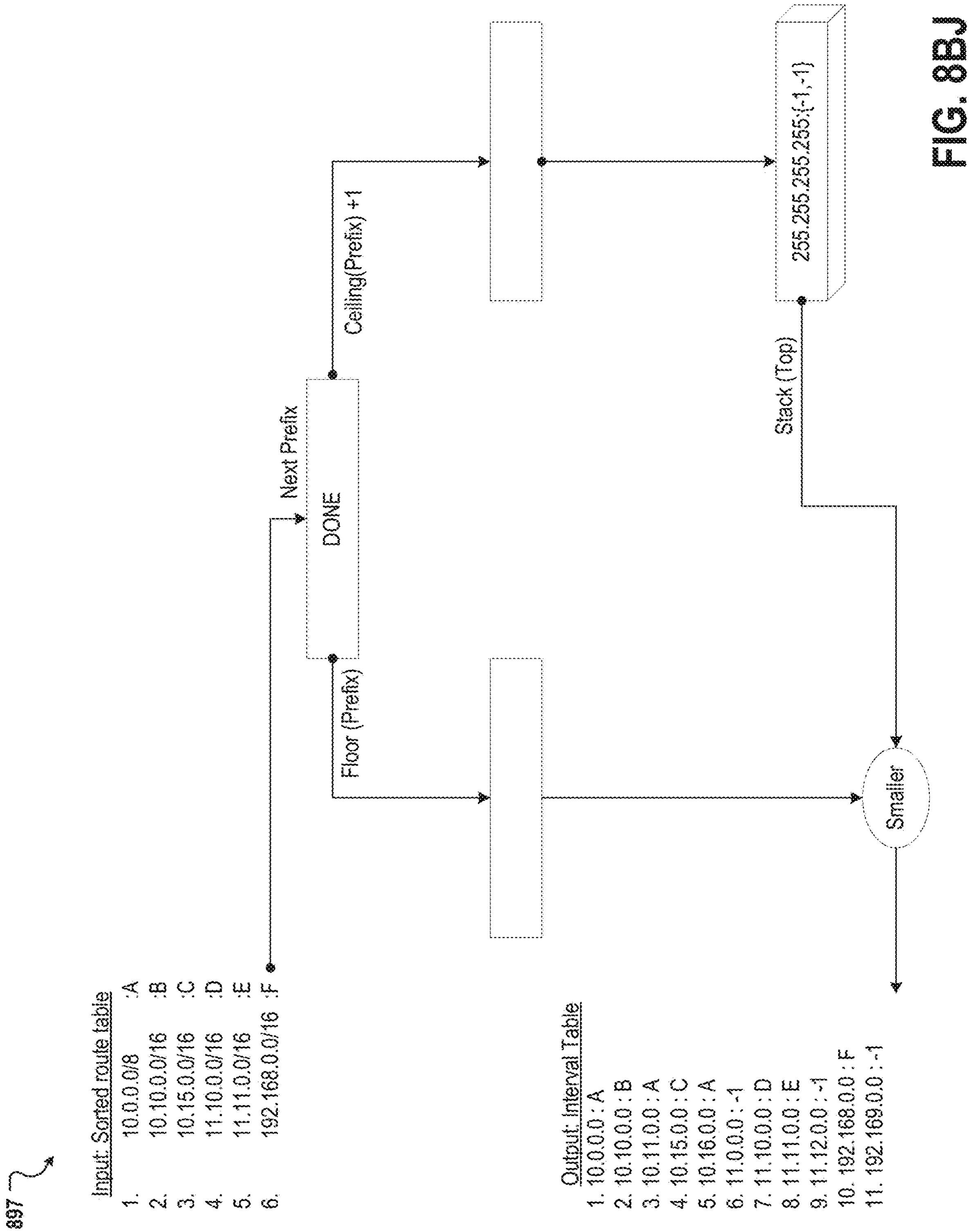
Figure 8B:
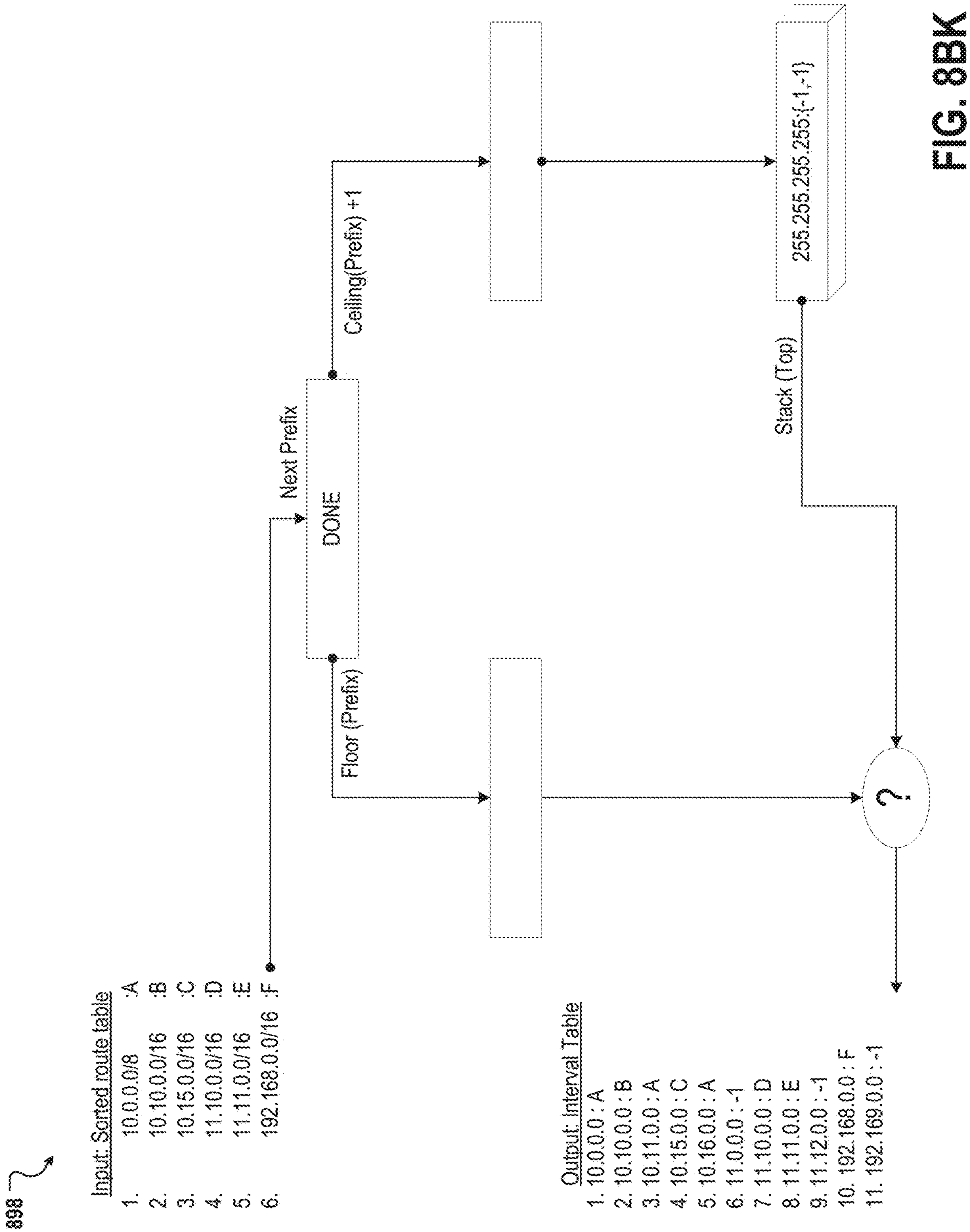
Figure 8B:
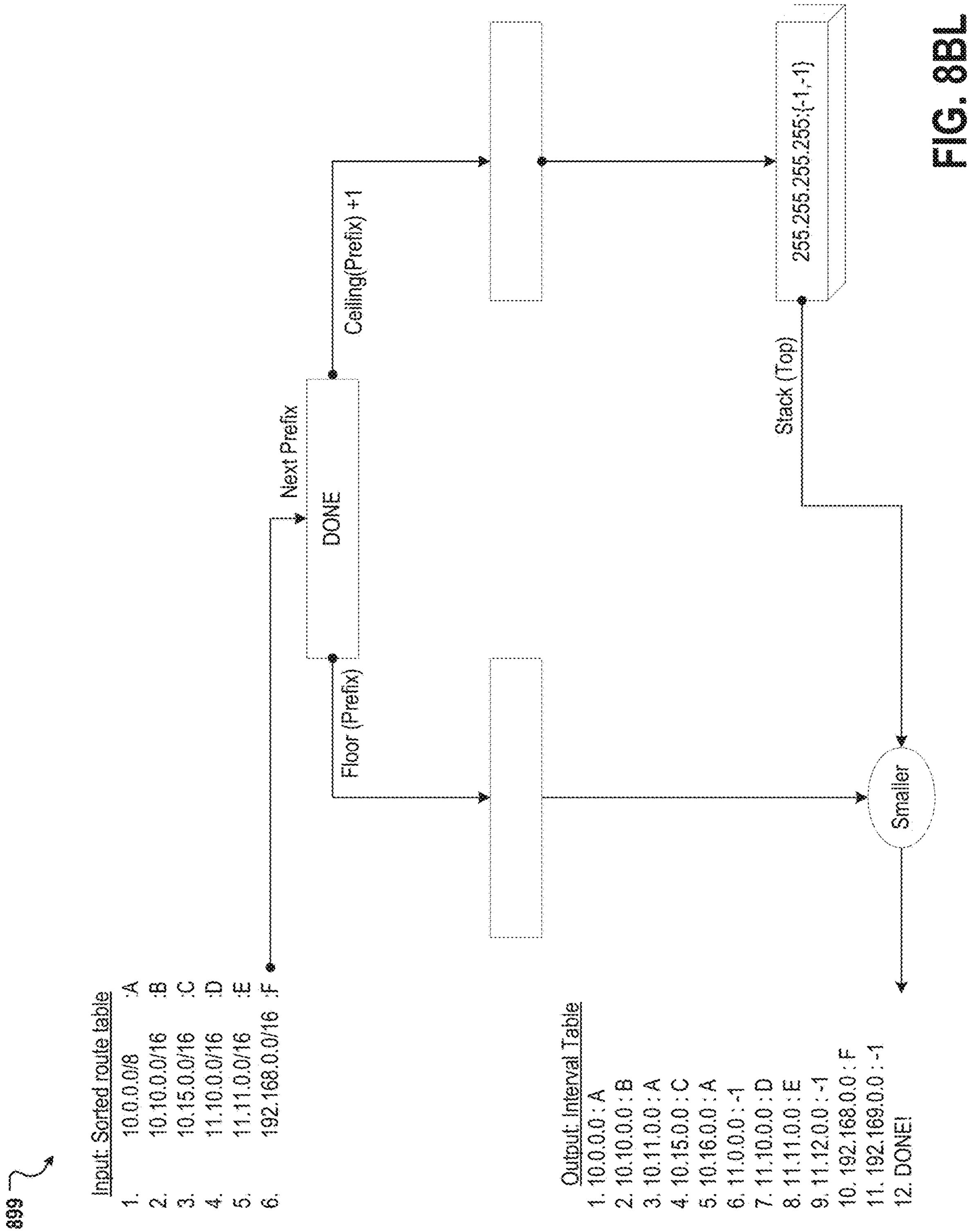

FIGS. 8A-8BL depicts steps 800-899 that show in greater detail an implementation how an interval table, such as the interval table 730 depicted in FIG. 7D, may be generating from a sorted list (e.g., a sorting route table) of prefixes using a stack. In some embodiments, deriving the sorted list corresponds to step 602 described in FIG. 6. In some embodiments, deriving the interval from a sorted list corresponds to step 604 described in FIG. 6. The depicted implementation employs the below linear algorithm to covert the sorted list of prefixes though other implementations may be employed. First, the stack is initialized by pushing the highest possible key value, with result data of −1 and parent data of −1. Next, for each prefix in the list of prefixes traversed in the ascending order: while the stack [top].key value is less than floor(prefix key), the stack[top].key value is popped and outputted to the interval table, with stack[top].result data used as the result data value; when the stack[top].key value equals floor(prefix key) then the stack is popped; the floor(prefix key) is outputted to the interval table, with prefix-result data used as the result-data value; when stack[top] key value equals ceiling(prefix key)+1 then the stack is popped; ceiling(prefix key)+1 is pushed to the stack along with stack[top] parent data used as the result data value and prefix result data used as the parent data value. Finally, while stack[top].key value is less than the highest possible value: the stack[top] key value is popped and outputted to the interval table, with stack[top] result data used as the result data value.

Interval Binary Search Trees

Figure 9A:
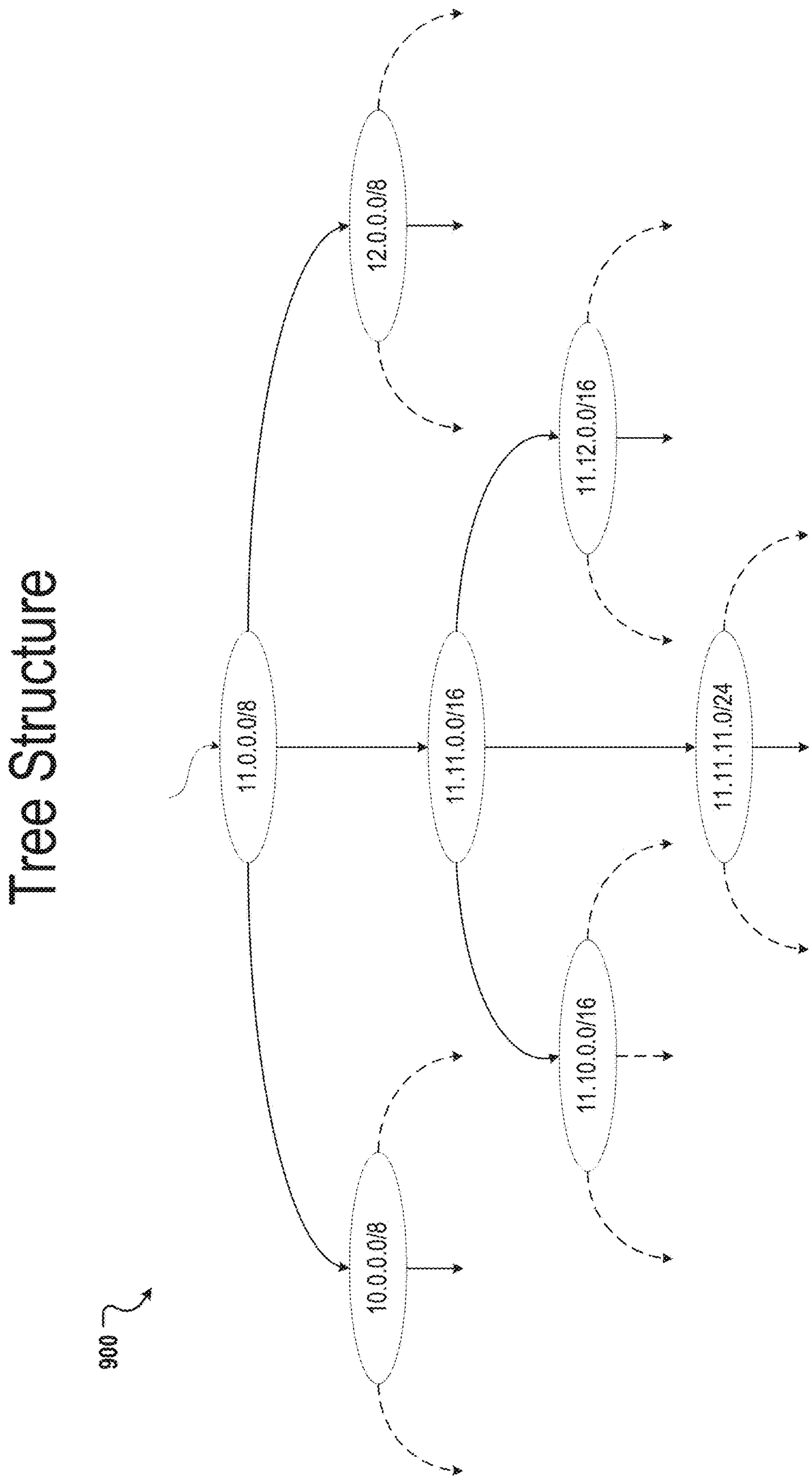
FIG. 9A depicts a non-limiting exemplary tree structure that shows what makes binary searching prefixes difficult for an LPM implementation.

FIG. 9A depicts an example tree structure 900 that shows what makes binary searching prefixes difficult for an LPM implementation. The example tree structure 900 includes prefix entries that are a range (e.g., has a low value and a high value). LPM searches cannot be stopped like a normal binary search when a range (prefix entry) is found within which a lookup key belongs because nested prefixes may exist under that range (prefix entry). As such, a ternary decision is created requiring a ternary tree, with one plane for each prefix level (e.g., the example tree structure 600). Moreover, the distribution of prefixes across prefix lengths is not predictable. As such, a maximum scale for each prefix length level can be provisioned. For example, up to 128 nesting levels for IPv6 require 128 times more memory, more processing at each node, and complex tree building.

Figure 9B:
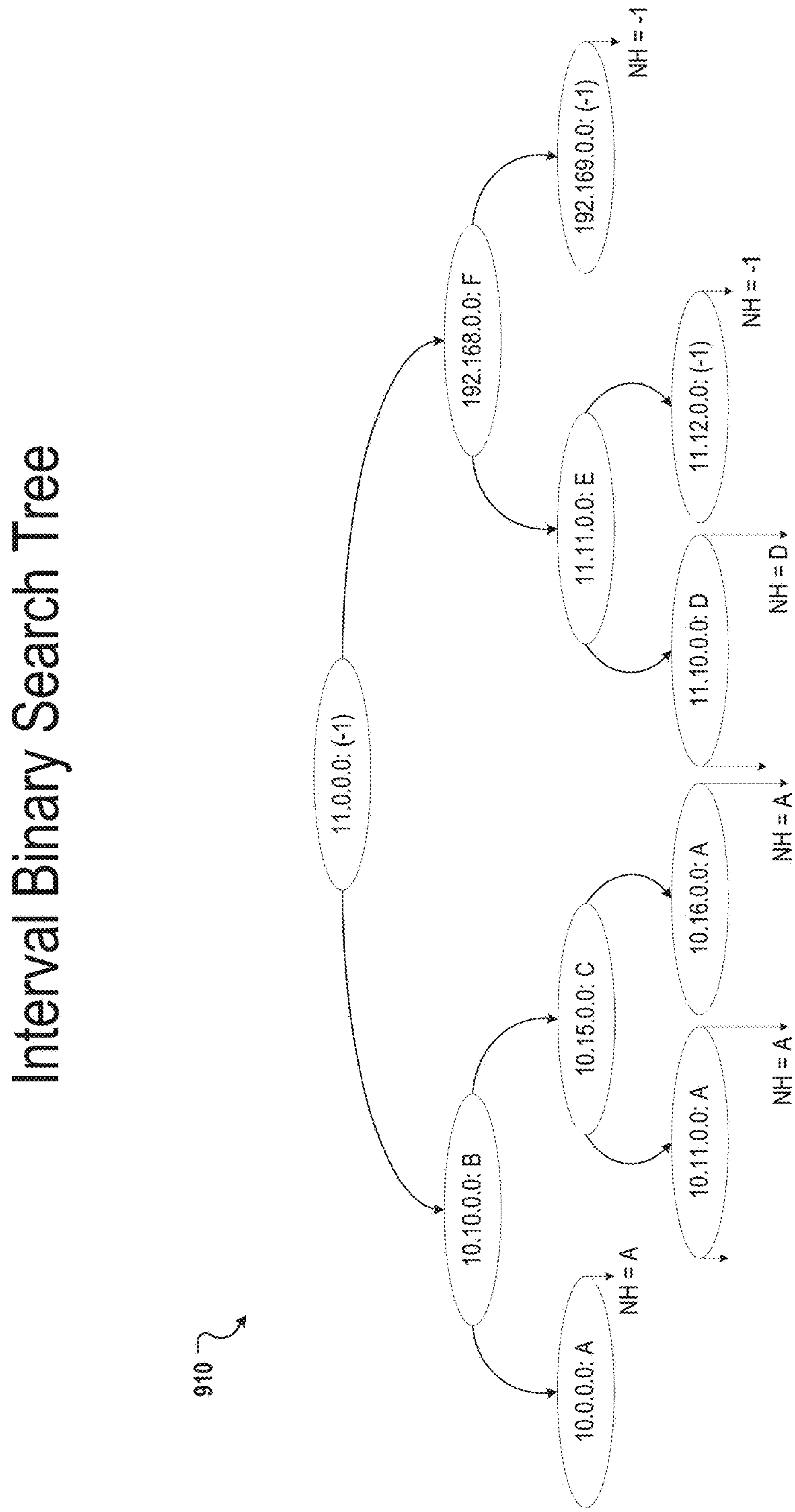
FIG. 9B depicts a non-limiting exemplary interval binary search tree derived from an interval table.

FIG. 9B depicts an example interval binary search tree 910 derived from the example interval table 730 depicted in FIG. 7D. In some embodiments, deriving the interval binary search tree 910 from the example interval table 730 corresponds to step 606 described in FIG. 6. This interval binary search tree representation 910 allows for the replacement of the sequential search with a (modified) binary search algorithm to search through the points on the number line 712 depicted in FIGS. 7A-7C in logarithmic time. For example, with a logarithmic search time, and each stage being able to compare and branch on 4 intervals (i.e., a search through 4 levels of a binary tree, which gives a 16-way exponential explosion at each stage), 4096 intervals (2K prefixes) can be searched in just 3 stages (16×16×16), and 16 Million intervals (8 Million prefixes) can be searched in just 6 stages (16×16×16×16×16×16). Moreover, because the values stored in the interval binary search tree nodes are interval values and not prefixes, the solution does not have to employ a complex ternary tree or make a complex ternary decision at each node.

Pushing Data to the Leaf Nodes

Figure 10A:
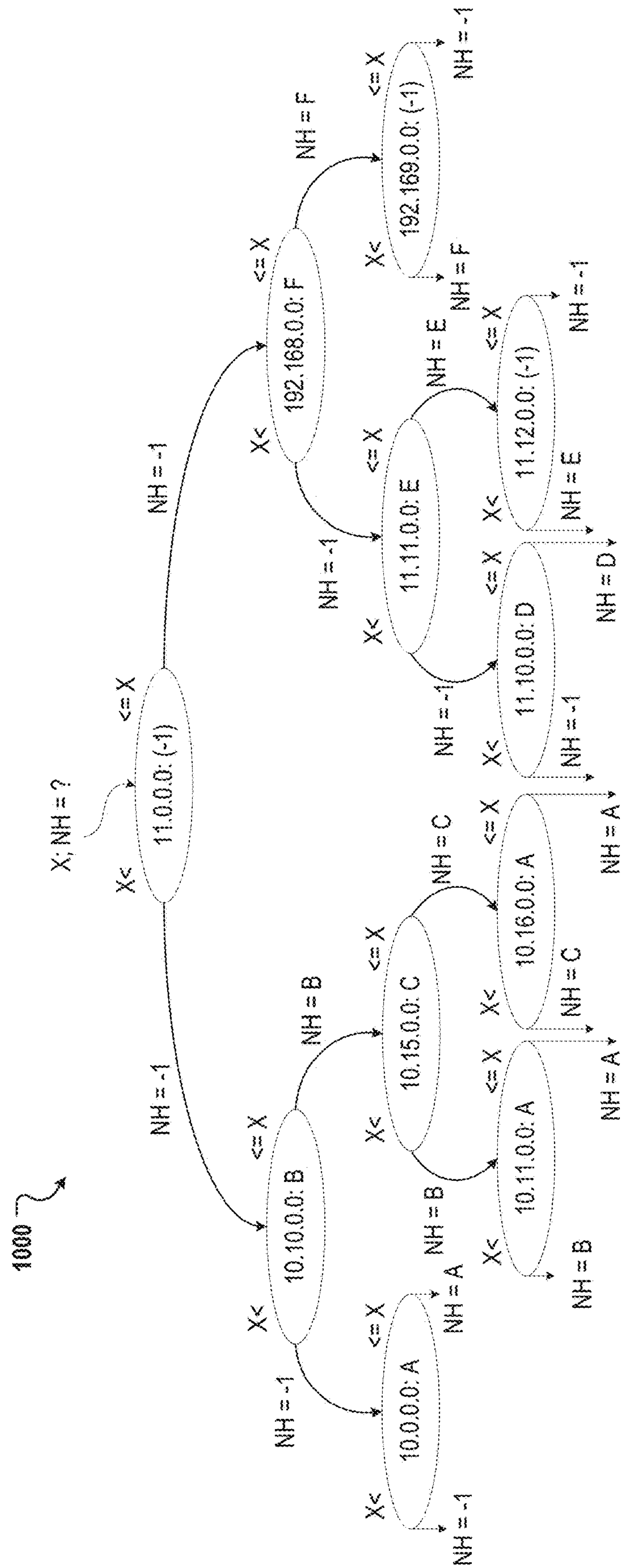
FIG. 10A depicts a non-limiting exemplary binary search tree where data is not stored in the interior nodes.

FIG. 10A depicts an example binary search tree 1000 where data is not stored in the interior nodes. In some embodiments, propagating ('pushing') the data from the interior nodes of the example interval binary search tree 910 to generate the example binary search tree 1000 corresponds to step 608 described in FIG. 6. The example binary search tree 1000 is the equivalent of the original tree 910 by preserving the data integrity of the original tree. A 'modified' binary search on this tree (See FIG. 11) for any key will yield the same result as the original tree 910 for that key, while storing the result data only in the leaf nodes and not in the interior nodes. This helps save a significant amount of memory when storing the interior nodes.

As depicted in the example binary search tree 1000, only the left most egress branch is reached without ever taking a right fork at a node. All the other egress branches of the example binary search tree 1000 are reached by taking at least one right fork, and over-writing the accumulated data with the data from the node at each right fork. Such an implementation provides that only that last data prevails (i.e., the last data is used for the correct derivation of the final result) and allows for the offline precomputation of this data (e.g., by the control plane) for each possible egress branch and allows for this data to be stored only in the leaf (e.g., the last stage) nodes. This allows the interior nodes (e.g., previous stages) to store only the keys and no data since nothing is accumulated from those nodes, which saves a significant amount of memory. In some embodiments, each subtree inherits only one default data from its parent tree: the data from the node at the most recent right fork that lead to this subtree, which will then be "pushed" down and stored as the data of the left most egress branch for that subtree.

Figure 10B:
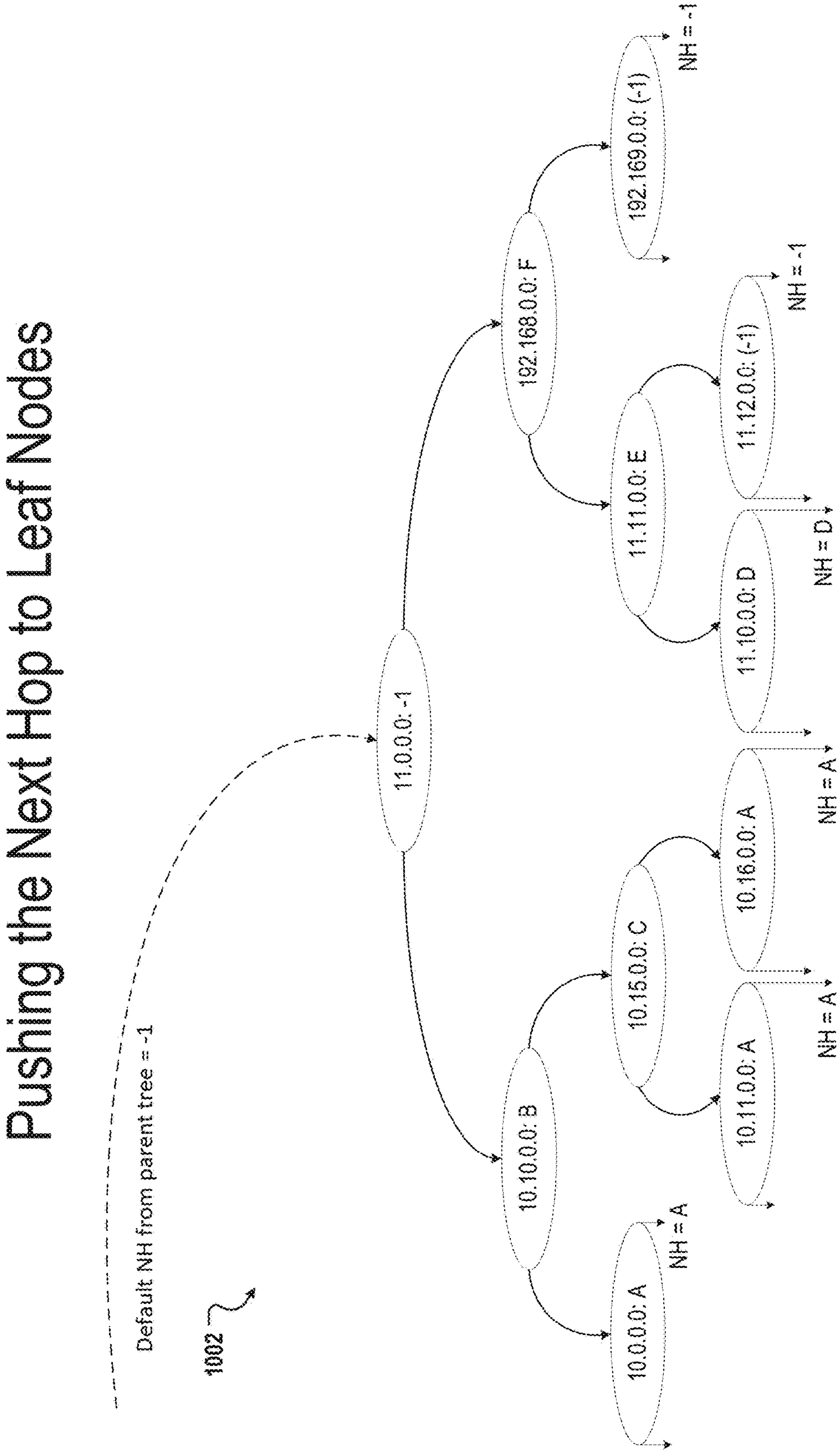
FIGS. 10B-10P depict non-limiting exemplary steps showing how the data from the interior nodes are pushed down to the correct egress branches by applying the rules below to the right-subtrees of each interior node starting at the root.
Figure 10C:
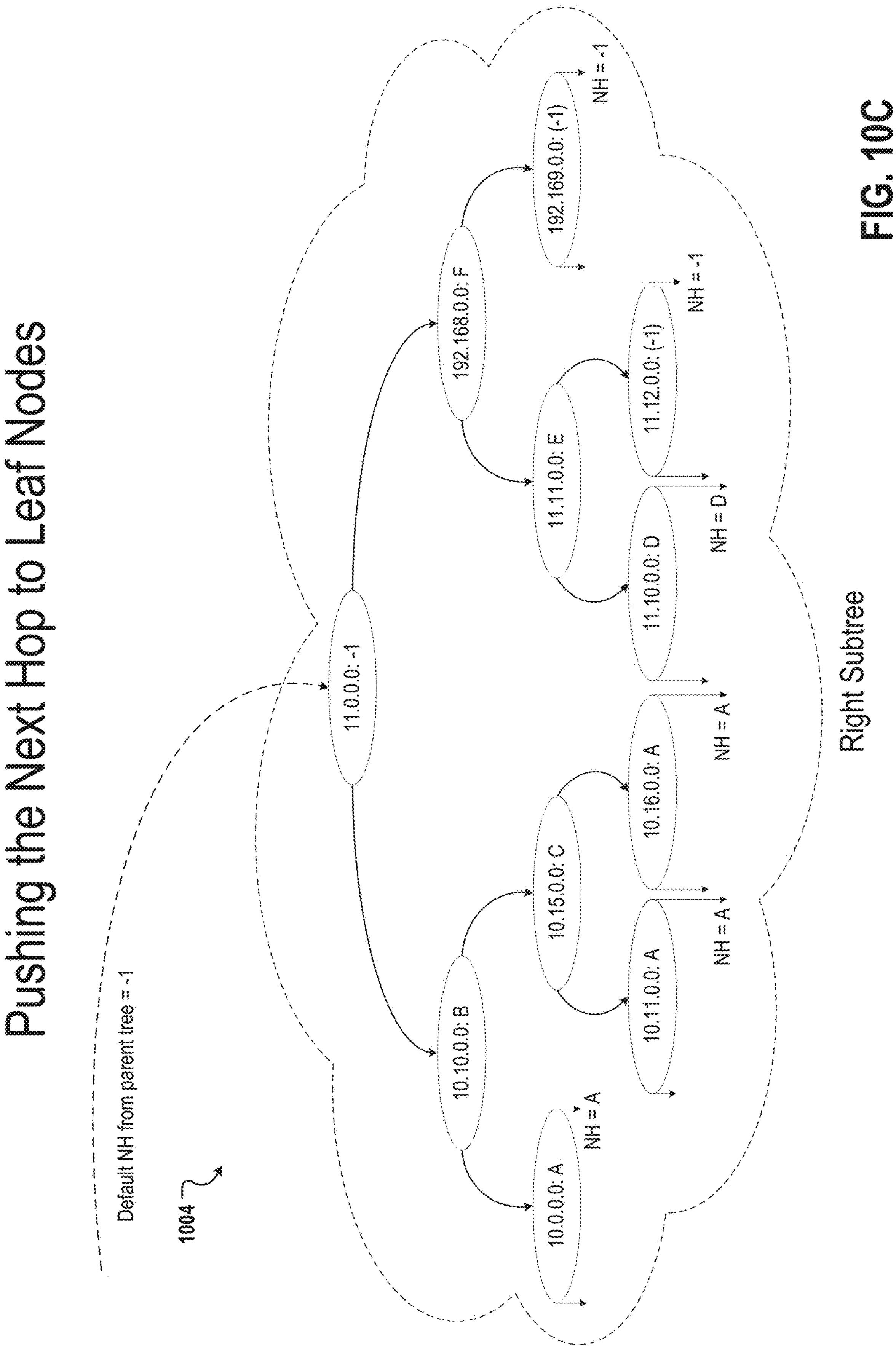
Figure 10D:
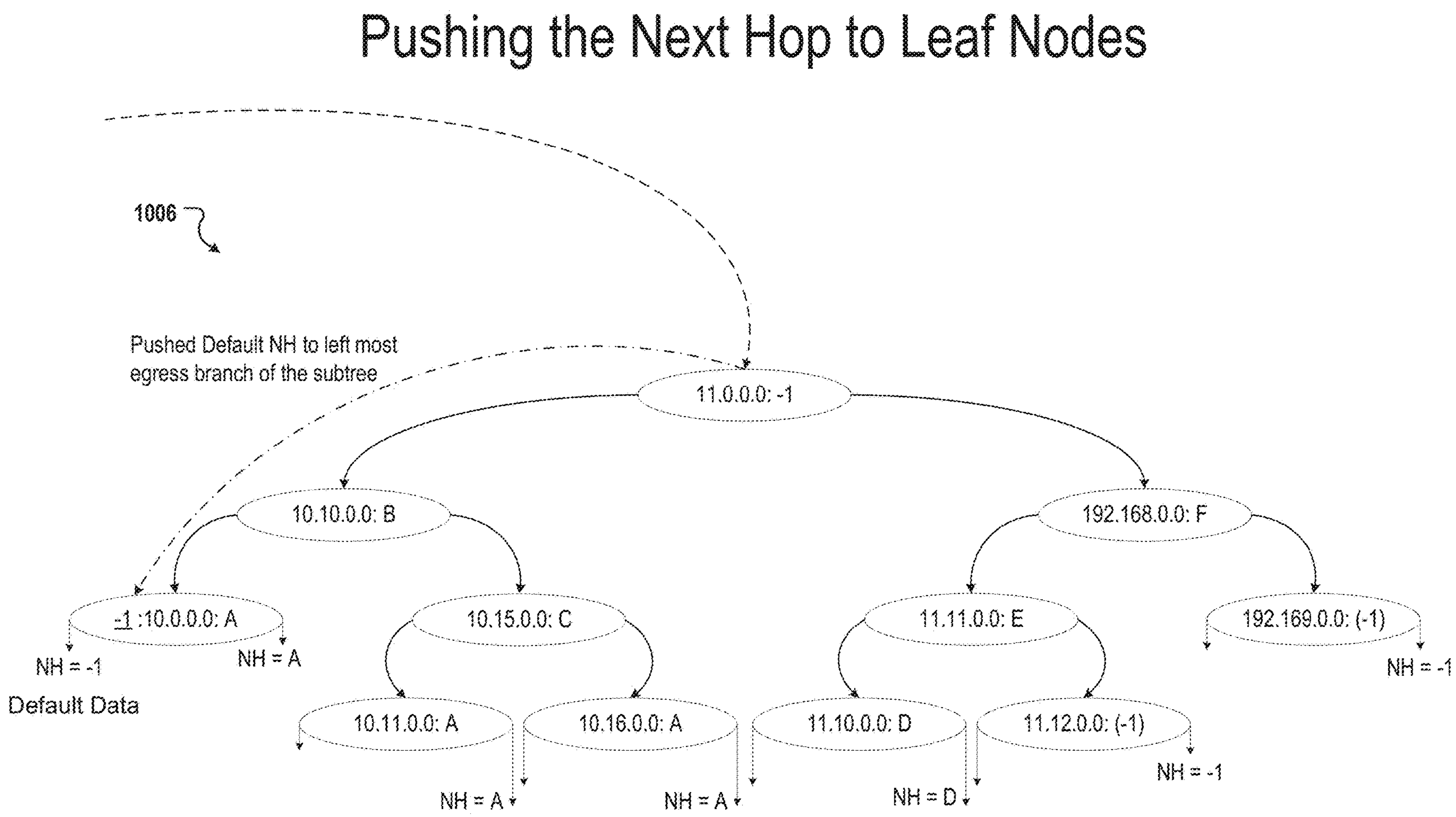
Figure 10E:
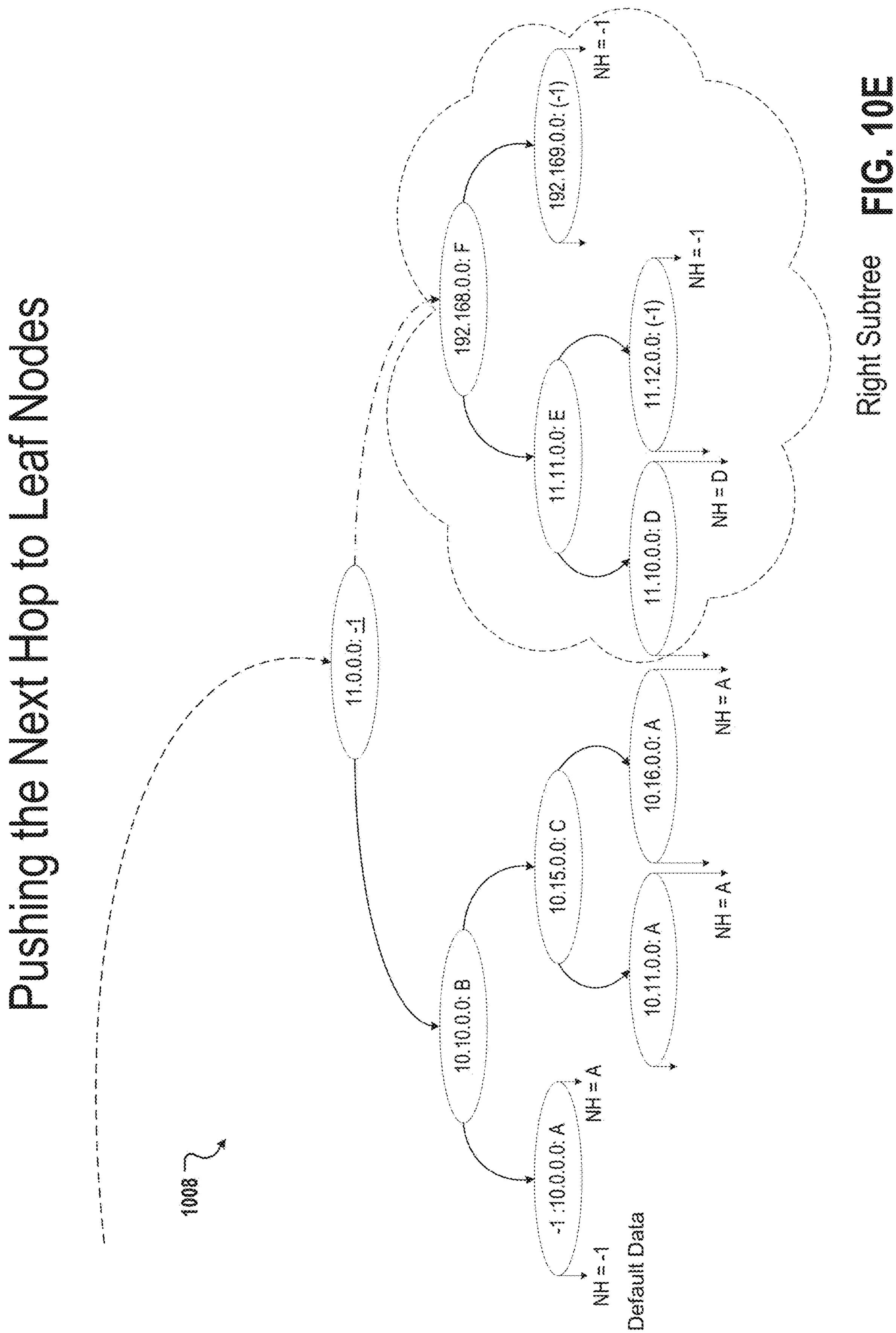
Figure 10F:
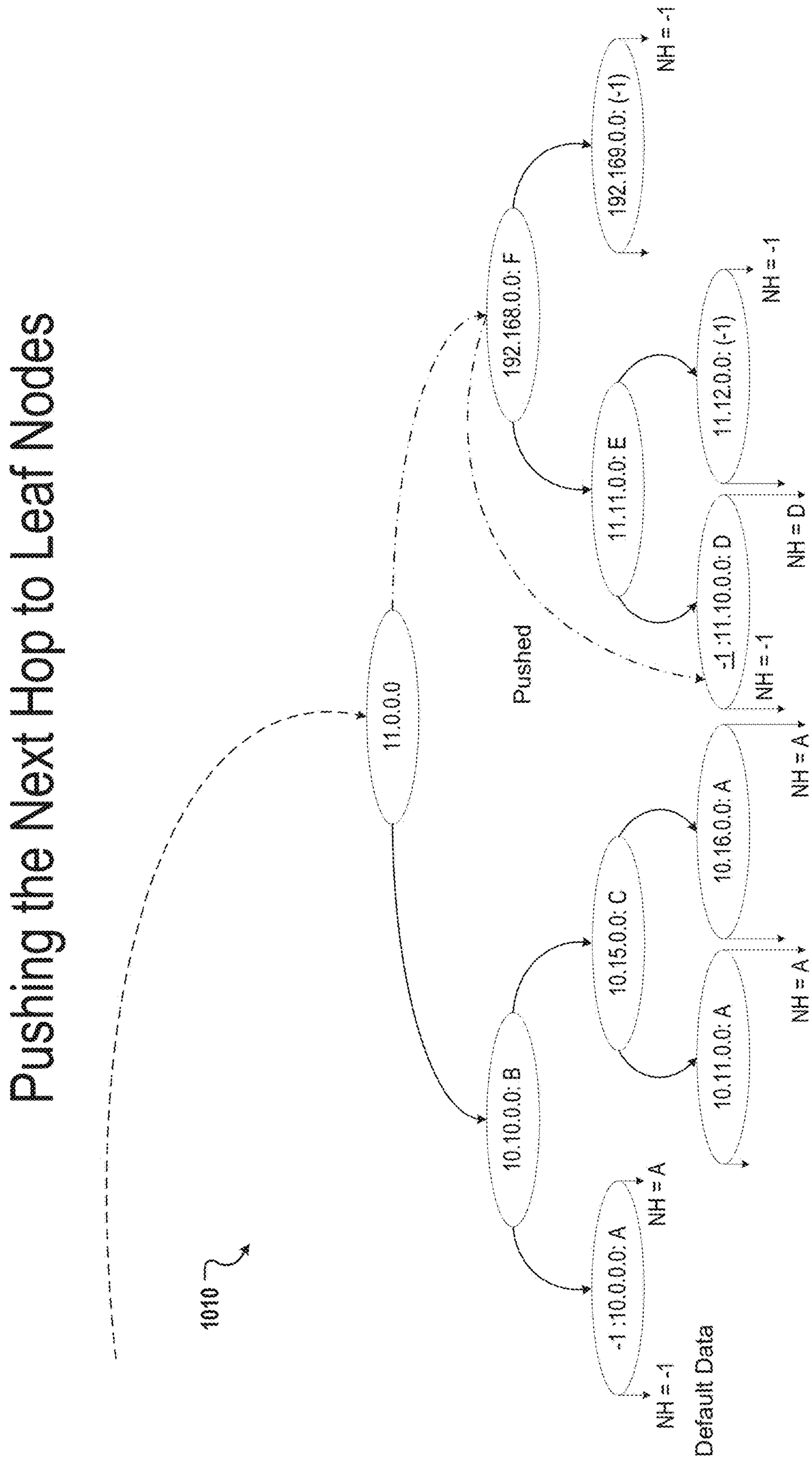
Figure 10G:
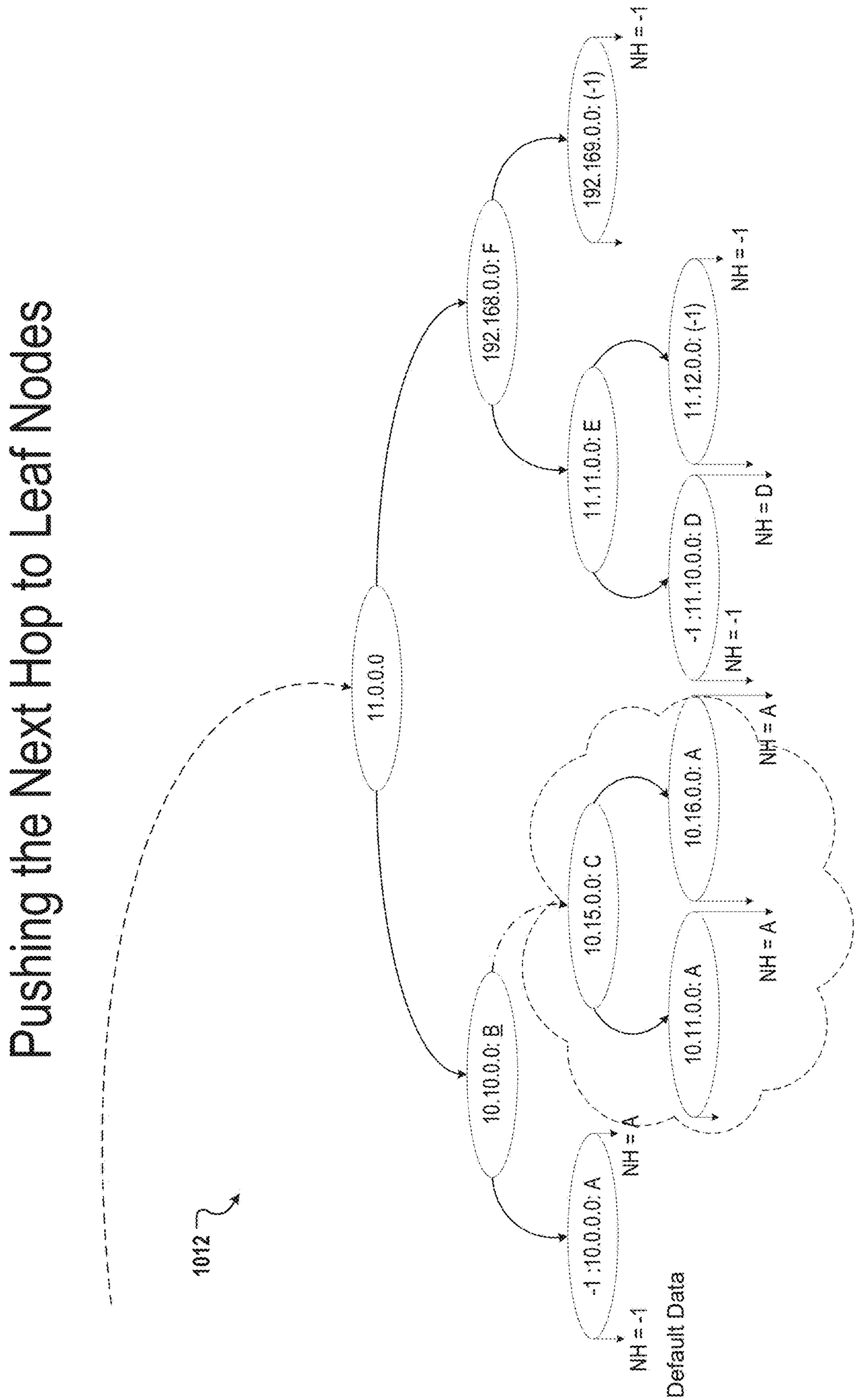
Figure 10H:
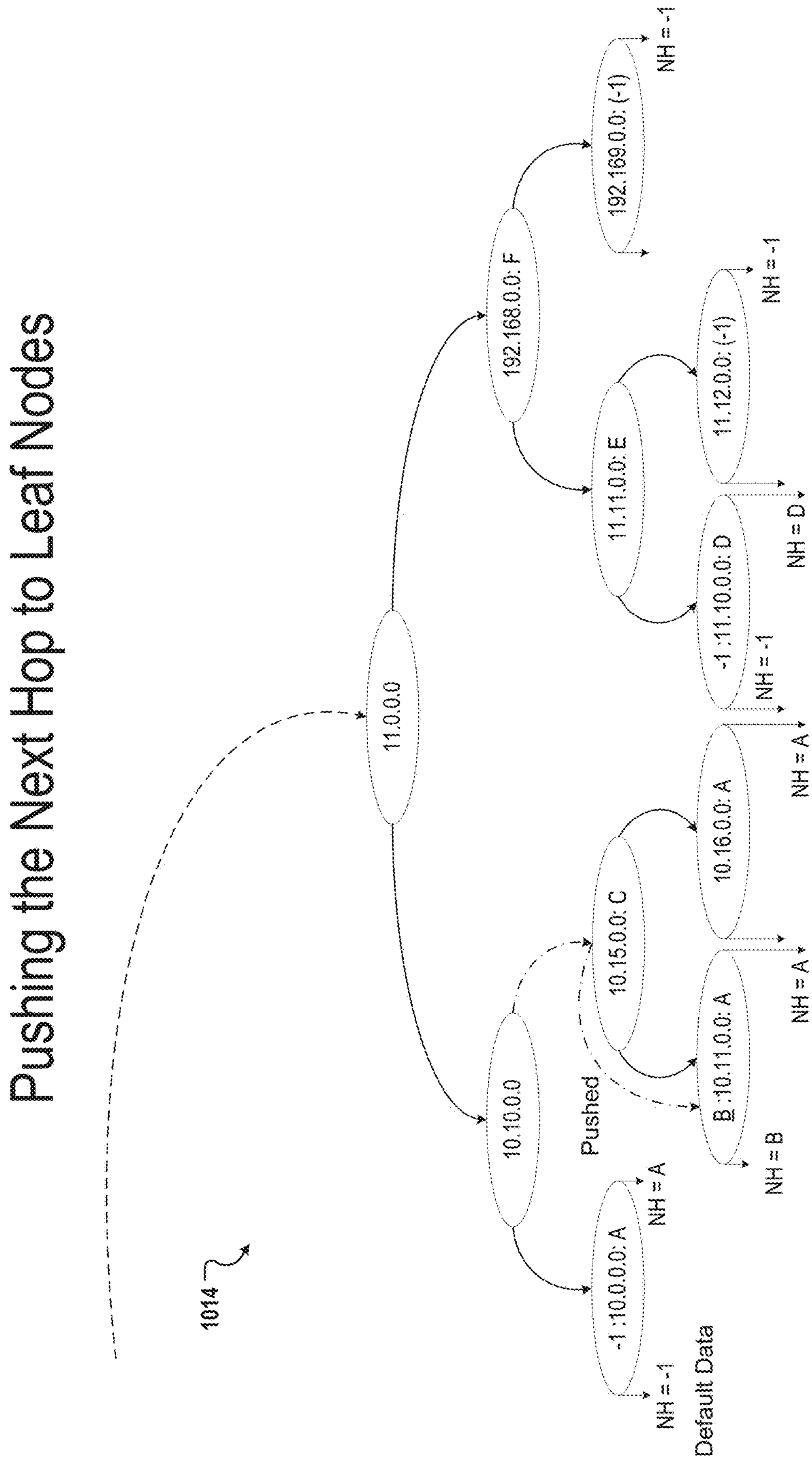
Figure 10I:
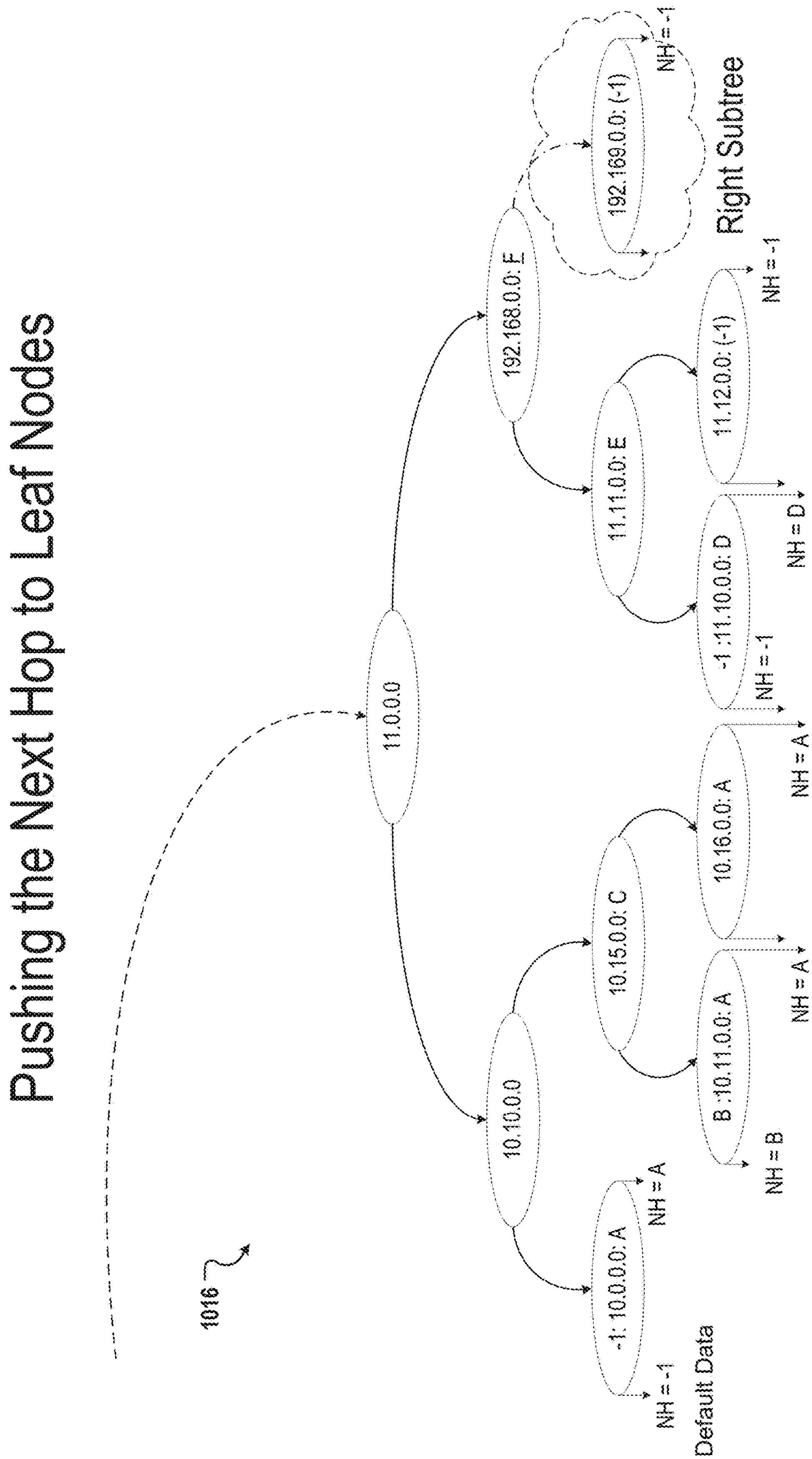
Figure 10J:
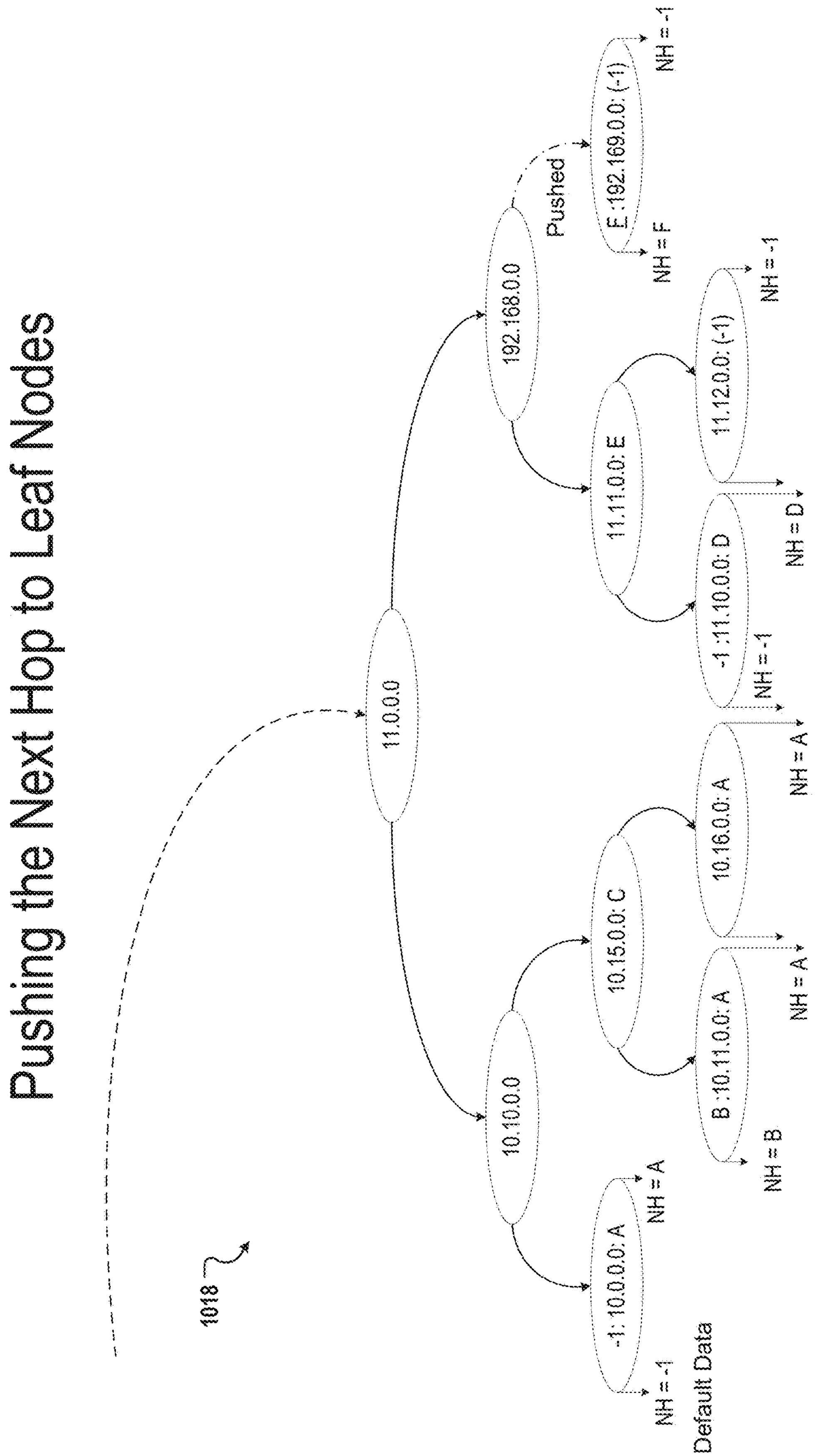
Figure 10K:
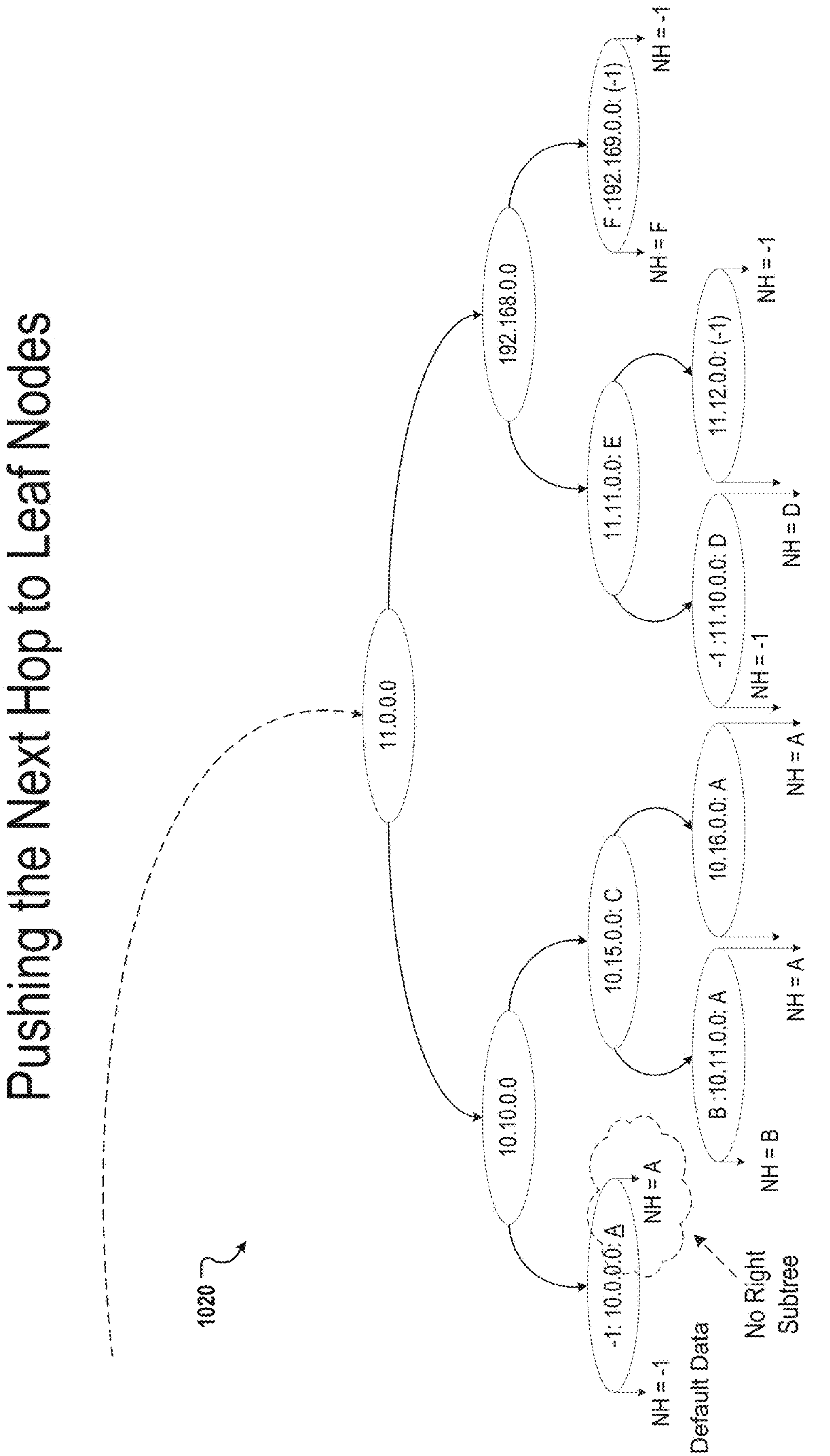
Figure 10L:
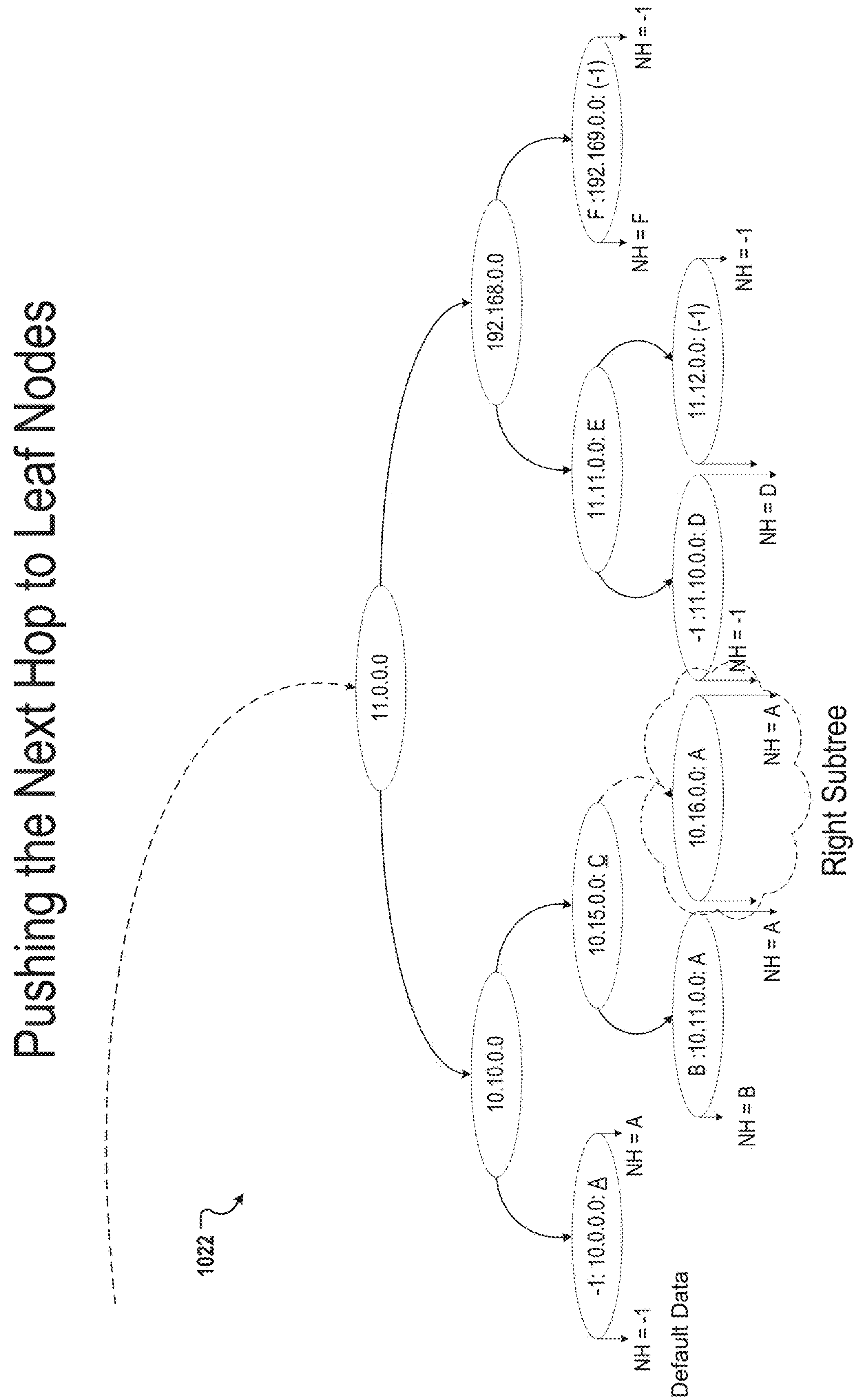
Figure 10M:
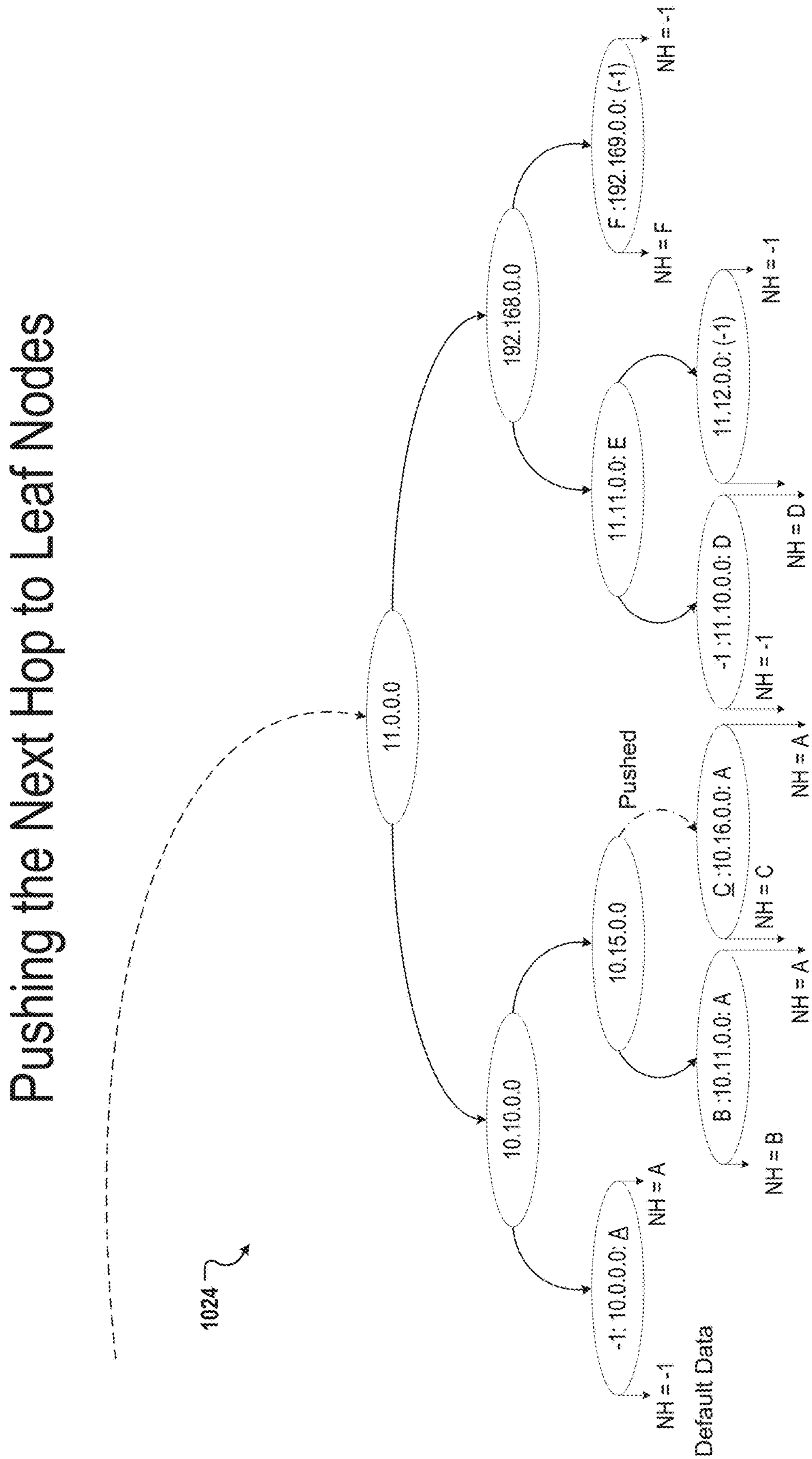
Figure 10N:
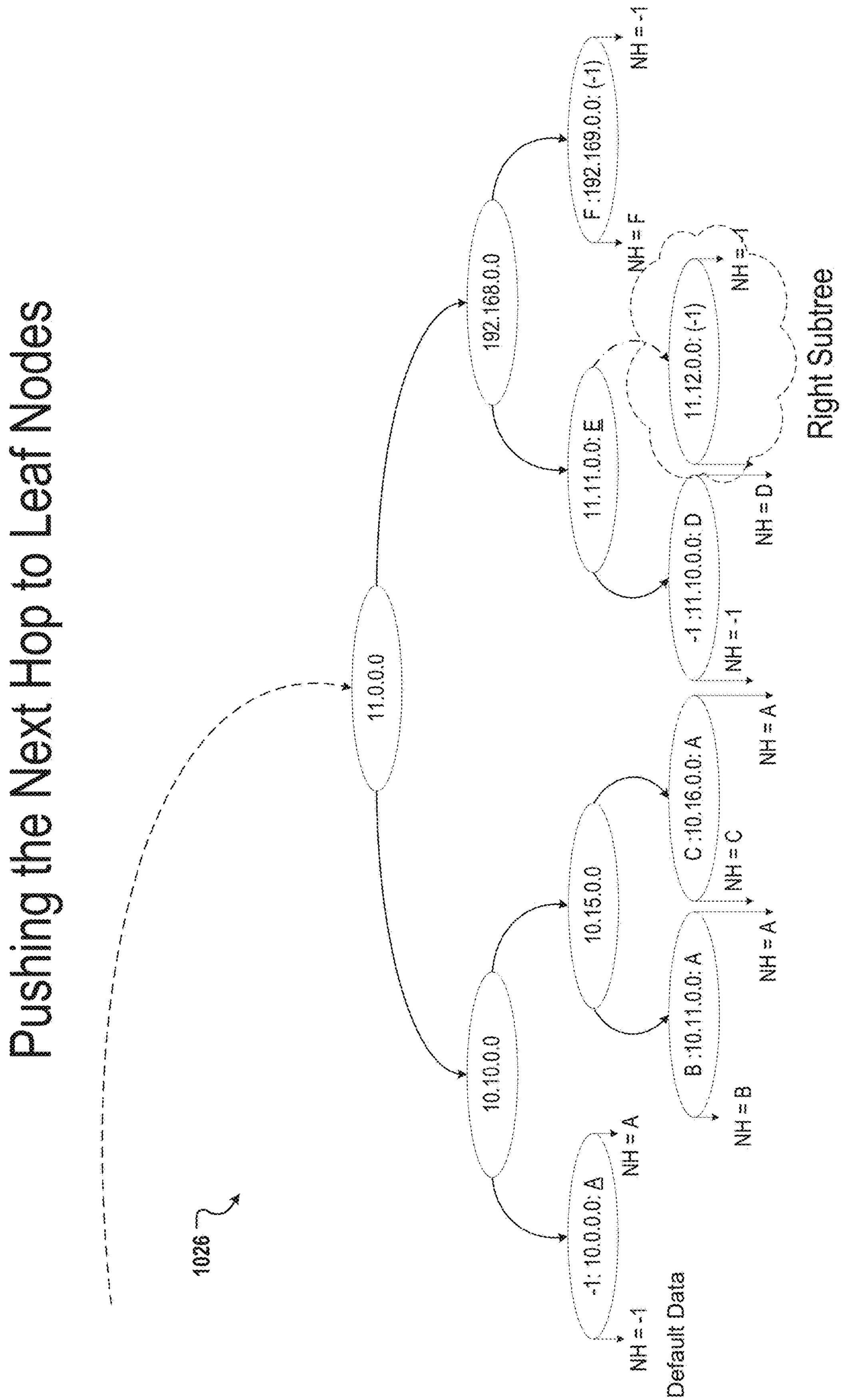
Figure 10O:
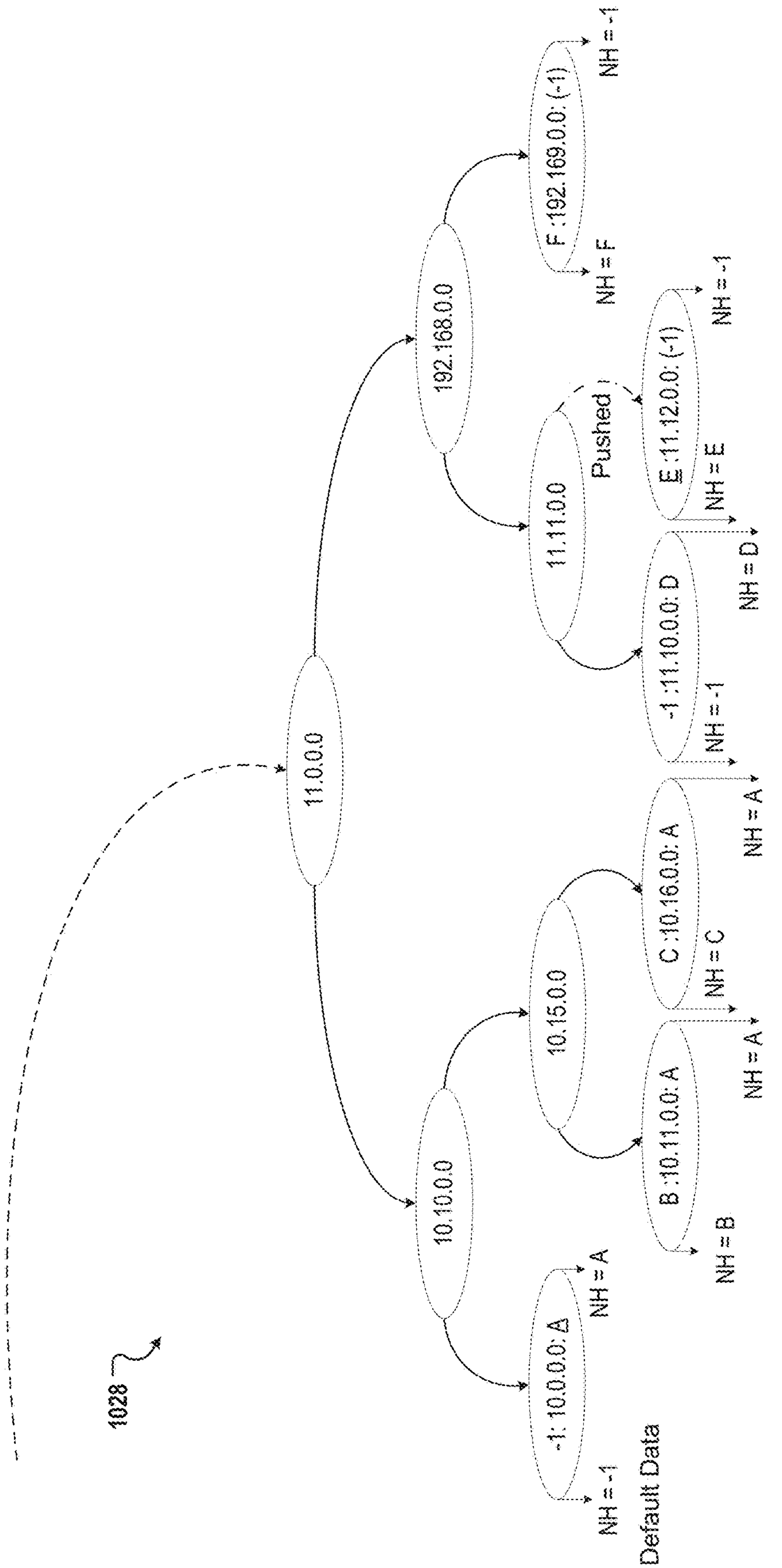
Figure 10P:
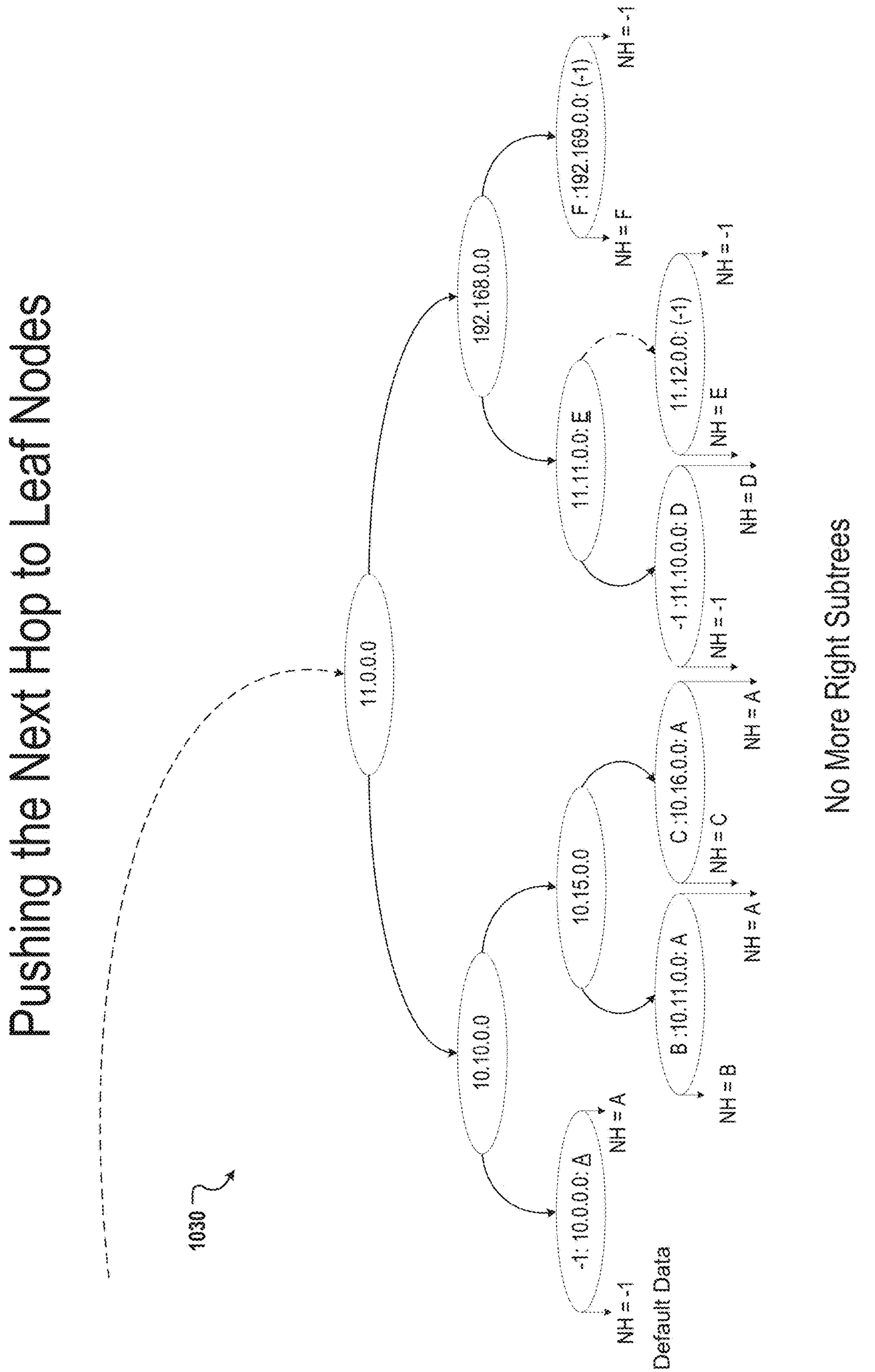

FIGS. 10B-10P depict steps 1002 through 1030 that show an example of how the data from the interior nodes are "pushed" down to the correct egress branches by applying the steps below to each of the right-subtrees, starting with the default data and the whole tree as a right-subtree of its imaginary parent node. These steps provide an example embodiment of how the data may be pushed to the exterior nodes, other algorithms may be employed to achieve the same result. The example steps include: 1) For the parent node, identify the right-subtree. 2) Go to the root node of the right-subtree and then traverse the tree all the way left to the left-most leaf node. 3) Store the data from the parent node as the data for the left egress branch of that node. 4) Repeat steps 1-3 with each of the nodes in the tree as the parent node.

The example binary search tree 1000 can be employed by the described system in the data plane provided by a Match Processing Unit (MPU). For example, an employed MPU can fetch one cache-line (64B) of data from the memory and execute up to 16 machine instructions at wire speed. The employed control plane running in the Processing Entity 111 compresses multiple levels of the respective binary search tree, such as binary search tree 1000, in one cache-line and writes it to the memory so that the MPU at the correct stage can fetch it and process those multiple levels of the tree. In some embodiments, data is not stored in the interior nodes, but is stored only in the last stage node. Such implementations save cache-line memory and allows more levels of a tree to be packed into one cache-line. In some embodiments, memory pointers to the subsequent cache-lines are not stored in the cache-lines. In some embodiments, address computation is employed within the MPU to find the next cache-line based on the address of the current cache-line and the outgoing branch taken at this stage. Employing address computation saves cache-line memory and allows more levels of the tree to be packed into one cache-line. In some embodiments, 15 IPv4 address intervals (60B) are stored in each interior-node cache-line, which forms four levels of the binary tree. In some embodiments, modified binary searches can be performed on these four levels using 16 instructions or less (including branch penalties and next cache-line address computation at wire speed). In some embodiments, processing 4 levels of the binary tree provides a 16-WAY expansion of the tree at each stage. Such a divide and conquer approach and the exponential expansion provides a significant scale advantage as more stages are added. For example, such an architecture can scale to one thousand IPv4 prefixes with just three stages, four million in six stages, and a whopping one billion in eight stages (even after applying cache-line constraints as explained above and accounting for cache-line memory for storing result data in the last stage nodes). In some embodiments, by pushing the data to the exterior nodes, such as depicted in the example binary search tree 1000, the data that will prevail for each egress branch can be precomputed offline at the control plane and can be stored only in the last stage, leaving the interior nodes to store only the keys.

Modified Binary Search

Figure 11:
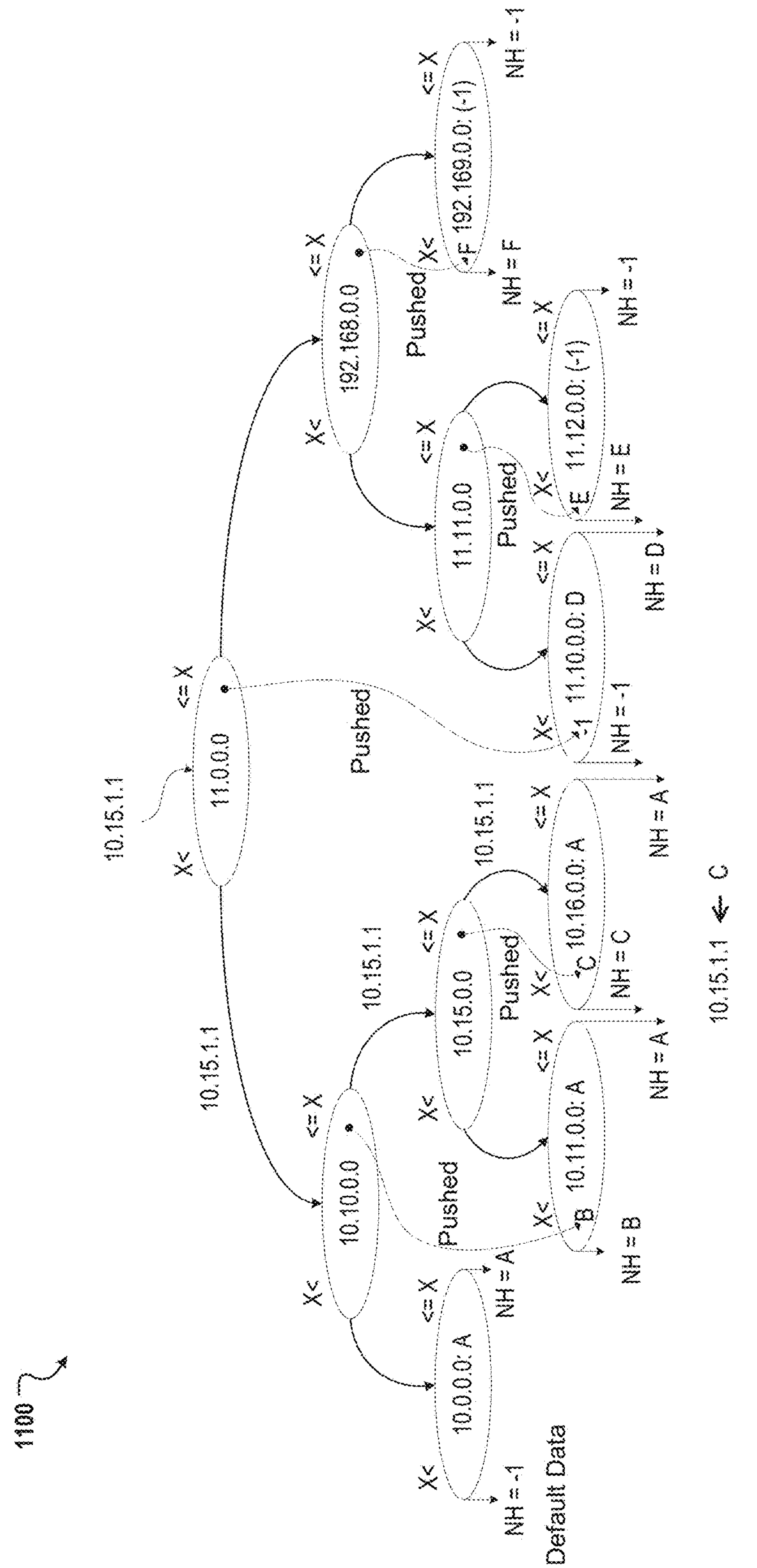
FIG. 11 depicts a non-limiting example binary search tree where data is not stored in the interior nodes.
Figure 12A:
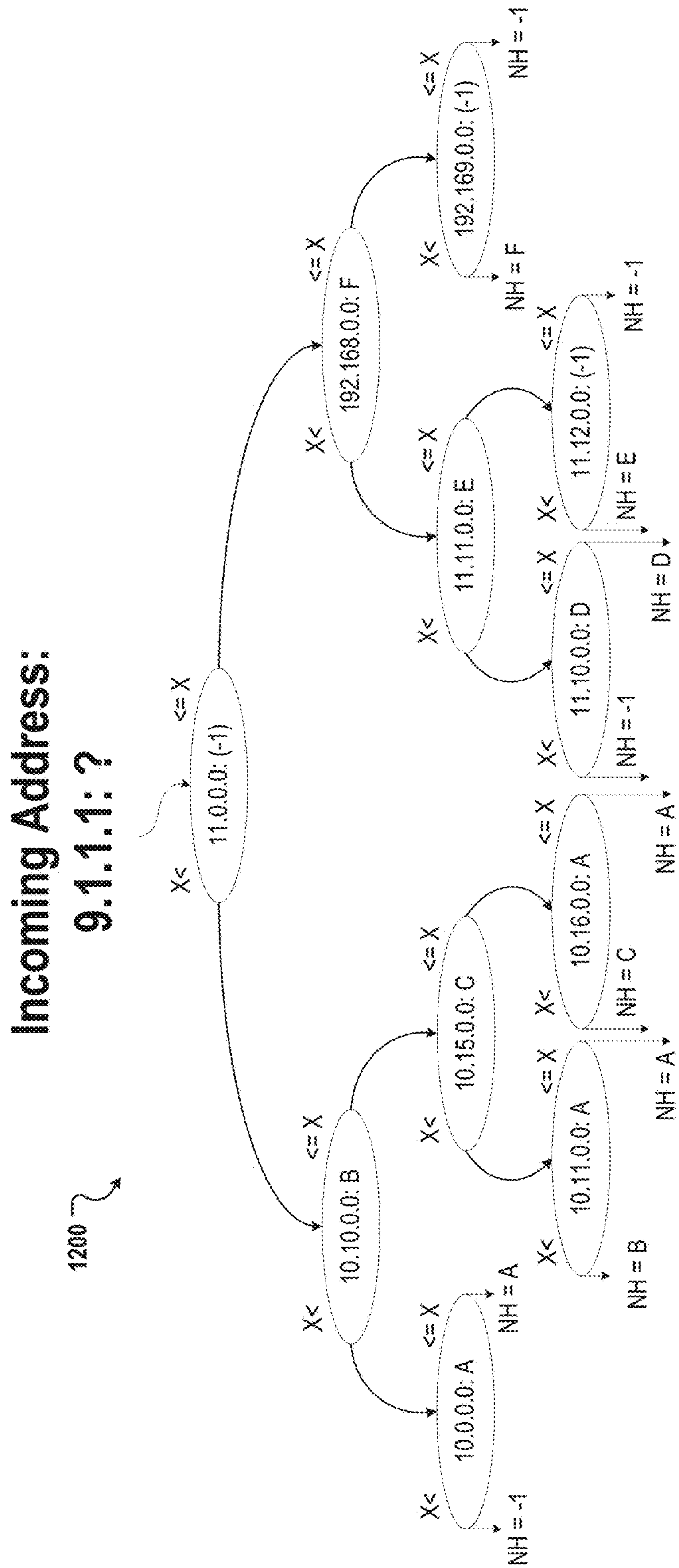
FIGS. 12A-12K depict a non-limiting series of incremental steps for an example modified binary search that can be performed on an interval binary search tree.
Figure 12B:
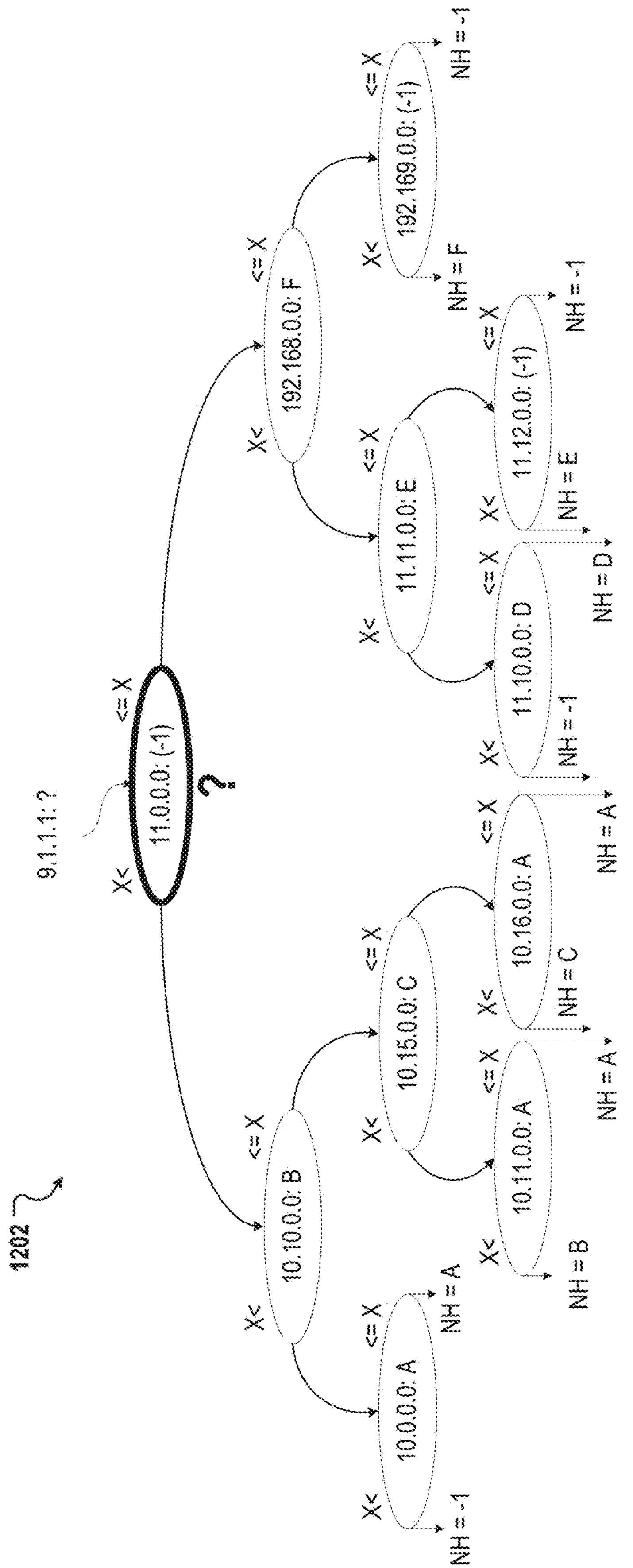
Figure 12C:
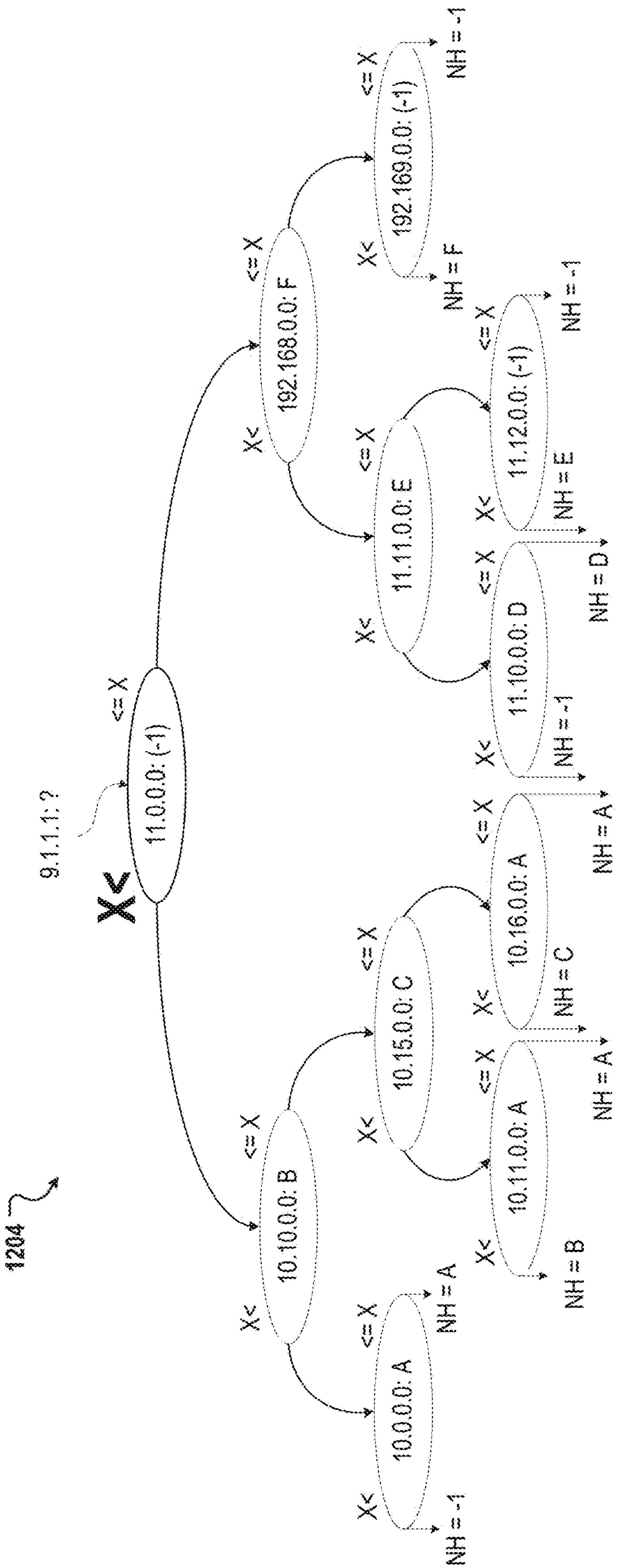
Figure 12D:
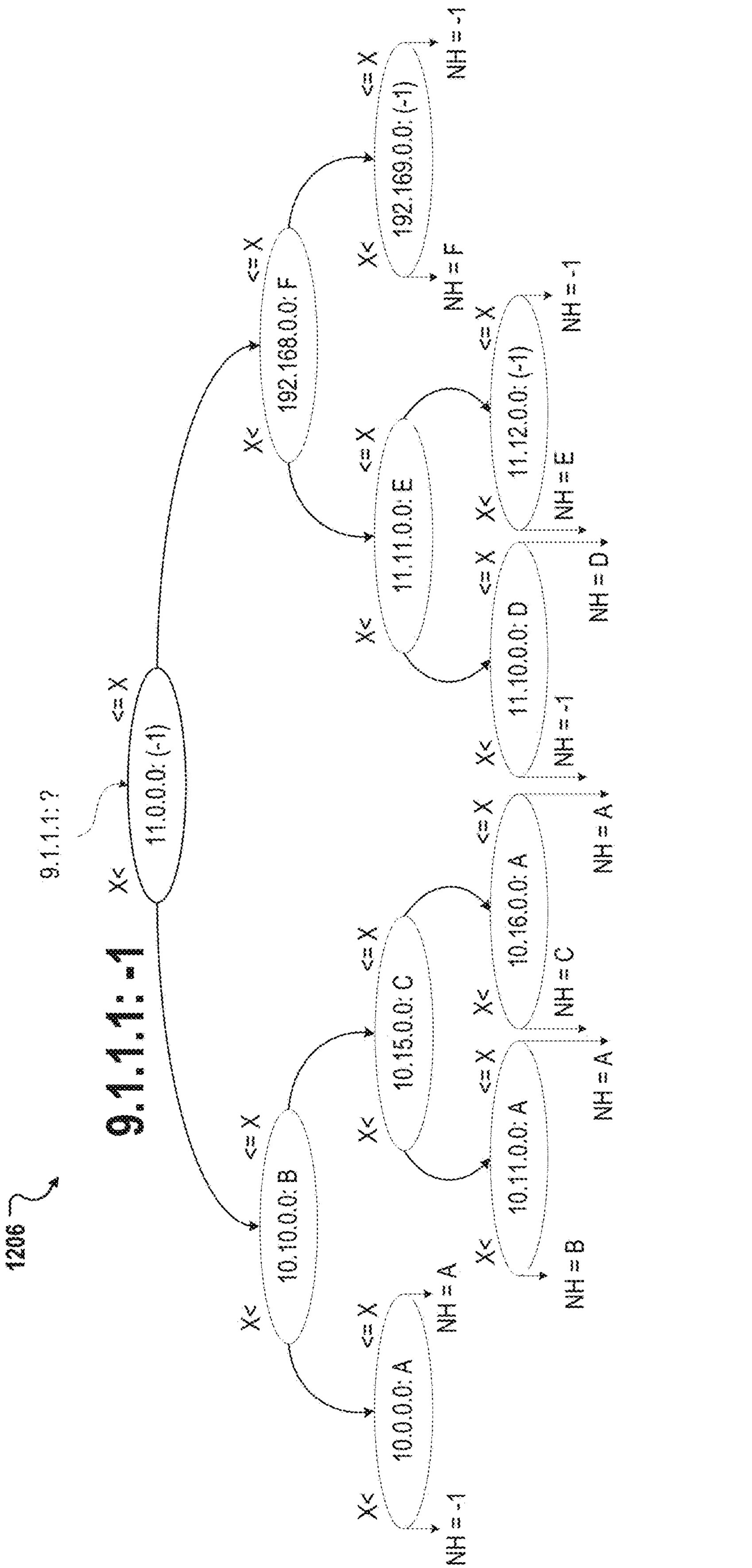
Figure 12E:
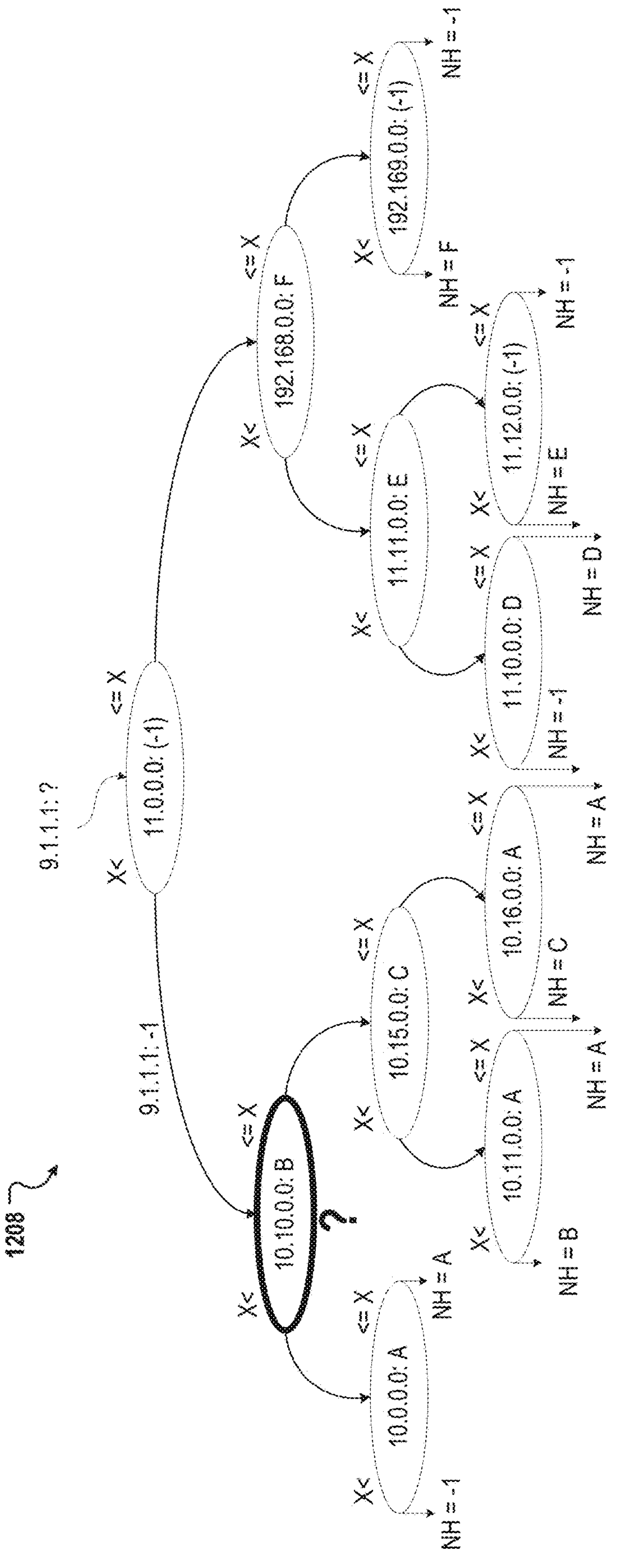
Figure 12F:
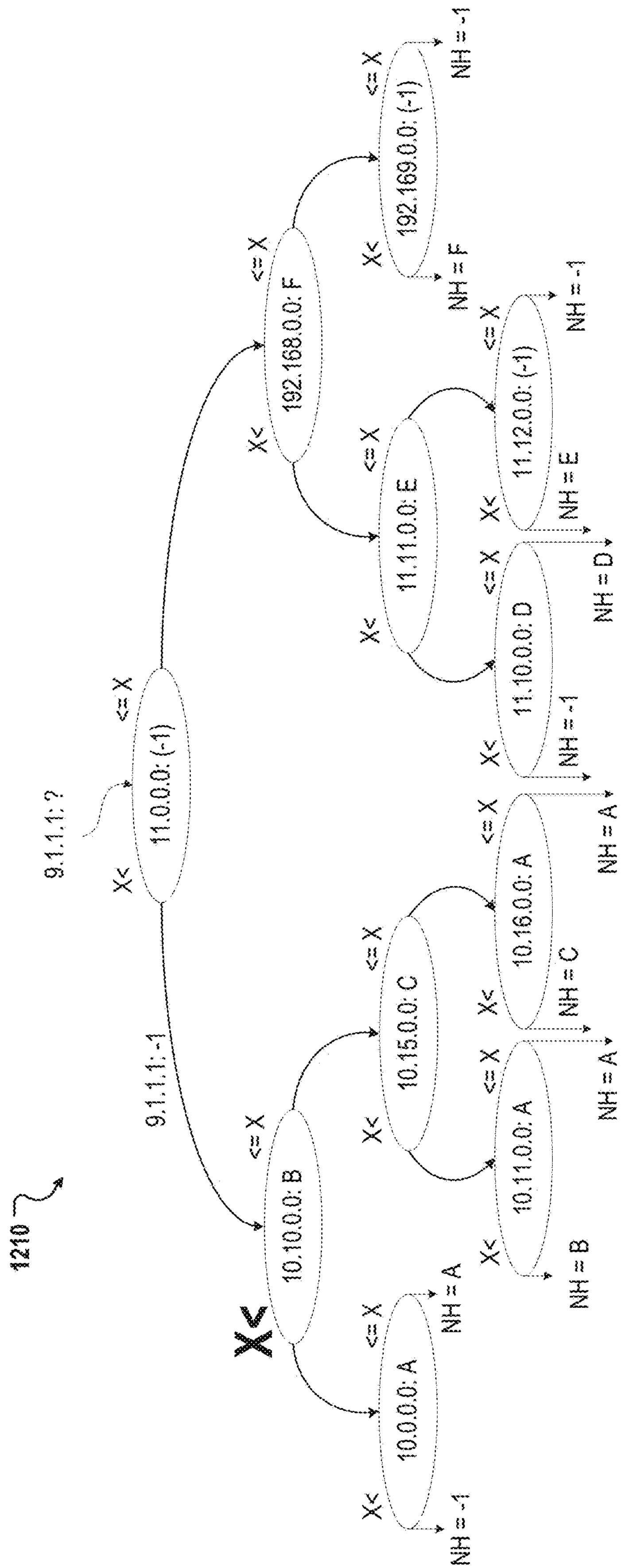
Figure 12G:
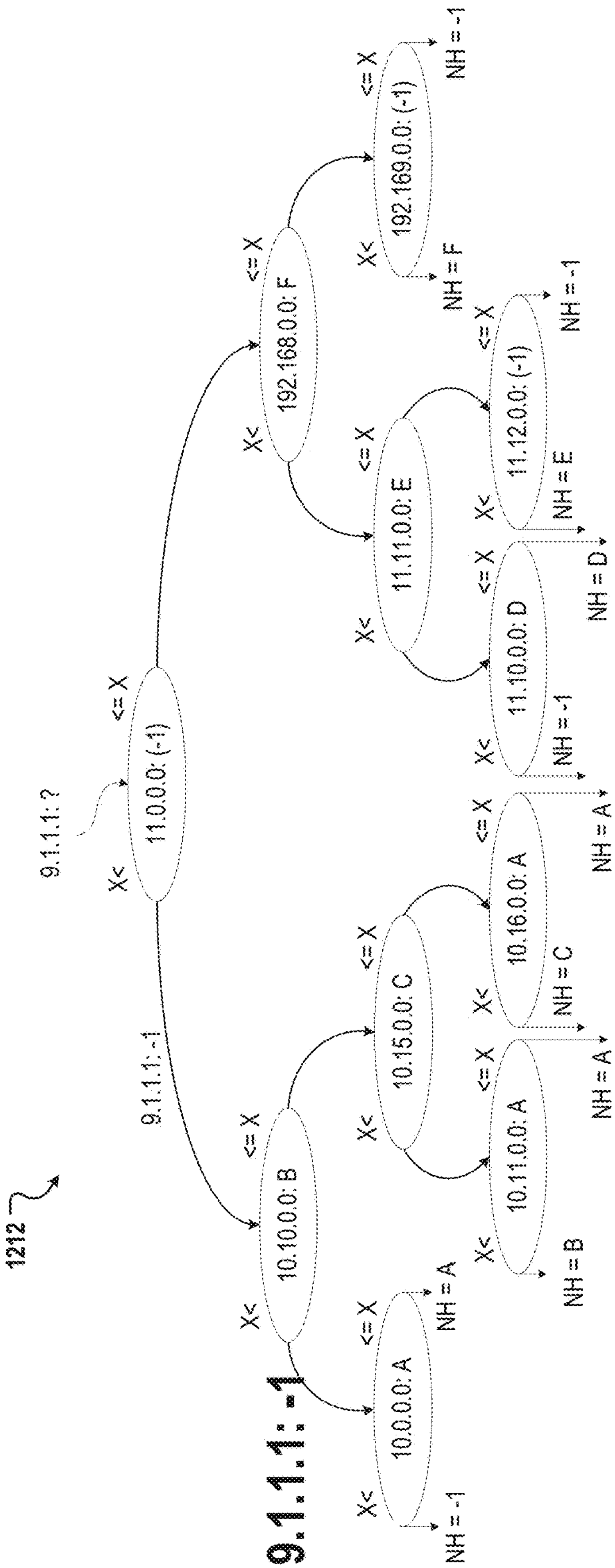
Figure 12H:
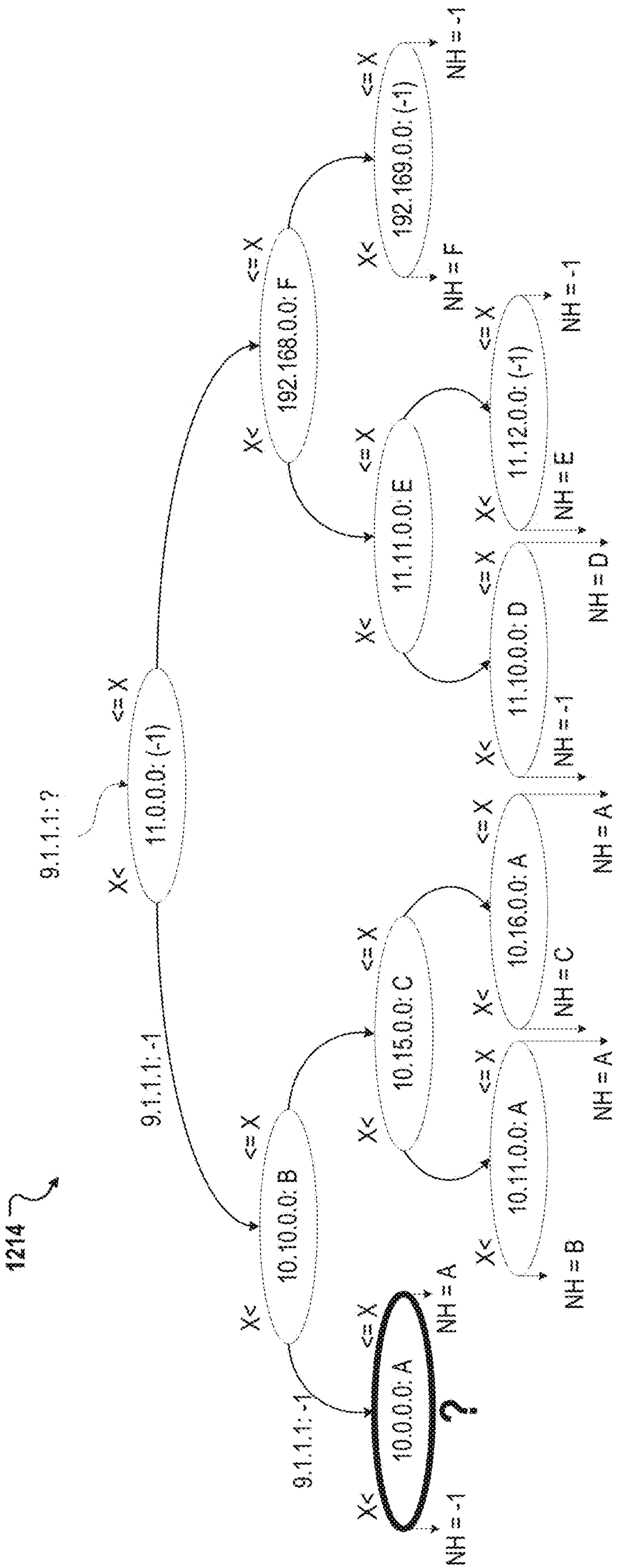
Figure 12I:
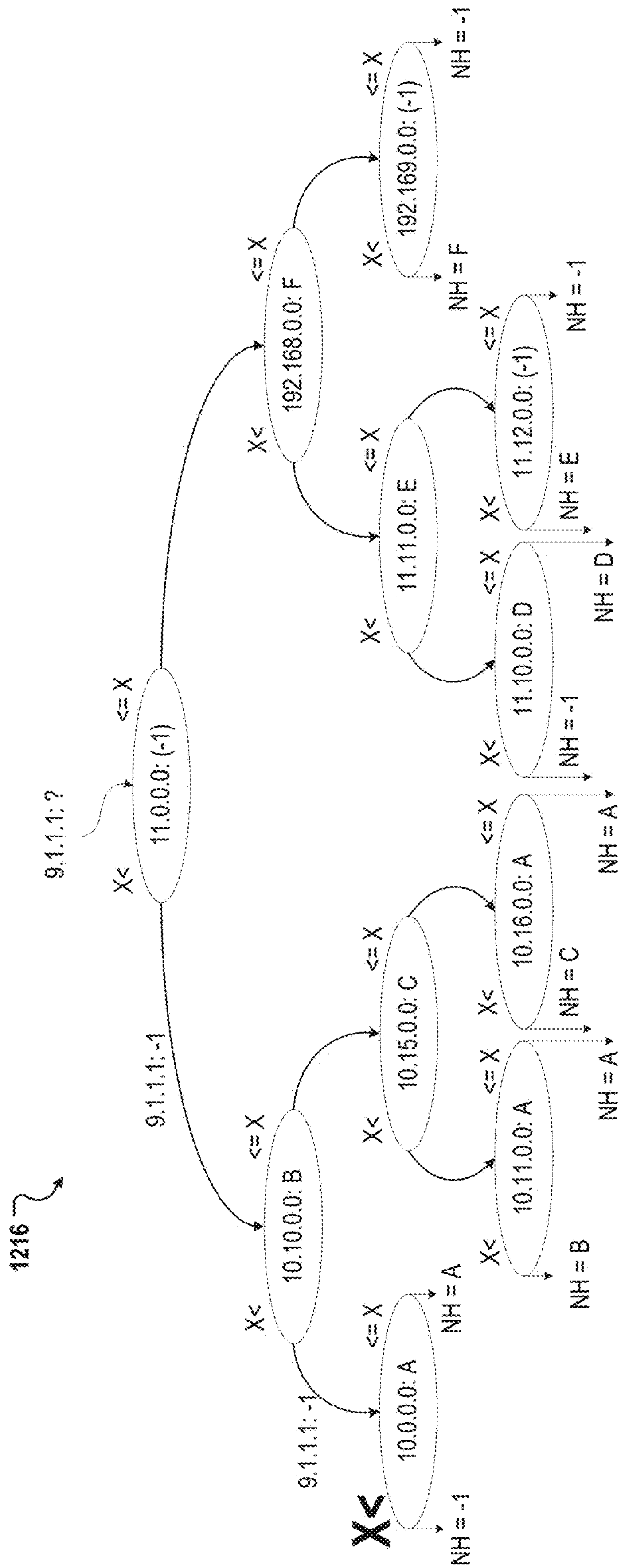
Figure 12J:
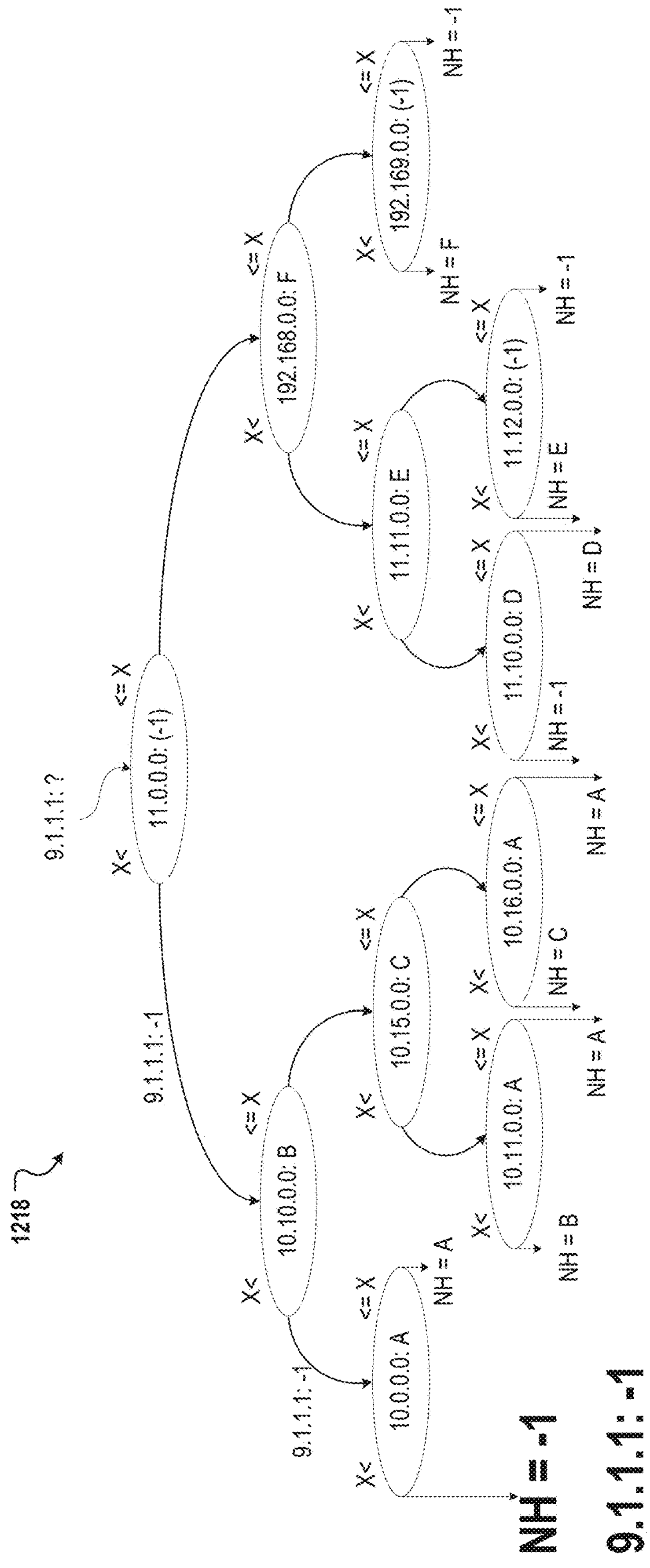
Figure 12K:
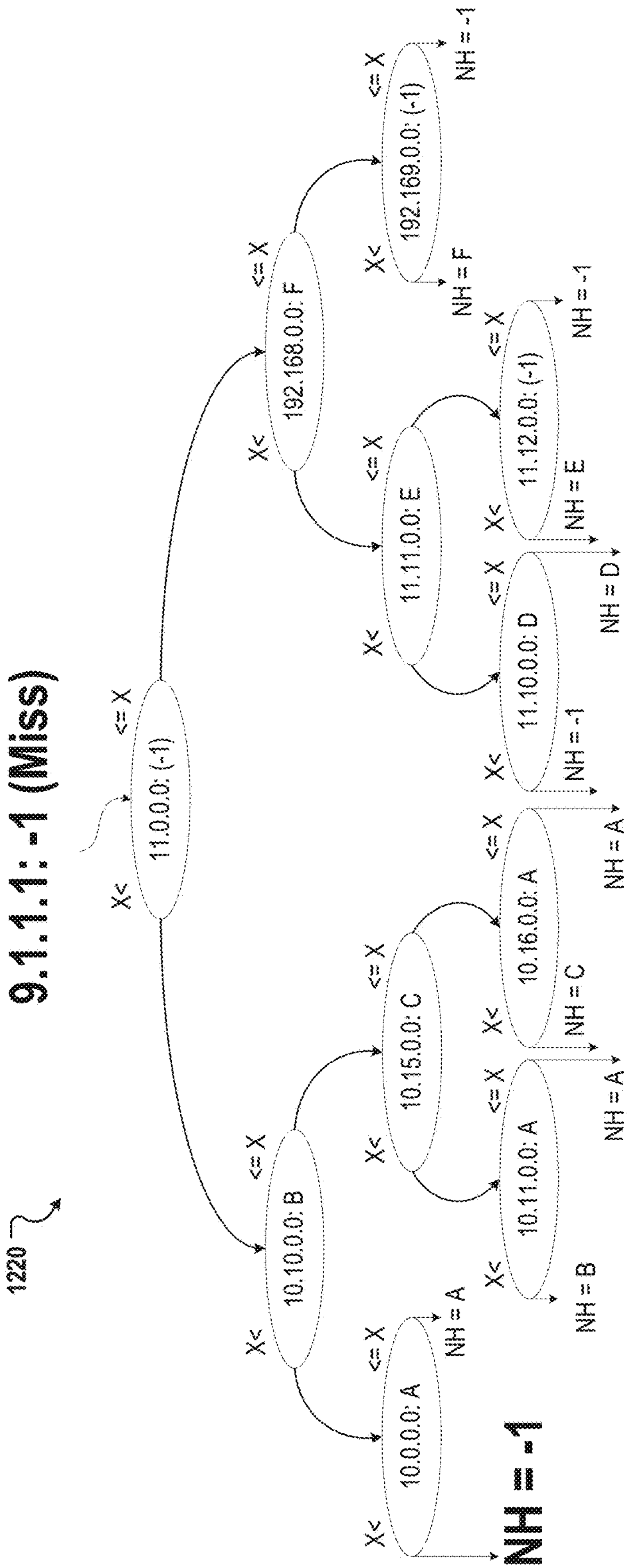

FIG. 11 depicts an example modified binary search 1100 for an address employing the example interval binary search tree 1000 where data is not stored in the interior nodes. Unlike a regular binary search, the example modified binary search 1000 does not stop when the value at a node is the same as the key being searched for. Instead, it traverses to the right child when a key is greater than or equal to the value in the node. Otherwise (when the key is less than the value in the node), the search traverses to the left child. In some embodiments, a modified binary search employed by the described system “picks up” data from a node only when the search moves in a configured direction (e.g., when the search goes right the current data is replace with the data stored at that node). In some embodiments, the result of the modified binary search is determined once search reaches and processes a leaf node.

An example modified binary search employed by the described system may be executed according to the following, where x is the key being searched for, and value(node) and nh(node) are the interval value and the corresponding next hop data stored at the node. NH is the accumulated next hop, which is initialized to the default next hop and will hold the correct next hop result for the search key when the search terminates:

```
At each node starting with root:
if (x<value(node)) then
  Go left;
else
  NH=nh(node);
  Go right;
endif
```

FIGS. 12A-12K depict a series of incremental steps 1200-1220 respectively for an example modified binary search for an incoming address of 9.1.1.1 that can be performed on the example interval binary search tree 1000 within the described system. This lookup results in a lookup miss, and the default next hop (−1) is preserved through the search and is correctly returned at the end as the resulting next hop for the incoming address.

Figure 13A:
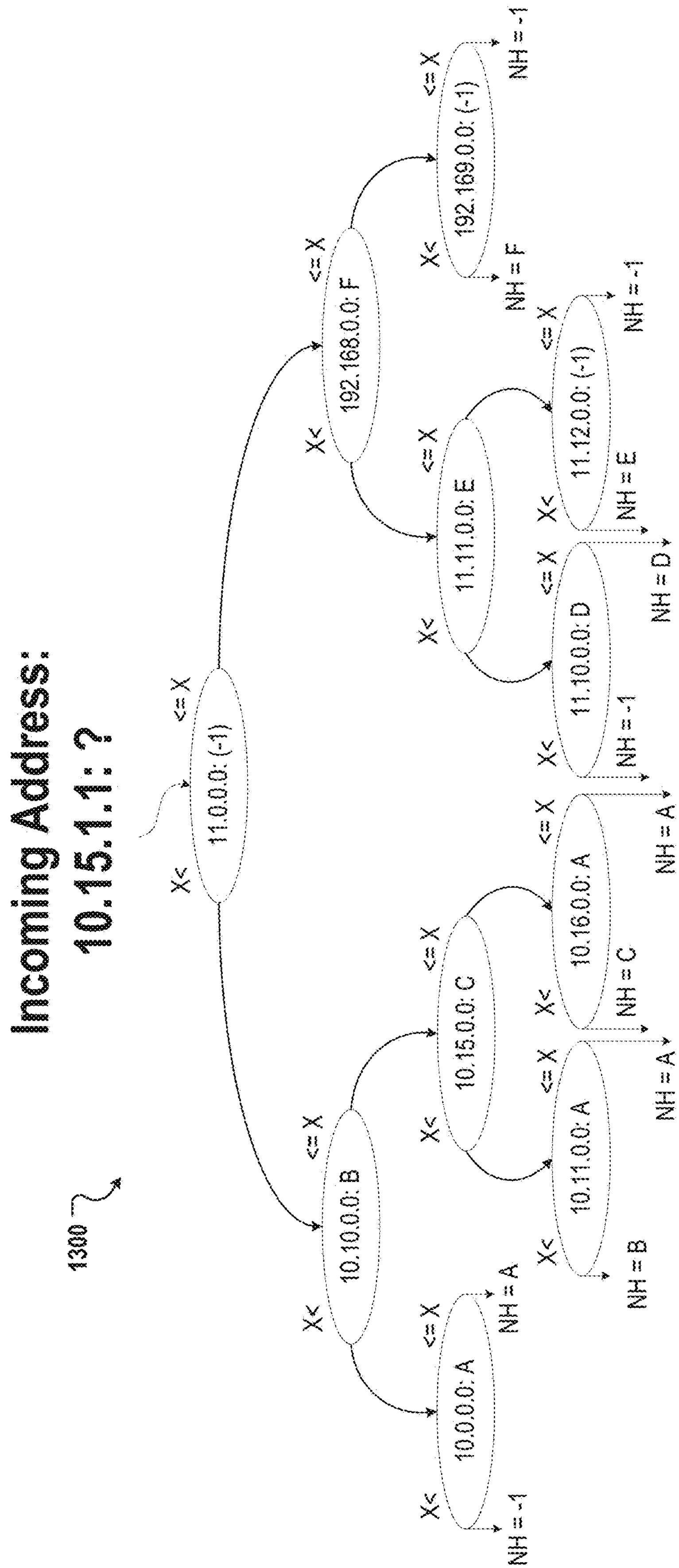
FIGS. 13A-13N depict another non-limiting series of incremental steps for an example modified binary search that can be performed on an interval binary search tree.
Figure 13B:
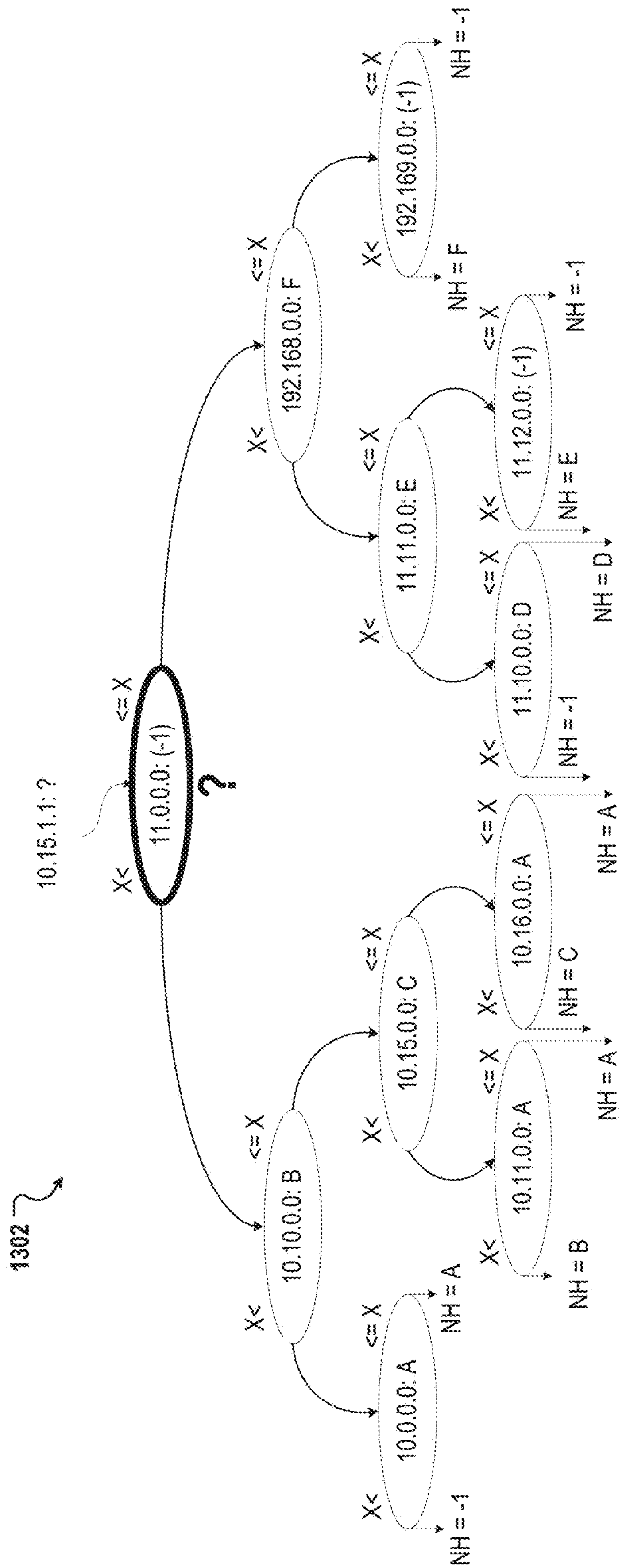
Figure 13C:
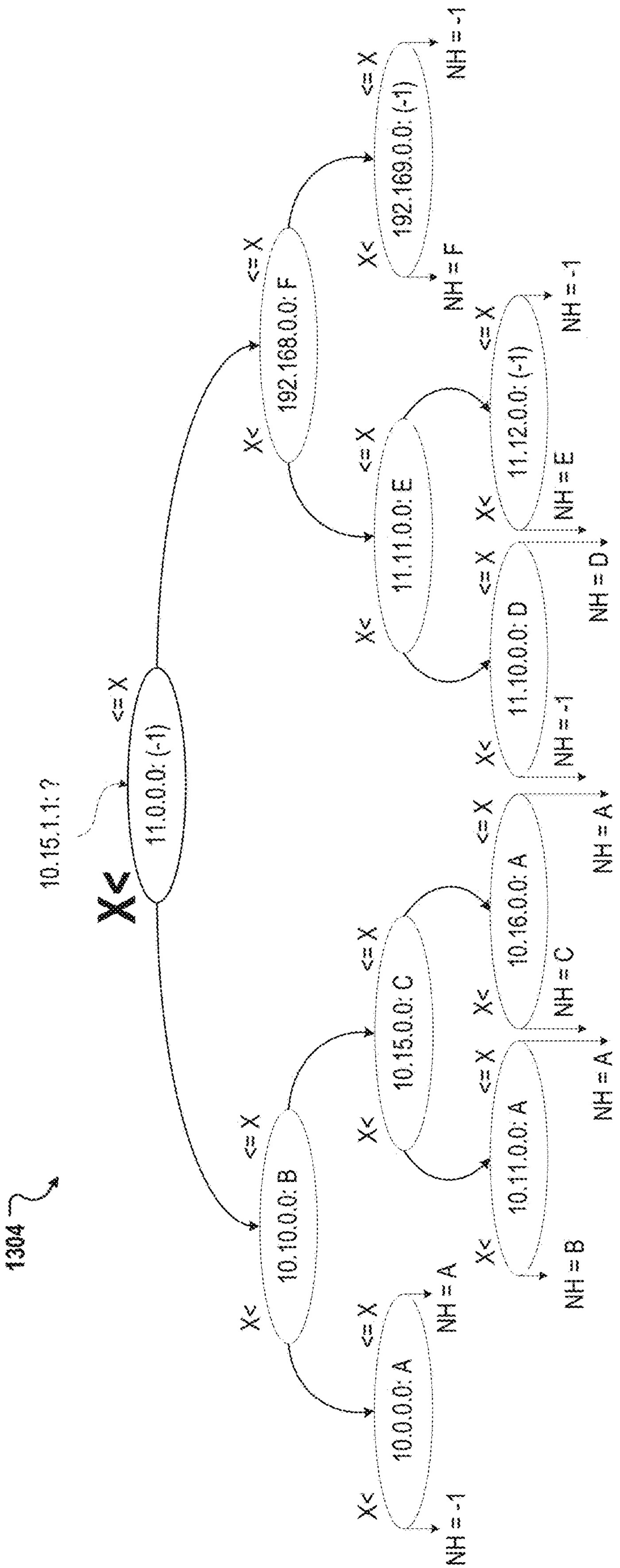
Figure 13D:
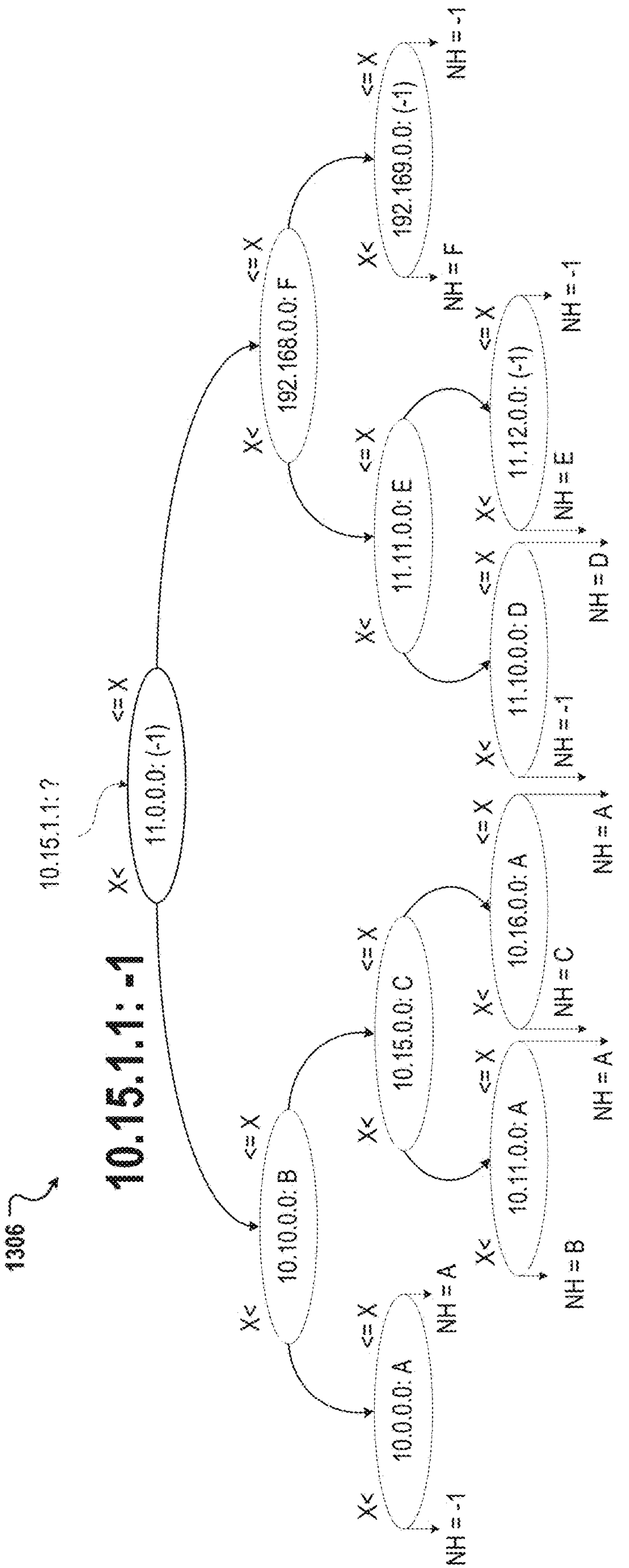
Figure 13E:
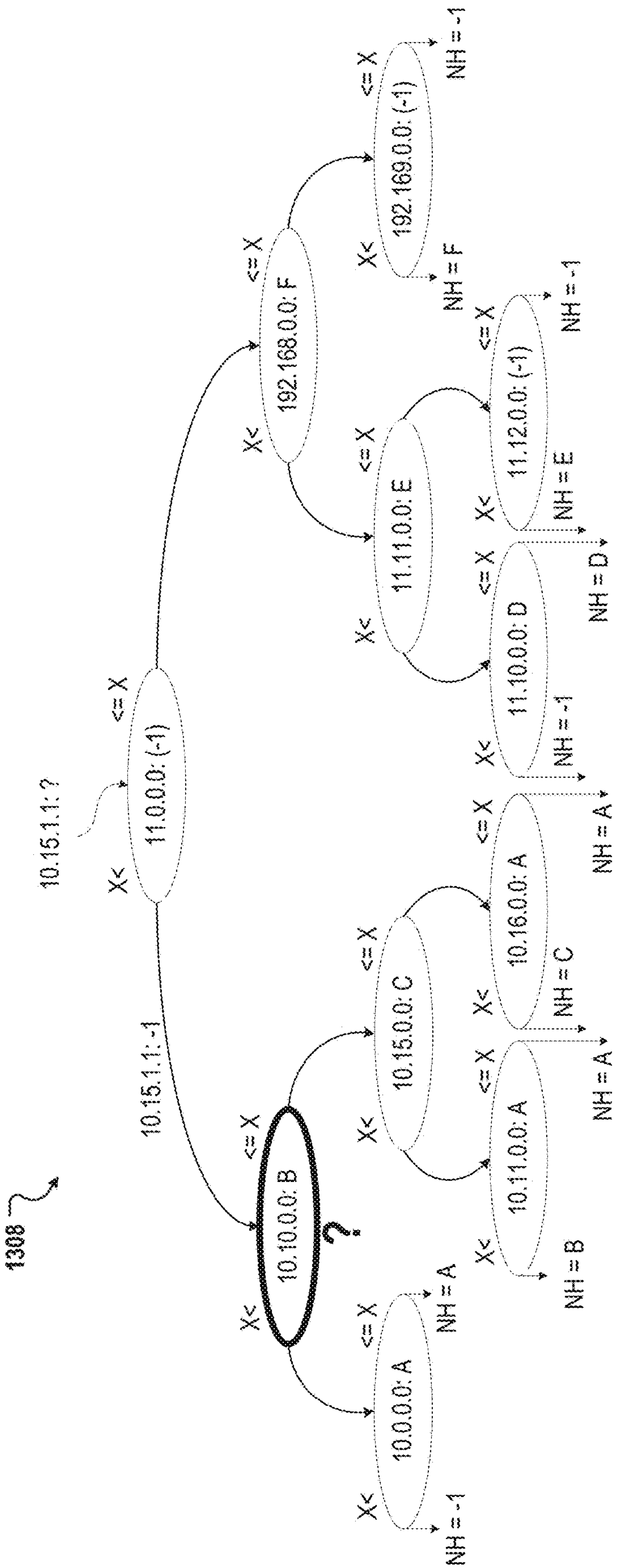
Figure 13F:
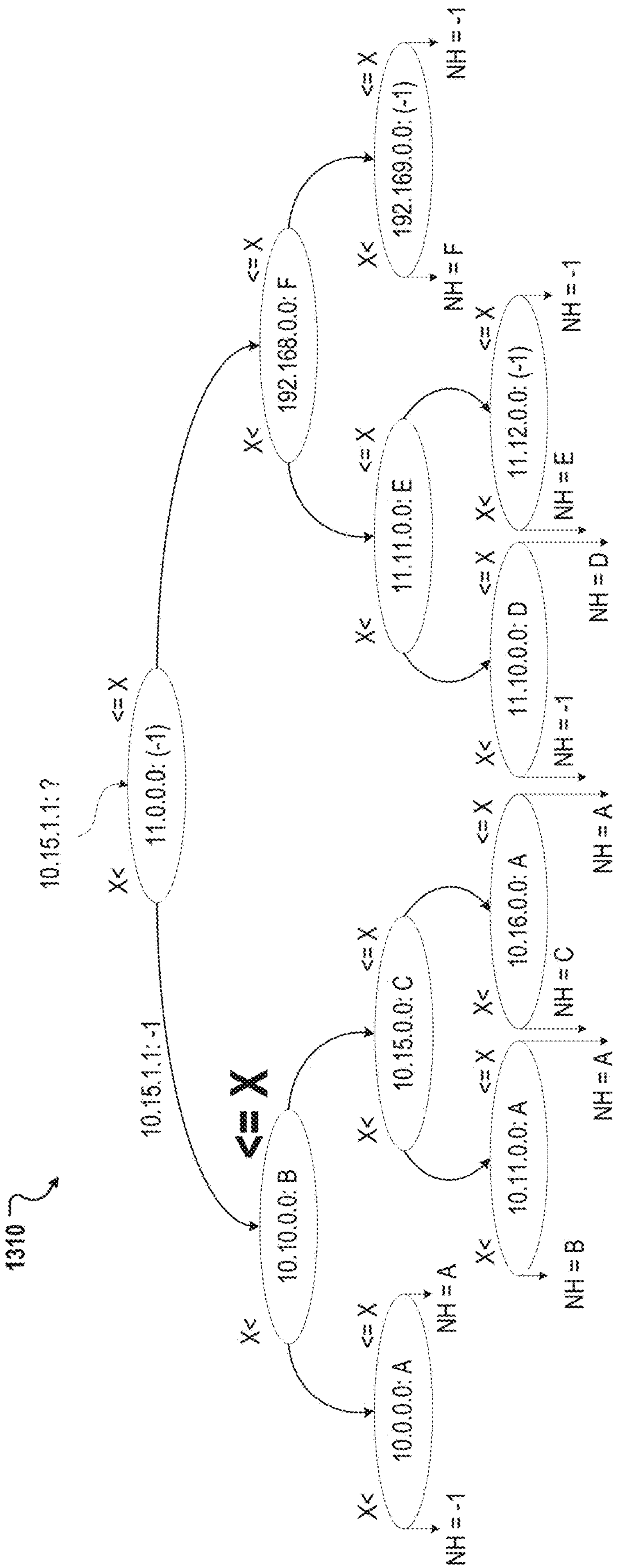
Figure 13G:
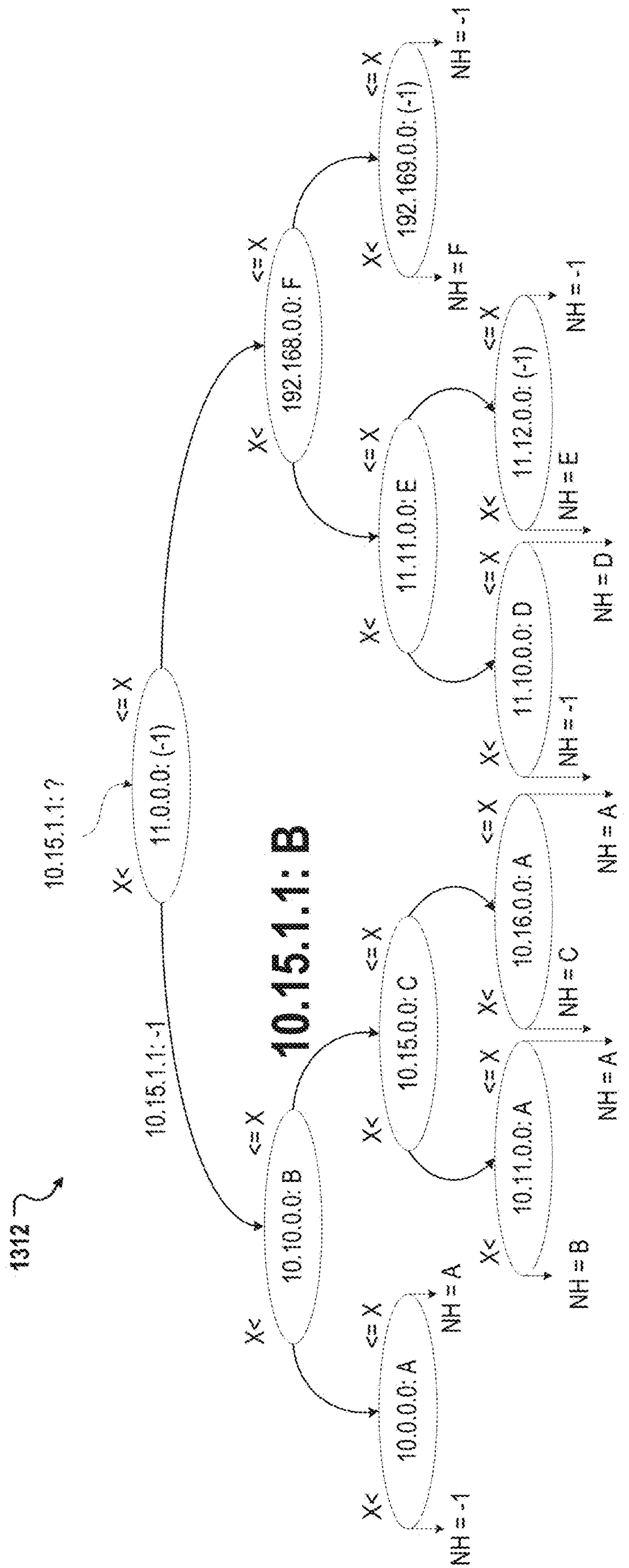
Figure 13H:
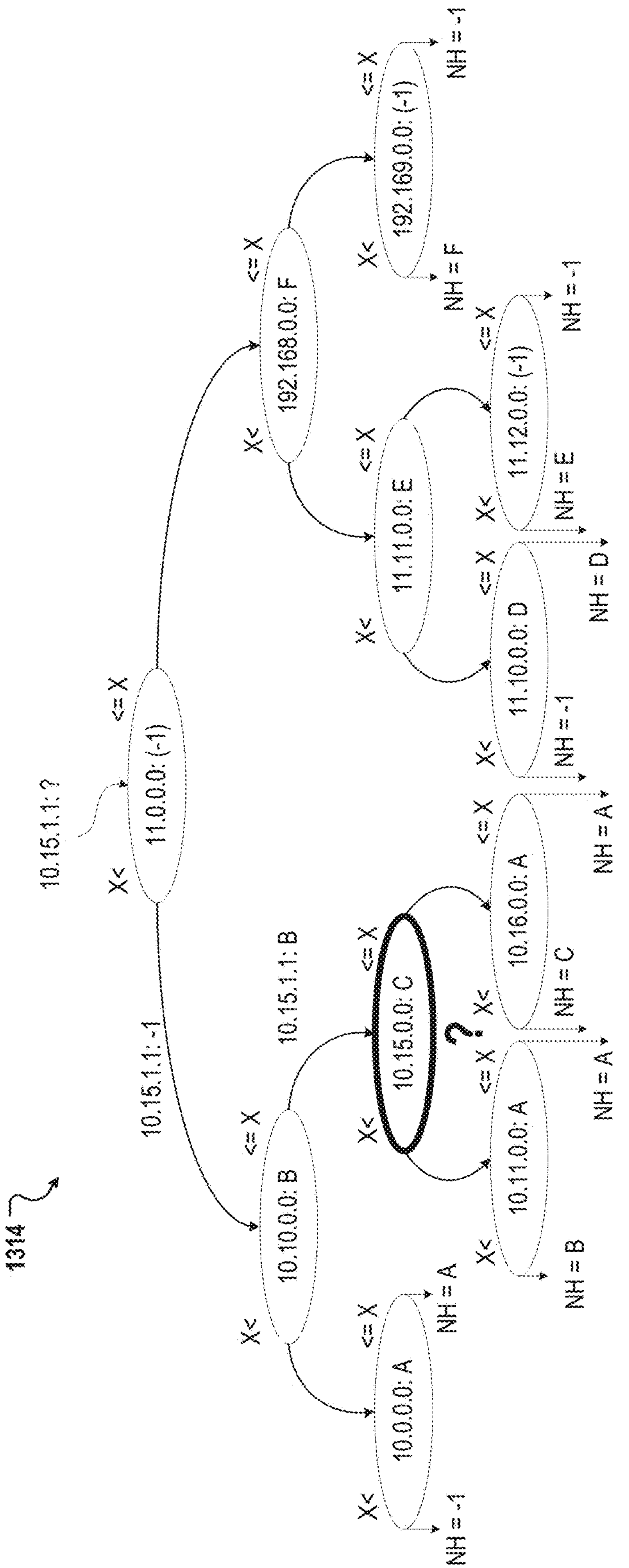
Figure 13I:
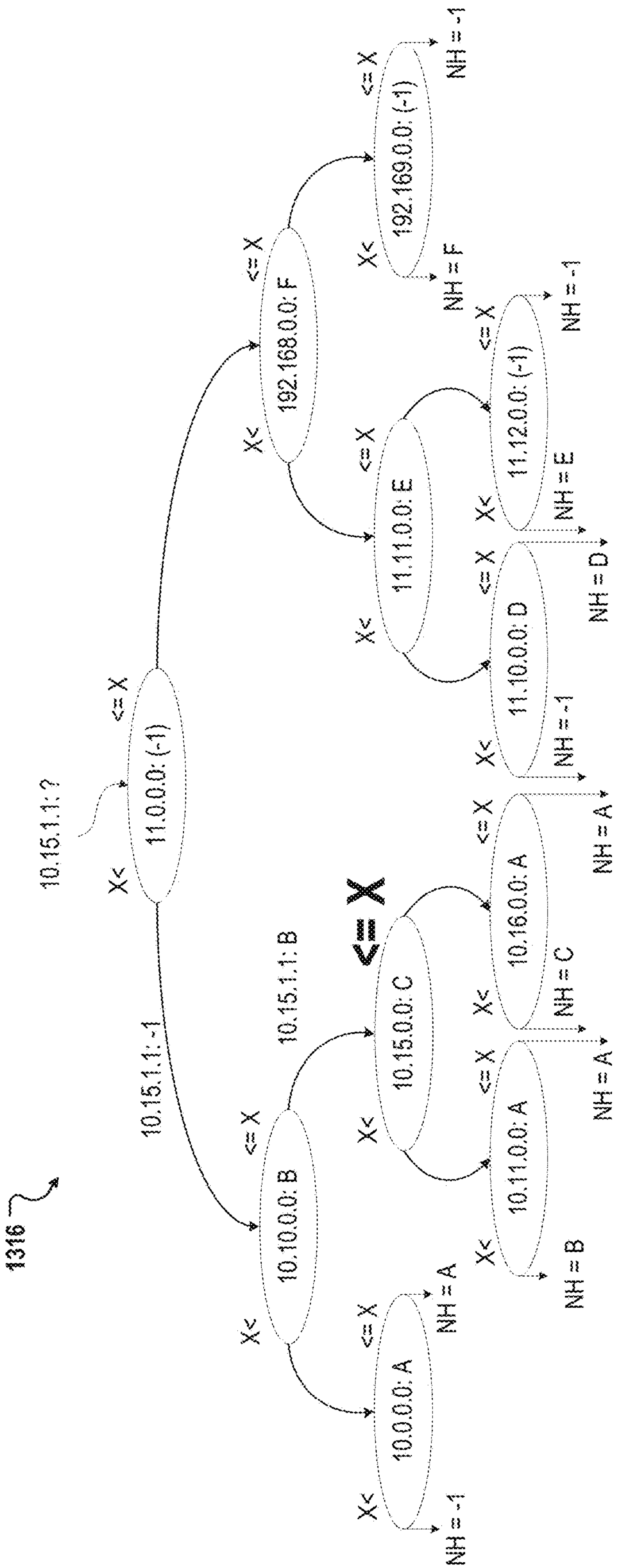
Figure 13J:
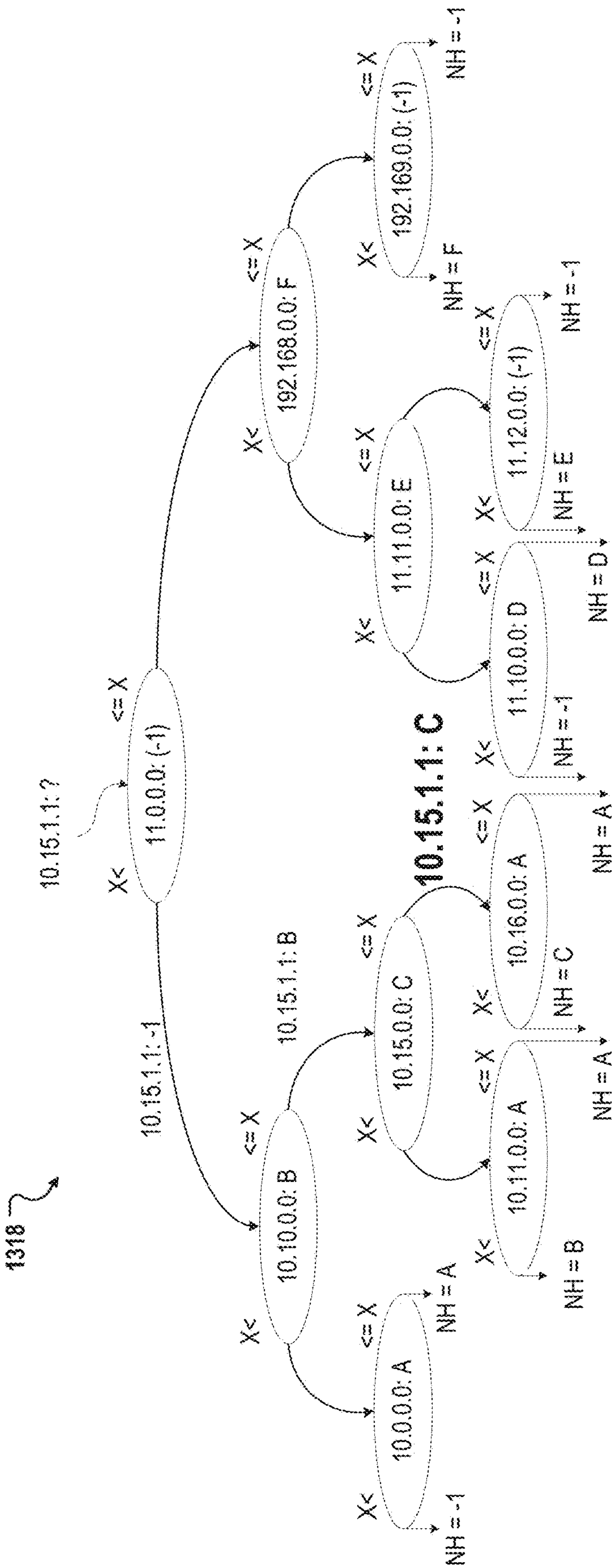
Figure 13K:
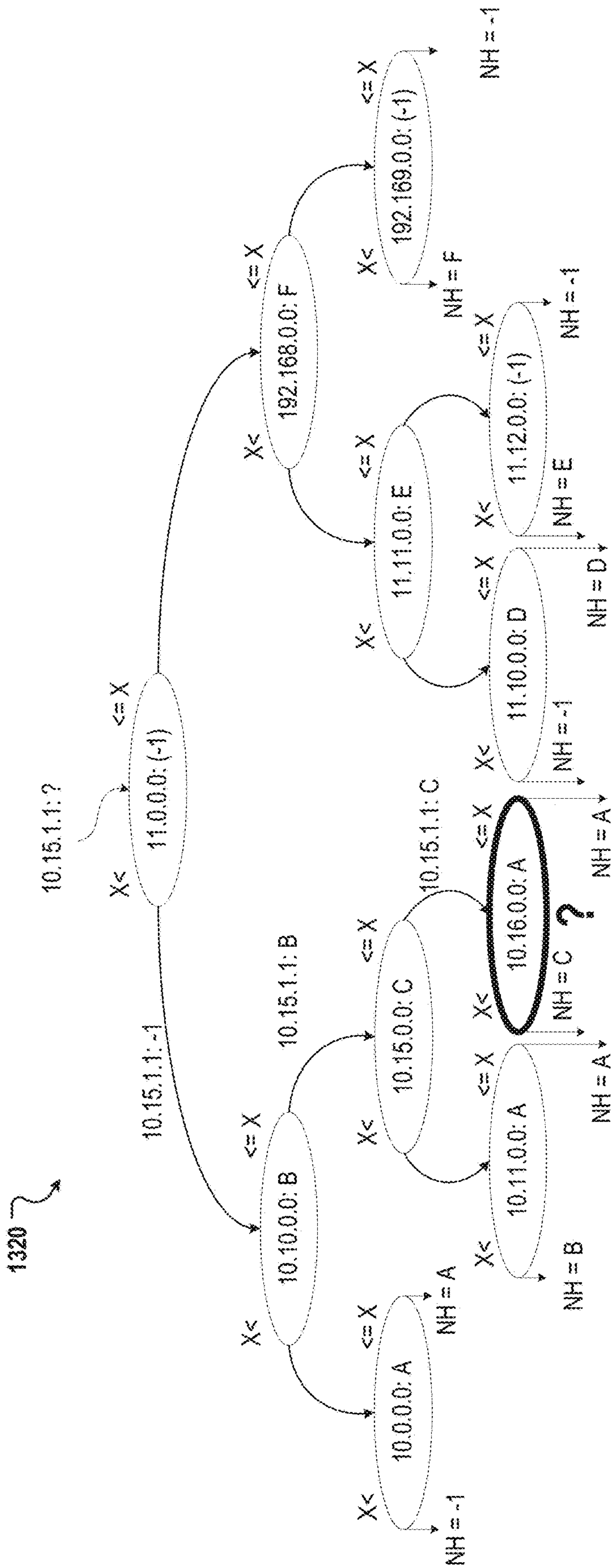
Figure 13L:
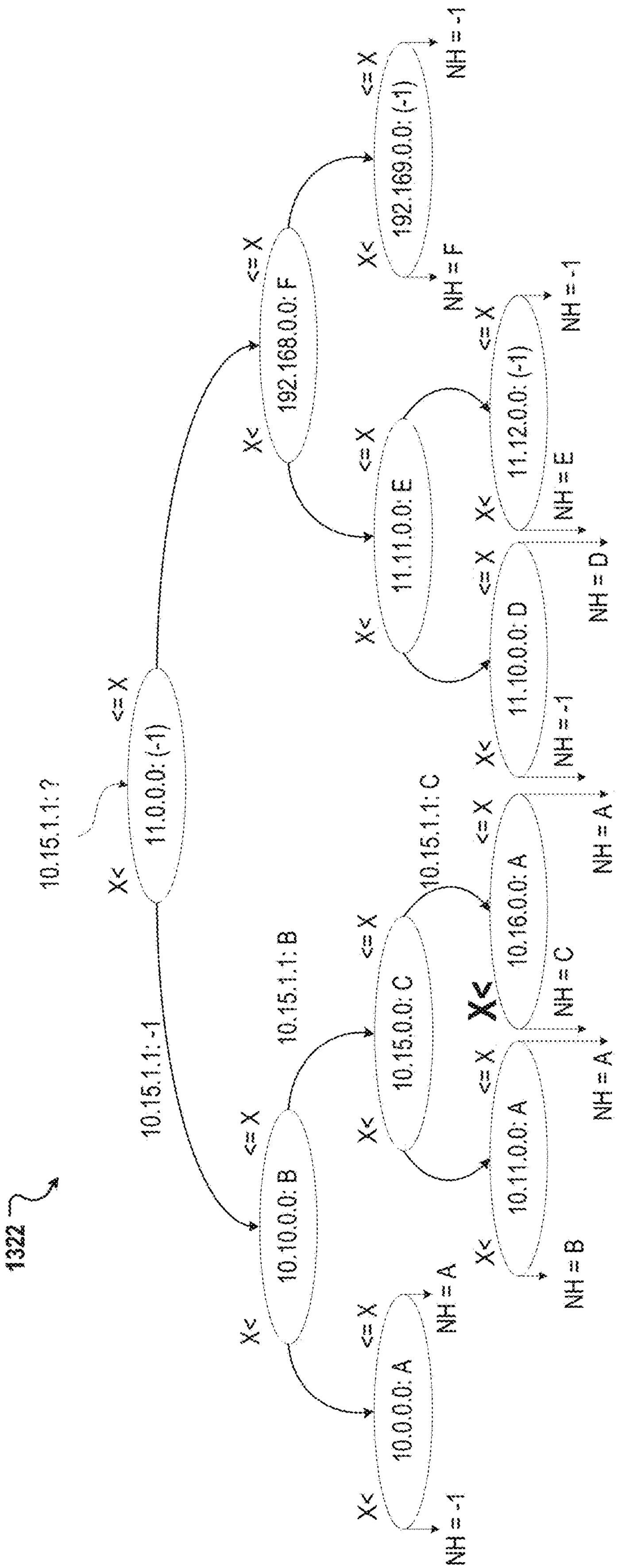
Figure 13M:
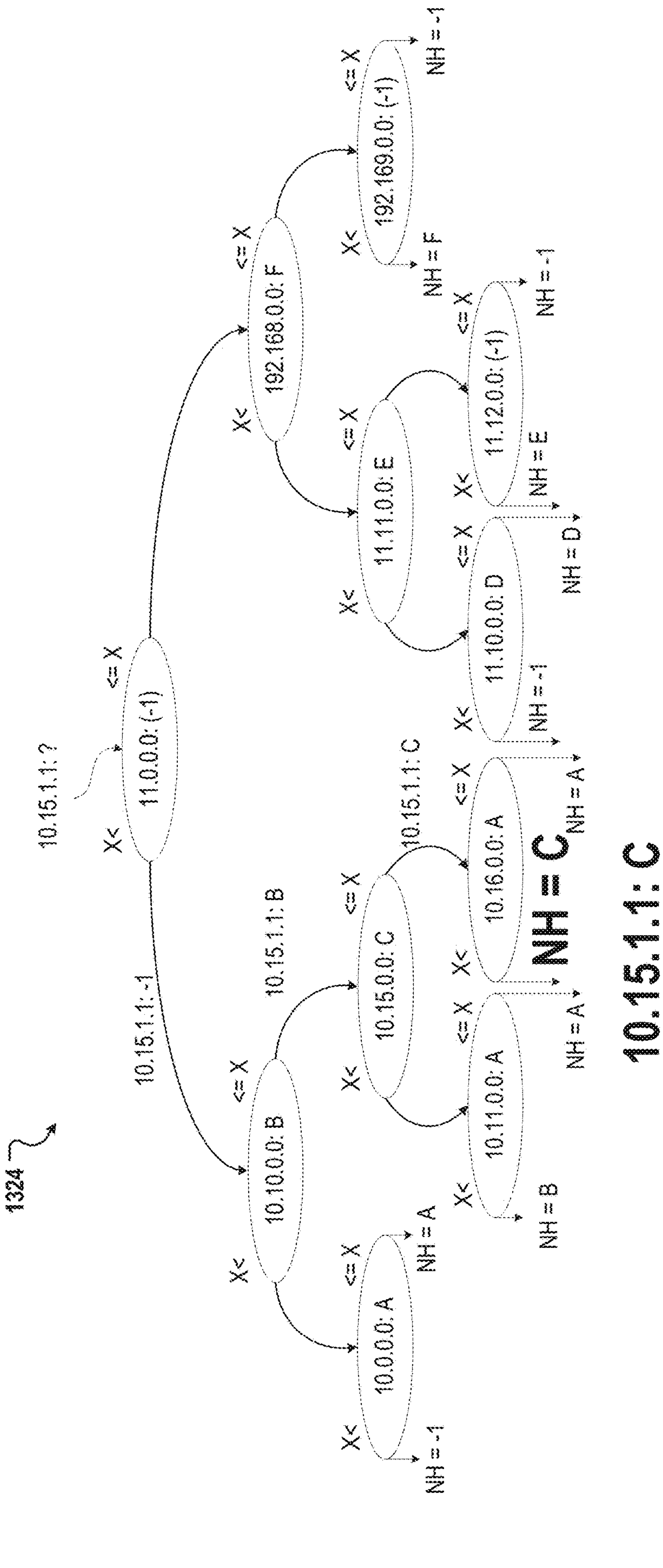
Figure 13N:
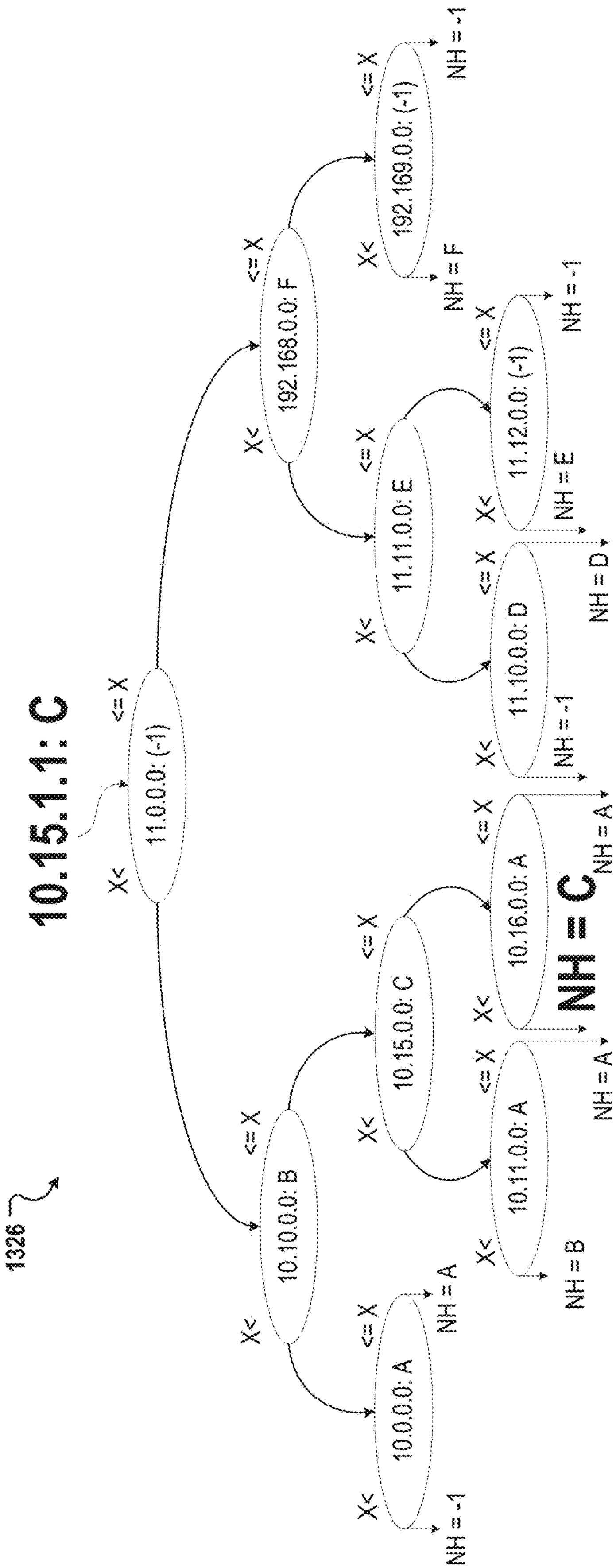
Figure 14:
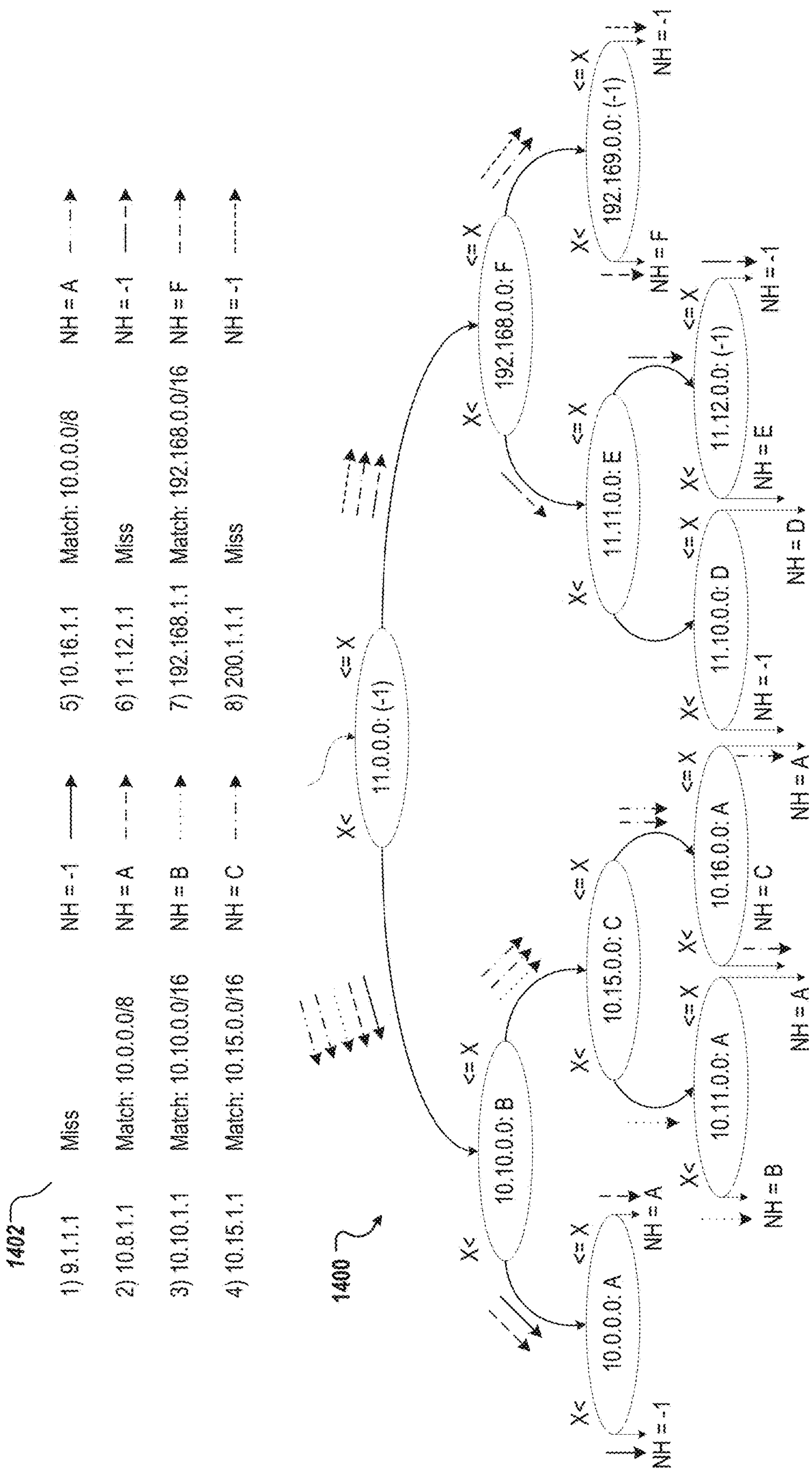
FIG. 14 depicts non-limiting example modified binary searches for various incoming addresses that can be performed on an interval binary search tree.

FIGS. 13A-13N depict a series of incremental steps 1300-1326 respectively for an example modified binary search for an incoming address of 10.15.1.1 that can be performed on the example interval binary search tree 1000 within the described system. This lookup results in a match with the prefix 10.15.0.0/16, and the correct next hop C is returned at the end as the resulting next hop for the incoming address FIG. 14 depicts example modified binary searches 1400 for various incoming addresses (1-8) included in the table 1102 that can be performed on the example interval binary search tree 1000 within the described system. Each of the example modified binary searches are depicted as arrows traversing the interval binary search tree 1000. The depicted example modified binary searches 1100 show the path taken to traverse the binary search tree 1000. Note: element 1 of the table 1402 is the incoming addresses 9.1.1.1, which modified binary search steps traversing the interval binary search tree 1000 are also depicted in FIGS. 12A-12K; and element 4 of the table 1402 is the incoming address 10.15.0.0, which modified binary search steps traversing the interval binary search tree 1000 are also depicted in FIGS. 13A-13N.

Pensando Tree

Figure 15A:
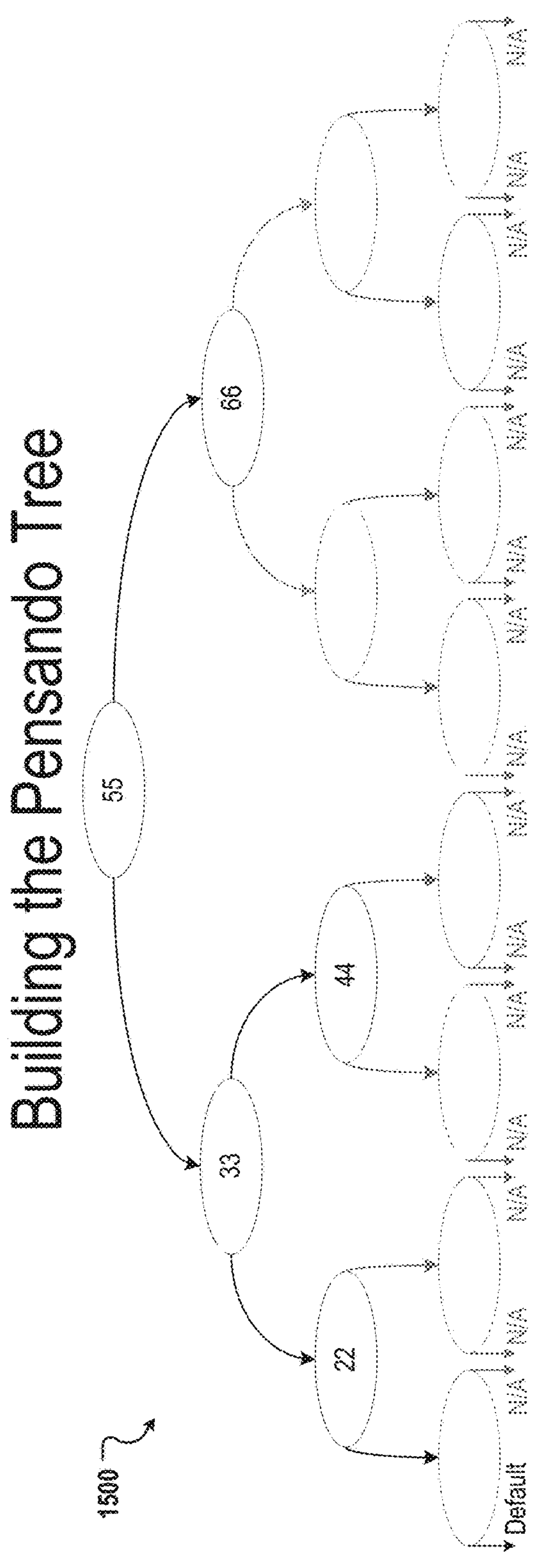
FIGS. 15A-15C depict a series of trees that highlight some of the issues with storing an interval binary search tree where data is not stored in the interior nodes.
Figure 15B:
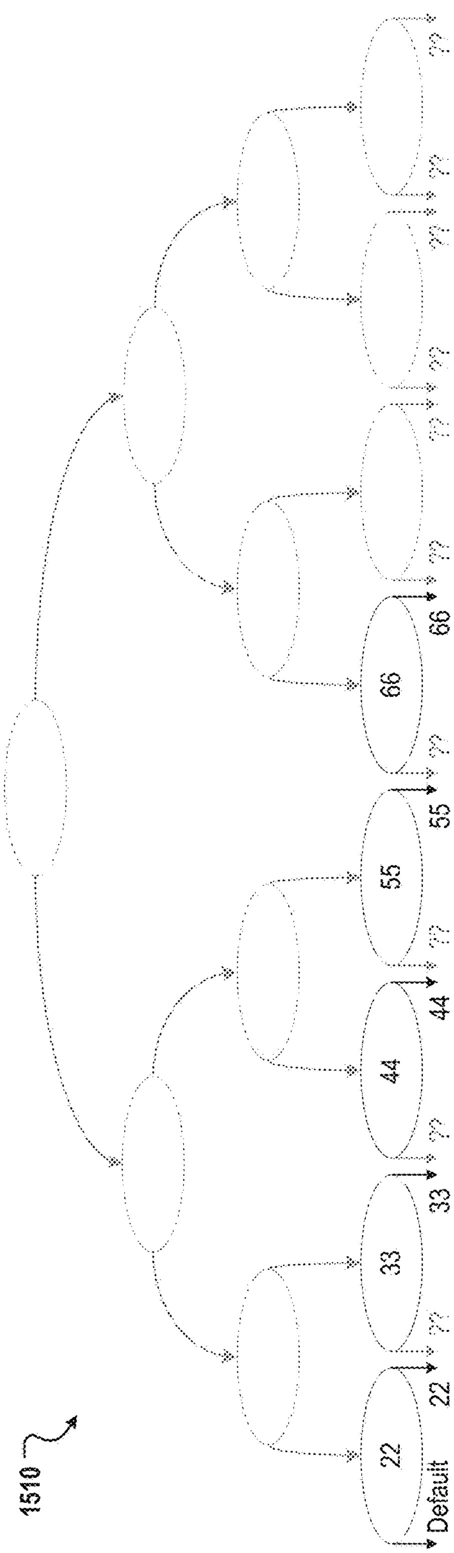
Figure 15C:
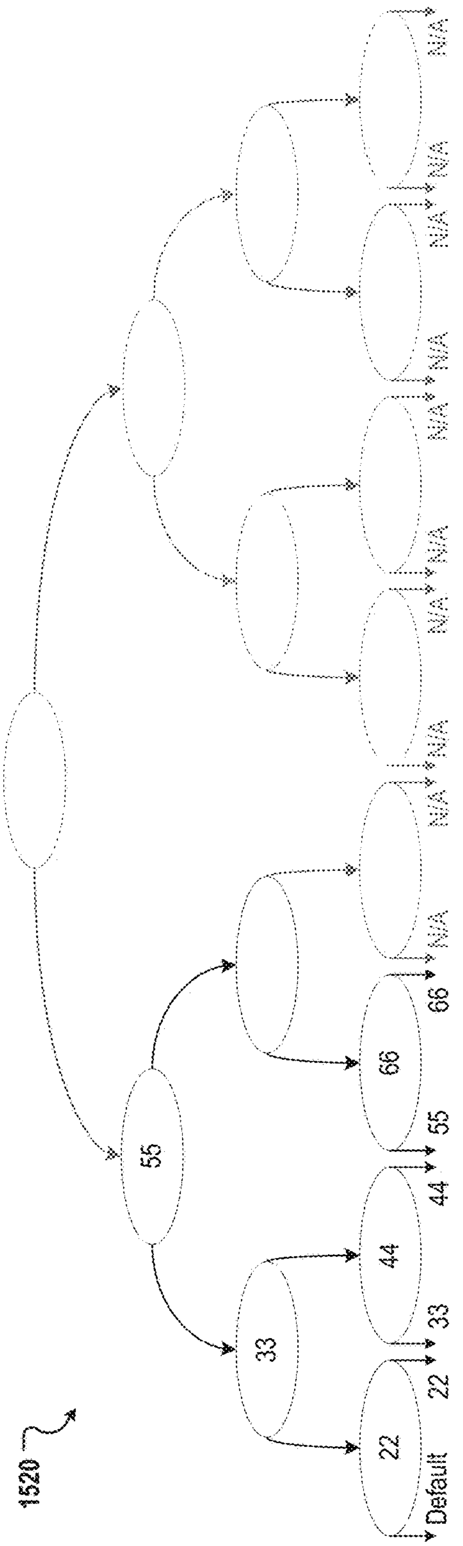
Figure 15D:
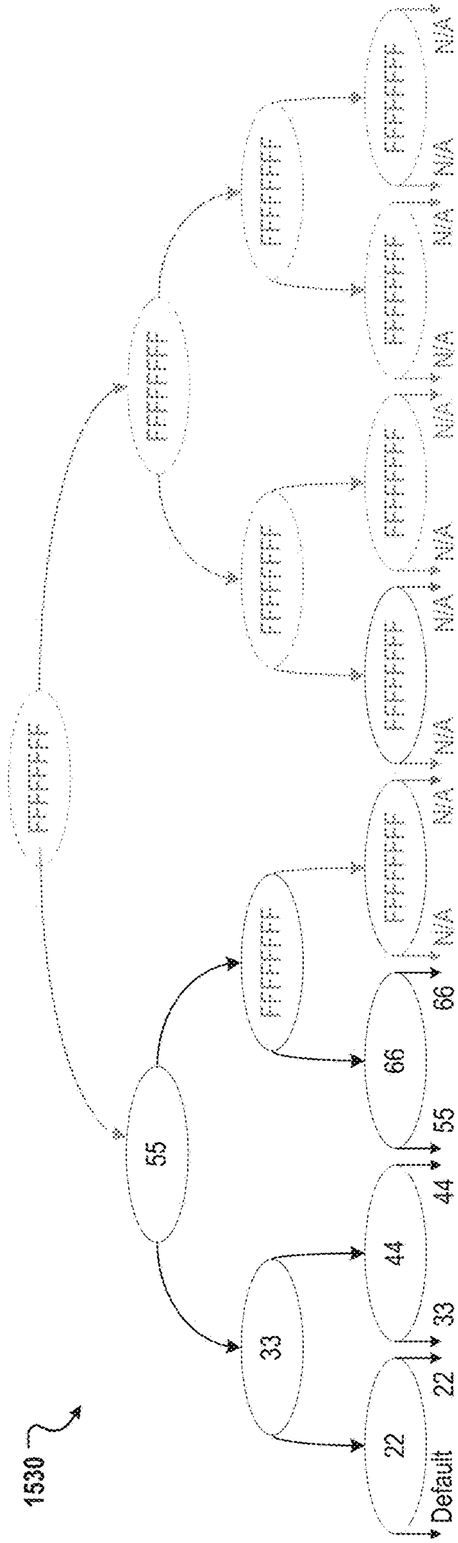
FIG. 15D depicts an example Pensando Tree that can be employed to store an interval binary search tree where data is not stored in the interior nodes.

Employing an interval binary search tree in the data plane hardware introduces additional constraints. For example, in some embodiments, the tree is implemented in memory that is pre-allocated for the maximum scale, and a unique and predetermined root node from which to start the search is included. These constraints present additional complexities for the search of a partially filled tree when the result data is not stored in the interior nodes. FIGS. 15A-15C depict a series of trees 1500-1520 respectively that highlight some issues associated with searching a partially filled interval binary search tree when data is not stored in the interior nodes. In some embodiments, a Pensando Tree is employed by the described system to overcome these issues. In some embodiments, a Pensando tree is a completely filled binary tree whose nodes are initialized with some MAX value, and whose valid (non MAX value) nodes are populated in-order (e.g., left to right) and exhibit the BST property. FIG. 15D depicts an example Pensando Tree 1530, which, in some embodiments, is employed by the described system to store the interval binary search tree. In some embodiments, building a Pensando Tree, such as Pensando Tree 1530, based on an interval binary search tree where data is not stored in the interior nodes corresponds to step 610 described in FIG. 6.

The example tree 1500 depicted in FIG. 15A, shows that when a tree has only a few nodes, there may not be any nodes in the last stage of the tree. In such an example, there is no place to store the result data (e.g., because the exterior nodes are the only place to store data and are not valid). Thus, such an example would require additional processing to fix this issue.

The example tree 1510 depicted in FIG. 15B, shows a result if the tree was built from the bottom up. In such an example, when the tree that is built from the bottom up is not full, then there are not enough nodes to fill up to the root. In such examples, multiple disjoint trees would be produced, and in some embodiments, the described system requires a unique and predetermined root from which to start a search.

The example tree 1520 depicted in FIG. 15C, shows a result if the tree was built, in order, from left to right. In such an example, when the resulting tree could still be disconnected from the root. In such examples, invalid (e.g., empty) nodes could result along a search path resulting in an invalid search.

The example Pensando Tree 1520 depicted in FIG. 15D includes 15 nodes with only 5 nodes populated with valid values; however, the example system can generate and employ a Pensando Tree with any number of nodes as required. In some embodiments, building a Pensando Tree includes initializing the tree nodes to a MAX_VALUE. For example, 0xFFFFFFFF for 32b keys. In some embodiments, the valid values are added to the tree from left to right (in order) and exhibit BST property among themselves. This tree could potentially leave the valid nodes disconnected from the root and could potentially have one or more MAX_VALUE nodes along the search path. Also, this tree, as a whole, may violate the property of a binary search tree as it may have multiple nodes with MAX_VALUE in the tree. However, with the Pensando Tree, the search can always start from the root node and will correctly be guided to the portion of the tree that is holding the valid values, search through the valid and MAX_VALUE nodes alike, and always yield the correct result.

By employing a Pensando Tree, such as the example Pensando Tree 1520, the memory can be pre allocated and the system programmed to always search until a leaf node is processed, thus providing no performance penalty for searching the tree (e.g., in hardware). However, in some embodiments the tree must be built efficiently for scale. For example, in linear time O(n) instead of O(n log n) achieved for in order tree building.

Memory Implementation

Figure 16:
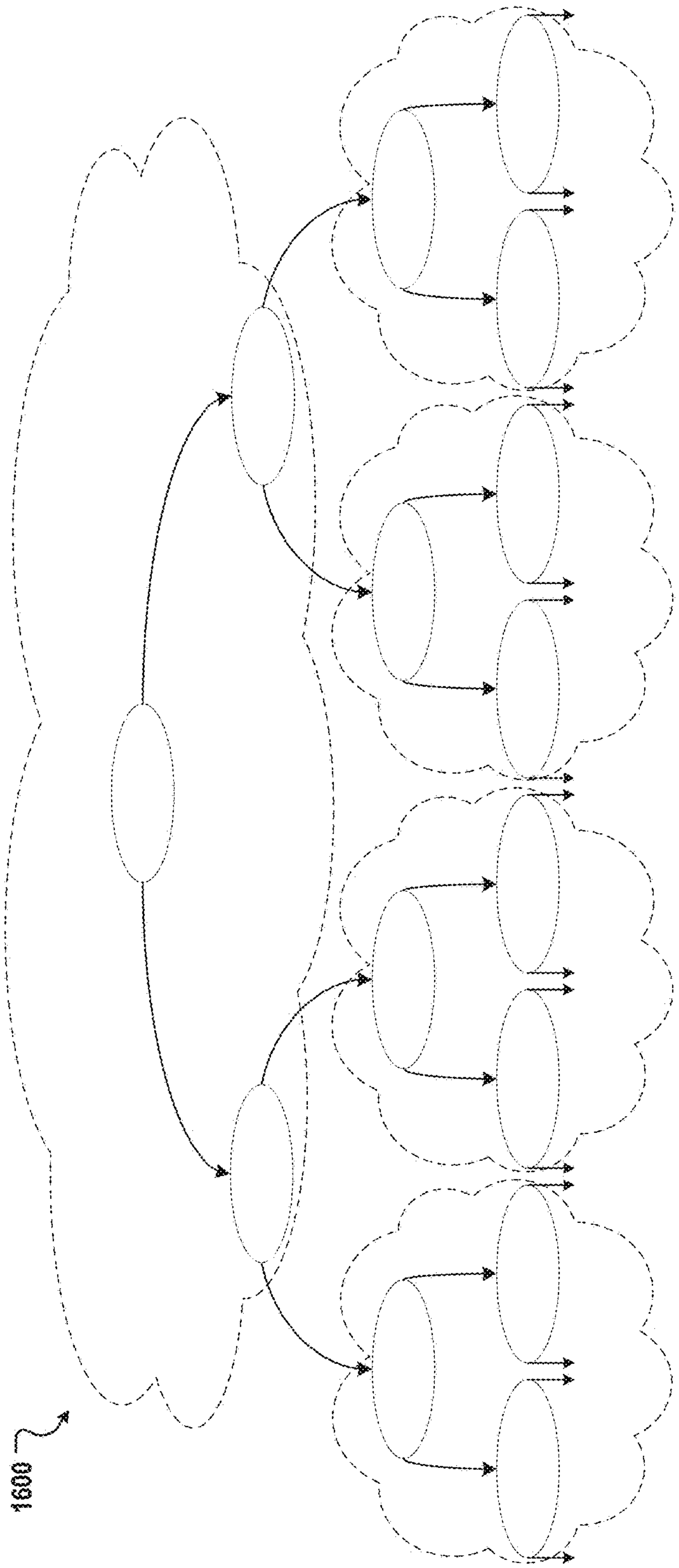
FIG. 16 depicts an example where an example Pensando Tree is divided it into subtrees each having some levels of the tree.

The efficient tree building is accomplished by the described system in step 612 of the example process depicted in FIG. 6 where multiple levels of the Pensando Tree are compressed into cache-lines based on a stage from which it will be accessed. FIG. 16 depicts an example 1600, where an example Pensando Tree is divided it into subtrees each having some levels of the tree. In some embodiments, each subtree is assembled into a 512b cache-line where the number of levels in each subtree is determined by the key width and whether last stage or not. For 16b keys, five levels are employed for non-last stages, and four levels are employed for last stage. For 32b key, four levels are employed for non-last stage, and three levels are employed for last stage (see FIGS. 18B-18E). For 64b keys, three levels are employed for non-last stage, and two levels for last stage (see FIGS. 19B-19E). For 128b keys, two levels are employed for non-last stage, and one level is employed for last stage (see FIGS. 20B-20E).

Figure 17:
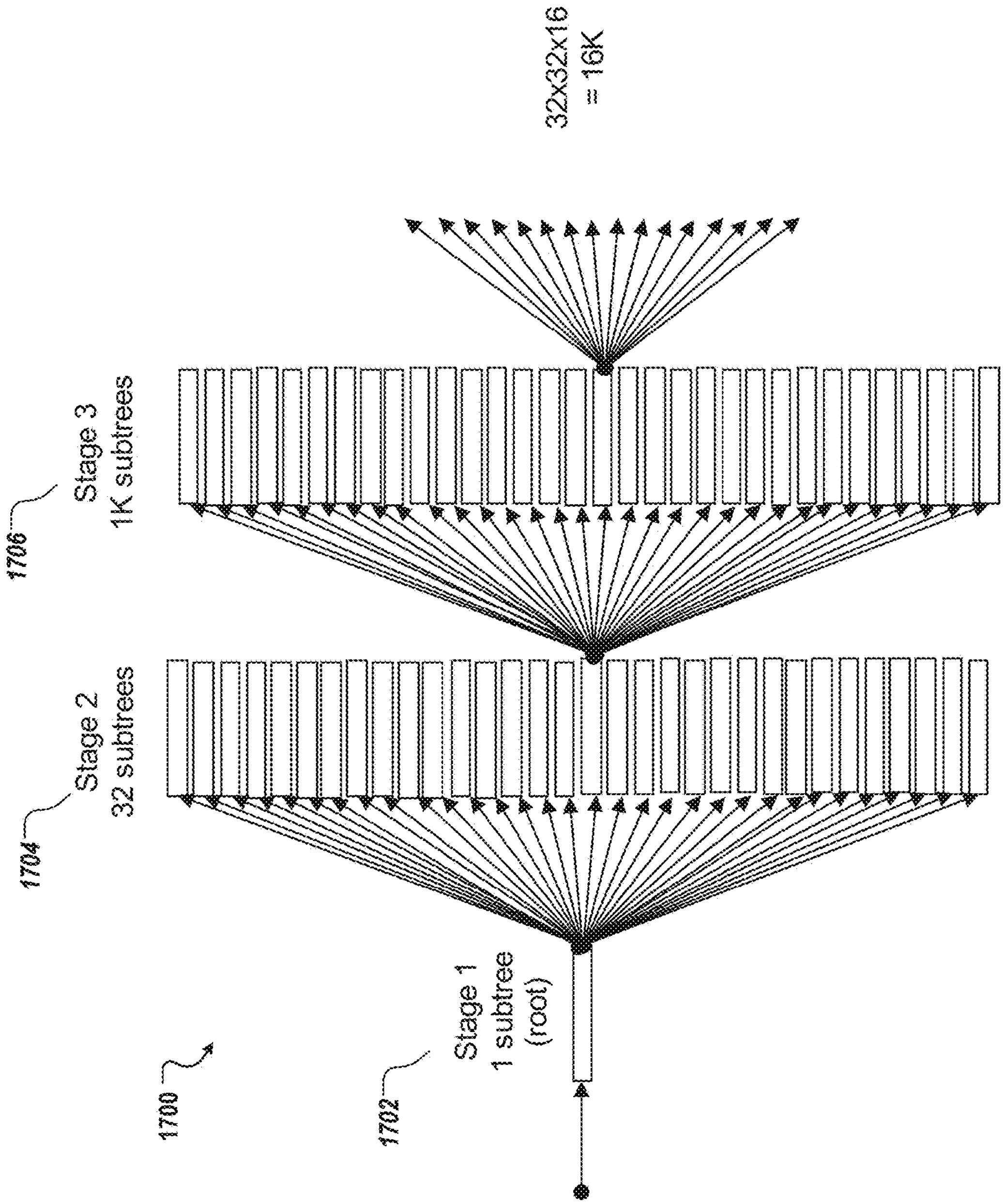
FIG. 17 depicts a non-limiting exemplary memory implementation that can be employed by the described system for Port Range (16b) LPM for 8K scale.

FIG. 17 depicts an example memory implementation 1700 that can be employed by the described system for a Port Range (16b) LPM for 8K scale implementation. The depicted implementation 1700 is spread over three stages (1702, 1704, and 1706) where each rectangle represents a 64B (512b) cache line that holds one subtree from the set of all subtrees at that respective level that can be processed by the stage at wire speed. As depicted, stages 1 1702 and 2 1704 use five level subtrees, of 31 nodes each, which provides a 32-way expansion at those stages. As depicted, stage 3 1706 is employed to store leaf nodes which store data in addition to the keys in the cache-line so only half as many nodes can be packed as the previous stages. As such, stage 3 1706 uses four level subtrees, of 15 nodes each, which provides a 16-way expansion at the last stage. The implementation 1700 provides 32×32×16=16K intervals, which accommodates 8K port ranges in the worst case.

The memory computation for 16b LPM for 8K scale depicted in FIG. 17 can be represented as:

a total memory requirement for 16b LPM for 8K scale:

=64B+(32*64B)+(1K*64B)=

67,648B

Figure 18A:
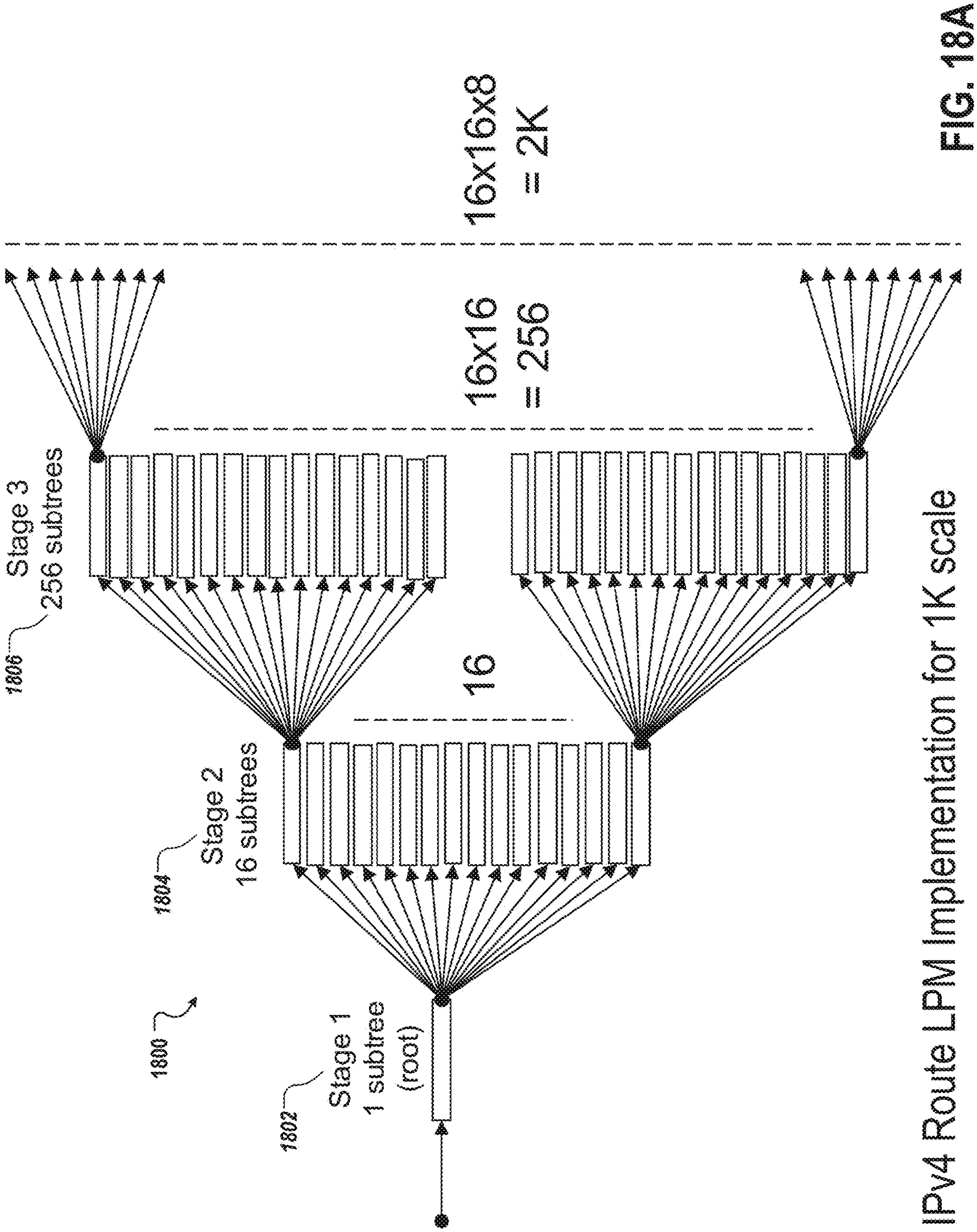
FIG. 18A depicts a non-limiting memory implementation that can be employed by the described system for IPv4 Route LPM for 1K scale.

FIG. 18A depicts an example memory implementation 1800 that can be employed by the described system for an IPv4 Route LPM for 1K (1024) scale implementation. The depicted memory implementation 1800 is spread over three stages (1802, 1804, and 1806) where each rectangle represents a 64B (512b) cache line that holds one subtree from the set of all subtrees at that respective level that can be processed by the stage at wire speed. As depicted, stages 1 1802 and 2 1804 use four level subtrees, of 15 nodes each, which provides a 16-Way expansion at those stages. As depicted, last stage 3 1806 is employed to store leaf nodes which store data in addition to the keys in the cache-line so only half as many nodes can be packed as the previous stages. As such, stage 3 1806 uses three level subtrees, of seven nodes each, which provides an eight-way expansion at the last stage. The memory implementation 1800 provides 16×16×8 or 2K intervals, which accommodates 1K prefixes in the worst case.

Figure 18B:
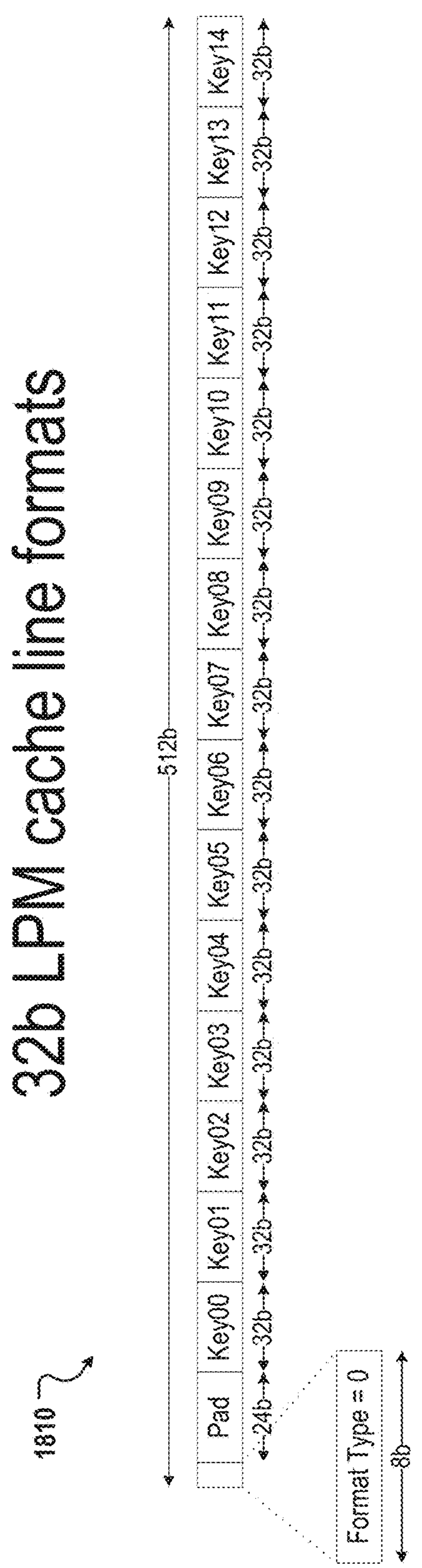
FIG. 18B depicts a non-limiting exemplary 32b LPM cache line formats.
Figure 18C:
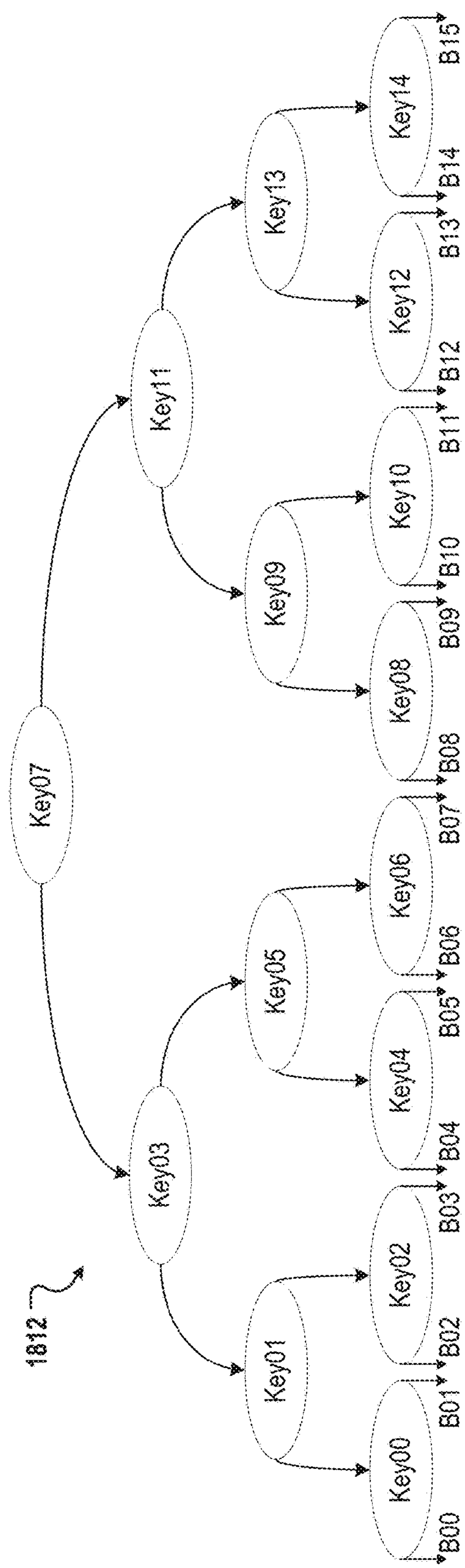
FIG. 18C depicts a non-limiting exemplary tree representation of an LPM cache line formats.

FIG. 18B depicts 32b LPM cache line formats 1810 that can be employed for the stages 1 1802 and 2 1804 depicted in FIG. 18A. As depicted, the LPM cache line formats 1810 stores 15 keys (interval values) of 32b each and no data as the data is pushed to the last stage (see FIGS. 18D and 18E). FIG. 18C depicts a tree representation 1812 that corresponds to the LPM cache line formats 1810. The tree representation 1812 provides for a 16-Way branch out at each stage with 256 branches total out of stage 2.

Figure 18D:
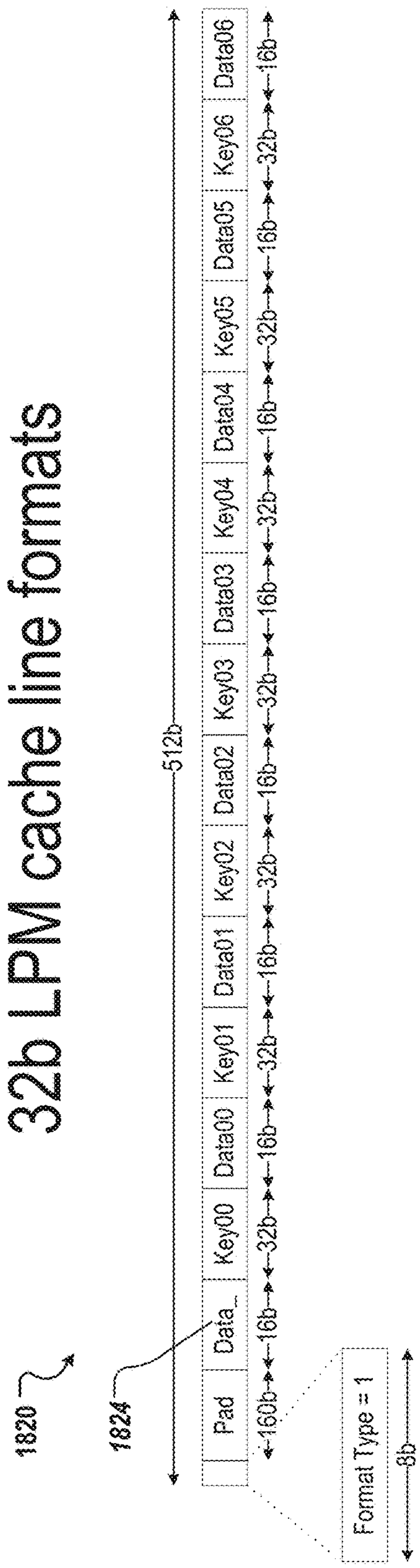
FIG. 18D depicts a non-limiting exemplary 32b LPM cache line formats.
Figure 18E:
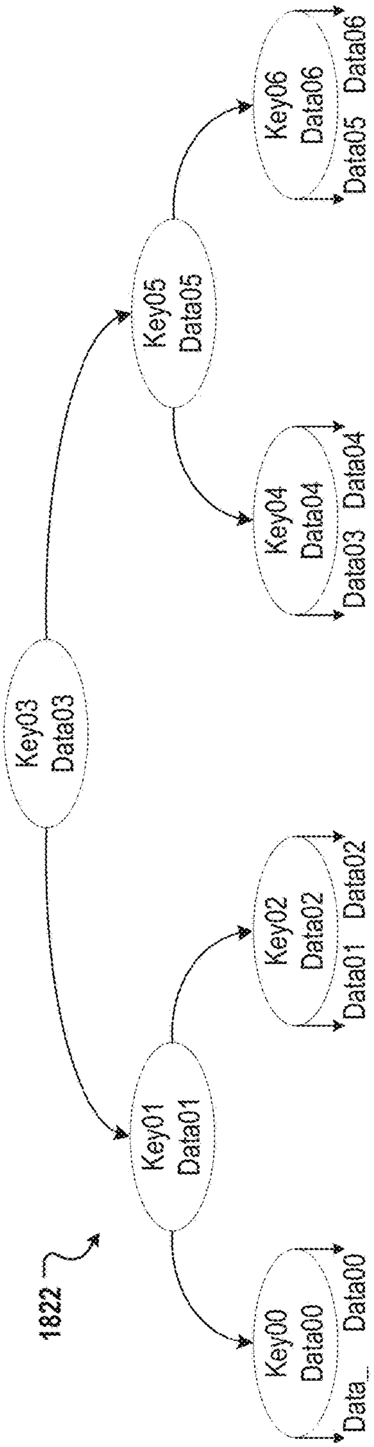
FIG. 18E depicts a non-limiting exemplary tree representation of an LPM cache line formats.

FIG. 18D depicts 32b LPM cache line formats 1820 that can be employed for stage 3 1806 depicted in FIG. 18A. As depicted, the LPM cache line formats 1820 stores seven keys and their corresponding 16b data. As depicted, an additional 16b field 1824 stores the data pushed from parent subtree. FIG. 18E depicts a tree representation 1822 that corresponds to the LPM cache line formats 1820. The tree representation 1822 provides for an 8-Way branch out at stage 3 1806. The 256×8 gives 2K decisions total for the LPM, which supports the resolution of 1K prefixes.

The memory computation for 32b LPM for 1K scale depicted in FIGS. 18A-18E can be represented as:

A total memory requirement for 1K IPv4 scale:

=mem usage(stage1)+mem usage(stage2)+mem usage (stage3)=

64B+(16*64B)+(256*64B)=

Figure 19A:
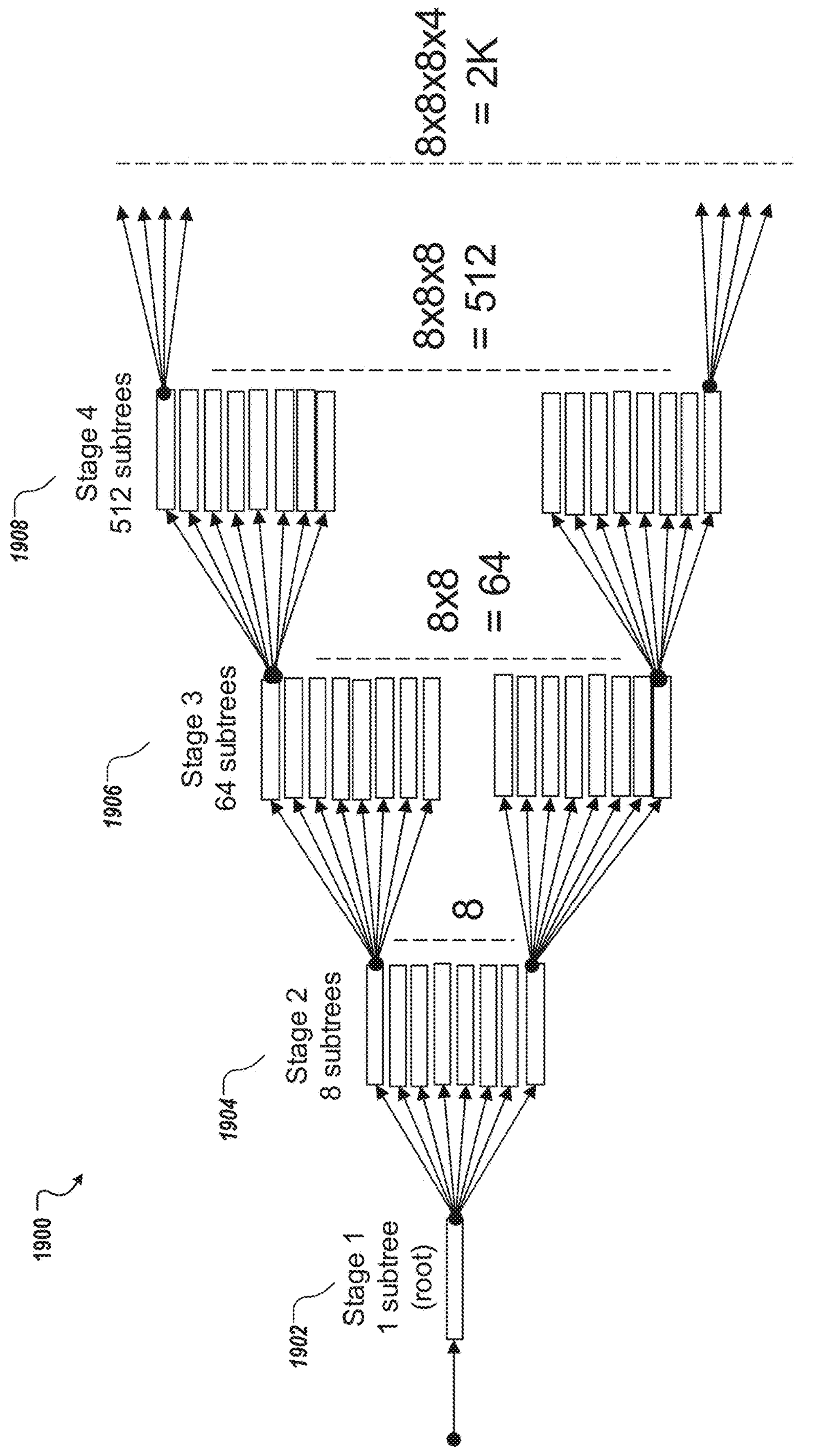
FIG. 19A depicts a non-limiting exemplary memory implementation that can be employed by the described system for IPv6 (64b) Route LPM for 1K scale.

17,472B;

FIG. 19A depicts an example memory implementation 1900 that can be employed by the described system for an IPv6 (64b) Route LPM for 1K scale implementation. The depicted implementation 1900 is spread over four stages (1902, 1904, 1906, and 1908) where each rectangle represents a 64B (512b) cache line that holds one subtree from the set of all subtrees at that respective level that can be processed by the stage at wire speed. As depicted, stages 1 1902, 2 1904, and 3 1906 use three level subtrees, of seven nodes each, which provides an eight-way expansion at those stages. As depicted, stage 4 1908 is employed to store leaf nodes which store data in addition to the keys in the cache-line so only half as many nodes can be packed as the previous stages. As such, stage 4 1908 uses two level subtrees, of three nodes each, which provides a four-way expansion at the last stage. The implementation 1900 provides 8×8×8×4=2K intervals, which accommodates 1K prefixes in the worst case.

Figure 19B:
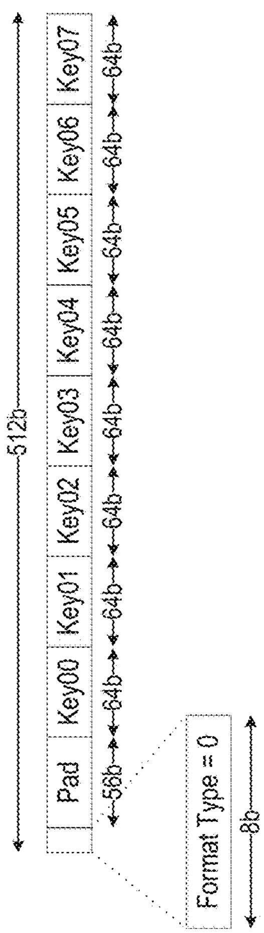
FIG. 19B depicts a non-limiting exemplary 64b LPM cache line formats.
Figure 19C:
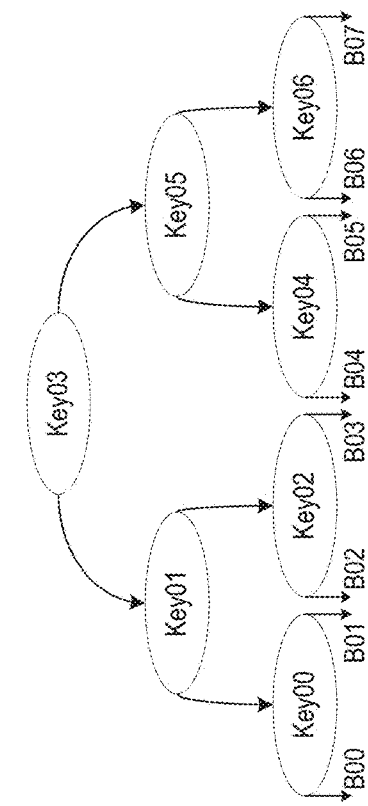
FIG. 19C depicts a non-limiting exemplary tree representation of an LPM cache line formats.

FIG. 19B depicts 64b LPM cache line formats 1910 that can be employed for the stages 1 1902, 2 1904, and 3 1906 depicted in FIG. 19A. As depicted, the LPM cache line formats 1910 stores seven keys (interval values) of 64b each and no data as the data is pushed to the last stage (see FIGS. 19D and 19E). FIG. 19C depicts a tree representation 1912 that corresponds to the LPM cache line formats 1910. The tree representation 1912 provides for an eight-way branch out at each stage with 512 branches total out of stage 3.

Figure 19D:
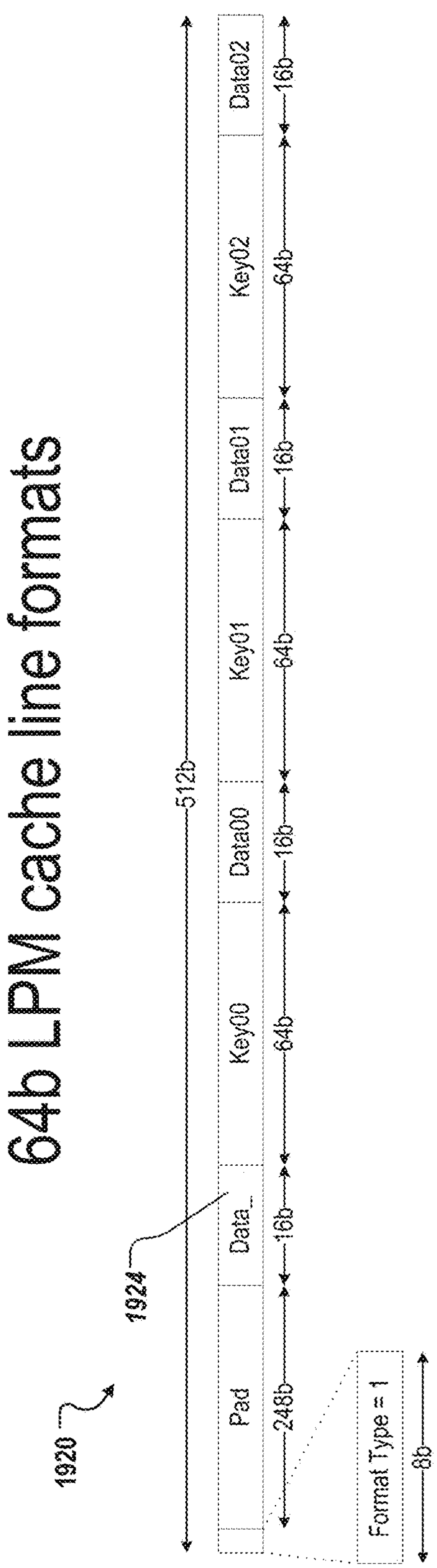
FIG. 19D depicts a non-limiting exemplary 64b LPM cache line formats.
Figure 19E:
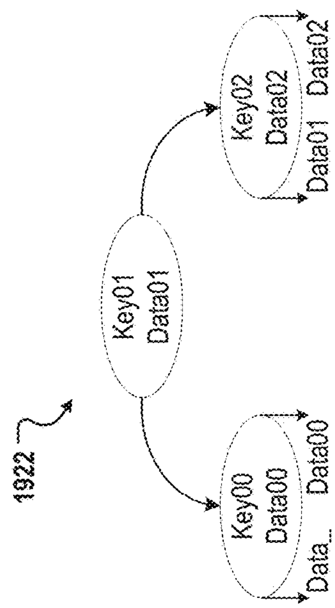
FIG. 19E depicts a non-limiting exemplary tree representation.

FIG. 19D depicts 64b LPM cache line formats 1920 that can be employed for stage 4 1908 depicted in FIG. 19A. As depicted, the LPM cache line formats 1920 stores three keys and their corresponding 16b data. As depicted, an additional 16b field 1924 stores the data pushed from parent subtree. FIG. 19E depicts a tree representation 1922 that corresponds to the LPM cache line formats 1920. The tree representation 1922 provides for a four-way branch out at stage 4 1908. The 512×4 gives 2K decisions total for the LPM, which supports the resolution of 1K prefixes.

The memory computation for 64b LPM for 1K scale depicted in FIGS. 19A-19E can be represented as:

A total memory requirement for 1K IPv6 scale:

=64B+(8*64B)+(64*64B)+(512*64B)=

Figure 20A:
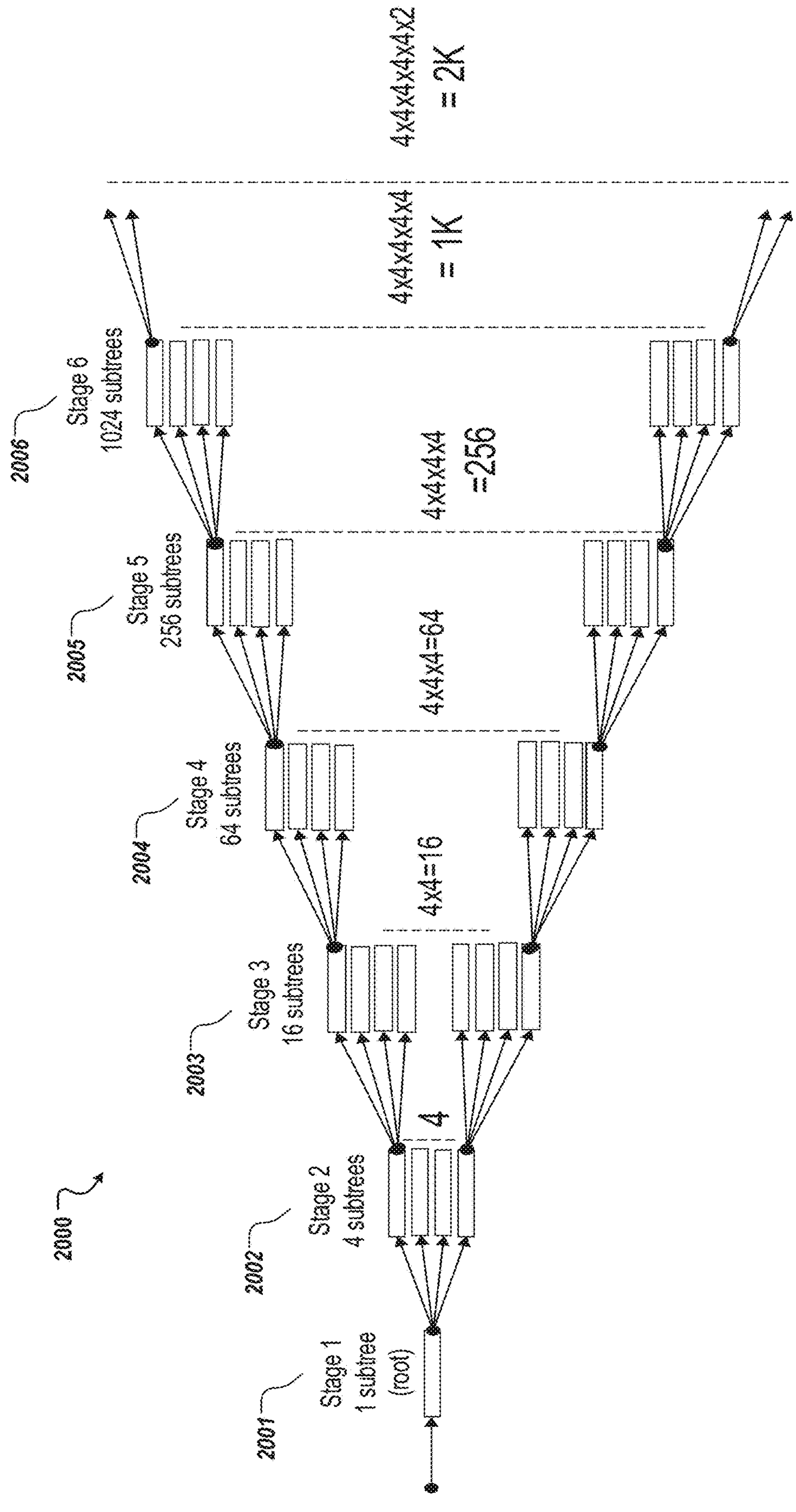
FIG. 20A depicts a non-limiting exemplary memory implementation that can be employed by the described system for IPv6 (128b) Policy LPM for 1K scale.

37,440B;

FIG. 20A depicts an example memory implementation 2000 that can be employed by the described system for an IPv6 (128b) Policy LPM for 1K scale implementation. The depicted implementation 2000 is spread over six stages (2001, 2002, 2003, 2004, 2005, and 2006) where each rectangle represents a 64B (512b) cache line that holds one subtree from the set of all subtrees at that respective level that can be processed by the stage at wire speed. As depicted, stages 1 2001, 2 2002, 3 2003, 4 2004, and 5 2005 use two level subtrees, of three nodes each, which provides a four-way expansion at those stages. As depicted, stage 6 2006 is employed to store leaf nodes which store data in addition to the keys in the cache-line so only half as many nodes can be packed as the previous stages. As such, stage 6 2006 uses one level subtrees, of one node each, which provides a two-way expansion at the last stage. The implementation 2000 provides 4×4×4×4×4×2=2K intervals, which accommodates 1K prefixes in the worst case.

Figure 20B:
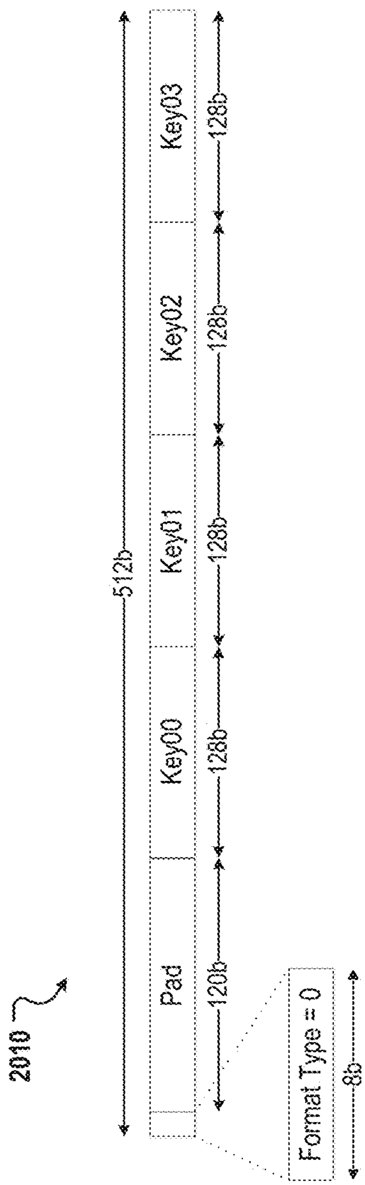
FIG. 20B depicts a non-limiting exemplary 128b LPM cache line formats.
Figure 20C:
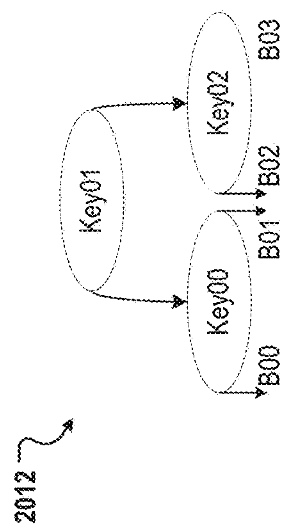
FIG. 20C depicts a non-limiting exemplary tree representation of an LPM cache line formats.

FIG. 20B depicts 128b LPM cache line formats 2010 that can be employed for the stages 1 2001, 2 2002, 3 2003, 4 2004, and 5 2005 depicted in FIG. 20A. As depicted, the LPM cache line formats 2010 stores three keys (interval values) of 128b each and no data as the data is pushed to the last stage (see FIGS. 20D and 20E). FIG. 20C depicts a tree representation 2012 that corresponds to the LPM cache line formats 2010. The tree representation 2012 provides for a four-way branch out at each stage with 1K branches total out of stage 5.

Figure 20D:
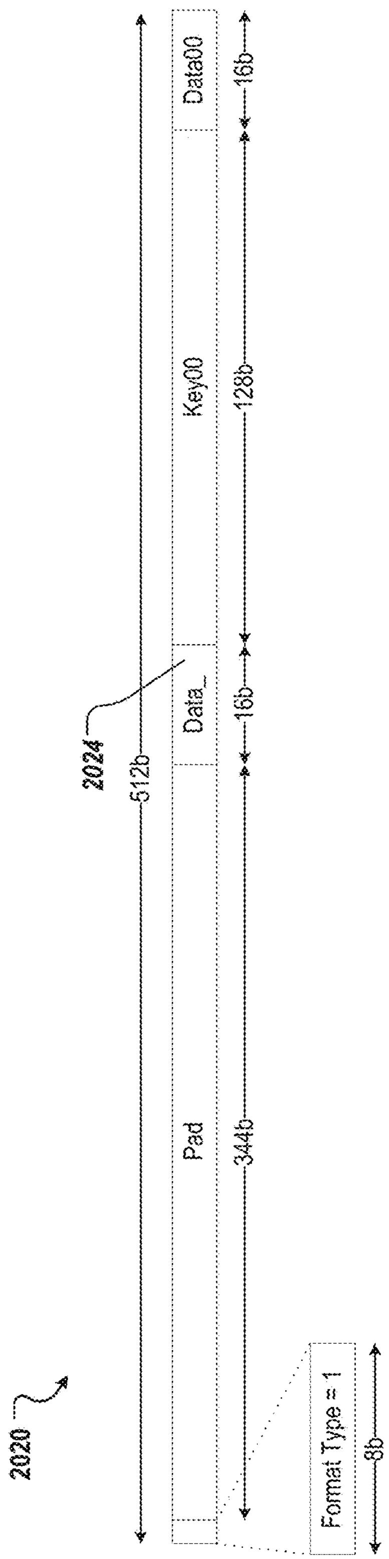
FIG. 20D depicts a non-limiting exemplary 128b LPM cache line formats.
Figure 20E:
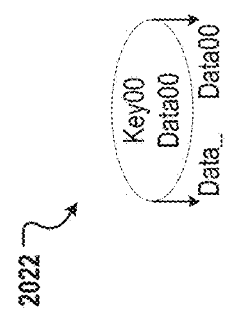
FIG. 20E depicts a non-limiting exemplary tree representation of an LPM cache line formats.

FIG. 20D depicts 128b LPM cache line formats 2020 that can be employed for stage 6 2006 depicted in FIG. 20A. As depicted, the LPM cache line formats 2020 stores one key and its corresponding 16b data. As depicted, an additional 16b field 2024 stores the data pushed from parent subtree. FIG. 20E depicts a tree representation 2022 that corresponds to the LPM cache line formats 2020. The tree representation 2022 provides for a two-way branch out at stage 6 2006. The 1K×2 gives 2K decisions total for the LPM, which supports the resolution of 1K prefixes.

The memory computation for 128b LPM for 1K scale depicted in FIGS. 20A-20E can be represented as:

A total memory requirement for 1K IPv6 scale:

=64B+(4*64B)+(16*64B)+(64*64B)+(256*64)+(1024*64)=

87,360B;

Assemble Cache-Lines in Memory

Figure 21:
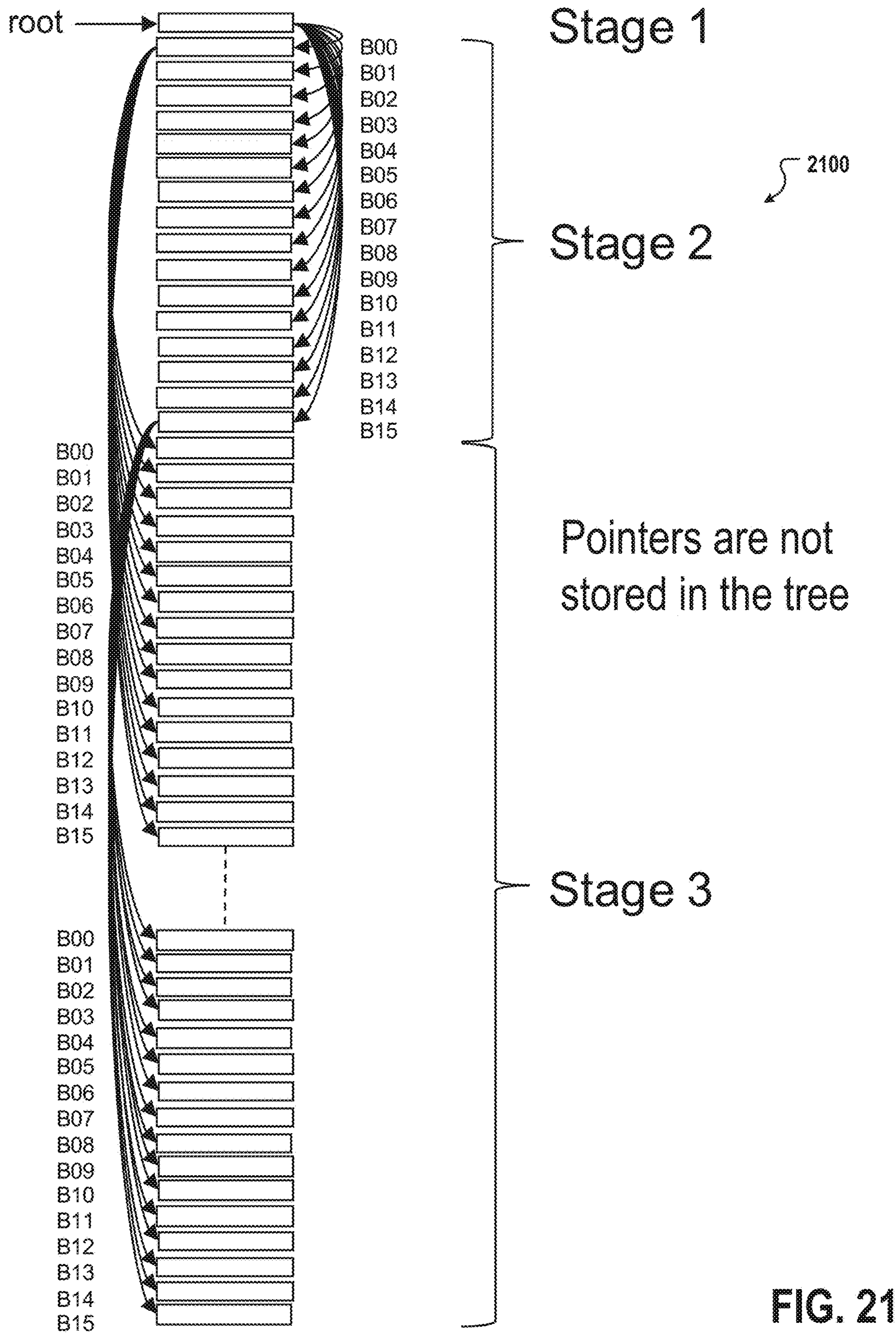
FIG. 21 depicts a non-limiting exemplary memory implementation that can be employed by the described system.

FIG. 21 depicts an example memory implementation 2100 that can be employed by the described system. The example memory 2100 is organized as an array of cache-lines such that each stage can compute the address of the next-cache line to be fetched by the next stage using the address of the current cache-line and the outgoing branch number of the subtree at this stage, which corresponds to step 614 described in FIG. 6. As depicted, the array of cache-lines are organized in such a way that each stage can compute the address of the next-cache line to be fetched by the next stage. Also, the address of the next cache line to fetch for processing by the subsequent stage is computed in the current stage based on the current address and the outgoing branch being taken at the current stage. The example memory implementation 2100 shows an example of how to accomplish these features without having to store memory addresses.

As depicted in FIG. 21, individual tree nodes within a cache line can be accessed directly as structure members (e.g., cache-line.node[0] to cache-line.node[n]) depending on how many nodes are packed within each cache-line. The arrows (e.g., B00, B01, and so forth) represent the possible branches that can be taken out of a cache-line by a modified binary search processing that cache-line, and the corresponding next cache-line that the search will lead to if each of those branches is taken. As depicted, the example memory implementation 2100 shows each cache line stores 4 levels of the interval binary search tree and hence provides 16 possible branches out of each cache-line. Employing the example memory 2100 allows for the assembly of the cache-lines in the memory as an array and in such a way that pointers are not required to be stored in the cache-lines. In some embodiments, the address of the next cache line to be fetched for processing by a subsequent stage is computed in the current stage based on the address of the current cache-line and the index of the outgoing branch being taken at the current stage. In some embodiments, the example memory 2100 is organized such that the above described address fetching can be performed without having to store the memory addresses.

Figure 22:
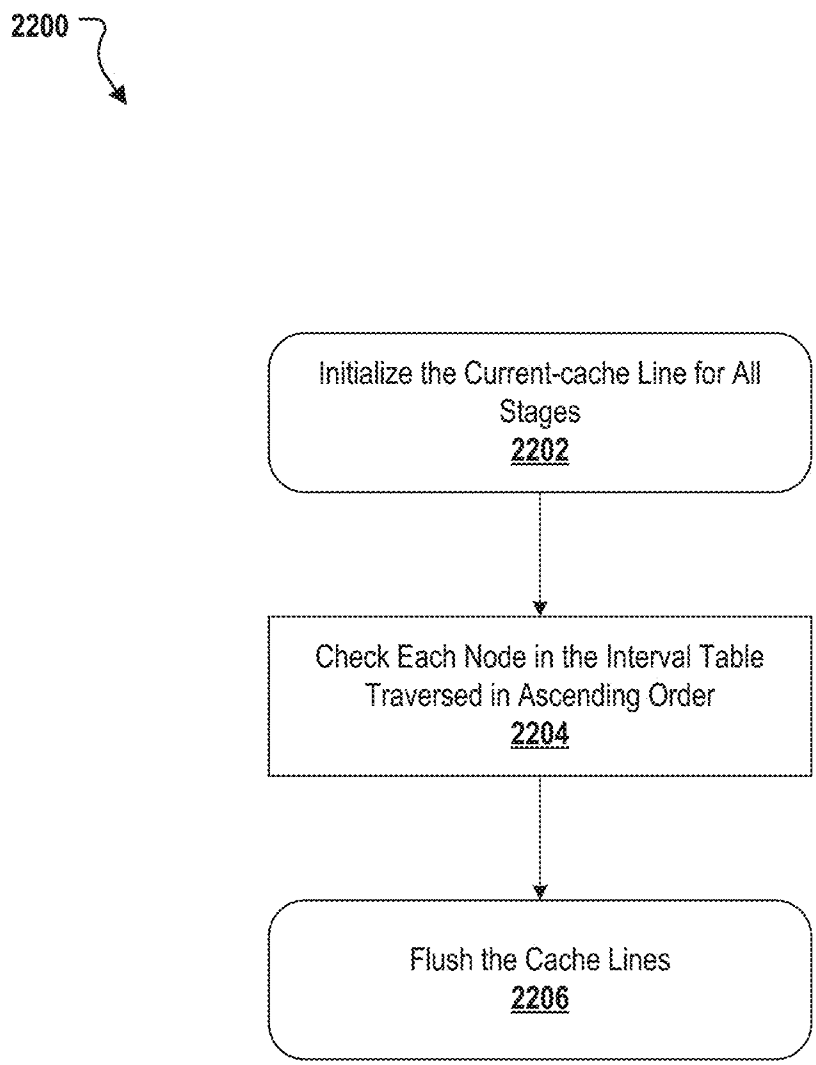
FIG. 22 depicts a flowchart of an example process to generate the final memory content from an interval table.

In some embodiment, a next address is calculated as:

curr_idx=(curr_addr−base_addr)/sizeof(cache_line);

next_idx=(curr_idx*16)+outgoing branch number;

next_addr=(next_idx*sizeof(cache_line))+base_addr;

FIG. 22 depicts a flowchart of an example process 2200 that consolidates steps 604 to 614 of process 600 depicted in FIG. 6 to generate the final memory content from an Interval Table. The example process 2200 may be implemented by various elements of the described system such as via a programmable IO device. As depicted, the example process can be executed in a control plane to efficiently build data structures that may be employed in a data plane implementation. The example process 2200 organizes memory into cache-lines that can be accessed by each cascading stage. The example process 2200 may be leveraged for LPMs of varying widths and expansion at each stage and avoid control plane bottlenecks through high efficiency (e.g., linear execution).

For clarity of presentation, the description that follows generally describes the example process 2200 in the context of FIGS. 1-21 and 23A-27. However, it will be understood that the processes 600 may be performed, for example, by any other suitable system, environment, software, and hardware, or a combination of systems, environments, software, and hardware as appropriate. In some embodiments, various operations of the process 2200 can be run in parallel, in combination, in loops, or in any order. In some embodiments, the process 2200 is executed by a programmable IO device. In some embodiments, the programmable IO device is an ISA. In some embodiments, the programmable IO device is a router or a switch. In some embodiments, the programmable IO device includes a memory unit having instructions stored thereon which, when executed by the programmable IO device, cause the programmable IO device to perform the process 2200. In some embodiments, the programmable IO device includes an MPU that includes at least one ALU. In some embodiments, the programmable IO device includes an ARM processor.

At 2202, the current-cache line for all the stages is initialized with max values, and the last stage's current-cache line is initialized with the default result data. At 2204, for each node in the Interval Table traversed in the ascending order: when the current-cache line of the last stage is not full then add the interval to the current-cache line for the last stage, along with its result data otherwise 1) recursively promote the interval to the previous stage(s); and 2) write the current-cache line for the last stage to the hardware, reinitialize it with max values, and set its default result data to the result data of the just promoted interval. In some embodiments, recursively promoting the interval to the previous stage includes when the previous stage's current-cache-line is full, then promote the interval one more stage back, write the full current-cache line of this stage to the hardware, and reinitialize it with max values. At 2206, the cache lines are flushed of all the stages.

Figure 23A:
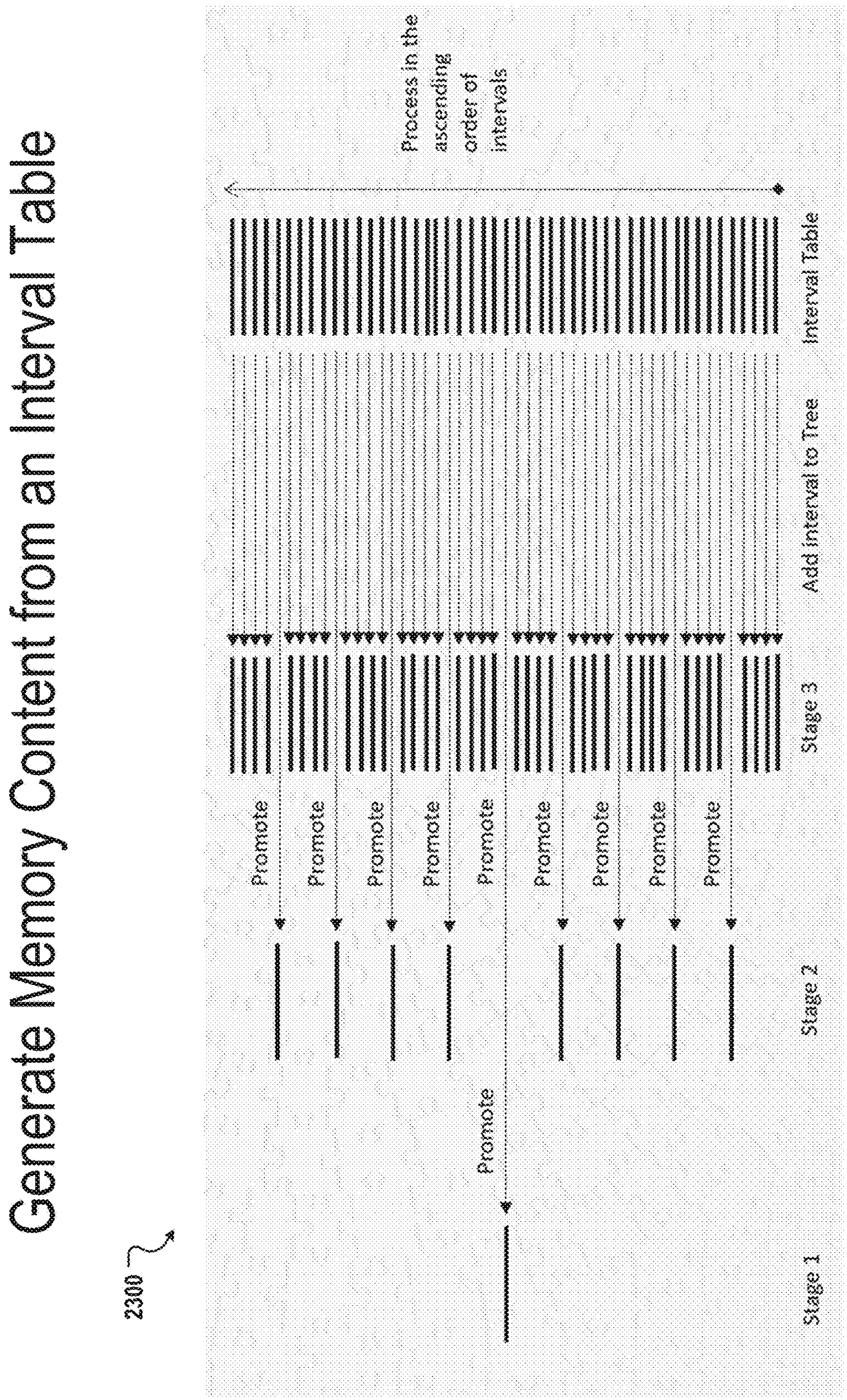
FIG. 23A depicts a non-limiting exemplary representation for of generating memory content from an interval table based on an interval table.
Figure 23B:
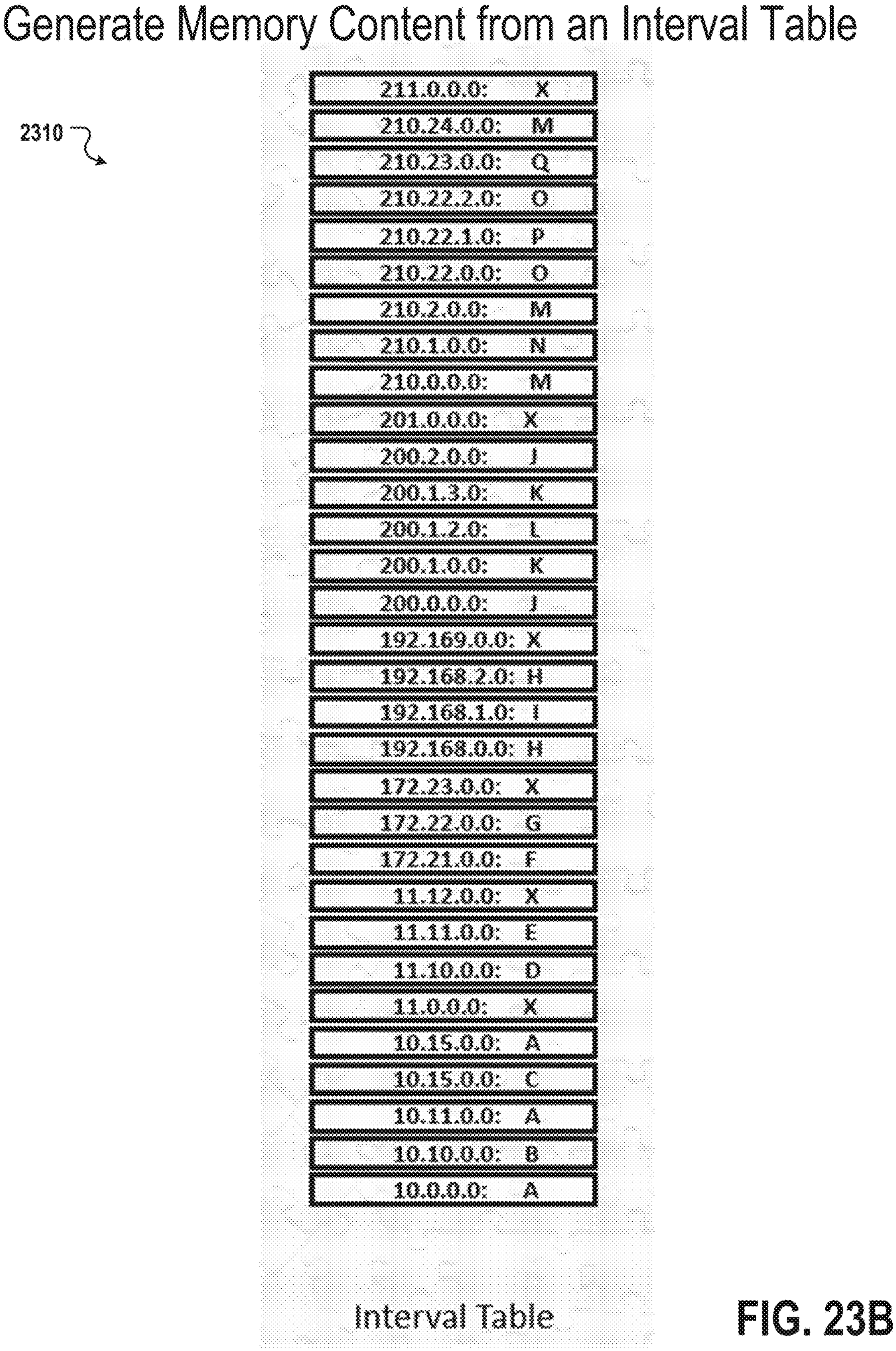
FIG. 23B depicts an example interval table.
Figure 23C:
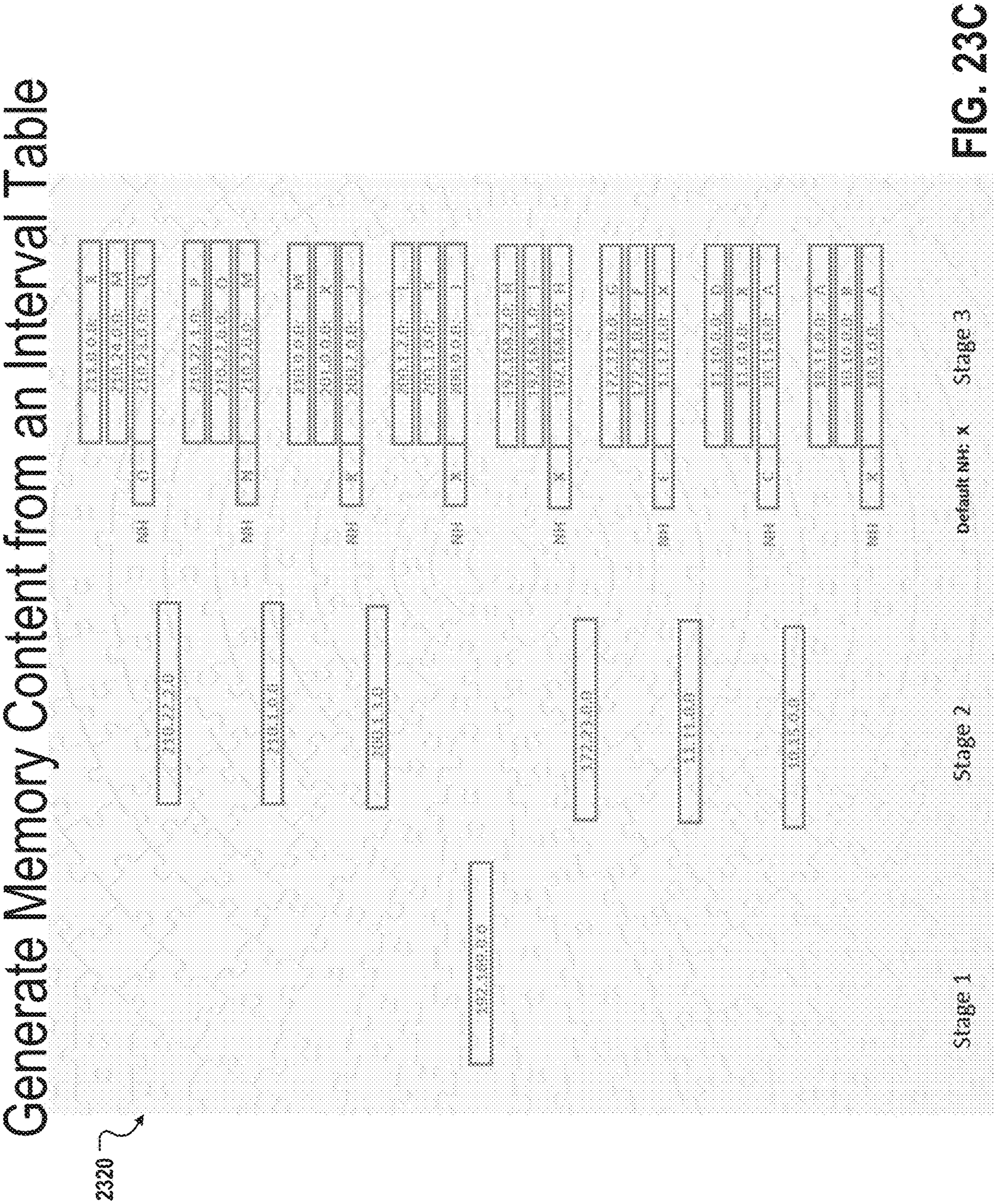
FIG. 23C depicts a non-limiting exemplary memory layout.

FIG. 23A depicts an example representation 2300 of generating memory content from an interval table according to the process 2200 depicted in FIG. 22 for the case where each stage gives a 4-way expansion where each cache-line compresses and stores two levels or three nodes of the interval binary search tree. FIG. 23B depicts an example interval table 2310 and FIG. 23C depicts an example memory layout 2320 that includes the content of the interval table 2310 after the process 2200 has been executed for the case where each stage gives a three-way expansion. The examples depicted in FIGS. 23A-23C illustrate cache-line that store four interval table key values where the first (bottom most) cache line in stage three has the system default next hop as the default next hop and the other stage three cache lines have the next hop of the last promoted interval as the default next hop. It is contemplated, however, that embodiments of the present disclosure can be realized with any of the appropriate number of cache-line that storing interval table key values, such as those mentioned previously.

Figure 24:
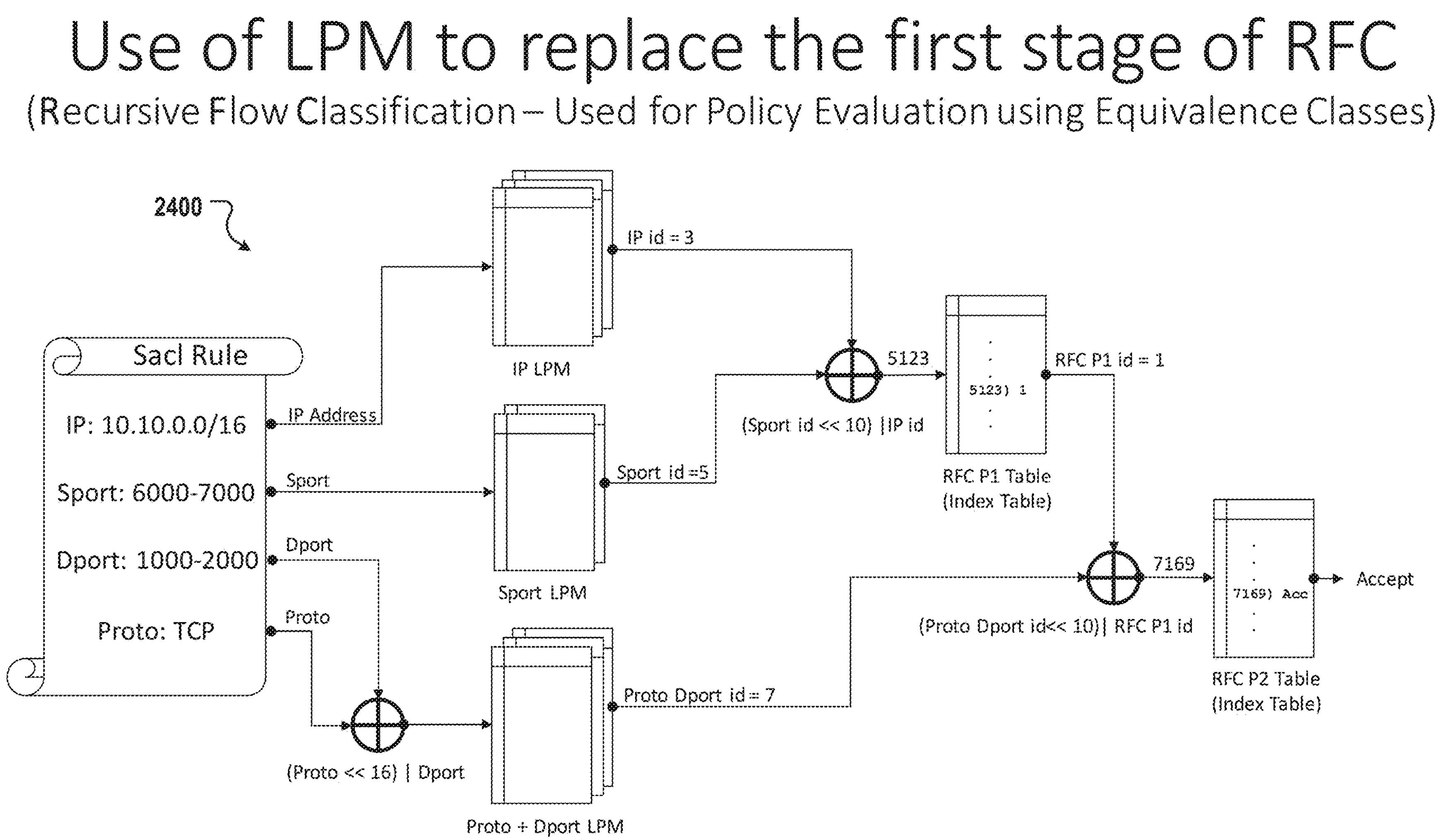
FIG. 24 depicts a non-limiting exemplary use of LPM to replace the first stage of RFC.

FIG. 24 depicts an example 2400 of the employment of LPM to replace the first stage of the Recursive Flow Classification (RFC) algorithm used for policy evaluation using equivalence classes. In some embodiments, such an RFC algorithm is used to implement policies. As depicted, the first stage lookups in the RFC algorithm are replaced. In some embodiments, these first stage lookups are used to convert source IP, destination IP, source port, destination port, and protocol from incoming packets to 'class ids' by employing the described system (see e.g., FIG. 5B).

Example Process

Figure 25:
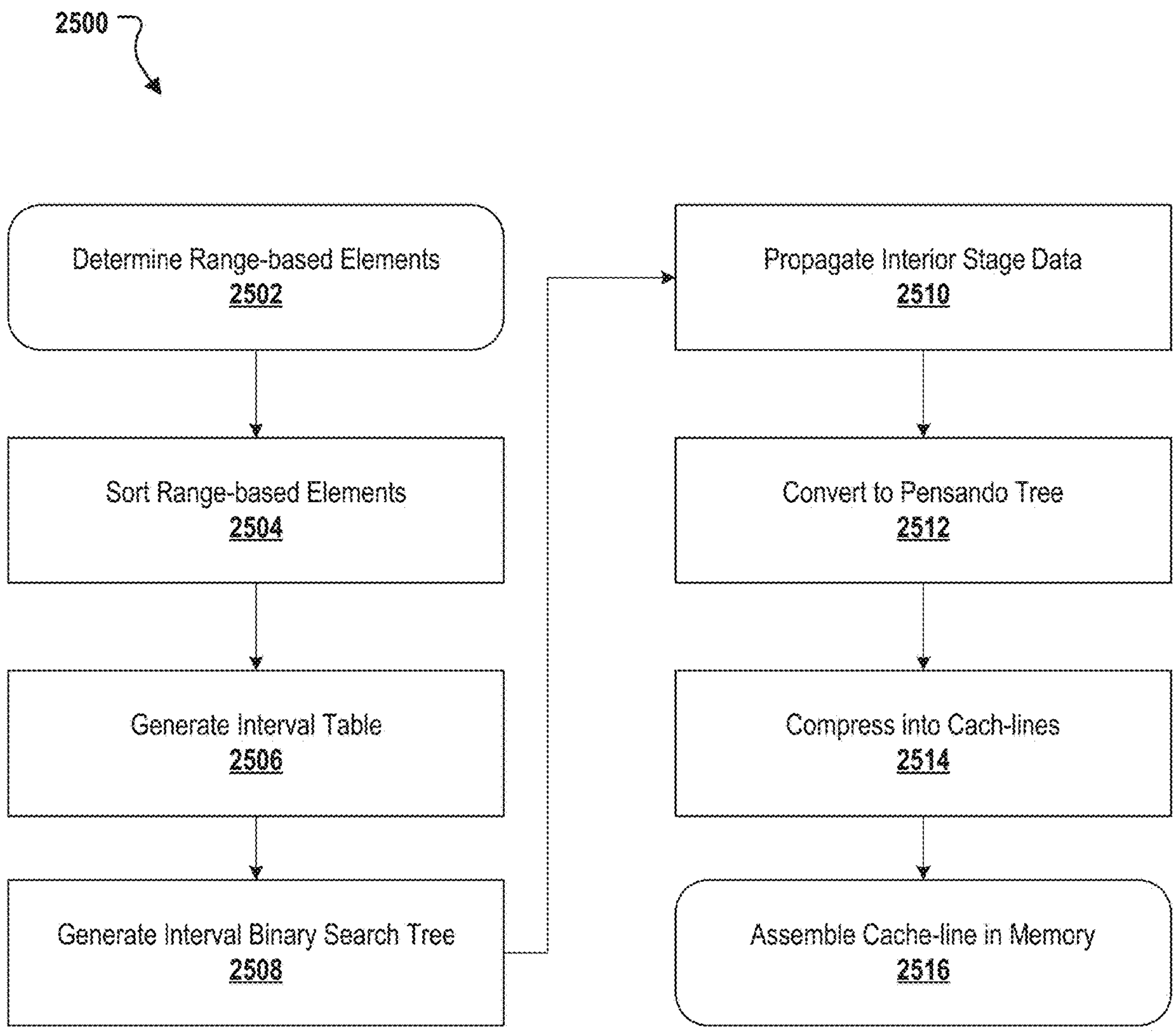
FIG. 25 depicts a flowchart of non-limiting exemplary process that can be implemented by embodiments of the present disclosure.

FIG. 25 depicts a flowchart of an example process 2500. The example process 2500 can be implemented by the various elements of the described system. As depicted, the example process shows in more detail providing a control plane to program data forwarding hardware. For clarity of presentation, the description that follows generally describes the example process 2500 in the context of FIGS. 1-24, 26, and 27. However, it will be understood that the processes 2500 may be performed, for example, by any other suitable system, environment, software, and hardware, or a combination of systems, environments, software, and hardware as appropriate. In some embodiments, various operations of the process 2500 can be run in parallel, in combination, in loops, or in any order. In some embodiments, the process 2500 is executed by a programmable IO device. In some embodiments, the programmable IO device is an ISA. In some embodiments, the programmable IO device is a router or a switch. In some embodiments, the programmable IO device includes a memory unit having instructions stored thereon which, when executed by the programmable IO device, cause the programmable IO device to perform the process 2500. In some embodiments, the programmable IO device includes an MPU that includes at least one ALU. In some embodiments, the programmable IO device includes an ARM processor. In some embodiments, the process 2500 is executed by the at least one ARM processor. In some embodiments, the control plane is executed via the at least one ARM processor.

At 2502, a set of range-based elements for a network is determined. In some embodiments, the set of range-based elements is sorted according to a sorting algorithm that receives the set of range-based elements and determines an ordered version of the set of range-based elements according to the global order. In some embodiments, the range-based elements comprise a set of available prefixes. In some embodiments, the global order is determined according to the lengths of the available prefixes. In some embodiments, the set of available prefixes comprise overlapping prefixes. In some embodiments, each of the range-based elements comprises an IP address. In some embodiments, the associated data element comprises a next hop. In some embodiments, classifying the packets comprises providing the packets to an outbound interface. In some embodiments, the outbound interface determined according to a lookup result of a modified binary search of the Pensando Tree. From 2502, the process 2500 proceeds to 2504.

At 2504, the set of range-based elements is sorted according to a global order among the range-based elements. From 2504, the process 2500 proceeds to 2506.

At 2506, an interval table is generated from the sorted range-based elements. In some embodiments, the interval table is generated from the sorted set of range-based elements via a stack. From 2506, the process 2500 proceeds to 2508.

At 2508, an interval binary search tree is generated from the interval table. In some embodiments, configured values for the range-based elements and associated data elements are converted into the interval binary search tree by: generating, as a range-based element number line, a number line representation of range-based values for the range-based elements and respective data element values associated with each of the range-based values over another number line, as a key space number line, which represents an entire number space of a search key; projecting each of the range-based element number lines onto the key space number line to mark a beginning point and an ending point of each of the range-based element number lines such that the key space number line is divided into distinct intervals; and deriving the Pensando Tree from the distinct intervals on the key space number line and the respective data element values associated with each of the distinct intervals. In some embodiments, each of the distinct interval comprises a unique data element value. In some embodiments, each of the unique data element value represents a data element value of a deepest nested range-based element number line above the respective interval. In some embodiments, each of the data elements mapped in the Pensando Tree comprise a routing policy, a metered identifier, a policer identifier, or a routing element. From 2508, the process 2500 proceeds to 2510.

At 2510, data stored in subtrees of interior stages of the interval binary search tree is propagated to subtrees of a last stage of the interval binary search tree such that the interior stages do not comprise data. From 2510, the process 2500 proceeds to 2512.

At 2512, the interval binary search tree is converted to a Pensando Tree. From 2512, the process 2500 proceeds to 2514.

At 2514, multiple levels of the Pensando Tree are compressed into cache-lines based on a stage from which each of the levels is accessed. In some embodiments, for the right-subtrees of all the nodes of the Pensando Tree starting at the root node of the interval binary search tree, the result data value from the node is stored as the result data value of a left most egress branch for the subtree in a left most leaf node of the subtree. In some embodiments, the Pensando Tree comprises a completely filled binary tree comprising nodes that are initialized with a max value and valid nodes that are populated in an order and exhibit the BST property. In some embodiments, the order is left to right. From 2514, the process 2500 proceeds to 2516.

At 2516, the cache-lines are assembled in the memory unit such that each stage can compute an address of a next-cache line of the cache-lines to be fetched by a next stage using an address of a current cache-line of the cache-lines and an outgoing branch number of the subtree at a current stage. In some embodiments, packets received in a data plane are classified based on the Pensando Tree without storing memory addresses in the cache-lines. In some embodiments, the packets received in the data plane are classified by the MPU based on a modified binary search of the Pensando Tree to determine an LPM. In some embodiments, the MPU executes multiple cascading stages to perform the modified binary search. In some embodiments, each of the multiple cascading stages performs an arithmetical operation through the ALU. In some embodiments, a lookup result of the modified binary search is not determined until the Pensando Tree is fully traversed. In some embodiments, individual nodes of the Pensando Tree stored in one of the cache-lines are accessed directly as structure members. In some embodiments, the address of a next cache line is computed based on an address of a current cache-line and an index of an outgoing branch of the Pensando Tree stored in the current cache-line. In some embodiments, the index of the outgoing branch is determined according to the modified binary search. In some embodiments, the modified binary search is performed by fetching data stored in a selected one of the cache-lines. In some embodiments, the selected cache-line is determined based on address computation. In some embodiments, the cache-lines are assembled in the memory unit according to a linear algorithm. In some embodiments, the assembling of the cache-lines in the memory unit does not require memory pointers. In some embodiments, the linear algorithm comprises: selecting, for each of the stages of the Pensando Tree, a first cache-line of the cache-lines as a current cache-line for that stage; initializing the current cache-lines of all of the stages to a respective max value; initializing a default result data of the current cache-line for the last stage with a default result data; and traversing the interval table in ascending order, for each traversed entry: when a current-cache line of the last stage is not full, adding the interval value and the result data to the current-cache line for the last stage; and when the current-cache line of the last stage is full: recursively promoting the interval value to a previous stage or stages; updating the current-cache line to represent the cache-line where the next numerically higher interval values will be stored for the previous stage or stages; reinitializing the updated current-cache lines with max values representing the next numerically higher cache-line for that stage; and setting the default result data for the reinitialized current cache-line for the last stage to the result data of the just promoted node. In some embodiments, each entry in the interval table comprises an interval value and a result data. In some embodiments, the first cache-line stores a numerically lowest interval value. From 2516, the process 2500 ends.

Computer Systems

Figure 26:
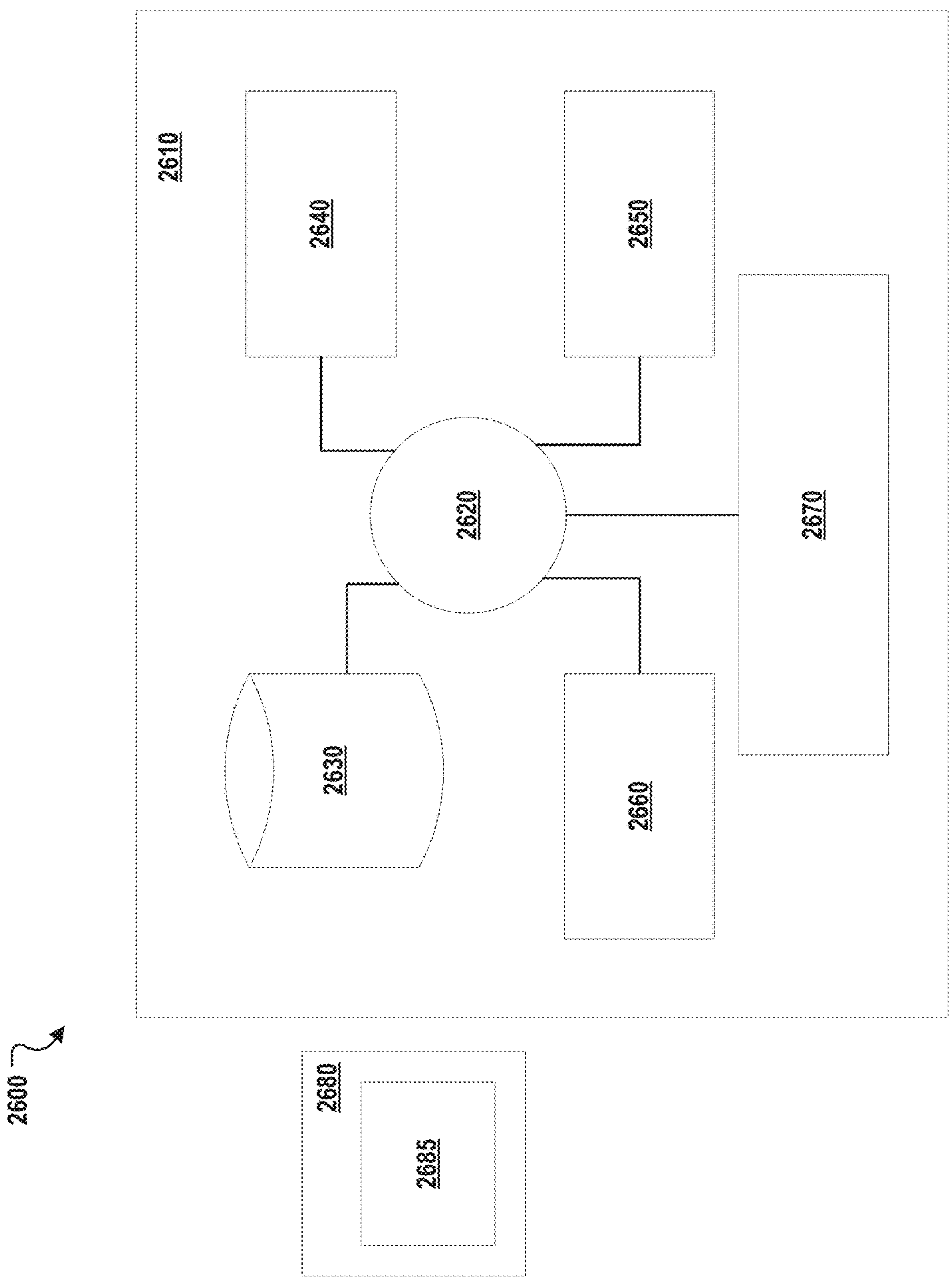
FIG. 26 depicts a non-limiting example computer system that can be programmed or otherwise configured to implement methods or systems of the present disclosure.

Computer systems are provided herein that can be used to implement methods or systems of the disclosure. FIG. 26 depicts an example a computer system 2600 that can be programmed or otherwise configured to implement methods or systems of the present disclosure. For example, the computing device 2610 can be programmed or otherwise configured upgrade the IO subsystem 2670 (e.g., an ISA) with no packet loss by employing an off-box service. As depicted, the computer system 2600 includes a computing device 2610 and an optional electronic display 2680. In some embodiments, the computing device 2610 is substantially similar to the computing system 120 depicted in FIG. 1.

In the depicted embodiment, the computing device 2610 includes a CPU (also "processor" and "computer processor" herein) 2620, which is optionally a single core, a multi core processor, or a plurality of processors for parallel processing. The computing device 2610 also includes memory or memory location 2630 (e.g., random-access memory, read-only memory, flash memory); electronic storage unit 2640 (e.g., hard disk); communication interface 2650 (e.g., network adapter) for communicating with one or more other systems; peripheral devices 2660 (e.g., cache, other memory, data storage or electronic display adapters), and IO subsystem 2670 (e.g., an IO device, such as a smartNIC). The memory 2630, the electronic storage unit 2640, the communication interface 2650, the peripheral devices 2660, and the IO subsystem 2670 are in communication with the CPU 2620 through a communication bus (solid lines), such as a motherboard.

In some embodiments, the CPU 2620 can execute a sequence of machine-readable instructions, which can be embodied in a program or software. The instructions may be stored in a memory location, such as the memory 2630. The instructions can be directed to the CPU 2620, which can subsequently program or otherwise configure the CPU 2620 to implement methods of the present disclosure. Examples of operations performed by the CPU 2620 can include fetch, decode, execute, and write back. In some embodiments, the CPU 2620 is part of a circuit, such as an integrated circuit. One or more other components of the computing device 2610 can be optionally included in the circuit. In some embodiments, the circuit is an ASIC or a Field Programmable Gate Array (FPGA).

In some embodiments, the IO subsystem 2670 (e.g., the above described IO device) comprises an expansion card, such as a smartNIC, that is connected with the CPU 2620 via PCIe. In some embodiments, the IO subsystem 2670 is completely programmable ASIC engine. In some embodiments, an ASIC engine is tailored to a specific subset of functions, such as compression and checksum, while another engine is dedicated for symmetric cryptography.

In some embodiments, the electronic storage unit 2640 includes a data storage unit (or data repository) for storing data. In some embodiments, the electronic storage unit 2640 stores files, such as drivers, libraries, images, and saved programs. In some embodiments, the electronic storage unit 2640 stores user data, e.g., user preferences and user programs. In some embodiments, the computing device 2610 includes one or more additional data storage units that are external, such as located on a remote server that is in communication through an intranet or the internet.

Figure 27:
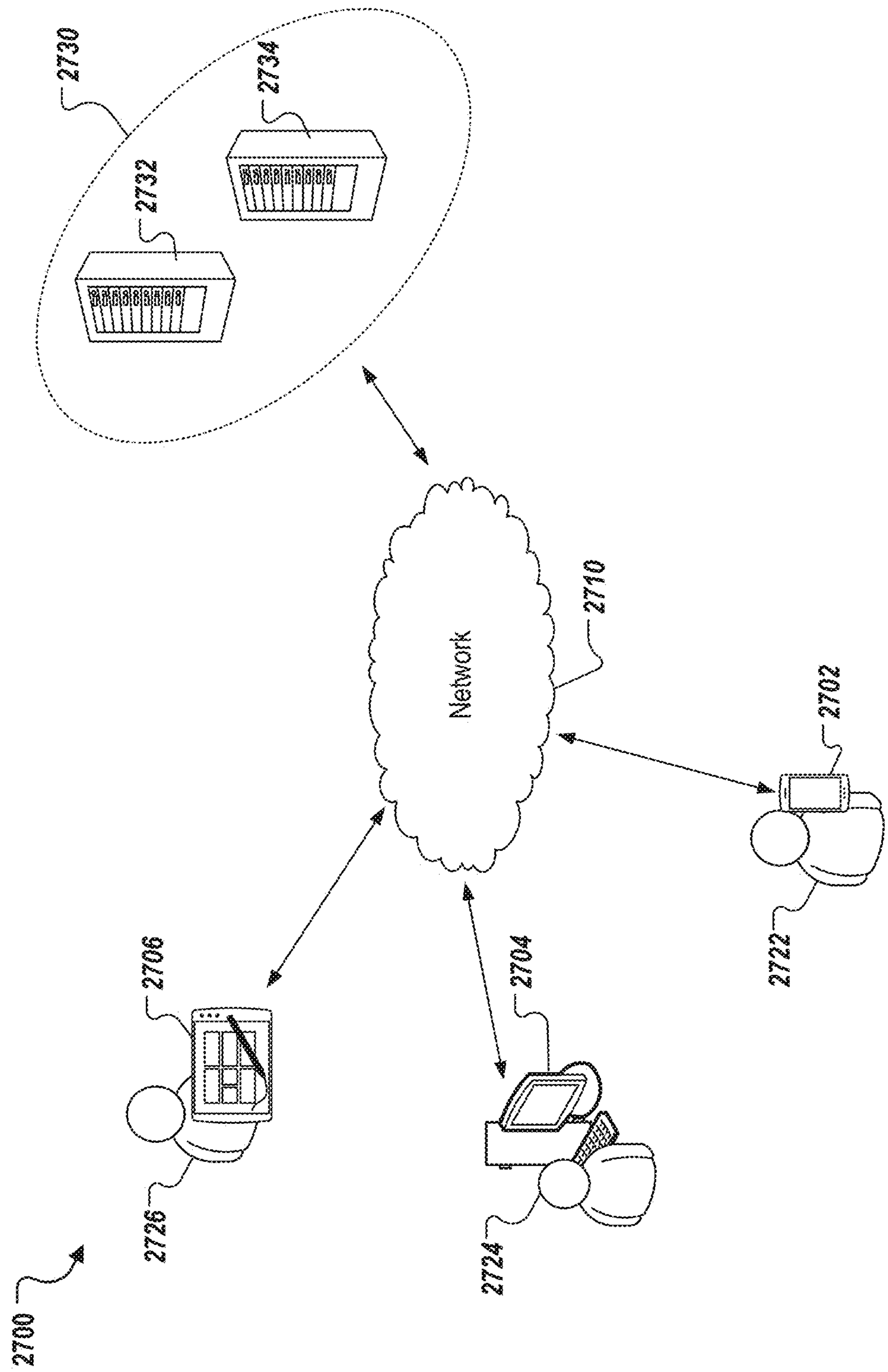
FIG. 27 depicts a non-limiting example environment where implementations of the present disclosure can be employed.

The computing device 2610 is optionally operatively coupled to a network, such as the network 2710 depicted and described in FIG. 27, with the aid of the communication interface 2650. In some embodiments, the computing device 2610 communicates with one or more remote computer systems through the network. Examples of remote computer systems include personal computers (e.g., portable PC), slate or tablet PCs (e.g., Apple® iPad, Samsung® Galaxy Tab, etc.), smartphones (e.g., Apple® iPhone, Android-enabled device, Blackberry®, etc.), or personal digital assistants. In some embodiments, a user can access the computing device 2610 via a network.

In some embodiments, methods as described herein are implemented by way of machine (e.g., computer processor) executable code stored on an electronic storage location of the computing device 2610, such as, for example, on the memory 2630 or the electronic storage unit 2640. In some embodiments, the CPU 2620 is adapted to execute the code. In some embodiments, the machine executable or machine-readable code is provided in the form of software. In some embodiments, during use, the code is executed by the CPU 2620. In some embodiments, the code is retrieved from the electronic storage unit 2640 and stored on the memory 2630 for ready access by the CPU 2620. In some situations, the electronic storage unit 2640 is precluded, and machine-executable instructions are stored on the memory 2640. In some embodiments, the code is pre-compiled. In some embodiments, the code is compiled during runtime. The code can be supplied in a programming language that can be selected to enable the code to execute in a pre-compiled or as-compiled fashion.

In some embodiments, the computing device 2610 can include or be in communication with the electronic display 2680. In some embodiments, the electronic display 2680 provides a user interface (UI) 2685.

Example Environment

FIG. 27 depicts an example environment 2700 that can be employed to execute implementations of the present disclosure. The example system 2700 includes computing devices 2702, 2704, and 2706; a back-end system 2730; and a network 2710.

In some embodiments, the network 2710 includes a local area network (LAN), wide area network (WAN), the Internet, or a combination thereof, and connects web sites, devices (e.g., the computing devices 2702, 2704, and 2706) and back-end systems (e.g., the back-end system 2730). In some embodiments, the network 2710 includes the Internet, an internet, and/or extranet, or an intranet and/or extranet that is in communication with the Internet. In some embodiments, the network 2710 includes a telecommunication and/or data network. In some embodiments, the network 2710 can be accessed over a wired and/or a wireless communications link. For example, mobile computing devices (e.g., the smartphone device 2702 and the tablet device 2706), can use a cellular network to access the network 2710.

In the depicted example environment 2700, the back-end system 2730 includes server devices 2732 and 2734, which can be employed to provide the described system. In some embodiments, the back-end system 2730 may be deploy within a data center that provides services, such as a web service, the computing devices 2702, 2704, and 2706. The described system may be employed within the example environment 2700 to provide an LPM implementation for a programmable data plane through a distributed algorithm.

In some embodiments, back-end system 2730 includes computer systems using clustered computers and components to act as a single pool of seamless resources when accessed through the network 2710. For example, such implementations may be used in data center, cloud computing, storage area network (SAN), and network attached storage (NAS) applications. In some embodiments, the servers 2732 and 2734 hosts one or more computer-implemented services with which users 2722, 2724, and 2726 can interact using the respective computing devices 2702, 2704, and 2706.

In some embodiments, the server devices 2732 and 2734 are each sustainably similar to the computing device 2610 depicted in FIG. 26 depending on how the server devices 2732 and 2734 are being used within the described system (e.g., a server employing an IO subsystem to perform LPM lookups such as described above). In some embodiments, the server devices 2732 and 2734 are server-class hardware type devices.

In some examples, the users 2722, 2724, and 2726 interact with the services provided by the back-end system 2730 through a graphical user interface (GUI) or application that is installed and executing on their respective computing devices 2702, 2704, and 2706. In some examples, the computing devices 2702, 2704, and 2706 provide viewing data to screens with which the users 2722, 2724, and 2726 can interact. In some embodiments, the computing devices 2702, 2704, 2706, and 2732 are sustainably similar to computing device 2610 depicted in FIG. 26. The computing devices 2702, 2704, 2706 may each include any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. In the depicted example, the computing device 2702 is a smartphone, the computing device 2704 is a tablet-computing device, and the computing device 2706 is a desktop computing device. Three user computing devices 2702, 2704, and 2706, are depicted in FIG. 27 for simplicity. It is contemplated, however, that implementations of the present disclosure can be realized with any of the appropriate computing devices, such as those mentioned previously. Moreover, implementations of the present disclosure can employ any number of devices as required.

Processing Devices and Processors

In some embodiments, the platforms, systems, media, and methods described herein include a computer, or use of the same. In further embodiments, the computer includes one or more hardware CPUs or general purpose graphics processing units (GPGPUs) that carry out the device's functions by providing chains of operation to an IO subsystem provided through a SmartNIC connected to the CPU or GPGPU via PCIe. In still further embodiments, the computer comprises an operating system configured to perform executable instructions. In some embodiments, the computer is optionally connected a computer network. In further embodiments, the computer is optionally connected to the Internet such that it accesses the World Wide Web. In still further embodiments, the computer is optionally connected to a cloud computing infrastructure. In other embodiments, the computer is optionally connected to an intranet. In other embodiments, the computer is optionally connected to a data storage device.

In accordance with the description herein, suitable computers include, by way of non-limiting examples, server computers, desktop computers, laptop computers, notebook computers, sub-notebook computers, netbook computers, netpad computers, handheld computers, Internet appliances, mobile smartphones, tablet computers, and vehicles. Those of skill in the art will recognize that many smartphones are suitable for use in the system described herein. Those of skill in the art will also recognize that select televisions, video players, and digital music players with optional computer network connectivity are suitable for use in the system described herein. Suitable tablet computers include those with booklet, slate, and convertible configurations, known to those of skill in the art.

In some embodiments, the device includes a storage and/or memory device. The storage and/or memory device is one or more physical apparatuses used to store data or programs on a temporary or permanent basis. In some embodiments, the device is volatile memory and requires power to maintain stored information. In some embodiments, the device is non-volatile memory and retains stored information when the computer is not powered. In further embodiments, the non-volatile memory comprises flash memory. In some embodiments, the non-volatile memory comprises dynamic random-access memory (DRAM). In some embodiments, the non-volatile memory comprises ferroelectric random access memory (FRAM). In some embodiments, the non-volatile memory comprises phase-change random access memory (PRAM). In other embodiments, the device is a storage device including, by way of non-limiting examples, compact disc (CD)-Read only Memories (ROMs), Digital Versatile Disks (DVDs), flash memory devices, magnetic disk drives, magnetic tapes drives, optical disk drives, and cloud computing-based storage. In further embodiments, the storage and/or memory device is a combination of devices such as those disclosed herein.

Non-Transitory Computer Readable Storage Medium

In some embodiments, the platforms, systems, media, and methods disclosed herein include one or more non-transitory computer readable storage media encoded with a program including instructions executable by the operating system of an optionally networked computer. In further embodiments, a computer readable storage medium is a tangible component of a computer. In still further embodiments, a computer readable storage medium is optionally removable from a computer. In some embodiments, a computer readable storage medium includes, by way of non-limiting examples, CD-ROMs, DVDs, flash memory devices, solid state memory, magnetic disk drives, magnetic tape drives, optical disk drives, cloud computing systems and services, and the like. In some cases, the program and instructions are permanently, substantially permanently, semi-permanently, or non-transitorily encoded on the media.

Computer Program

In some embodiments, the platforms, systems, media, and methods disclosed herein include at least one computer program, or use of the same. In some embodiments, a computer program includes a sequence of instructions, executable in the computer's CPU or in the processors of an IO subsystem, written to perform a specified task. Computer readable instructions may be implemented as program modules, such as functions, objects, API, data structures, and the like, that perform particular tasks or implement particular abstract data types. In light of the disclosure provided herein, those of skill in the art will recognize that a computer program may be written in various versions of various languages.

The functionality of the computer readable instructions may be combined or distributed as desired in various environments. In some embodiments, a computer program comprises one sequence of instructions. In some embodiments, a computer program comprises a plurality of sequences of instructions. In some embodiments, a computer program is provided from one location. In other embodiments, a computer program is provided from a plurality of locations. In various embodiments, a computer program includes one or more software modules. In various embodiments, a computer program includes, in part or in whole, one or more web applications, one or more mobile applications, one or more standalone applications, one or more web browser plug-ins, extensions, add-ins, or add-ons, or combinations thereof.

While preferred embodiments of the present subject matter have been shown and described herein, it will be obvious to those skilled in the art that such embodiments are provided by way of example only. Numerous variations, changes, and substitutions will now occur to those skilled in the art without departing from the described system. It should be understood that various alternatives to the embodiments of the subject matter described herein may be employed in practicing the described system.

What is claimed is:

1. A programmable input output (IO) device comprising:

a memory unit, the memory unit having instructions stored thereon which, when executed by the programmable IO device, cause the programmable IO device to perform operations to provide a control plane to program data forwarding hardware, the operations comprising:

determining a set of range-based elements for a network;

sorting the set of range-based elements according to a global order among the range-based elements;

generating an interval table from the sorted range-based elements;

generating an interval binary search tree from the interval table;

propagating data stored in subtrees of interior stages of the interval binary search tree to subtrees of a last stage of the interval binary search tree such that the interior stages do not comprise data;

converting the interval binary search tree to a Pensando Tree;

compressing multiple levels of the Pensando Tree into cache-lines based on a stage from which each of the levels is accessed; and assembling the cache-lines in the memory unit such that each stage can compute an address of a next-cache line of the cache-lines to be fetched by a next stage using an address of a current cache-line of the cache-lines and an outgoing branch number of the subtree at a current stage, wherein packets received in a data plane are classified based on the Pensando Tree without storing memory addresses in the cache-lines.

2. The programmable IO device of claim 1, comprising at least one Advanced Reduced Instruction Set Computer (RISC) Machine (ARM) processor, wherein the instructions stored on the memory unit are executed by the at least one ARM processor.

3. The programmable IO device of claim 2, wherein the control plane is executed via the at least one ARM processor.

4. The programmable IO device of claim 1, comprising a match processing unit (MPU), wherein the packets received in the data plane are classified by the MPU based on a modified binary search of the Pensando Tree to determine a longest prefix match (LPM).

5. The programmable IO device of claim 4, wherein the MPU executes multiple cascading stages to perform the modified binary search.

6. The programmable IO device of claim 5, wherein the MPU comprises at least one arithmetic logic units (ALU), and wherein each of the multiple cascading stages performs an arithmetical operation through the ALU.

7. The programmable IO device of claim 4, wherein a lookup result of the modified binary search is not determined until the Pensando Tree is fully traversed.

8. The programmable IO device of claim 4, wherein individual nodes of the Pensando Tree stored in one of the cache-lines are accessed directly as structure members.

9. The programmable IO device of claim 4, wherein the address of a next cache line is computed based on an address of a current cache-line and an index of an outgoing branch of the Pensando Tree stored in the current cache-line, wherein the index of the outgoing branch is determined according to the modified binary search.

10. The programmable IO device of claim 4, wherein the modified binary search is performed by fetching data stored in a selected one of the cache-lines.

11. The programmable IO device of claim 10, wherein the selected cache-line is determined based on address computation.

12. The programmable IO device of claim 1, wherein the interval table is generated from the sorted set of range-based elements via a stack.

13. The programmable IO device of claim 1, wherein the set of range-based elements is sorted according to a sorting algorithm that receives the set of range-based elements and determines an ordered version of the set of range-based elements according to the global order.

14. The programmable IO device of claim 1, wherein the cache-lines are assembled in the memory unit according to a linear algorithm.

15. The programmable IO device of claim 14, wherein the assembling of the cache-lines in the memory unit does not require memory pointers.

16. The programmable IO device of claim 14, wherein the linear algorithm comprises:

selecting, for each of the stages of the Pensando Tree, a first cache-line of the cache-lines as a current cache-line for that stage;

initializing the current cache-lines of all of the stages to a respective max value;

initializing a default result data of the current cache-line for the last stage with a default result data; and traversing the interval table in ascending order, wherein each entry in the interval table comprises an interval value and a result data, for each traversed entry:

when a current-cache line of the last stage is not full, adding the interval value and the result data to the current-cache line for the last stage; and when the current-cache line of the last stage is full:

recursively promoting the interval value to a previous stage or stages;

updating the current-cache line to represent the cache-line where the next numerically higher interval values will be stored for the previous stage or stages;

reinitializing the updated current-cache lines with max values representing the next numerically higher cache-line for that stage; and setting the default result data for the reinitialized current cache-line for the last stage to the result data of the just promoted node.

17. The programmable IO device of claim 16, wherein the first cache-line stores a numerically lowest interval value.

18. The programmable IO device of claim 1, wherein the range-based elements comprise a set of available prefixes.

19. The programmable IO device of claim 18, wherein the global order is determined according to the lengths of the available prefixes.

20. The programmable IO device of claim 18, wherein the set of available prefixes comprise overlapping prefixes.

21. The programmable IO device of claim 1, wherein configured values for the range-based elements and associated data elements are converted into the interval binary search tree by:

generating, as a range-based element number line, a number line representation of range-based values for the range-based elements and respective data element values associated with each of the range-based values over another number line, as a key space number line, which represents an entire number space of a search key;

projecting each of the range-based element number lines onto the key space number line to mark a beginning point and an ending point of each of the range-based element number lines such that the key space number line is divided into distinct intervals, wherein each of the distinct interval comprises a unique data element value, and wherein each of the unique data element value represents a data element value of a deepest nested range-based element number line above the respective interval; and deriving the Pensando Tree from the distinct intervals on the key space number line and the respective data element values associated with each of the distinct intervals.

22. The programmable IO device of claim 21, wherein each of the data elements mapped in the Pensando Tree comprise a routing policy, a metered identifier, a policer identifier, or a routing element.

23. The programmable IO device of claim 1, wherein each of the range-based elements comprises an Internet Protocol (IP) address, wherein the associated data element comprises a next hop, and wherein classifying the packets comprises providing the packets to an outbound interface, the outbound interface determined according to a lookup result of a modified binary search of the Pensando Tree.

24. The programmable IO device of claim 1, wherein, for the right-subtrees of all the nodes of the Pensando Tree starting at the root node of the interval binary search tree, the result data value from the node is stored as the result data value of a left most egress branch for the subtree in a left most leaf node of the subtree.

25. The programmable IO device of claim 1, wherein the programmable IO device is an intelligent server adapter (ISA).

26. The programmable IO device of claim 1, wherein the programmable IO device is a router or a switch.

27. The programmable IO device of claim 1, wherein the Pensando Tree comprises a completely filled binary tree comprising nodes that are initialized with a max value and valid nodes that are populated in an order and exhibit the Binary Search Tree (BST) property.

28. The programmable IO device of claim 27, wherein the order is left to right.

29. A method for providing a control plane to program data forwarding hardware, the method being executed by a programmable IO device and comprising:

determining a set of range-based elements for a network;

sorting the set of range-based elements according to a global order among the range-based elements;

generating an interval table from the sorted range-based elements;

generating an interval binary search tree from the interval table;

propagating data stored in subtrees of interior stages of the interval binary search tree to subtrees of a last stage of the interval binary search tree such that the interior stages do not comprise data;

converting the interval binary search tree to a Pensando Tree;

compressing multiple levels of the Pensando Tree into cache-lines based on a stage from which each of the levels is accessed; and assembling the cache-lines in a memory unit such that each stage can compute an address of a next-cache line to be fetched by a next stage using an address of a current cache-line and an outgoing branch number of the subtree at a current stage, wherein packets received in a data plane are classified based on the Pensando Tree without storing memory addresses in the cache-lines.

30. A programmable input output (IO) device configured to execute instructions that cause the programmable IO device to perform operations to provide a control plane to program data forwarding hardware, the operations comprising:

determining a set of range-based elements for a network;

sorting the set of range-based elements according to a global order among the range-based elements;

generating an interval table from the sorted range-based elements;

generating an interval binary search tree from the interval table;

propagating data stored in subtrees of interior stages of the interval binary search tree to subtrees of a last stage of the interval binary search tree such that the interior stages do not comprise data;

converting the interval binary search tree to a Pensando Tree;

compressing multiple levels of the Pensando Tree into cache-lines based on a stage from which each of the levels is accessed; and assembling the cache-lines in a memory unit such that each stage can compute an address of a next-cache line to be fetched by a next stage using an address of a current cache-line and an outgoing branch number of the subtree at a current stage, wherein packets received in a data plane are classified based on the Pensando Tree without storing memory addresses in the cache-lines.

* * * * *